United States Patent [19]

Baldwin

[11] Patent Number: 5,428,754
[45] Date of Patent: Jun. 27, 1995

[54] COMPUTER SYSTEM WITH CLOCK SHARED BETWEEN PROCESSORS EXECUTING SEPARATE INSTRUCTION STREAMS

[75] Inventor: David R. Baldwin, Weybridge, United Kingdom

[73] Assignee: 3DLabs Ltd, Egham, United Kingdom

[21] Appl. No.: 326,573

[22] Filed: Mar. 21, 1989

[30] Foreign Application Priority Data

Mar. 23, 1988 [GB] United Kingdom ............ 8806862
Mar. 23, 1988 [GB] United Kingdom ............ 8806866

[51] Int. Cl.⁶ .................................................. G06F 15/16
[52] U.S. Cl. ............................... 395/375; 395/800; 364/DIG. 1
[58] Field of Search ... 364/200 MS File, 900 MS File; 395/375, 800

[56] References Cited

U.S. PATENT DOCUMENTS

| | | | |
|---|---|---|---|
| 3,656,123 | 4/1972 | Carnevale et al. | 340/172.5 |
| 3,961,313 | 6/1976 | Bodner et al. | 340/172.5 |
| 4,153,941 | 5/1979 | Caddell | 364/900 |
| 4,308,579 | 12/1981 | Dlugos | 395/200 |
| 4,419,739 | 12/1983 | Blum | 364/900 |
| 4,653,018 | 3/1987 | Stadlmeier et al. | 364/900 |
| 4,685,614 | 8/1987 | Levine | 236/78 |
| 4,851,995 | 7/1989 | Hsu et al. | 364/200 |
| 5,021,679 | 6/1991 | Fairbanks et al. | 307/66 |

*Primary Examiner*—Parshotam S. Lall
*Assistant Examiner*—Richard Ellis
*Attorney, Agent, or Firm*—Robert Groover

[57] ABSTRACT

A multiprocessor system which includes a control processor and a high-level data-transfer processor. Both of these two processors are docked by a shared variable-duration clock. The duration of the clock is adjusted on the fly, to accommodate whichever of the two processors needs the longest cycle time on that particular cycle. Thus, the control processor 110 and the data transfer processor 120 are enabled to run synchronously, even though they are concurrently running separate streams of instructions.

11 Claims, 59 Drawing Sheets

| Mode | Mux A | | Mux B | | Mux C | |
|---|---|---|---|---|---|---|
| | OE | SEL | OE | SEL | OE | SEL |
| No Operation | Z | - | Z | - | Z | - |
| Byte Extend | Enable | BIT 7 | Enable | Bit 7 | Enable | Bit 7 |
| Byte Zero Fill | Enable | Zero | Enable | Zero | Enable | Zero |
| Word Extend | Z | - | Enable | Bit 15 | Enable | Bit 15 |
| Word Zero Fill | Z | - | Enable | Zero | Enable | Zero |

Z = Hi Impedance

Fig. 14B

COMPUTER SYSTEM WITH CLOCK SHARED BETWEEN PROCESSORS EXECUTING SEPARATE INSTRUCTION STREAMS

PARTIAL WAIVER OF COPYRIGHT

All of the material in this patent application is subject to copyright protection under the copyright laws of the United Kingdom, the United States, and of other countries. As of the first effective filing date of the present application, this material is protected as unpublished material.

However, permission to copy this material is hereby granted to the extent that the copyright owner has no objection to the facsimile reproduction by anyone of the patent document or patent disclosure, as it appears in official patent file or records of the United Kingdom or any other country, but otherwise reserves all copyright rights whatsoever.

BACKGROUND OF THE INVENTION

The present invention relates to computer systems and subsystems, and to computer-based methods for data processing.

High-Speed Multiprocessor Architectures

It has long been realized that the use of multiple processors operating in parallel might in principle be a very convenient way to achieve very high net throughput. Many such architectures have been proposed. However, the actual realization of such architectures is very difficult. In particular, it is difficult to design an architecture of this kind which will be versatile enough to satisfy a range of users and adapt to advances in technology.

Fully asynchronous multiprocessor architectures have been proposed, but it is generally recognized in the art that the problems of programming support in a multiprocessor architecture have not nearly been solved.

A very recent overview of some of the issues involved in multiprocessor systems may be found in Dubois et al., "Synchronization, Coherence, and Event Ordering in Multiprocessors," Computer magazine, February 1988, page 9, which is hereby incorporated by reference. A recently proposed multiprocessor architecture for digital signal processing is described in Lang et al., "An Optimum Parallel Architecture for High-Speed Real-Time Digital Signal Processing," Computer magazine, February 1988, page 47, which is hereby incorporated by reference.

Inter-Processor Synchronization

Synchronization between processors is a continuing critical issue in a very wide variety of multiprocessor systems. Often such inter-processor interfaces make use of "processor-waiting" or "processor-ready" status signals which can be set or cleared by either processor. (Such signals are commonly known as "semaphores.")

I/O Management

The use of a separate I/O processor, in addition to an interface controller and at least one other processor, has long been known in supercomputer and mainframe systems. Such systems will often use a variety of dedicated processors to handle various specialized tasks. More recently, such I/O processors have seen use in board-level numeric processing subsystems. For example, Mercury Computer Systems has announced a system (Zip3232) which appears to have a separate data-transfer processor, running asynchronously to the floating-point processor.

Specialized Hardware Architectures

A variety of specialized processor architectures, which are particularly useful for particular applications, have been proposed. However, much less attention has been paid to how such specialized architectures can be integrated in a general-purpose numeric processing architecture. Also, relatively little attention has been paid to generalized interface management for algorithm-specific processors.

SUMMARY OF THE INVENTION

The present application provides a large number of innovative teachings, which will be described in the general context of a system like that shown in FIG. 1.

Among the innovative teachings set forth herein is a system where two processors are both clocked by a shared variable-duration clock. (In the embodiment of FIG. 1, it is the control processor 110 and the data-transfer processor 120 which share a clock in this fashion.) Thus, the control processor 110 and the data transfer processor 120 are enabled to run synchronously, even though they are concurrently running separate streams of instructions. Obviously, when one processor has requested a shorter cycle duration, that processor will lose some efficiency when the clock is temporarily slowed to produce the longer duration requested by the other processor. However, this inefficiency is minor, because the majority of instructions will specify the shortest cycle time.

Thus, in the presently preferred embodiment, the control processor 110 and the data transfer processor 120 are enabled to run synchronously, even though they are concurrently running separate streams of instructions. Obviously, when one processor has requested a shorter cycle duration, that processor will lose some efficiency when the clock is temporarily slowed to produce the longer duration requested by the other processor. However, this inefficiency is minor, because the majority of instructions will specify the shortest cycle time.

In addition, a further level of arbitration is also provided. The control processor 110 is given priority on access to the cache memory 140. That is, the data transfer processor 120 must check before every cache access, to ensure that cache access has not been preempted by the control processor 110. However, to prevent lockout, the data transfer processor 120 has an interrupt signal available to it, which will command the control processor 110 to release control of the cache port 142 for at least one cycle.

A further innovative teaching herein is a new architecture (based on a novel allocation of logic families) in high-speed numeric processors. In the sample embodiment of FIGS. 4A through 4D, some very sparing use is made of ECL, in a TTL board architecture. ECL is used in three important places:

- the clock on the high-speed numeric calculation module is a "smart" clock, using ECL logic, which adjusts the clock durations cycle-by-cycle, in accordance with the particular instructions being executed by the arithmetic calculation units.
- an ECL transfer clock is used to provide a transitional clock domain which is quasi-synchronized to the slower logic outside the numeric processing module, but also has minor cycles (or clock "beats") at a frequency comparable to the maximum clock rate which the calculation units (e.g. ALU and multiplier) can accept. Again, this is a fairly smart clock, which performs some significant logic operations in between the system clock cycles.

the calculation units preferably have ECL internal data paths, but TTL interfaces.

This allocation of technologies is advantageous, not only in extracting the maximum possible speed from a given set of calculation units, but also in enabling an extremely efficient data transfer path across a very severe clock domain boundary (between the numeric processing module and the remainder of the system).

Of course, the advantages of the innovative subsystem enabled by the disclosed innovations are also advantages for the computer system as a whole. Moreover, many of the innovative teachings set forth herein can also be adapted to computing systems which do not contain a separate sub-system like that shown in FIG. 1, i.e. to more simply structured stand-alone computer systems.

BRIEF DESCRIPTION OF THE DRAWING

The present invention will be described with reference to the accompanying drawings, which show important sample embodiments of the invention and which are incorporated in the specification hereof by reference, wherein:

FIG. 4A shows some key parts of the interface to the Control Processor module 110. FIG. 4B shows some key parts of the data path in the Floating-Point Processor, in the presently preferred embodiment. FIG. 4C shows some key parts of the control logic in the Floating-Point Processor, in the presently preferred embodiment. FIG. 4D schematically shows the field allocations in the microinstruction format used in the Numeric Processor module 130, in the presently preferred embodiment.

FIG. 14B shows the inputs used in the different operating modes of the hardware used, in the presently preferred embodiment, to use low-resolution data sources in a high-speed system.

DESCRIPTION OF THE PREFERRED EMBODIMENTS

The numerous innovative teachings of the present application will be described with particular reference to the presently preferred embodiment, wherein these innovative teachings are advantageously applied to the particular problems of subsystems which can work under the direction of a host computer to handle high-speed numeric computing. (Such subsystems are commonly referred to as "accelerator boards.") However, it should be understood that this embodiment is only one example of the many advantageous uses of the innovative teachings herein. For example, the various types of the architectural innovations disclosed herein can optionally be adapted to a wide variety of computer system contexts. In general, statements made in the specification of the present application do not necessarily delimit any of the various claimed inventions. Moreover, some statements may apply to some inventive features but not to others.

Overview

The present invention will be described with particular reference to the context of a system embodiment like that shown in FIG. 1 (or, alternatively, those of FIGS. 9A, 10, 41, or 43.) It should be understood that the features of these embodiments are not all necessary parts of the present invention, but they do provide the context in which the preferred embodiment will be described.

Figure 1:
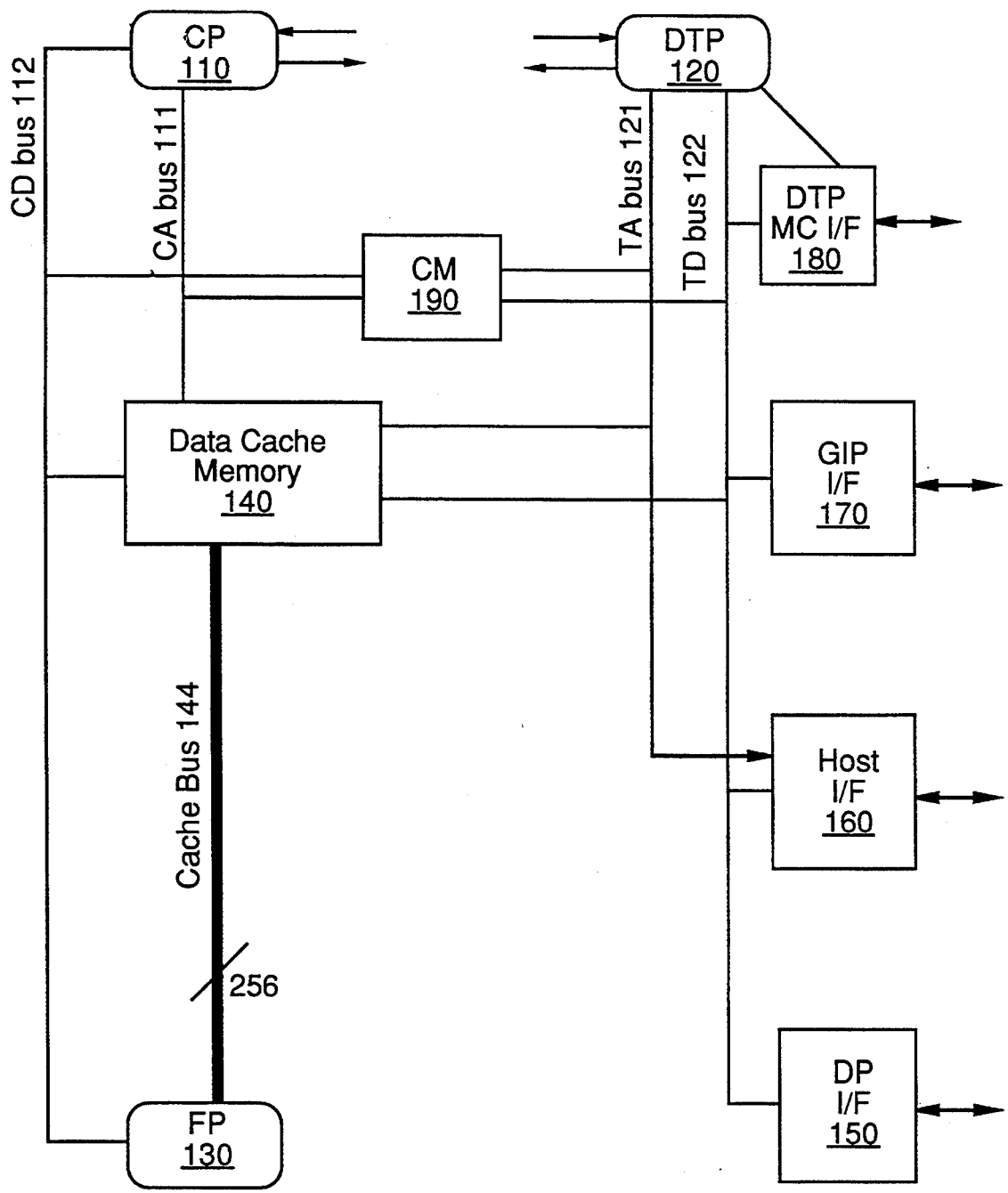
FIG. 1 shows a general overview of a numeric accelerator subsystem having a novel three-processor architecture.

FIG. 1 generally shows an architecture for a numeric processing system, which normally is used as a subsystem of a larger computer system. Systems like that of FIG. 1 are commonly referred to as "accelerator boards". They are normally used as sub-systems. That is, a supervisor processor will provide a high-level command to the accelerator subsystem For example, the supervisor processor may order the accelerator subsystem to perform a vector add, a matrix inversion, or a fast Fourier transform (FFT). The accelerator subsystem will then fetch the data from the location specified by the supervisor processor, perform the number-crunching operations, and return the result to the supervisor processor.

FIG. 1 shows an architecture with three different processor modules, all of which can run different tasks concurrently. These three modules are the control processor (CP) module 110, the data transfer processor (DTP) module 120, and the numeric processing module 130. (This numeric processing module is preferably a floating-point processing module, and will therefore often be referred to as the "FP" module. Various other types of numeric processing modules can be used, as will be discussed below.) The numeric processor module 130 runs asynchronously to the other two processors, i.e. with a completely independent clock. In addition, the external interfaces 150, 160, 170, and 180 also contain substantial amounts of logic.

The structure of the data cache memory 140, and its relation to the other blocks in the system, is quite significant. The data cache memory 140 is connected to the floating point processor 130 by a wide cache bus 144. In the presently preferred embodiment, the cache bus 144 includes 256 physical lines reserved for data.

The three types of processor modules permit easy task allocation. The primary allocation of tasks is as follows:
- the data transfer processor manages the interface to the outside world, through the external interfaces, and also handles data transfer between the cache memory and the outside world;
- the control processor 110 performs address calculations, and controls all data transfers to and from the numeric processing module 130; and
- the numeric processing module 130 performs data calculations.

Designing an efficient high-speed system to support this allocation of tasks requires that some significant architectural difficulties be solved. However, the disclosed innovations solve these difficulties, and the result turns out to be surprisingly advantageous.

To facilitate realization of such an architecture, the embodiment of FIG. 1 contains several notable hardware features. First, the control processor 110 includes a very large capability for address calculation operations. In the presently preferred embodiment, as generally shown in FIG. 2, this processor includes not only a sequencer, but also address generation logic and an arithmetic-logic-unit (ALU).

The data transfer processor 120 supervises the operation of the external interface controllers. In the presently preferred embodiment, there are actually three external interface controllers. These include a VME bus interface 160, and also controllers for two backplane busses. (One backplane bus is a "data pipe," which provides a high-bandwidth ink between accelerators, and the other is a "GIP bus," which is optimized for transmission of image or graphics data.) Each of these three bus interfaces includes its own control logic, preferably including a controller. For example, the VME bus interface includes a direct-memory-access (DMA) controller, for expedited block data transfer. However, the data transfer processor 120 provides a high-level supervision for all of these interfaces.

A critical part of this architecture is the cache memory 140. This cache memory is not only very wide (256 bits), large (preferably at least 2 megabytes), and fast (100 nanoseconds access time as presently configured, and preferably much faster), but is also effectively tri-ported. The memory is preferably only dual ported physically, and arbitration between the control processor 110 and the data transfer processor 120 is accomplished in their microcoded instruction scheme.

Note also that the three ports of the cache memory 140 are quite different. In general, in most numeric processing subsystems it has been found that the bandwidth between the cache memory and the number-crunching components is of critical importance. Therefore, in the presently preferred embodiment, the port to numeric processor 130 is much wider (and therefore has a much higher bandwidth) than the ports to the control processor and data transfer processor. In the presently preferred embodiment, the latter ports are only 32 bits wide. Moreover, a set of fully parallel registers is used at the 32-bit ports, so that all accesses to these ports are seen by the cache memory 140 as fully parallel i.e. as 256-bit parallel reads or writes.

The interface to the numeric processing module 130 is so defined that multiple modules 130 can be used in parallel all under the control of a single control processor 110 and all accessing (preferably) a single data cache module 140. The extremely high bandwidth of the cache bus 144 is an important factor in achieving this multi-module capability.

The interface between the control processor 110 and the data transfer processor module 120 also provides significant advantages in efficiently exploiting the cache. In the presently preferred embodiment, some significant features are used to improve the advantages of this interaction. First, as is common in the art of microprogrammed processors, both the control processor 110 and the data transfer processor 120 preferably use variable-duration instructions. That is, some instruction types require substantially longer cycle times than others. For example, to give extreme cases, a no-operation instruction or an unconditional branch would require far less processor time than a multiply instruction. Thus, it has been common to use variable-duration clocks for controlling processors, where the clock generator looks at the instruction type being executed and adjusts the duration of the clock interval accordingly, on the fly.

In the presently preferred embodiment, both the control processor 110 and the data-transfer processor 120 are docked by a shared variable-duration clock. Thus, the control processor 110 and the data transfer processor 120 are enabled to run synchronously, even though they are concurrently running separate streams of instructions.

The control processor 110 is given priority on access to the cache memory 140. That is, the data transfer processor 120 must check before every cache access, to ensure that cache access has not been preempted by the control processor 110. However, to prevent lock-out, the data transfer processor 120 has an interrupt signal available to it, which will command the control processor 110 to release control of the cache port for at least one cycle.

The three types of processor modules will sometimes be referred to by abbreviations in the following text. For example, the microcode which runs in the data transfer processor module 120 may be referred to as the DTP microcode. Similarly, the microcode which runs in the control processor 110 may be referred to as the CP microcode, and the microcode which runs in the numeric processing module 130 may be referred to as FP microcode. These abbreviations will be used regarding other features as well.

Design Goals

The subsystem of the presently preferred embodiment has been designed to give a very high floating point number crunching performance with small size and at low cost.

Two system contexts have been targets for use of this subsystem: this subsystem is well suited for use as a floating point accelerator for a wide range of general-purpose host computers. (In particular, compatibility with UNIX engines is desirable.)

It is also contemplated that the accelerator system of FIG. 1 may be very advantageous in a specialized picture processing system. An example of such a system would be a graphics and image processing system, manufactured by benchMark Technologies Ltd., and referred to as the "GIP" system. (The GIP systems include a number of features to give very high throughput in a wide range of graphics and image applications.) Such a system, including an accelerator subsystem like those shown in FIGS. 1, 9A, 10, 43, etc., may be particularly advantageous for running three-dimensional graphics algorithms.

Division Of Algorithms

The architecture of FIG. 1 will be discussed in much greater detail below, but first it will be informative to look at how this multiprocessor structure can be used.

As noted above, most algorithms can be broken down into four separate parts: Control, Data input and output, Address calculations, and Data calculations.

The preferred architecture treats these as separate tasks, and maps them onto the three processors. The control and address calculations are handled by the Control Processor (CP) Module 110, the data I/O tasks are handled by the Data Transfer Processor (DTP) Module 120, and the data calculations are handled by the Floating-point Processor (FP) Module 130.

The division of an algorithm between the control processor module 110 and the FP is illustrated by the detailed descriptions below, regarding some specific algorithm implementations. One good example is provided by the Fast Fourier Transform (FFT) implementation discussed below, with reference to FIG. 31. The FFT algorithm is notoriously difficult to program efficiently.

In this example, the FFT algorithm is divided between the control processor module 110 and floating-point processor module 130, by assigning the address calculations for the data samples and phase coefficients to the control processor module 110 and the butterfly calculations to the floating-point processor module 130.

The portion of the FFT software which runs in the CP module 110 calculates the address of the complex data, as a function of the stage and butterfly numbers. The complex phase coefficients are held in a table, and thus part of the software will also calculate the position of the needed coefficients in the table, as a function of the stage and butterfly numbers. Once the addresses have been calculated, the data and coefficients can be fetched and transferred over to the floating-point processor module 130. When the floating-point processor module 130 has completed the butterfly calculations, the control processor module 110 will read the results and save them before repeating the address calculations for the next butterfly. Note that the control processor module 110 does not have to track the actual butterfly calculation; it merely interchanges data with the floating-point processor module 130 at synchronization points. Note also that this software does not merely calculate addresses, but also controls the actual data transfers between the cache memory and the numeric processor.

The portion of the FFT software which runs in the floating-point processor module 130, calculates the butterfly by a simple linear sequence of instructions to implement the butterfly calculations for the data set at each successive stage. It knows nothing of the complicated address calculations needed to provide the correct data and coefficients for each stage. The code for the data calculations can therefore be written without reference to the code for the data transfer operations. In fact, if it is desired to use a different design for floating-point processor module 130 (e.g. to use a different floating point chip set, or a low-level data path architecture which is more optimized for FFTs), then only this (relatively simple) portion of the software will require changing.

The execution of the CP and FP software occurs in parallel, and is pipelined so that the speed at which an algorithm runs is determined by the slowest part.

Architecture Description

Some of the key parts of the subsystem of FIG. 1 will now be described in greater detail However, it should be understood that this is still only a summary description. Far greater detail will be provided below.

Figure 2A:
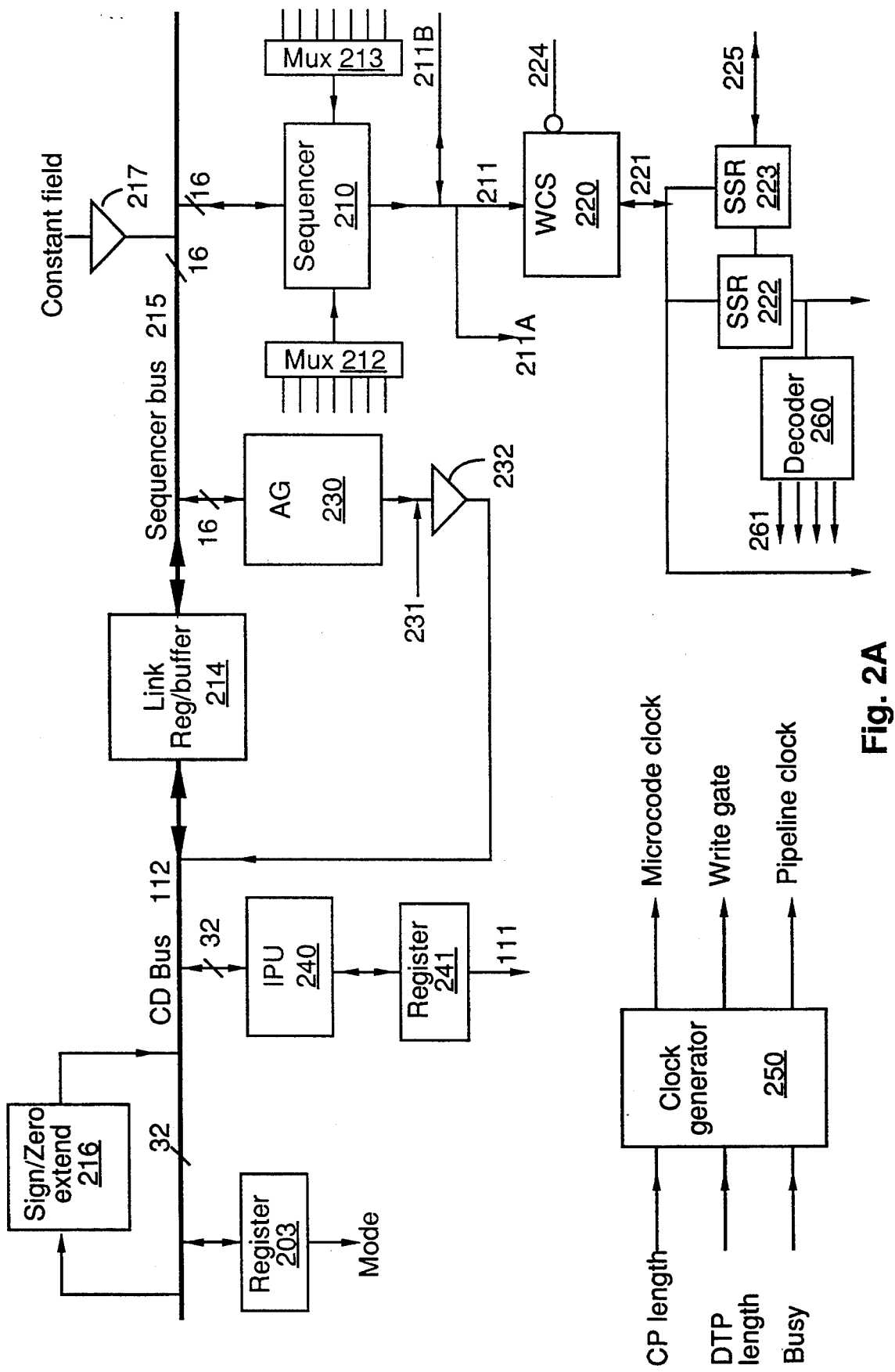
FIG. 2A generally shows the organization of some key parts of the Control Processor module 110, in the presently preferred embodiment.

Brief Review of CP Module 110 (FIG. 2A)

The Control Processor (CP) module 110 includes a 32 bit integer processor unit (IPU) 240, a microcode sequencer 210, an address generator (AG) 230, and miscellaneous items such as microprogram memory, clock generator, bus control, etc.

In the presently preferred embodiment, the integer processor unit 240 is a Weitek XL8137, the sequencer 210 is an Analog Devices ADSP-1401, and the address generator 230 is an Analog Devices ADSP-1410. As will be readily understood by those skilled in the art, a wide variety of other components could be used instead, or equivalent functionality could be embodied in other blocks instead.

The control processor module 110 has two main tasks to undertake:

It controls the operation of the board (at a higher level), by interpreting commands from the host, requesting transfers by the DTP module 120, and initializing the floating-point processor module 130 before it starts data calculations.

It generates addresses for the data cache memory, and controls the transfer and routing of data between the data cache memory and the FP module 130. This activity normally occurs repeatedly during the actual number crunching process, after the high level control operations have been completed. Loop control is handed by the sequencer, so that the address generator and IPU can be used exclusively for generating addresses.

Communication with other blocks is via a 32 bit wide data bus (CD bus 112), which allows the control processor module 110 to read and write to the data cache memory 140, command memory 190, and the control registers of FP module 130. The control processor module 110 can be interrupted by the host (via the VME interface 160), by the floating-point processor module 130, or by the data transfer processor module 120. In normal operation (i.e. apart from program development and debugging) the only interrupt source will be the data transfer processor module 120.

Figure 3A:
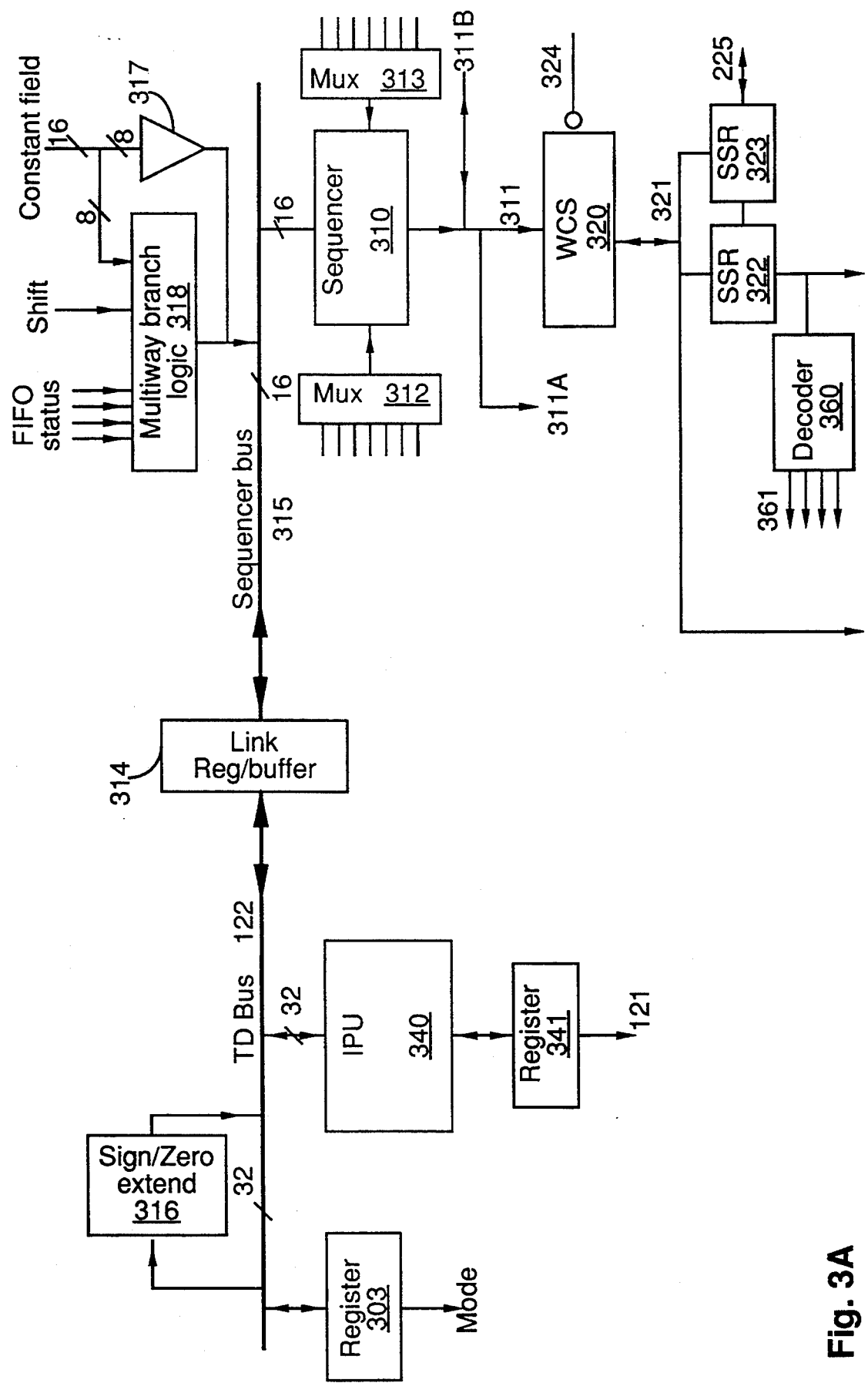
FIG. 3A generally shows the organization of some key parts of the Data Transfer Processor module, in the presently preferred embodiment.

Brief Review of DTP Module 120 (FIG. 3A)

The Data Transfer Processor (DTP) Module 120 is very similar to the control processor module 110, from the programmer's viewpoint, in that it uses the same 32 bit processor and sequencer. The bus control and interface control are obviously different. One other distinguishing feature from the control processor module 110 is that the data transfer processor module 120 has a microcode expansion port, which permits it to control add-on boards (such as a bulk memory card or a network card).

The data transfer processor module 120 has three main tasks to undertake:

It controls the transfer of data between the data cache memory and the external interfaces. (It does this in response to high-level commands from the control processor module 110 (or from the host).)

It transfers commands from the external interfaces to the command queues maintained in the command memory 190, for subsequent processing by the control processor module 110. Any of the external interfaces can provide commands, but initially it is expected that the VME interface will be the main source. Suitable software will allow command lists to be held in the data cache memory (or command memory), and be called as macros. (This method is sometimes called "vector chaining."))

In the debug environment, the data transfer processor module 120 is the main interface between the debug monitor (running on the host) and the microcode being debugged in the data transfer processor module 120, control processor module 110 or floating-point processor module 130. It also gives the debug monitor access to the various memories that are not mapped into the VME address space.

The transfer of data and commands between the external interfaces, the data cache memory, command memory, VME interface memory, and the data transfer processor module 120 occurs over the 32 bit wide TD bus 122. The external interfaces 150, 160, and 170 are FIFO buffered, and interrupt the data transfer processor module 120 when they require attention, i.e. when they receive some data or are getting empty. Additional interrupt sources are the host (via the VME interface), and the control processor module 110.

Access by the data transfer processor module 120 to the data cache memory is limited to cycles that are not used by the control processor module 110. (The CP module 110 may be using the memory either for transfers to the floating-point processor module 130 or for itself.) If the data transfer processor module 120 is forced to wait too long for access, it can steal a cycle by interrupting the control processor module 110.

Figure 4A:
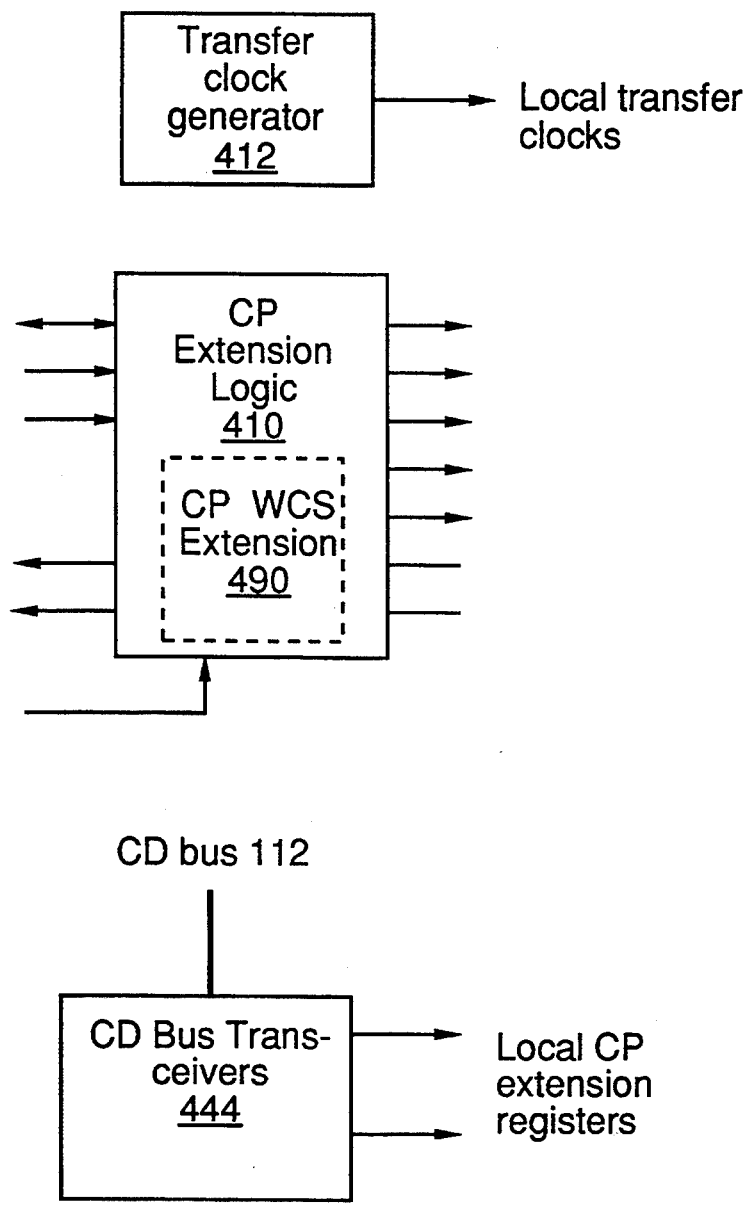
FIGS. 4A, 4B, 4C, and 4D generally show the organization of some key parts of the numeric processing module 130, which in the presently preferred embodiment is a Floating-Point Processor.
Figure 4B:
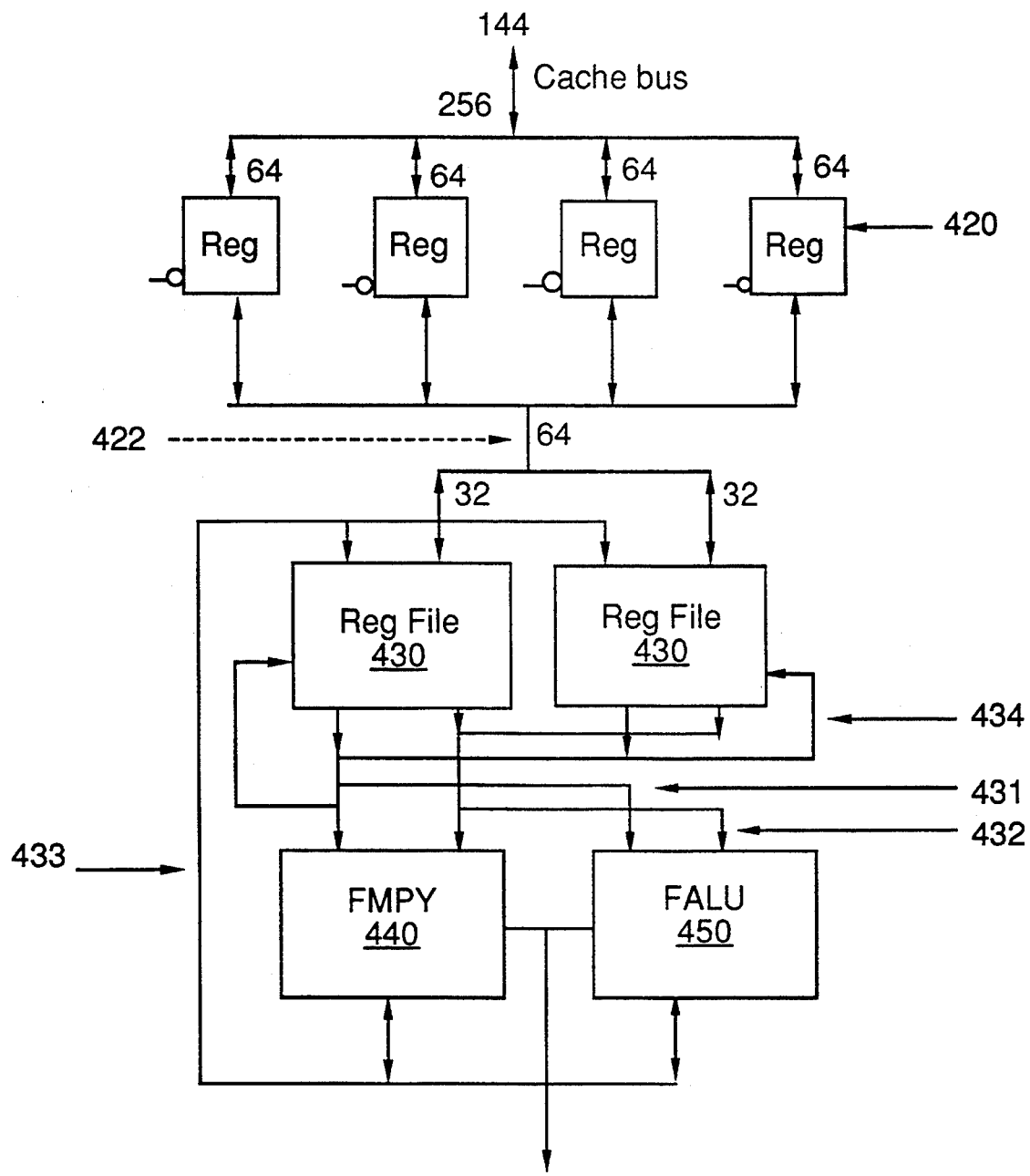
Figure 4C:
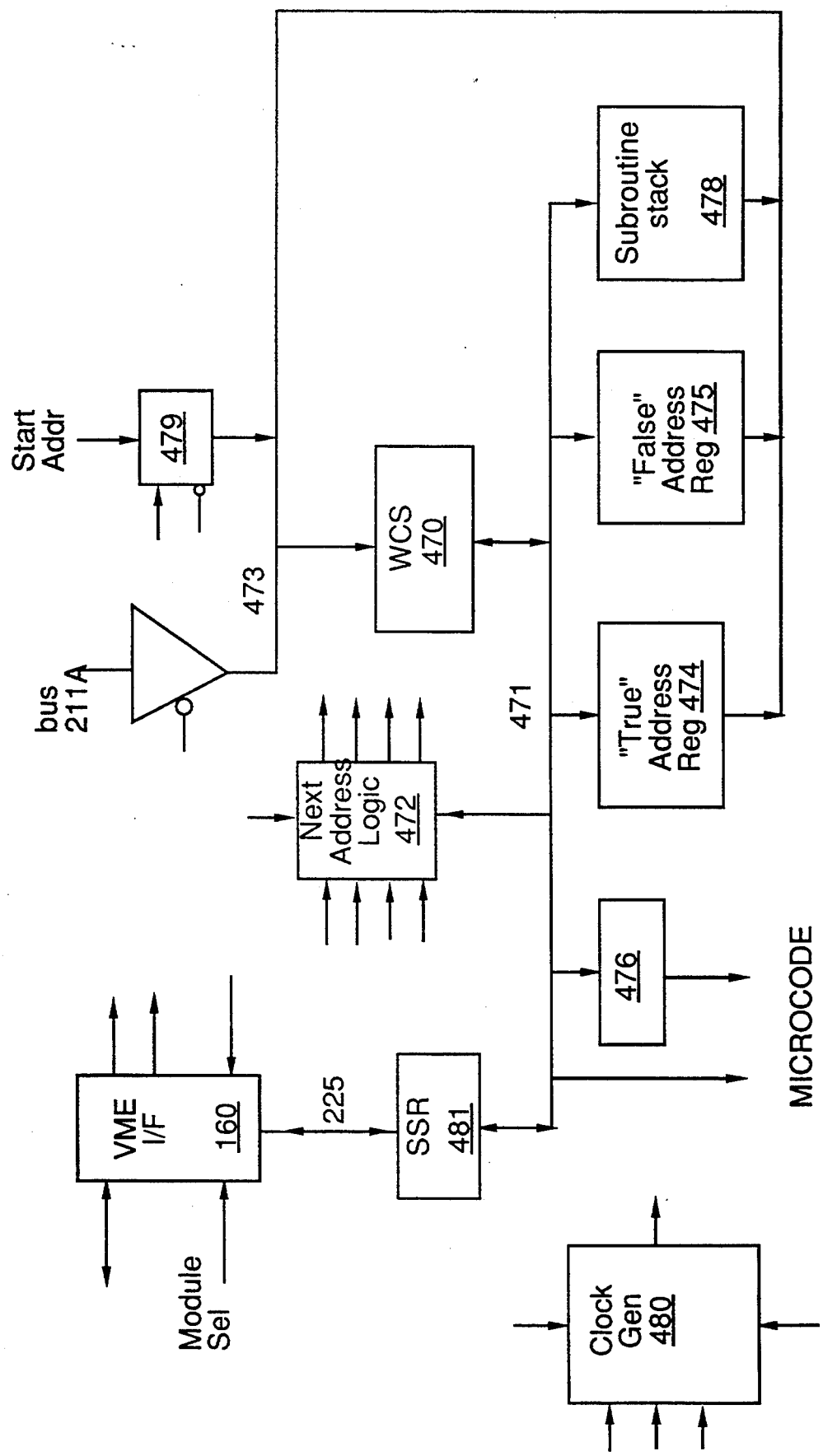

Brief Review of FP Module 130 (FIGS. 4A–4C)

The Floating-point Processor Module 130 is located on a separate board, which plugs into the main base board The operations of the floating-point processor module 130 may be considered as having two distinguishable parts:

(a) The microcoded floating point unit. This section undertakes the floating point calculations. The unit was designed to achieve one goal—to run as fast as possible, in order to obtain maximum performance from the floating point hardware devices. To meet these design aims, a very simple architecture is utilized. It includes a floating point multiplier, a floating point ALU (arithmetic and logic unit), fast multiport register files, and a very fast, but simple, sequencer. In addition, a scratchpad memory is closely coupled to the inner data paths, to hold lookup tables and provide histogram storage. The floating point arithmetic units interface with the register files via two read ports and one write port. Another write port is connected to one of the read ports, to provide a data shuffle and replication capability. The final pert is bidirectional, and is used to pass data into and out of the register files.

(b) The data cache memory interface. This part of the FP module interfaces data cache memory to the bidirectional port of the register files. There is a set of bidirectional registers between the register file and the data cache memory which pipelines the data transfers and also handles the data multiplexing and routing. The control for the transfer is generated in the transfer logic. Note that many parts of this interface, although physically located together with the FP module 130, are clocked with the CP module 110, and will generally be referred to as an extension CP module 110 rather than as part of the FP module 130.

A highly multi-ported fast register file is a key element in providing a clean interface between the control processor module 110 and floating-point processor module 130. One side of this register file runs synchronously to the control processor module 110, and the other side runs synchronously to the floating point processor module 130. Thus, this clock boundary placement permits changes to be made on one side of the boundary without affecting the other side. This provides a migration path to faster, or more, integrated floating point chip sets, and hence floating point device independence.

Figure 9A:
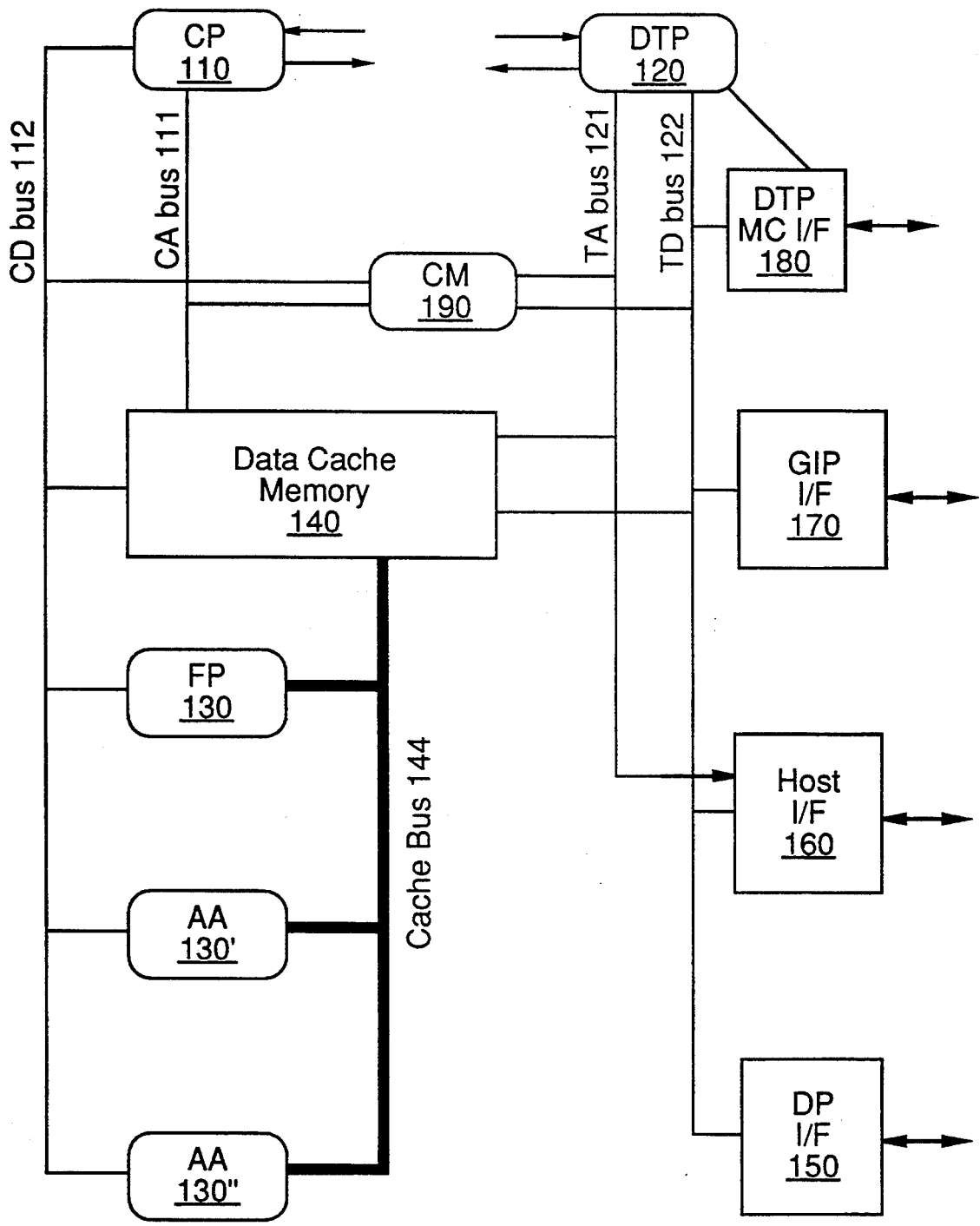
FIG. 9A shows a general overview of a numeric accelerator subsystem including an application-customized numeric processing module ("algorithm accelerator") 130'.
Figure 10:
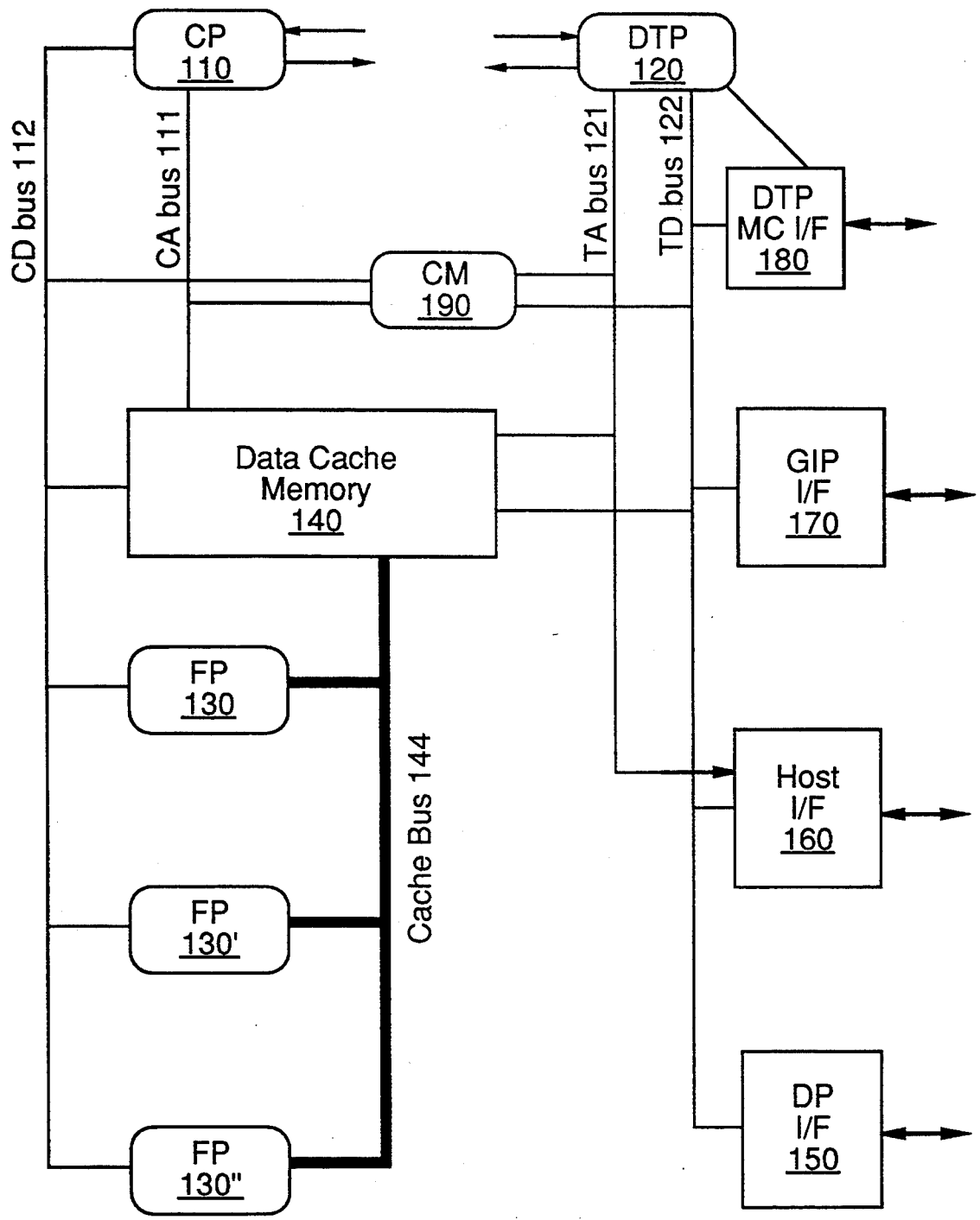
FIG. 10 shows a subsystem including multiple numeric processing sub-subsystems.

Up to 4 floating-point processor modules 130 (or algorithm-customized modules 130') can be included in one such subsystem, Some examples of interest are shown in FIGS. 9A and 10.

Figure 5:
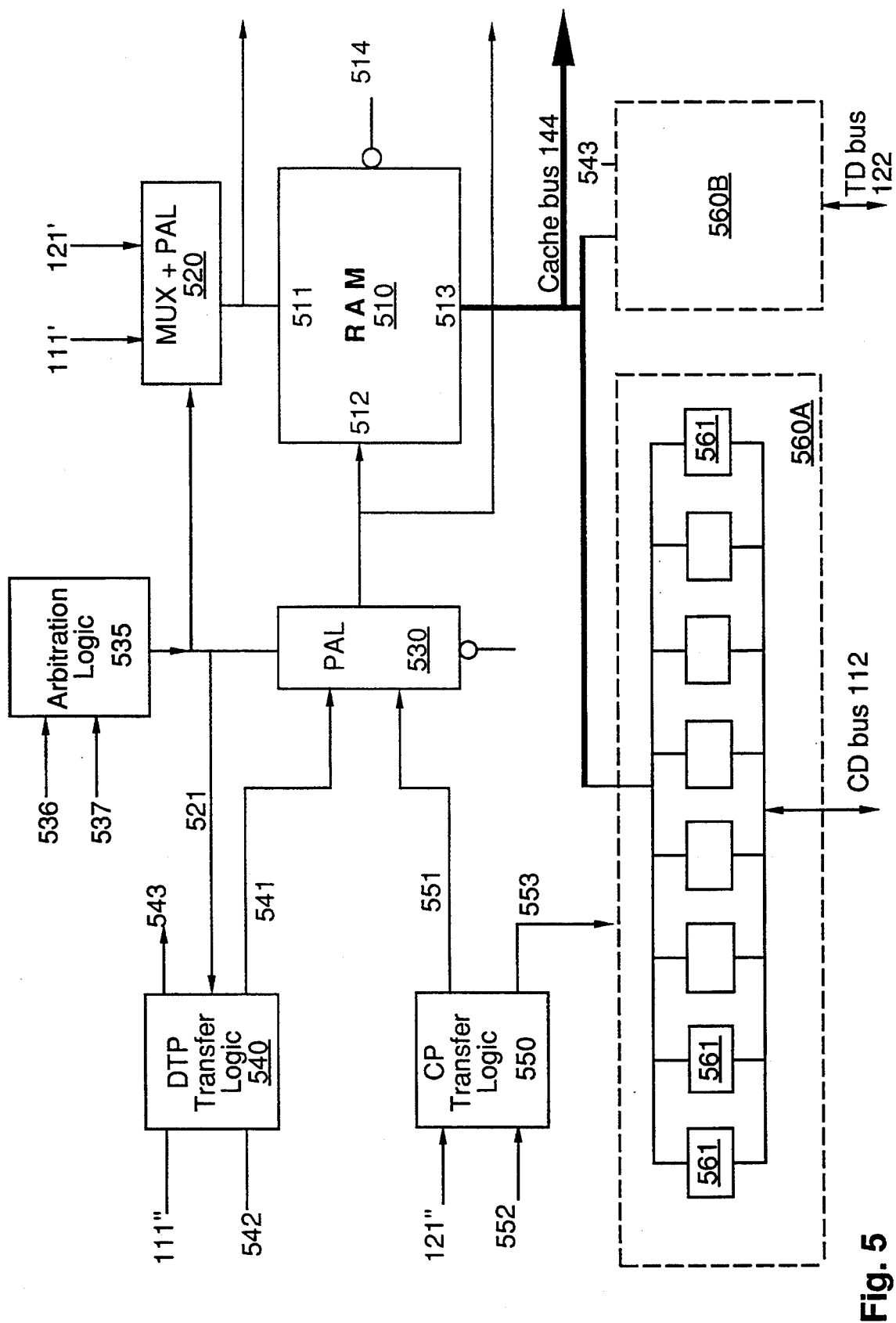
FIG. 5 generally shows the organization of some key parts of the Data Cache Memory, in the presently preferred embodiment.

Brief Review of DCM 140 (FIG. 5)

The Data Cache Memory 140 is a very high bandwidth, multi-ported memory. The architecture of this memory and its interfaces provides tremendous advantages in the overall performance of the system of the preferred embodiment. The high bandwidth is necessary to keep the floating-point processor module 130 supplied with data (and to remove its results), when the floating-point processor module 130 is undertaking simple vector calculations. For example, a vector 'add' operation requires 3 number transfers per calculation; if the floating-point processor module 130 is able to sustain a calculation rate of 20 Mflops, the memory bandwidth required to keep up will be 240 Mbytes per second.

The data cache memory has a memory bank made up of 64K by 32 bit memory modules, providing 2 Mbytes of on-board storage. This may be expanded by the use of a remote memory expansion board 4310 which hangs onto the cache bus 144. (Physically, this memory expansion module plugs into the same connectors as the floating-point processor module 130 modules.) This memory expansion board, which will have the same bandwidth as the on-board data cache memory, can be configured to store an extra 12 Mbytes of memory in increments of 2 Mbytes. By using double capacity memory modules, the on-board storage may be increased to 4 Mbytes and the off-board to 24 Mbytes.

There are three ports to the data cache memory, one to each of the processors. However, in many respects it has been possible to treat the memory as only dual ported, because the data transfers to the control processor module 110 and floating-point processor module(s) 130 are all controlled by the CP microcode. Data transfers for the floating-point processor module 130 and control processor module 110 have priority over I/O transfers, so the data transfer processor module 120 may be forced to wait until there is a free memory cycle. If the data transfer processor module 120 is kept waiting too long, it can interrupt the control processor module 110 and gain access to the memory. This is not likely to be a problem, unless the control processor module 110 is undertaking random accesses. Even then, for block I/O transfers, the data transfer processor module 120 will requires 8 cycles to transfer the data per memory access, before it needs to request another block of data.

In order to obtain the high memory bandwidth with reasonable cycle time memory devices, a wide memory architecture has been chosen. The memory is 256 bits wide, so that in a single access cycle, 32 bytes (8 F_words) are transferred. With the memory cycling in periods of 100 ns, the memory bandwidth is 320 Mbytes per second for block transfers and 40 Mbytes per second for random F_word accesses.

The data cache memory may also be used to hold microcode overlays for the FP module 130. These can be transferred into and out of the FP module's writable control store (WCS) when the floating-point processor module 130 microcode exceeds the WCS size. The reloading of the WCS via this parallel load facility occurs very much faster than the normal serial load under host control In fact, this capability is fast enough to allow dynamic paging of the microcode.

Brief Review of CM 190

The Command Memory (CM) 190 is a small amount (2K) of 32 bit wide memory, dual ported between the control processor module 110 and data transfer processor module 120. Command, control and status data are passed between the control processor module 110 and DTP via software queues or FIFOs maintained in this memory.

Half of this memory is reserved for use by the microcode debug monitor, to hold the control processor module 110 and floating-point processor module 130 state information (as well as some command structures).

Brief Review of External Interfaces

The preferred embodiment includes several smart interfaces. The most important of these is the host interface 160 (also referred to as the VME interface). The VME interface interfaces the subsystem of the preferred embodiment to the VME bus and complies with the full electrical and protocol specifications as defined in the VME bus specification, revision C1.

The VME interface operates in slave mode when the VME host is loading up microcode, accessing control or status registers, accessing the VME Interface Memory (VIM) or accessing the data FIFO. The slave interface does not support byte or word accesses; it supports only 32 bit parallel accesses. However, the control and status registers are 16 bits wide, and therefore a 16 bit host can still control the subsystem of the preferred embodiment.

The VME interface operates in master mode when it is transferring data between the data FIFO and VME memory under local DMA control. The DMA activity is controlled and monitored by the data transfer processor module 120 which can also initiate interrupt cycles onto the VME bus.

The Data Pipe interface is designed to connect to a high-bandwidth backplane bus. (Physically, this can be configured simply using ribbon cable.) This bus provides a convenient mechanism for private inter-subsystem communication. That is, the interface logic includes two receiving ports and one sending port, so that several busses of this type can be used as short local busses, to provide a wide variety of system dataflow architectures. The data transfers on this bus are buffered with FIFOs (at the receiving end), and this architecture allows high speed low overhead transfers. Multiple subsystem can be connected in parallel or in series (e.g. in a pipeline), which allows very high performance systems to be implemented easily.

As an example, a high performance, real time 3D graphics system can be constructed with two accelerator subsystems and a picture processor, configured in a pipeline. The first accelerator subsystem transforms and clips the polygons for frame n, the second accelerator sorts the polygons into drawing order (for hidden surface removal) for frame n−1, and the picture processor draws the polygons for frame n−2.

The DTP microcode expansion interface is virtually an extension of the DTP module 120 micro address and data busses. It is 100% compatible (physically and electrically) with the GIP microcode expansion bus, and can use any of the expansion cards, designed for GIP, that use this type of interface. The external bulk memory systems and network cards will connect to the subsystem of the preferred embodiment via this interface port.

A Picture Data Bus Interface 170 (or "GIP Interface") connects to another bus which is particularly optimized for graphics and image data This interface also permits connection to the GIP microcode expansion bus, which allows a small amount of interface logic on the subsystem of the preferred embodiment to be controlled by the GIP microcode. This provides a bidirectional, 16 bit wide FIFO between the GIP and subsystem of the preferred embodiment along which commands and data can travel. Each side of the interface can interrupt the other.

Control Processor (CP) Module 110

The control processor is a 32 bit microcoded processor based around a 32 bit Integer Processor Unit (IPU) 240, which in the presently preferred embodiment is a Weitek XL8137. The IPU 240 is supported by a 16 bit address generator (AG) 230 (which in the presently preferred embodiment is an Analog Devices ADSP 1410), and a 16 bit sequencer 210 (which in the presently preferred embodiment is an Analog Devices ADSP 1401). The main data path within the control processor is the CD bus 112.

FIG. 2A provides a general overview of the organization of a control processor 110, in the presently preferred embodiment. A writable control store (WCS) 220 is a memory which contains a sequence of microinstructions. A sequencer 210 provides microinstruction address commands 211 to fetch microinstructions from control store 220. The stream of instructions thus fetched from control store 220 is shown as 221. Note that both an unregistered output and an output registered through register 222 are preferably provided. The registered output from 222 is provided to decoder 260. Registers 222 and 223 are both configured as serial shadow registers, and interface to a serial loop 225. Note also that a portion of the microaddress stream is also preferably provided on a line 211A, which will be communicated to the floating point module 130. This has advantages which will be discussed below.

Note also that the flow on line 221 is preferably bidirectional That is, this line can not only be used to read out microinstructions from the writable control store, but can also be used, under some circumstances, to write instructions back into the control store 220. This is an important capability, which has advantages which will be discussed below.

Figure 2B:
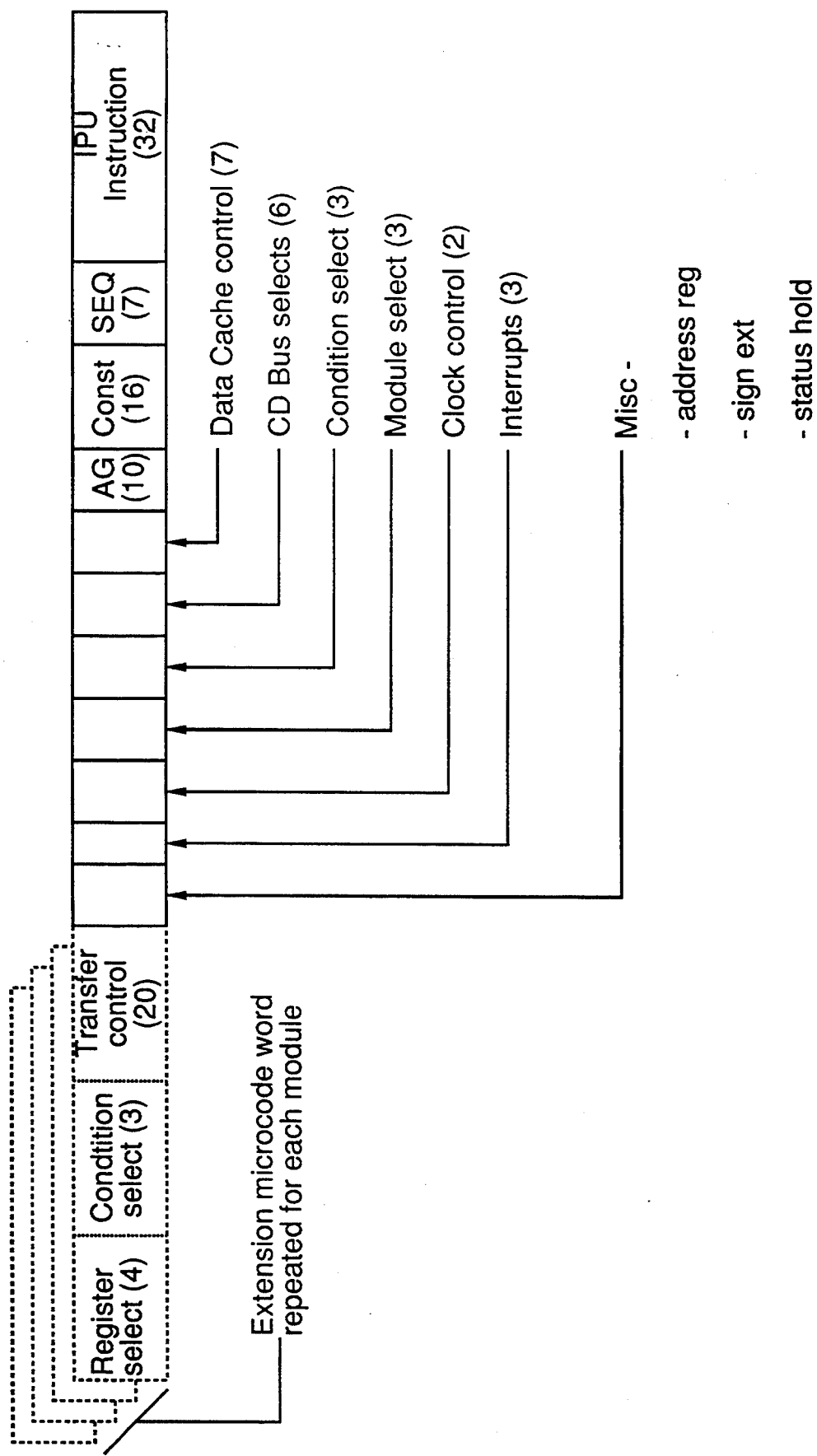
FIG. 2B schematically shows the field allocations in the microinstruction format used in the Control Processor module 110, in the presently preferred embodiment.

The microcode output is provided as an input to decoder 260. In conventional fashion, this decoder separates the fields of a microinstruction and decodes them as needed, with minimal low level decode logic. The presently preferred microinstruction format is shown in FIG. 2B, and will be discussed in greater detail below. The outputs 261 of the decoder 260 are routed to all of the major functional blocks, including the address generator 230, the integer processing unit 240 and the sequencer 210. Because these lines are so pervasive, they are not separately shown.

Note that the sequencer 210 receives inputs not only from the IPU 240 through link register (transceiver) 214, and from address generator 230 via sequencer local bus 215, but also receives several other inputs:

- A variety of interrupt lines are multiplexed through a multiplexer 213, and these interrupts will generate the various alterations in the program counter operation of a sequencer 210. Sequencer hardware for handling interrupts appropriately is very well known.
- Another multiplexer (shown as 212) is used to select among a variety of condition code signals, for input into sequencer 210. These condition code signals are used in the logic of the sequencer 210 in various ways, as will be further discussed below.
- A buffer 217 is used to route constants which may have been specified by a field of the microinstructions 221.

In addition, some further inputs and outputs are shown to the writable control store 220 and microinstruction bus 221. A write enable line 224 is externally controlled, e.g. from a host. In addition, a two-way interface 211B permits the host to write or read to the microaddress bus 211. This capability is useful for diagnostics, and also for writing microinstructions into the control store 220, as will be discussed below.

A clock generator 250 receives cycle-duration inputs from both the control processor 110 and the data transfer processor 120. The duration of the current clock cycle is selected on the fly, in accordance with the longest duration specifier received from the CP and DTP modules. This is preferably implemented using a programmed logic array (PAL). As with decoder 260, the outputs of the clock generator 250 are so pervasively routed that they are generally not separately shown.

FIG. 2B shows the microinstruction field allocation, in the presently preferred embodiment. Note that the allocation of fields in the CP extension logic is also shown. The operation of this extension logic will be discussed in great detail below. However, at this point it should be noted that the additional bits of microinstruction format in this extension field, and the WCS extension which stores these additional fields for each instruction in the primary WCS 220, and the logic which decodes and executes these additional microinstruction fields, are all replicated for each numeric processing module 130 or algorithm accelerator in the subsystem. Thus, the embodiment of FIG. 10 would include three WCS extensions, and the total CP microcode field would be 192 bits.

Note that separate instruction fields in the primary instruction are allocated for the integer processing unit 240 (32 bits), for the address generator 230 (10 bits), and also for the sequencer 210 (7 bits). In the extension fields (which would be stored in each WCS extension), fields are allocated for register select, condition select, and transfer control. The use of these bits will be discussed in greater detail below.

Other instruction fields are allocated in ways which are fairly conventional in the art of microcoded architectures. For example, a bit is used to indicate that a breakpoint has been reached, several bits are used to briefly describe the instruction type, two bits are used to encode the clock control (to permit the variable-duration clocks, as discussed above), etc.

The address generator 230 is an off-the-shelf address generator unit. The calculations which can be performed by this unit enhance the rapid address computation abilities of the control processor 110.

In addition, the integer processing unit (IPU) 240 provides still greater arithmetic capability. The IPU can read and write from the CD bus 112, and can also output addresses onto the CA bus 111 (through the register 241). These addresses, as may be seen in the high level diagram of FIG. 1, provide address information to the cache memory 140, and also to the command memory 120.

The actual component used for the integer processing unit 240, in the presently preferred embodiment, has significant arithmetic capability, including the capability to do multiplies in hardware. Thus, units 230 and 240 together provide a large mount of arithmetic hardware available for the purpose of address generation. In addition, of course, the sequencer 210 includes some logic which also performs the function of microinstruction address generation.

Note that the address generator 230 has an output 231, which is buffered and connected back onto the CD bus 112. The sequencer 210 can read the outputs of integer processing unit 240 (through link register 214), but the IPU 240 can also be commanded to drive the CD bus 112. The cache memory 140, the FP module 130, or the command memory 190 can also access these results, once they are put out on this bus.

Register 203 (shown at the top left of FIG. 2A) stores several little-used control signals. These include signals for diagnostics, LED control signals, etc.

Integer Processor Unit (IPU) 240

Figure 11:
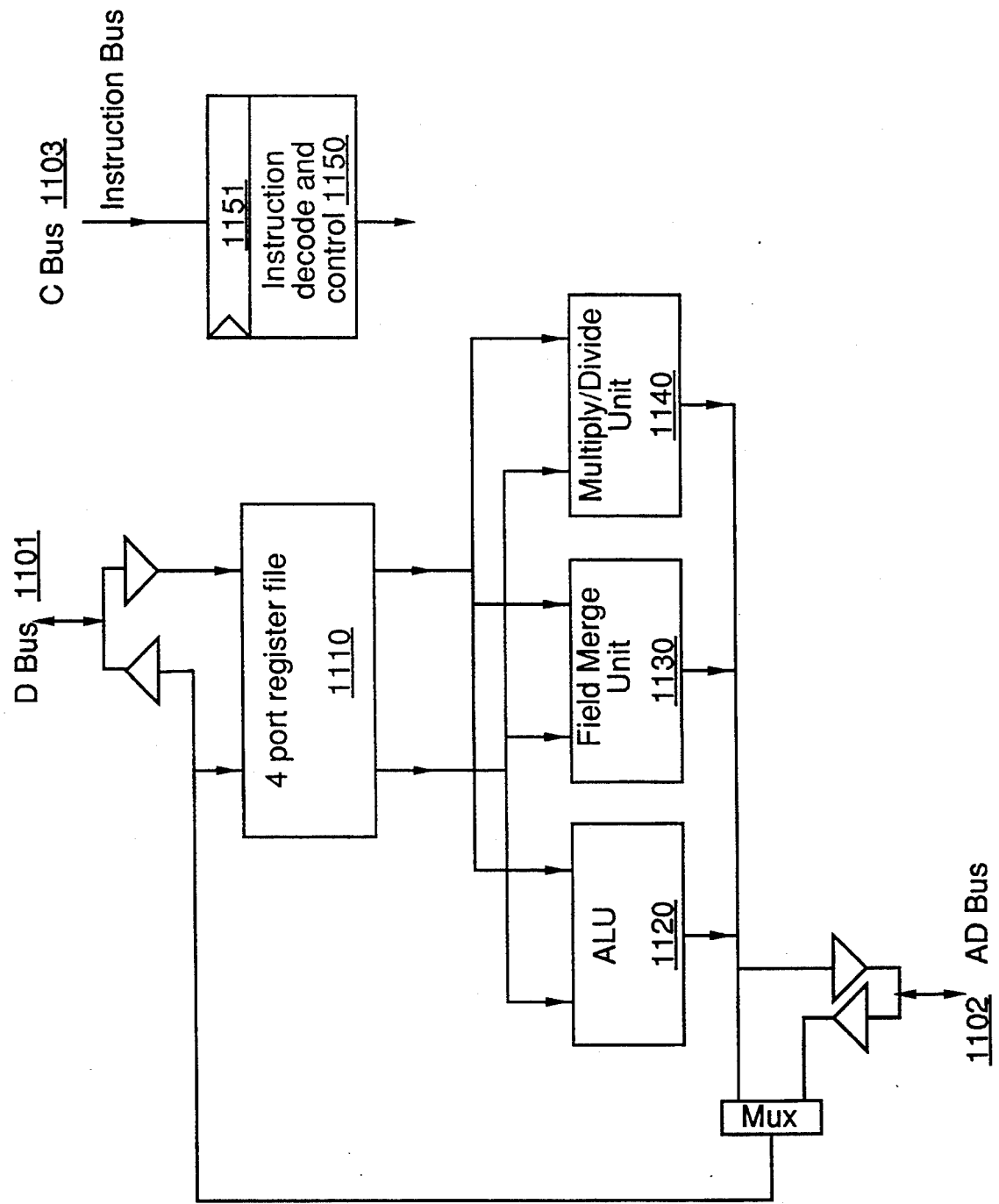
FIG. 11 generally shows the organization of some key parts of the Integer Processor Unit, which is part of the control processor (and of the data-transfer processor) in the presently preferred embodiment.

The IPU 240 contains a 4 port register file 1110, an ALU 1120, a field merge unit 1130, and a multiply/divide unit 1140. A simplified diagram showing these components is shown in FIG. 11. The two external data paths are shown in this figure as the D and AD buses 1101 and 1102. In the control processor module 110, the AD bus 1102 is connected through register 241 to serve as the address bus to the various memories, and the D bus 1101 connects directly to the CD bus 112.

The IPU 240's four port register file 1110 allows, in a single cycle, such operations as r1=r2+r3, in addition to a write into the register file via the fourth port. The ALU 1120 provides all the usual arithmetic and logical operations, as well as priority encoding and bit or byte reversal instructions. The field merge unit 1130 provides multi-bit shifts and rotates, variable bit field extract, deposit and merge functions. The multiply/divide unit 1140 runs separate from the rest of the IPU 240: once it has started doing a multiply or divide operation, any other non- multiply/divide instructions can be executed by the ALU 1120 or field merge unit 1130. The multiply operation is 32 by 32 signed (8 cycles), and the divide operation is 64 over 32 bits unsigned (20 cycles).

Register 241, external to the IPU 240, is used at the interface to the CA bus 111. This introduces a pipeline delay when accessing memory. (This register is necessary because, with the specific part used here, the AD bus is not valid until 75-90 ns after the start of a cycle.)

The microcode instruction input to the IPU 240 (on a "C" bus 1103) is registered internally (in a register 1151), so the microcode instruction is taken directly from the writable control store (WCS).

Address Generator (AG) 230

Figure 12:
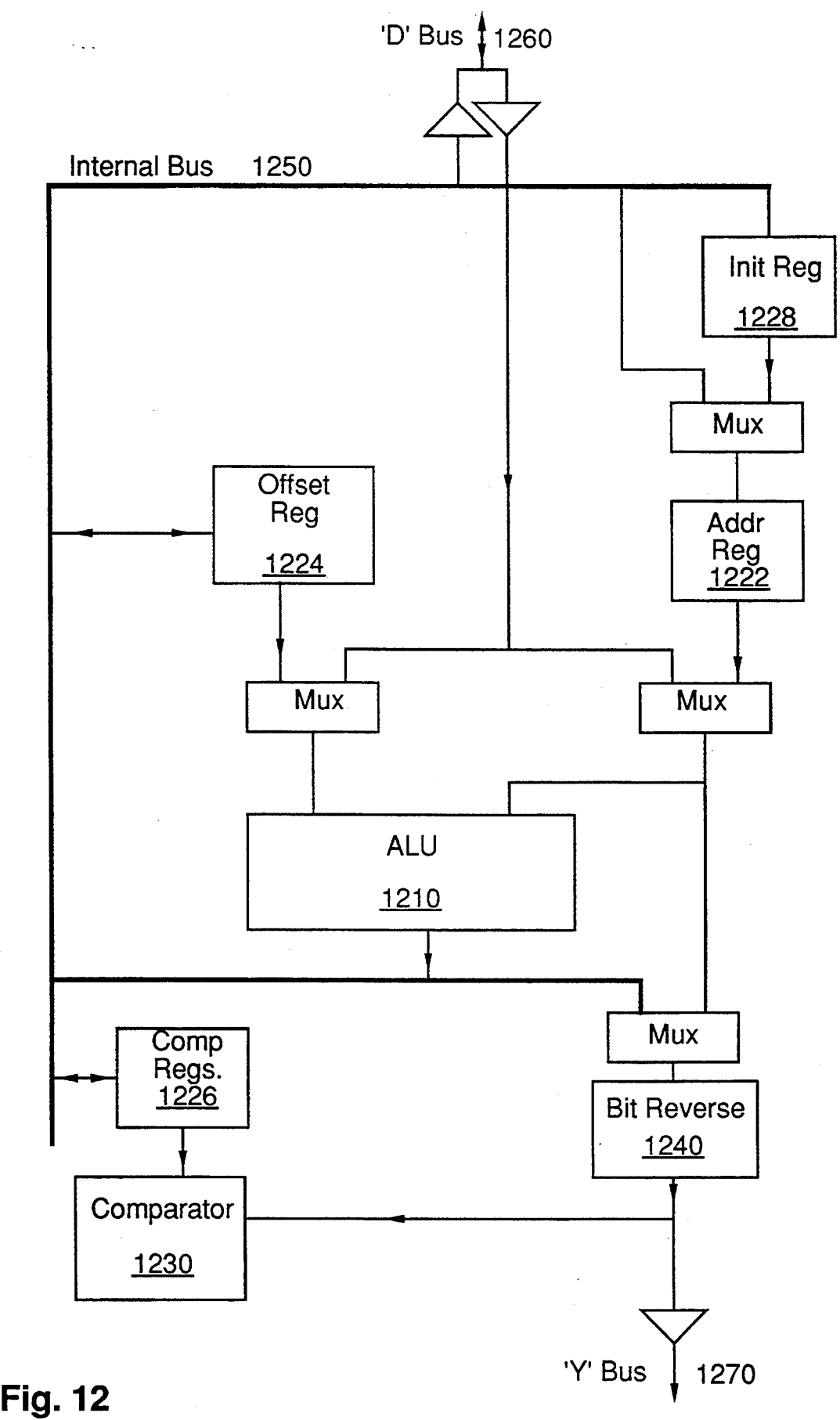
FIG. 12 generally shows the organization of some key parts of the Address generator, which is part of the control processor in the presently preferred embodiment.

The configuration of the address generator 230 used in the preferred embodiment is generally shown in FIG. 12. Key elements include a 16 bit wide ALU 1210, 30 internal registers (functionally grouped as 16 address registers 1222, 4 offset registers 1224, 4 compare registers 1226, and 4 initialization registers 1228. Also included are an address comparator 1230 and bit reverser 1240. An internal bus 1250 provides data routing, and a "Y" bus 1270 provides address outputs 231 which are fed back onto CD bus 112 (when output buffer 232 is enabled). The "D" bus 1260 is connected to provide inputs or outputs to the sequencer data bus 215, which is separated from the CD bus 112 by link register/transceiver 214. The actual device also includes an instruction decoder and miscellaneous timing and glue logic, not shown.

These features allow the address generator 230, in a single cycle, to:
output a 16 bit address,
modify this memory address by adding (or subtracting) an offset to it,
detect when the address value has moved to or beyond a pre-set boundary, and conditionally re-initialize the address value.

This latter step is particularly useful for implementing circular buffers or module addressing.

The address generator 230 augments the address generating capabilities of the IPU 240. However, the particular chip used for the address generator 230 can only generate 16 bit addresses, if operating directly. (Double precision addresses would take two cycles, or two chips can be cascaded.) In the presently preferred embodiment, the 16-bit address outputs of the address generator 230 are passed through the IPU 240, where they can be added to a base address and extended up to 32 bits.

The address generator's registers are accessed via its 16 bit wide D port, which is connected to the same local portion 215 and link register 214 as the sequencer.

The addresses come out of the Y port 1270 (shown as line 231 in FIG. 2A). The addresses are passed through a three-state buffer 232 before connecting to the CD bus 112. When either the address generator's D or Y port is read (i.e. is called on to drive the CD bus) the 16 bit values can be zero extended or sign extended to the bus width (32 bits). The logic which performs this is located in sign/zero extend PAL 216, which is discussed in greater detail below. Zero extension or sign extension is controlled directly from the CP microcode. (This feature is available when any of the 16 bit wide ports are selected to drive the CD bus.)

The instruction set of the address generator 230 is divided into the following groups:
Looping,
Register transfers,
Logical and shift operations,
Control operations, and
Miscellaneous operations.

The microcode instruction input to the address generator is registered internally, so the microcode instruction is taken directly from the WCS 220.

Sequencer 210 and associated Support Logic

Figure 13:
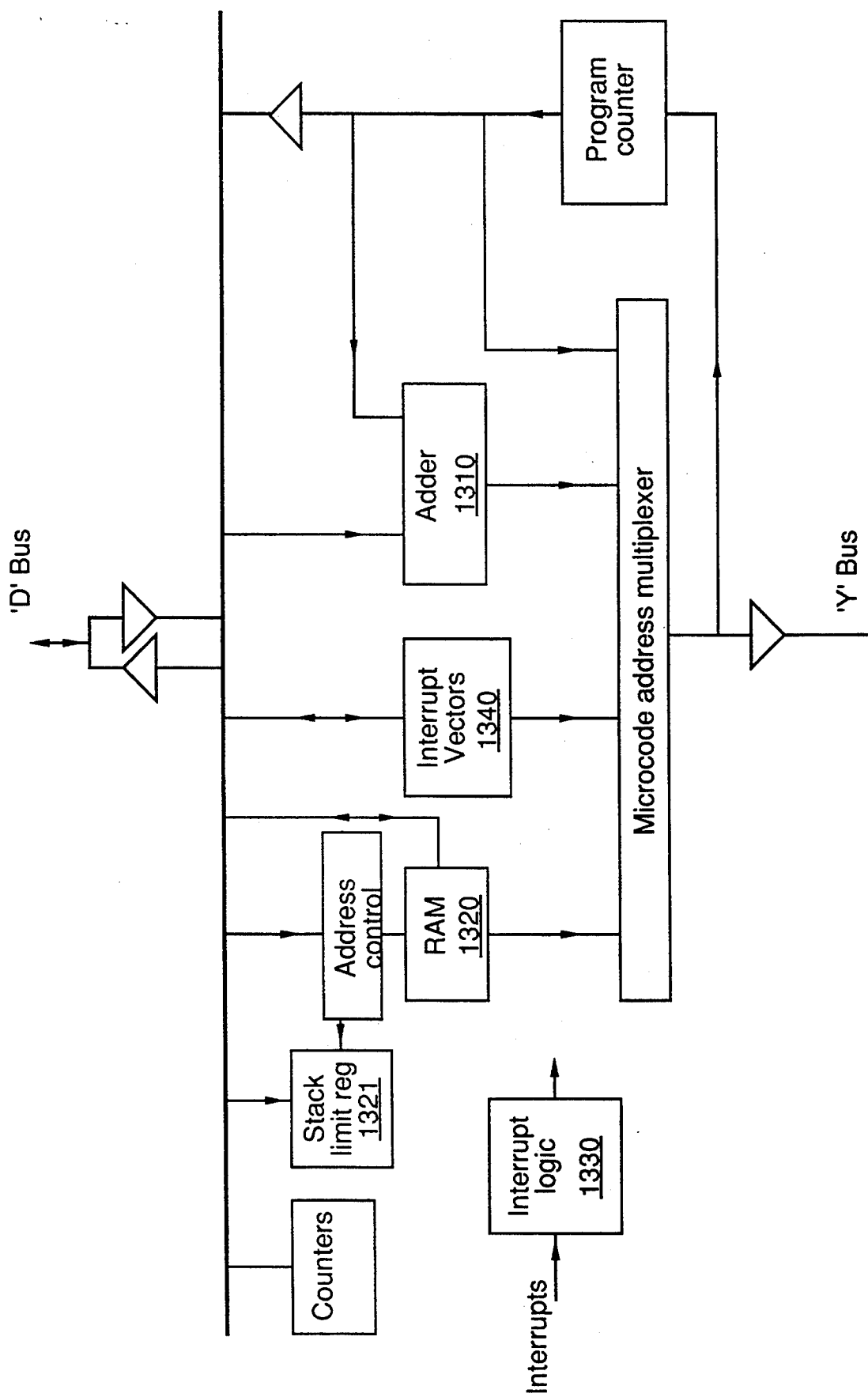
FIG. 13 generally shows the organization of some key parts of the Sequencer, which is part of the control processor (and also of the data transfer processor) in the presently preferred embodiment.

In the presently preferred embodiment, sequencer 210 employs an ADSP 1401. Key elements of this particular implementation are shown in FIG. 13. These include a 16 bit adder 1310, a 64×16 bit RAM 1320, interrupt logic 1330, interrupt vector storage 1340, and four loop counters.

The internal RAM 1320 can be used in three ways:
As a register stack: This allows up to four addresses to be saved on the stack when entering a subroutine. These can then be accessed by a 2 bit field in the relevant instructions.
As a subroutine stack: This provides the normal return address storage for subroutine linkage and interrupts. It can also be used to save other parameters such as the status register or counters.
For indirect address storage: This allows an area to be set aside to hold often used addresses. These are accessed using the least significant 6 bits of the D port.

Stack limit registers 1321 protect against one stack area corrupting another, or stack overflow and underflow situations. If one of these occurs then an internal interrupt is generated, so an error condition can be flagged or the stack extended off-chip (stack paging).

Ten prioritized interrupts are catered for—two internal to the device, for stack errors and counter underflow, and eight external. All the interrupt detection, registering and masking is handled on-chip by logic 1330, and the corresponding vector is fetched from the interrupt vector file 1340.

The instruction set is very comprehensive with a wide variety of jumps, subroutine calls, and returns. Most of these instructions can use absolute addresses, relative addresses, or indirect addresses to specify the target address. They can also be qualified by one of the selected conditions:
Unconditional. Execute the instruction always.
Not flag. If the condition code input (called FLAG) is false then execute the instruction, otherwise continue (the usual fail instruction).
Flag. If the condition code input is true then execute the instruction, otherwise continue (the usual fail instruction).
Sign. Execution of the instruction depends on the sign bit in the status register.

There are also instructions to do stack management, status register operations, counter operations and interrupt control.

The microcode instruction input is registered internally, so the microcode instruction is taken directly from the WCS (unregistered).

The sequencer support logic falls into four categories: interrupts, conditional code selection, micro address bus, and constant/next address field.

Interrupts

The chip used for sequencer 210, in the presently preferred embodiment, only has four interrupt input pins. Therefore an external multiplexer 213 is used to extend the number of available interrupts to eight. The interrupts are mainly used for communication and to support debugging tools.

The interrupt sources are (in order of highest priority first):

Claw Logic

Within the debug environment there are, nominally, two tasks running: the monitor task and the user task. The claw logic allows the user task to be single stepped without single stepping the monitor task as well The claw logic "claws back control" to the monitor task after one instruction in the user task has been run. The instruction that returns control back to the user task requests a claw interrupt. Since this is delayed by one cycle, the interrupt occurs on the first instruction executed in the user's task. Thus control is returned back to the monitor task before the next (i.e. the second) instruction in the user task is executed.

Breakpoint

This interrupt level is connected directly to a microcode bit, so that whenever this bit is set an interrupt will occur. This provides a convenient mechanism for implementing breakpoints. The instruction with the breakpoint bit set will be executed, and then control passed to the breakpoint handler. Any number of breakpoints can be set.

VME Bus

The VME bus interrupt is normally used only for supporting the debug monitor and should not be used during normal operation.

Floating Point Processor (breakpoint)

When the floating-point processor module 130 hits one of the breakpoints set in its WCS, the FP clocks are stopped. The FP module notifies the control processor module 110 of its situation via this interrupt. *

DTP Memory access

This interrupt is used to force the control processor module 110 to temporarily suspend accesses to the data cache memory. This permits the data transfer processor module 120 to gain access to cache 140.

DTP (command)

This interrupt is the normal method for the data transfer processor to inform the control processor module 110 that there is a command in the cp_command FIFO (in command memory 190).**

DTP (data transfer done)

This interrupt is used by the data transfer processor module 120 to inform the control processor module 110 that a data transfer request has been finished. **

Floating Point Processor (general)

This interrupt can be generated as a result of the CPWAIT, FPWAIT changing state, or the occurrence of an error (whose type can be defined in software), or a breakpoint in the floating-point processor module 130. The active events are selected by a mask register, on the FP module 130, which the control processor module 110 can load. This interrupt is not used at present, and is reserved for future use. In system using multiple FP modules 130, the four FPs will share this interrupt. The interrupt service routine will therefore need to identify which FP(s) caused the interrupt, in order to service them accordingly. *

Note: The interrupts marked with * can also be tested by the normal condition code logic, so that if it is more convenient for them to be polled then they can be.

For the interrupts marked **, the situation that generates the interrupt condition can be detected by examining the control information in the software FIFO data structures. This can be polled if interrupts are not used.

The use of multiplexer 213 to expand the number of interrupts forces different time requirements between the four high priority interrupt levels and the four low priority interrupts. For the four highest priority interrupts to be recognized, they must occur 25 ns before the rising edge of the microcode clock. For the lower priority interrupts, the time limit is 15 ns before the falling edge.

To generate an interrupt, the corresponding interrupt input is held high for one clock period. No hardware interrupt acknowledge cycle is necessary, so the interrupt generating hardware is very simple.

Condition Code Logic

The sequencer has a single condition code input called FLAG, and all of the testable status signals are multiplexed into this pin. This is registered internally, and has a normal set up time of 10 ns when IR0 is masked (counter underflow interrupt), or 26 ns when enabled. The polarity of the FLAG input can be changed inside the sequencer.

Figure 40A:
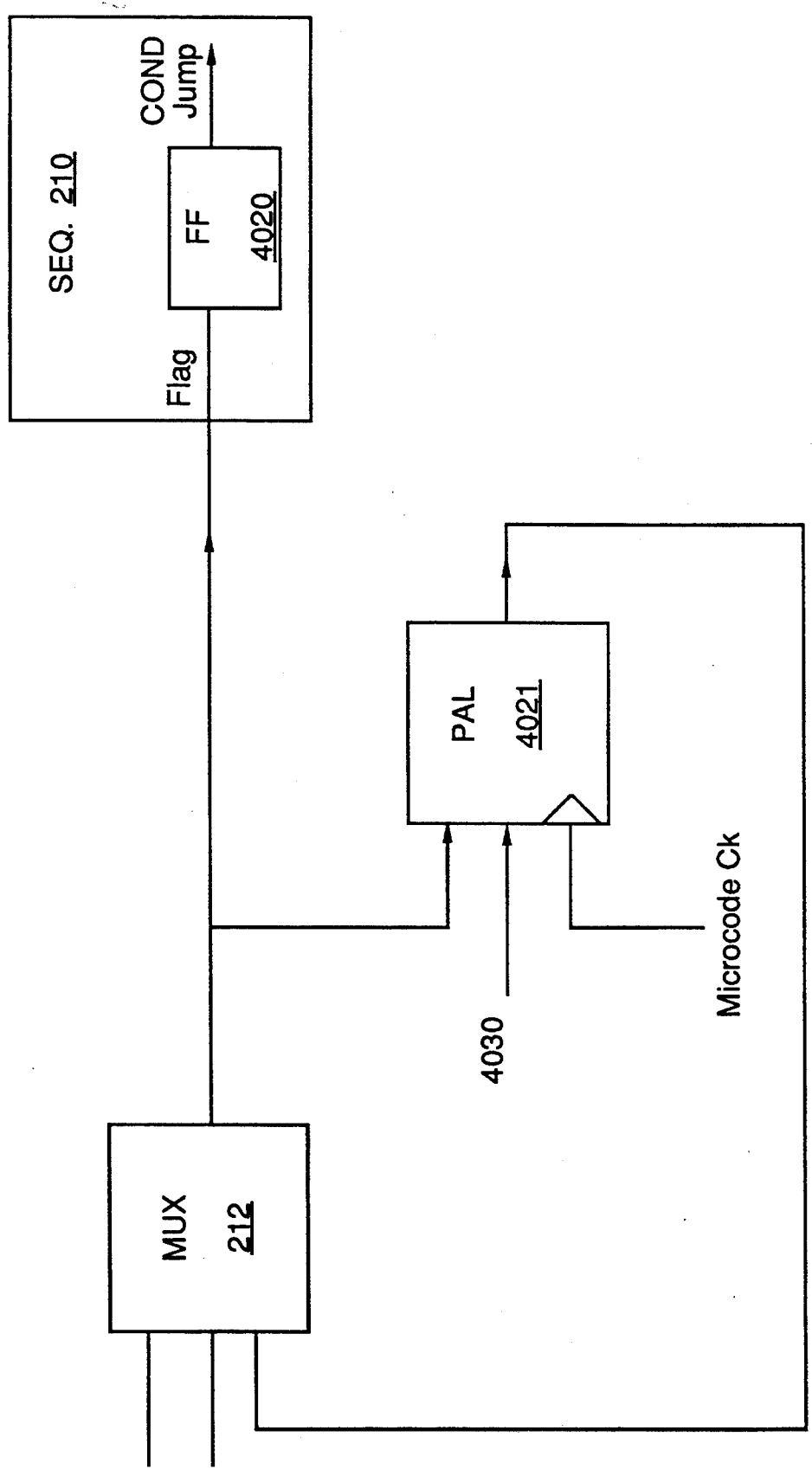
FIG. 40A shows some support logic which is used, in the presently preferred embodiment, with the sequencer in the control processor module 110 (and in the data transfer module 120).

As seen in FIG. 40A, some additional logic is preferably used to preserve the state of the FLAG inputs outside the sequencer 210. This permits the internal state of the sequencer 210 to be fully restored after an interrupt.

Figure 40B:
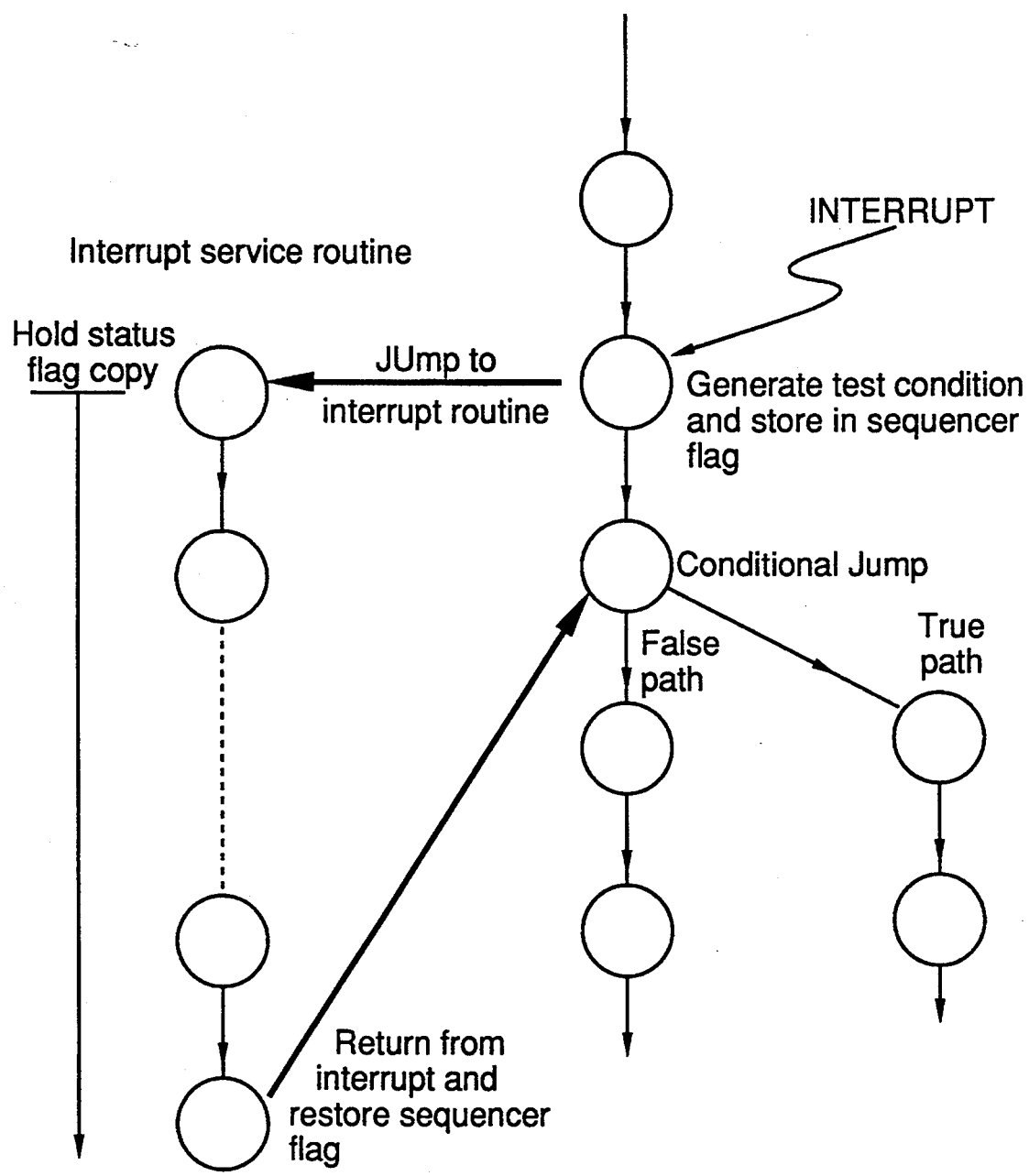
FIG. 40B schematically shows a microinstruction sequence wherein an interrupt occurs during a multiway branch operation.

A PAL 4021 is used to emulate the internal flip-flop 4020, inside the sequencer 210 (or 310). This PAL is thus operated simply as a "mimic register." The need for this can arise under conditions as shown in FIG. 40B.

When an interrupt occurs, the sequencer will divert to an interrupt handling routine. During this routine the mimic register PAL simply holds a copy of the status flag condition which existed before the interrupt. At the end of the interrupt handling routine, the multiplexer 212 is commanded to provide the output of the PAL 4021 as the FLAG input to sequencer 210. This restores the internal state of flip-flop 4020. This permits instruction flow to continue in the same sequence it would have if the interrupt had not occurred. This is particularly important if the instruction following the interrupt is a conditional branch. Correct restoration of the internal state assures that the conditional branch will be correctly executed.

Of come, this logic would not be necessary with some sequencers. However, it is advantageous with the particular sequencer used in the presently preferred embodiment.

The testable status signals are:
IPU 240 condition code output: this relays the status of the current instruction. Which condition is indicated by the IPU output on this pin is defined by the microcode instruction.
Microcode loop: This is a status bit in the VME interface control register and is useful for diagnostic software.
Write flags 0 and 1: These two signals allow better access to the internal state of the data cache memory write logic and are only used by the state save and restore microcode in the debug monitor.

Held status: This is tested when returning from an interrupt, so that any conditional jump, etc., is executed correctly even if it was displaced by a jump to the interrupt service routine.

FP status signal CPWAIT: This is cleared when the FP has finished its calculations and is waiting for more data.

FP status signal FPWAIT: This is cleared when the control processor module 110 has finished its calculations and is waiting for more data.

FP status signal bank$_{13}$ select: This indicates which half of the FP register file is allocated to the control processor module 110, when the register files are used in the double buffered (logical) mode.

FP status signal: Serial loop. This is extracted from the end of the serial loop that runs through the floating point chips on the FP. The interfaces to this serial loop allow the control processor module 110 to extract (and insert) the internal status of these devices.

FP status signals: cp_wait_interrupt and fp_wait_interrupt. These two status bits are set (if masking permits) whenever their respective signals have gone from high to low. The signals FPWAIT and CPWAIT are directly tested, since they might return high again before the CP can identify the interrupt source.

FP status signal: fp_breakpoint. This is only used for debugging, and is set whenever the FP hits a breakpoint.

FP status signal: fp_error. This is set whenever an error occurs in the floating-point processor module 130. It has been included for future use.

The FP status signals share a common line into the sequencer, and the actual one to be tested is selected by the portion of CP extension microcode.

The condition output from the IPU 240 is valid too late to meet the sequencer's set up time (especially as it will be delayed by a multiplexer), when cycling in 100 ns. When testing this condition the clock will need to be stretched to 125 ns.

Implementing "for loops" is best done by using one of the counters internal to the sequencer, thus freeing the IPU 240 for address calculations. For-loops could be done using the IPU 240, but this would impose extra overhead due to a longer cycle time.

The condition codes are multiplexed via an 8 to 1 multiplexer 212 into the "FLAG" input in the sequencer. The sequencer internally registers and selects the polarity of the selected condition code signal.

Micro-address Bus

The micro-address bus 211 and 211A can be driven from two sources: from the sequencer 210 during normal program execution, and from the VME bus when loading microcode. The VME bus can also read the contents of the micro-address bus to see what address the sequencer is at. This is done asynchronously to the sequencer operation, and is mainly used for diagnostics.

The micro-address bus 211 is also routed onto the FP module (shown as extension 211A) because 32 bits of the control processor module 110 WCS is located on each FP module. The micro address bus extension 211A can also be used to drive the FP WCS. This capability can be useful for two reasons:

1) As a means for the host to provide an address when the FP microcode is down loaded.

2) As a mechanism which could be used for running the FP microcode synchronously with the control processor module 110, so that the address of the sequencer 210 in the control processor module 110 is used rather than the internally generated one. (This capability is not present in the principal preferred embodiment, but is noted as a readily available alternative.)

Constant Field

The 16 bit wide constant field of the microinstruction is mainly used to provide addresses to the sequencer, but can also hold constants for the address generator.

The sequencer 210 has a bidirectional connection to a private local bus (the sequencer data bus 215). This permits jumps, etc., to be done in parallel with actions using the CD bus 112. The sequencer data bus is linked to the CD bus 112 via a bidirectional link register/transceiver 214. The timing of the clocks and the "feed through" control to the link register 214 are varied, depending on the transfer path and direction, because the source and destinations all have different requirements. Note that the address generator data input 1260 is connected to the sequencer side of this interface, because the address generator 230 has the same timing requirements as the sequencer for transfers on this bus.

This configuration allows the following routings:

| | |
|---|---|
| Constant field −> Sequencer | (Jumps) |
| Constant field −> CD bus | (Register loading) |
| Sequencer −> CD bus | (Diagnostics) |
| CD bus −> Sequencer | (Computed Jumps) |
| Constant field −> Address generator | |
| Address Generator −> CD bus | (Diagnostics) |
| CD bus −> Address Generator | (Computed addresses) |

Writable Control Store (WCS) 220

In the presently preferred embodiment, the WCS memory bank uses microcode SIL modules. These provide 8K by 32 bits of memory, together with serial shadow registers 222 and 223 for loading microcode and for diagnostics. (The operation of these shadow registers will be discussed in much greater detail below.) Two versions of the module are used: registered or non-registered outputs. The IPU 240, and address generator 230, and sequencer 210 have their own internal pipeline registers, and so use the non-registered outputs from WCS 220.

It should be noted that the control processor module's WCS is actually distributed. In addition to the primary WCS portion 220 shown (which is physically located on the base board), there are also one or more other extensions of WCS 220. These extensions 490 receive the microaddress stream 211A, and physically reside on each FP module. The instruction set stored in the primary WCS 220 contains 96 bits of instruction at each address. The WCS extensions 490 each span the same range of addresses as the primary WCS 220, but each of the WCS extensions (in each of the numeric processor modules 130) contains an additional 32 bits of instruction at each address.

WCS Interface Registers 222 and 223

The operation of the serial loop by which the host (working through the VME Interface 160) can read from and write to all of the control stores will be discussed in detail below. At this point, hardware structure and connections will be described.

As noted, register 222 provides a registered microinstruction output, to the decoder 260 and to many other logic and memory components. An unregistered microinstruction output 221 is also provided, for components which have internal instruction registering. (For example, the IPU 240 has internal instruction pipeline registers. It also has sophisticated internal decode logic. Note that the IPU 240 also receives some registered control bits from the decoder 260, e.g. output enable signals.)

The register 222 is actually a serial shadow register. It not only provides a registered parallel throughput, but also has a serial access mode. The serial access mode is used for interface to the serial loop described below.

The other serial shadow register 223 shadows the unregistered outputs 221. To provide a serial output (when demanded) which corresponds to the complete instruction 221 (or, conversely, to write the full width of an instruction 221 back into the control store 220), all bit fields must be accessed.

Of course, the connections just described provide only a data interface to the WCS 220. That is, the registers 222 and 223 see the content of locations in WCS 220, but do not see addresses explicitly associated with the data. The address interface is a separate two-way interface, which is shown as a bidirectional connection 211B. This is the CP microaddress bus, which is connected to the microcode load control logic 610 in the VME Interface. This same bus provides the microaddress interface to all of the control stores in the system, except for the DTP control store. The microaddress line in the DTP control store is connected to another register/buffer pair in the VME Interface.

FP Control Logic

An important feature of the architecture is that the control processor module 110 is not merely a supervisory processor, but directly controls all data transfers to and from the floating-point processor module 130. Most of this logic is physically on the FP module, but is controlled by the microcode of the control processor module 110, and interfaces to the CD bus. This logic is discussed in much greater detail below, where the data operations of the FP module are reviewed.

Miscellaneous Logic

Mode Registers 203

The mode registers 203 hold the value of little used control signals which can not justify dedicated microcode bits. The mode bits are:
Flow through or register control of the read holding registers 561.
Flow through or register control of the write holding registers 561 (the registers shown as 561 in FIG. 5 are actually doubled, and include one read register and one write register).
Loopback mode for the holding registers 560.
Two LED control signals.
Module select (3 bits): this address selects among the multiple possible FP modules 130 and/or algorithm accelerators 130'.

CD Bus Decode Logic

One of the functions of decoder 260 is to decode the microcode CD source field to control the output enables of devices that can drive the CD bus. It also decodes the CD destination field to generate clock strobe and write enable signals (which are qualified by write gate signal from the clock generator). Most of the ports on the CD bus can be read and written, so mimic registers in the IPU 240 are not required. (Note that some of the CD sources and destinations will be controlled by decode logic in the CP Extension Logic 410, rather than by that in the decoder 260.)

Possible CD bus sources and destinations include: IPU 240; Command memory; Data cache memory holding registers 560A; Mode register (8 bits); Transfer control register * **; FP control register * **; Start address register * **; Instruction register (8 bits) *; Status register (source only) *; Address generator address port ; Address generator data port ; Sequencer data port ; Constant/next address field (source only) . Registers marked * are part of the CP Extension Logic 410, which is located on the FP module. These registers are selected by fields in the extended CP microcode, which is stored in the WCS extension 490. Only the selected module(s) respond to the data transfer, and source or sink the data. Sources marked ** only drive the lower 16 bits. When one of them is selected, the sign/zero extend PAL 216 is also activated, so that the data is either sign or zero extended up to the bus width of 32 bits.

Note that only one source and one destination can be selected, and that they must be different. The transfer of data into the IPU 240 is under control of the IPU 240's instruction field, so that it can take data from the CD bus at the same time it is being loaded into another destination.

Clock Generator 250

The clock generator 250 produces the basic clock signals used throughout the control processor module 110 (and the data transfer processor module 120). It receives cycle-duration inputs from both the control processor 110 and the data transfer processor 120. The duration of the current clock cycle is selected on the fly, in accordance with the longer duration of the two received from the CP and DTP modules.

This generator is preferably implemented using a programmed logic array (PAL). This PAL generates one of four predefined waveform sequences. These four sequences have different periods, namely 4, 5, 6, and 7 times the input clock period. This translates to 100, 125, 150 and 175 ns, when a 40 MHz oscillator is used, as presently preferred.

Four clock outputs are produced. All of these clocks, except the time-two clock, will have the same duration, depending on the cycle-duration inputs. These include a microcode clock, a pipeline clock, a write-enable gate signal, and a times-two clock.
  The microcode clock is always high for 2 cycles (of the oscillator), and then is low for 2, 3, 4 or 5 cycles, as selected by the cycle length inputs. The microcode clock keeps the sequencer, integer processor trait address generator, registers, etc. running synchronously.
  The pipeline clock has the same waveform as the microcode clock, but the microcode clock can be disabled, leaving the pipeline clock running, for microcode loading.
  The write-enable gate signal goes low one cycle after the microcode clock goes high, but returns high 1 cycle before the microcode clock does.

This signal provides the timing for write enables for all of the memories and some of the registers.

The times-two clock runs at twice the frequency the microcode clock does, and its rising edge occurs at the same time as a the microcode clock edge. This is a special clock, which is used only by the Integer Processor Units 240 and 340. The IPUs use this clock to clock their (internal) multiply/divide logic, in order to reduce the time taken for these multi-cycle functions.

Figure 43:
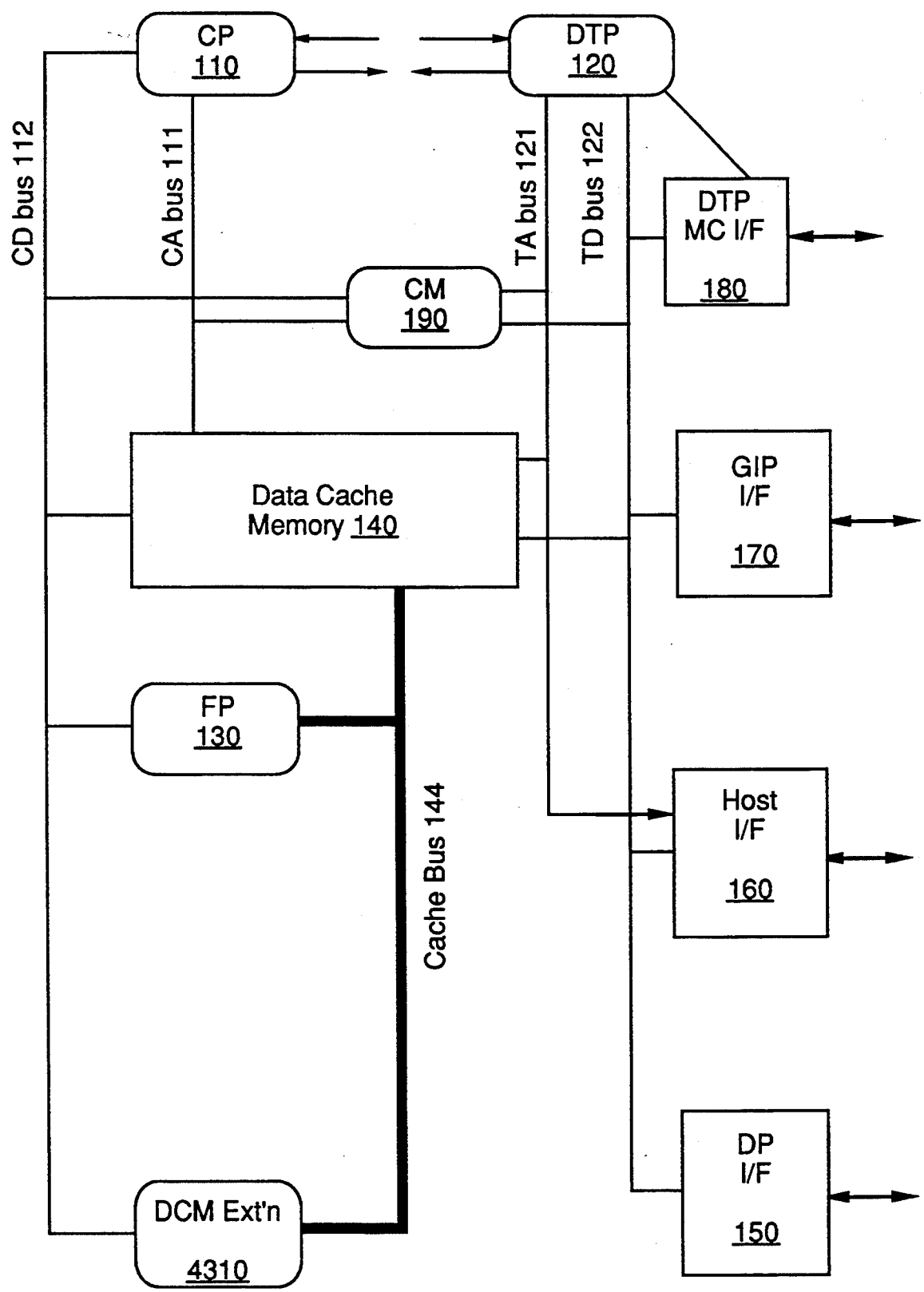
FIG. 43 shows a sample system which includes a high-speed cache expansion memory on the same very wide data bus as one or more numeric processing modules.

The cycle length of the clocks are adjusted for each instruction, so that the time allocated to that instruction is the minimum required by the data path routing specified in the instruction. The cycle duration for each instruction is preferably calculated by the microcode assembler, and is included as part of the instruction. This gives an increase in performance over the case where a fixed cycle length is used, in which case all instructions would have to take as long the slowest instruction. In the presently preferred embodiment four cycle lengths are supported, of 100, 125, 150 and 175 ns. However, most instructions will use the shortest cycle length, The clock cycle can also be extended by a "wait signal." This wait signal is used when memories cannot meet the normal access time, e.g. because they are busy, or because they are off-board and their access times must be extended due to the additional buffering. For example, the VME interface memory, which is dual ported, may suffer a clash on addresses and require one port to wait. The data cache memory 140 can be expanded (as shown in FIG. 43) with a cache memory expansion module, mounted on a memory board which uses the same connectors as the FP module. However, depending on the memory type used, accesses to the cache expansion module may be slower than accesses to the primary cache 140. In such cases the wait-state input to the clock generator will permit the cycle length will be automatically extended. This facility will allow much slower, and hence cheaper, memory to be used on the expansion module 4310, with only modest degradation in performance.

The host can control the clock generator via the VME bus interface. The host can thereby select whether the clock generator 250 free runs or is stopped. In the stopped condition, the host can single step the clocks. Note that both the control processor module 110 and data transfer processor module 120 will be single stepped together.

The final control into the clock generator is one that inhibits all the clocks except the pipeline clock (which behaves normally). This is used when loading (or reading) WCS, as it allows these actions to occur without disturbing the internal state of the control processor module 110 or data transfer processor module 120. For example, this would be used when a breakpoint is set in WCS during a microcode debugging session.

Debug Hardware

Most of the debug hardware included in the control processor module 110 has already been mentioned in various places above. Key features are summarized here for convenience:

The host can take control of the microaddress bus 211, both for read and for write.
The host can load and read back the WCS 220.
The control processor module 110 recognizes a VME generated interrupt (i.e. an interrupt from the host) as a high priority interrupt.
Hardware breakpoint support is provided, with no restriction on the number of breakpoints that are set at any one time.
Claw logic is provided, so a user task can be single stepped without single stepping the monitor task.
All registers are read/write, permitting many normal data flows to be reversed for diagnostics.
A clock control input permits single stepping microcode.
All interrupts can be selectively enabled or disabled.
The internal state of the critical logic groups can be accessed. This allows a complete state save and restore of the control processor module 110 hardware.

Microcode Word Format

FIG. 2B shows schematically the organization of the microinstructions stored in WCS 220 and in the WCS extension(s) located on the FP module(s). The items marked with a * come directly from the WCS, and are pipelined internally in the devices they are controlling. The other items are registered at the output of the WCS 220.

The fields marked ** are physically stored in the WCS extension on the FP module, but are part of the CP microcode word. Most of these microcode actions are qualified by the module selection logic, and will have no effect if the FP module hasn't been selected.

The total number of microcode bits available are 96 plus an extra 32 per FP module installed. Most of the bits are used, but there are also a few spare bits available.

IPU opcode (32) * This field controls the data routing and arithmetic or logical operation of the IPU 240 integer processor. The allocation of bits within the field is encoded. All instructions are encoded in the bottom 24 bits. The top 8 bits are only used during the transfer of data into the IPU 240's register file. (Further details of this field may be found in the manufacturer's data sheets for the IPU.)

Sequencer opcode (7) * This field controls the generation of the next address by the ADSP 1401. (Further details of this field may be found in the manufacturer's data sheets for that part.)

Constant/next address field (16) * This field is mainly used for providing address information to the sequencer, but can also be used to place a 16 bit constant value onto the data bus. This can then be loaded into any of the registers on this bus.

Address generator opcode (10) This field controls the ADSP 1410 address generator. (Further details of this field may be found in the manufacturer's data sheets for that part.)

Cycle length (2) This field selects the cycle length appropriate to the instruction and data routing selected.

Data cache access (1) * This bit is active whenever an access to the data cache memory is required by the control processor module 110 for its own use or to transfer data to or from the FP. The access flag is not pipelined so that the arbitration with the data transfer processor module 120 data cache requests can be sorted out before the start of the cycle the request happens on.

Data cache write enable (1) This bit generates a write cycle in the data cache memory.

Data cache write all (1) This bit overrides the normal write enable gating that allows selective updating of words in the data cache memory and forces them all to be written. This is useful when setting blocks of memory to a constant value.

Data cache port select (1) This bit selects either the FP module holding registers or the control processor module 110 holding registers to be the source or destination for a data cache transfer.

Data cache memory length (3) These bits specify the number of words from the FP holding register to write into the data cache memory. The first word in the holding register is specified by the least significant three bits of the data cache memory address.

Condition code select (3) This field selects one of the following condition codes to be tested by the sequencer during a conditional instruction: IPU 240 condition code output; fp_status (actual status selected by a separate field); fp_breakpoint; microcode loop; write flags (2 entries); hold status.

CD bus source (3) This field selects one of the following registers, buffers or devices to drive the CD bus: IPU 240; Command memory 190; One of the Data cache memory holding registers 561*; Mode register; FP module*; Address generator address port; Address generator data port; Sequencer data port; Constant/next address field; (* Note that the particular register or buffer to use as the source is specified in another; field.)

CD bus destination (3) This field selects one of the following registers, buffers or devices as the destination of the data on the CD bus: Command memory; Data cache memory holding register; Mode register; FP module (the particular module to use as the source is specified in another field); Address generator address port; Address generator data port; Sequencer data port.

The IPU 240 is not included because it can "grab" the data on the CD bus at any time. (This function is controlled by the IPU instruction field.)

Address register control (2) One of these control bits enables the loading of the address register and the other bit enables readback of the register for use by the diagnostics and debug monitor.

Module select (3) The most significant bit (broadcast select) controls how the other two bits (module ID) are interpreted. When broadcast select is 0 the module (ID) selects the single module which is to respond to a data transfer, either with the data cache memory or the CD bus. When broadcast select is 1 the module ID selects which group of FPs (or algorithm accelerators) responds to a data transfer. This allows the same data to be transferred to multiple destinations at the same time and hence is faster than individual writes. Note that this is only valid for transfers to the modules, since multiple transfers from the modules could cause contention on the data bus.

Module select mode (1) Specifies whether the module to select is defined by the microcode module select field or by the mode register. This allows the module to be selected on a cycle by cycle basis or more globally. The global method is used when the work can be done on any of the FP modules present and the control processor module 110 picks the FP to use before it starts the transfer/calculate cycle. If the global facility wasn't available then there would be a different control processor module 110 routine to correspond to every FP module.

Break (1) ( Debug use only ) Set by the debug monitor to place a breakpoint on an instruction. This causes an interrupt to occur during the instruction so that control is passed to the debug monitor microcode after this instruction has finished.

Claw (1) ( Debug use only ) Set to prime the claw logic when single stepping a user task. This causes an interrupt to occur during the next instruction so that control is passed back to the debug monitor microcode after one user task instruction has been executed. This allows a user task to be single stepped without physically switching the clocks on and off.

Interrupt DTP (1) This generates an interrupt in the data transfer processor module 120 to gets its attention. The net result of this is to force the data transfer processor module 120 to examine a command queue to find its next item of work.

Zero or Sign extend (1) This only has any effect when a 16 bit wide register or device is read. This signal selects whether the data is zero extended (bits 16–31 set to zero) or sign extended (bits 16–31 set to the same as bit 15).

Held Status (1) This bit prevents the updating of the mimic status register that normally follows the state of the FLAG register inside the sequencer 210. Normally this mimic bit follows the internal register's state, but during an interrupt service the mimic bit is prevented from being updated. This, permits the FLAG register to be correctly restored when the interrupt routine is exited.

FP condition code select (3) ** These bits select which one of the internal FP module signals drive the common condition code line to the control processor module 110 sequencer. The following can be selected: CPWAIT; FPWAIT; bank_select; serial loop; cp_wait_interrupt; fp_wait_interrupt; fp_breakpoint; and fp_error.

Register select (3) ** These bits select which one of the internal registers 444 on the FP module are to be read or written via the CD bus (bottom 16 bits only). The registers and buffers are: Transfer control register; FP control register; Start address register; Instruction register (8 bits); Status register (source only).

Register direction (1) ** This bit selects whether a register is to be read or written.

Clear FP breakpoint (1) ** This bit dears the FP breakpoint, which in turn allows the FP clocks to run.

Jump start address (1) ** This bit causes the FP sequencer to use the start address register 479 (loaded by the control processor module 110) as the address to the next instruction to execute. This is a "one shot" action, so after the FP has executed the instruction at the start address the FP sequencer reverts back to its normal mode of operation.

Transfer Control (20) ** This field controls the transfer of data between the holding registers 420 (on the FP module) and the FP module's fast register files 430. Only a brief description of each sub-field is included here, because their use will only become apparent once the overall transfer mechanisms have been explored.

Direction (1) This bit determines the transfer direction between the holding registers 420 and the register file 430. The direction is either holding register to register file or register file to holding register.

Transfer enable (1) This bit starts a transfer cycle, as defined by the other microcode bits and the registered control bits (in the transfer control register).

Register file address (6) The address specified here is the address of the first word in the register file that data is read from or written to.

Register file address modifiers (2) These specify how the register file address is to be modified to implement physical, logical or preview mode of addressing which are all concerned with how the register file is shared between the control processor module 110 and FP.

Holding register start address (3) This specifies the first holding register to use in a transfer.

Holding resister start address mode (2) The holding register start address can be specified to come from one of three sources:

1. From the CP microcode field mentioned in the previous paragraph;
2. From a field held in the FP module's transfer register; or
3. From the least significant 3 bits of the address used in the last CP access to cache.

Handshake mode (3) The handshake mode controls the handshaking between the control processor module 110 and FP via the FPWAIT and CPWAIT mechanism, and the bank selection. Several of the modes override the normal handshaking procedures, so the main signals can be initialized or set for debugging purposes. The modes are: set CPDONE; request register file swap; set CPDONE and request swap; clear CPDONE; test mode (used only for diagnostics); and no operation.

Double write enable (1) The double write enable forces two words to be transferred into the register file instead of the one that the length or start parameters are requesting. This ensures that the valid data is tagged with its data valid flag asserted and that the invalid data is tagged with its valid data flag disasserted. These flags are tested by the FP to identify which data items are valid.

Clock All holding registers This bit overrides the normal holding register clock sequencing when transferring data from the register files into the holding registers. When active this bit causes all registers to be clocked together rather than sequentially which quadruplicates the register file data into all holding registers.

Data Transfer Processor Module 120

A block diagram of the data transfer processor module 120 is shown in FIG. 3. Note that it is very similar to the control processor module 110, except that the DTP module 120 does not include a separate address generator like address generator 230. If the specialized features in each processor were not used, the same microcode (at source level) could in principle be run in both processors.

The data transfer processor module 120 is a 32 bit microcoded processor, based around a 32 bit Integer Processor Unit (IPU) 340 controlled by a 16 bit sequencer 310. The main data path within the data transfer processor module 120 is the Transfer Data bus (TD bus) 122.

Many of the portions of DTP module 120, in this embodiment, are closely analogous to portions of the control processor module 110. In general, corresponding reference numerals have been used to indicate such similarity. Thus, a sequencer 310 provides a sequence of microinstruction addresses 311 to a writable control store 320. The sequencer 310 not only interfaces with the TD bus 122 through register 314, but also receives condition codes through a multiplexer 312, and receives interrupts through multiplexer 313. The microinstructions accessed from control store 320 are provided as outputs 321, and a registered output is also provided through register 322. Lines 311B and 225 provide address and data interface from the host to this writable control store 320, as will be described below. (Line 324 is a write enable line, used in serial access.) Serial/parallel shift register 323 shadows the internal state of devices which receive unregistered inputs. A 16-bit sequencer bus 315 also provides 16-bit inputs to the sequencer 310. This input is a buffered input, which can be used, e.g., to input literal values.

The microinstructions 321 are provided as registered input to decode logic 360 (via shadow register 322). The outputs 361 of this decode logic are provided as control inputs to the integer processing unit 340, the sequencer 310, and also to various of the interfaces 150, 160, and 170. In particular, the outputs of decode logic 360 control access to the TD bus 122. Note that the TD bus 122 provides a data interface to the external interfaces, and also to the cache memory 140. As with decoder 260, the outputs of decoder 360 are not separately shown, because they are so pervasive.

The integer processing unit 340 is preferably a Weitek XL8137, as in the control processor. (However, note that no separate address generator is needed in the data transfer processor, since address generation is not so critical in this module.) The integer processing unit 340 has a two way interface to the TD bus 122, and can also provide address outputs, through register 341, onto the TA bus 121.

Control of Data Transfers

In order to achieve one transfer per cycle between a source port and a destination port, several factors are catered for:

1. Either the source or destination of the transfer may be FIFO buffered, and the transfer control must respond to the full and empty flags on the FIFO. The timing of these signals, in combination with the pipelining of the condition code input to the sequencer, will sometimes cause the transfer to overrun by one. For the transfers into a FIFO this is not a problem, because the half full flag is used. Use of the half full flag means that there is plenty of spare capacity in the FIFO to accept one or two words of overrun. When reading from the FIFO, other strategies must be used. The options of using FIFOs with "empty+1" flags, or delaying the FIFO data in a pipeline stage, are not used in the presently preferred embodiment, due to their cost and space demands.

Two methods are provided to solve this possible problem. Which of these methods is used depends on whether the destination is a memory or a FIFO. The difference is that a write operation can be undone on a memory, but not on a FIFO. That is, if a data transfer from FIFO to memory is continued for a word or two after the FIFO goes empty, some erroneous data will be written into the memory. However, this data can simply be overwritten as soon as good data becomes available.

a. When reading a FIFO, the read signals are logically modified by the FIFO empty signals. The result of this is that, if an attempt is made to read an empty FIFO, no read action is actually performed. This allows FIFO reads to overrun without any consequences. The FIFOs protect themselves from reads when they are empty, but this extra control is necessary because the other side of the FIFO might be written to during the overrun read, and this would lose data. Thus, when the data transfer processor module 120 is transferring data into a memory, it will stop when the FIFO has gone empty. At this point an overrun will have occurred. The DTP module 120 can then backtrack the address, so that, when data becomes available in the FIFO, the transfer restarts as if nothing had happened.

b. When writing into a FIFO, the write operation cannot be undone. Therefore, a different method is used. The microcode tests the status from the source FIFO (and obviously the destination FIFO) before every transfer. In this mode, the transfer rate is much slower. However, if the source FIFO ever gets more than half full, the microcode switches to a fast transfer mode. The occurrence of this condition guarantees that up to half the source FIFO depth can be read out without going past the empty mark. Therefore, in this mode, the DTP module 120 can transfer a block of this size without stopping to check the status. The status in the receiving FIFO will still need checking, unless it is less than half full This same technique of switching between slow and fast transfer modes can obviously be used with memories as well.

2. A three way branch instruction in the sequencer 310 (called BRANCH) provides a convenient way of keeping track of the number of words transferred and testing the FIFO status signals. This has the advantage of not using the IPU 340 in the conditional path, and thereby minimizes the cycle length, 3. For optimum data transfers to or from the data cache memory, the data interface to the TD bus 122 is buffered in a register bank 560B (seen in FIG. 5), which contains eight 32 bit registers. This allows fully parallel reads and writes, as seen by the DCM. This gives a natural break in any long transfer (>8 floating-point words), because there is no double buffering in this path. The data transfer processor module 120 will therefore be forced to suspend transfers until the memory cycle has occurred. This break will happen more frequently when contiguous transfers are not used and more memory access cycles are needed.

4. The arbitration of the data cache memory is decided at the beginning of the CP module's cycle. If the data transfer processor module 120 were running asynchronous to the control processor module 110 (to allow instruction dependent cycle time), the data transfer processor module 120 might have to wait up to 100 ns of synchronization time, and then another 100 ns of access time. (The access time could be much longer, because the control processor module 110 has priority, and the DTP module 120 must wait for a free memory cycle.) Moreover, the pipelining of the microcode instructions and FLAG input to the sequencer could introduce yet another delay, while the DTP module was looping to see if the transfer has been done.

To minimize these delays, the control processor module 110 and data transfer processor module 120 share the same microcode clock generator. Both processors ask for their optimum cycle time, and the clock generator chooses the longest one. This should not greatly degrade the average speed of either processor, because the majority of instructions execute in the shortest cycle time. To overcome the delay when looping, the arbitration is done using non-registered microcode request bits.

One very minor drawback of this approach is that when the hardware single step is used it will affect both processors.

5. Thus, when a FIFO is either the source or the destination, the FIFO status signal (and, in some cases, the data cache memory arbitration signals) will need to be monitored during a transfer. So that these four status signals (FIFO full, FIFO half-full, FIFO empty, cache access granted) can be monitored within a single cycle, the data transfer processor module 120 has multiway branch capability. This inserts the status to be tested into the jump address, so that the address that is jumped to depends on the status during that cycle. The three FIFO status conditions are encoded into two bits, and the arbitration signal makes up the third bit. This provides an 8 way branch. When only the FIFO status is of interest, the arbitration signal can be disabled, so the multiway branch is reduced to 4 ways.

6. To avoid the data transfer processor module 120 being locked out of the data cache memory 140 when the control processor module 110 (or FP module 130) is using it on every cycle, an interrupt has been provided. When the data transfer processor module 120 is denied access, it starts looping on the transfer acknowledge signal. A timeout under this condition can easily be tested for. If a timeout occurs, then the data transfer processor module 120 can interrupt the control processor module 110. This will take the data transfer processor module 120 out of the memory access mode, and thus let the data transfer processor module 120 in.

Integer Processor Unit 340

The IPU 340, in the presently preferred embodiment, is essentially the same as the IPU 240 of the control processing module 110, which is extensively described above.

Sequencer 310 and associated Support Logic

The sequencer 310, in the presently preferred embodiment, is essentially the same as the sequencer 210 of the control processing module 110, which is extensively described above.

The sequencer support logic falls into 4 categories: interrupts, conditional code selection, micro address bus and constant/next address field.

Interrupts

The sequencer only has 4 interrupt input pins. Therefore an external multiplexer 318 is used to extend the number to 8. The interrupts are mainly used for communication and to support debugging tools.

The interrupt sources are (in order of highest priority first):

Claw Logic and Breakpoint: This interrupt level is shared between the claw logic and the breakpoint logic. The functions of these two interrupt types are described above, in connection with the function of the sequencer 210 in the control processor module 110.

VME bus (debug): The VME bus interrupt is normally used only for supporting the debug monitor and should not be used during normal operation.

VME bus (command): This interrupt level is set whenever a command is stored in the command register.

Control processor (command): This provides the normal method whereby the control processor module 110 can inform the data transfer processor module 120 that there is a command in the dtp__command FIFO. **

VME data FIFO: This interrupt level is used to notify the data transfer processor module 120 that the data FIFO in the VME interface needs attention because they have received some data (the input FIFO) or have run out of data (the output FIFO). *

GIP interface: The GIP interrupt is generated by the GIP FIFO status signals.*

Data pipe interface: This interrupt level is used to notify the data transfer processor module 120 whenever one of the FIFOs in the data pipe interface needs attention because they have received some data. *

Microcode expansion interface: This interrupt is reserved for use by any of the expansion cards (e.g. bulk memory card or network). *

Note: The interrupts marked with * can also be tested by the normal condition code logic, so that they can be polled if that is preferred.

For the interrupts marked **, the situation that generates the interrupt condition can be detected by examining the control information in the software FIFO data structures. This can be polled if interrupts are not to be used.

The use of multiplexer 313 to expand the number of interrupts forces different timing requirements between the four higher priority interrupt levels and the four low priority interrupts. For the higher priority interrupts to be recognized, they must occur 25 ns before the rising edge of the microcode clock. For the lower priority interrupts, the deadline is 15 ns before the falling edge.

To generate an interrupt the corresponding interrupt input is held high for one clock period. No hardware interrupt acknowledge cycle is necessary, so the interrupting hardware is very simple.

Condition Code Logic

The sequencer has a single condition code input called FLAG so all the testable status signals are multiplexed into this pin. This is registered internally and has the normal set up time of 10 ns when IR0 is masked (counter underflow interrupt) or 26 ns when enabled.

The polarity of the FLAG input can be changed inside the sequencer.

The DTP module, like the CP module, contains mimic register logic like that shown in FIG. 40A. (This avoids problems with returning from interrupt handling.)

The testable status signals are:

IPU 340 condition code output (COND): this signal relays the status of the current instruction. The specific condition that the IPU 340 outputs on this pin is coded in the microcode instruction.

Microcode loop. This is a status bit in the VME interface control register, and is useful for diagnostic software.

FIFO status signals for the following FIFOs: Data pipe input #1 (half full and empty); Data pipe input #2 (half full and empty); Data pipe output #1 (full) *; Data pipe output #2 (full) *; VME data input (half full and empty); VME data output (half full and empty); GIP interface (input) (half full and empty); GIP interface (output) (full, half full and empty). Signals marked * come from the receiving FIFOs on another subsystem.

Data cache memory cycle acknowledge. This indicates when the access to the data cache memory has been granted.

Microcode expansion interface condition code signal This is used by any microcode extension interface 180 to pass back status to the data transfer processor module's sequencer 310.

DMA bus error. This status bit goes active when the DMA transfer on the VME bus gets aborted as a result of a bus error occurring. The most likely reason for this error is that non-existent memory was addressed.

Write flags 0 and 1. These two signals allow better access to the internal state of the data cache memory write logic. They are only used by the state save and restore microcode in the debug monitor.

Held status: This is tested when returning from an interrupt, so that any conditional jump, etc., is executed correctly even if it was displaced by a jump to the interrupt service routine.

The COND output from the IPU 340 is valid toe late to meet the sequencer's set up time (especially as it will be delayed by a multiplexer) when cycling in 100 ns. When testing this condition, the clock will need to be stretched to 125 ns.

Implementing "for loops" is best done by using one of the counters internal to the sequencer, thus freeing the IPU 340 for address calculations. Obviously they can be done using the IPU 340, but with the extra overhead of a longer cycle time.

The condition codes are multiplexed, via an 24 to 1 multiplexer 312, into the "FLAG" input in the sequencer 310. The sequencer internally registers and selects the polarity of the selected condition code signal.

Microaddress Bus 311

The micro address bus 311 can be driven from two sources: from sequencer 310 during normal program execution, and from the VME bus when loading microcode. The VME bus can also read the contents of the microaddress bus 311, to see what address the sequencer 310 is at. This is done asynchronously to the sequencer operation, and is mainly used for diagnostics. The extension of this bus, shown as line 311B, is connected to the Host Interface Logic 160.

Constant/Next Address Field

This is used in a fashion quite different from that described above in connection with sequencer 210. In the DTP module 120, some innovative logic is used to provide an enhanced multiway branching capability. This logic (and its use in multiway branching) will now be described.

Multiway Branching

Figure 3B:
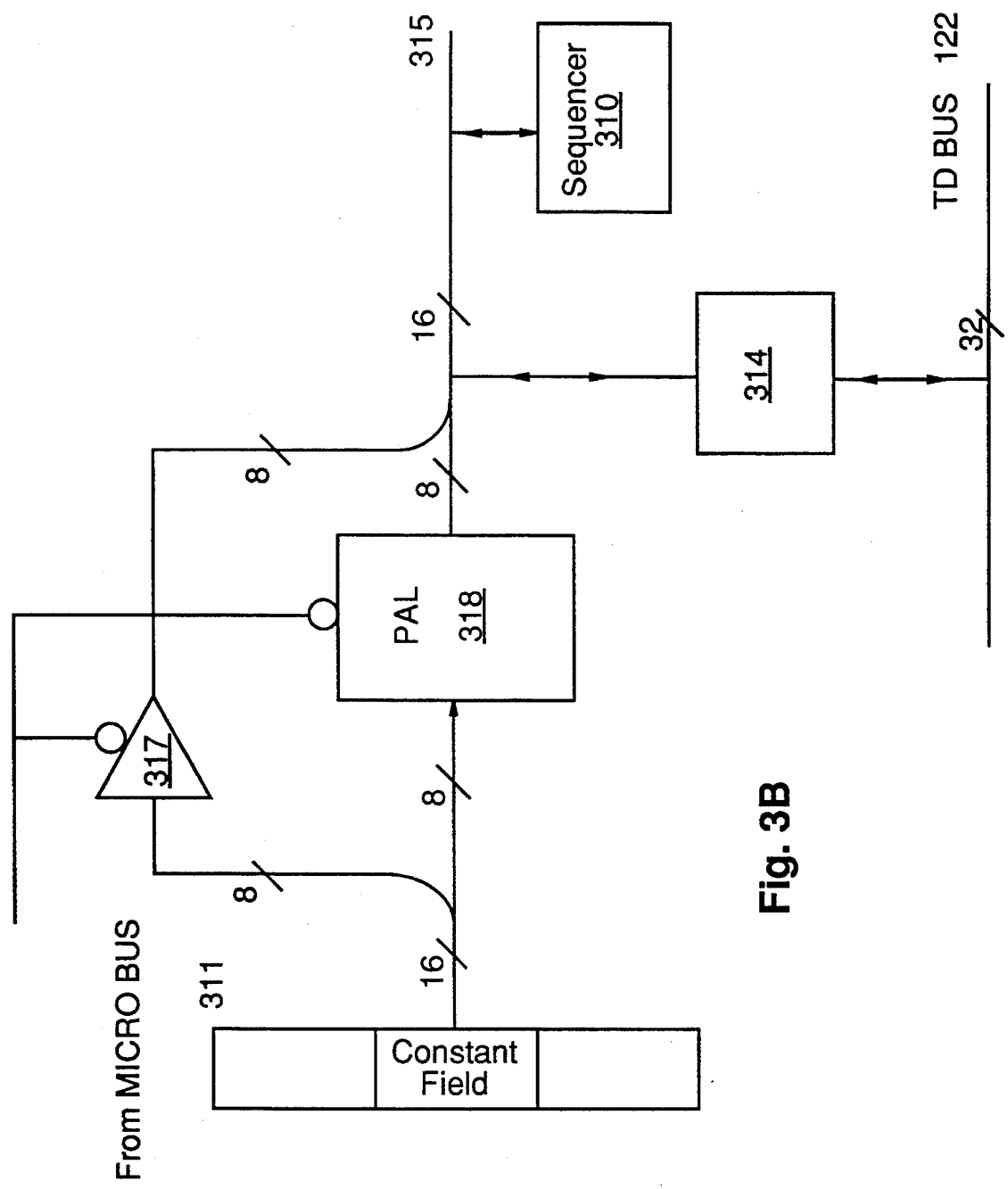
FIG. 3B shows greater detail of the logic used to selectably drive a constant address onto the sequencer bus 315 in the Data Transfer Processor module.
Figure 30:
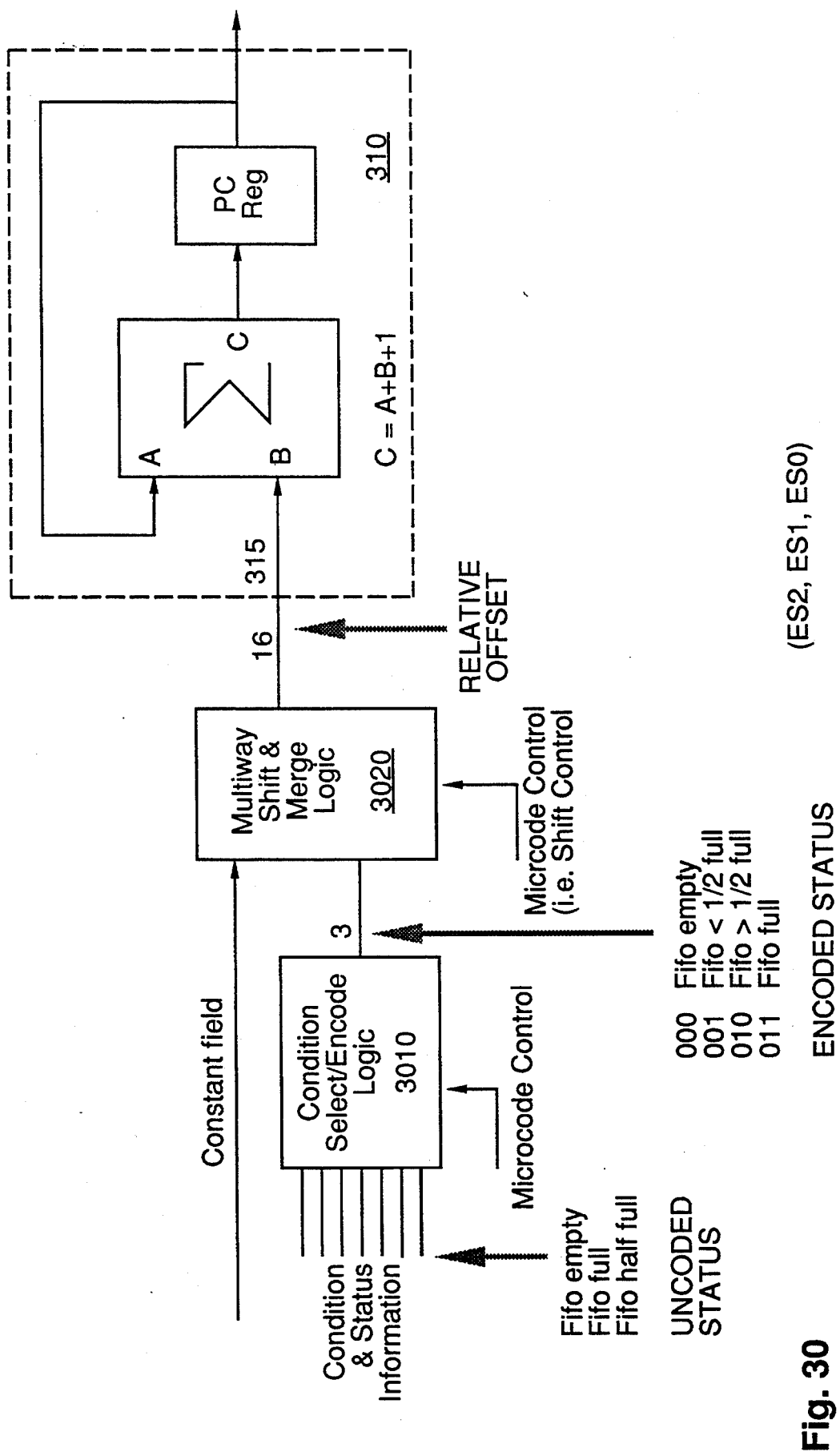
FIG. 30 schematically shows the microcode operation used in the presently preferred embodiment to provide multiway branching without address boundary constraints.

The embodiment shown in FIGS. 3A and 3B includes some significant new capabilities for multiway branching in microcoded systems. FIG. 30 schematically shows the microcode operation used in the presently preferred embodiment to provide multiway branching without address boundary constraints.

In FIG. 3A, note that the constant/next address field (from a microinstruction field) is not only provided to buffer 317, but is also provided as an input to multiway branch logic 318. The multiway branch logic can manipulate this signal in ways which provide a novel capability in microcoded architectures. Other inputs to this multiway branch logic include FIF status signals, and also a shift command (which will be used to vary the increment between alternative destinations, in the multiway branch step performed by sequencer 310).

FIG. 3B shows somewhat greater detail The constant field (16 bits) from the microinstruction bus 311 is split, to provide inputs both to PAL 318 and buffer 317. A common enable signal is used to activate both of these, when multiway branch operation is desired. (Of course, the sequencer bus 315 has many other uses as well, and multiway branch operation will often not be desired.) Moreover, the constant/next address field is also used very often for simple jump operations, and in such cases the multiway branch logic 318 is disabled.

FIG. 30 shows still greater detail regarding the internal operation of the multiway branch logic 318. A variety of condition and status signals are provided to condition select/encode logic 3010. This selects and encodes these conditions to give a three bit signal which can be used for branching.

The multiway branch logic is controlled by several microinstruction bits, as described in detail below.

It is particularly advantageous to use such multiway branching logic in a data transfer processor like module 120. In this case, device condition signals can be used as the conditions input to select/encode logic 3010. This permits a data transfer processor to exercise high-level control over a quite complex interface. When a status signal of interest occurs, the multiway branch logic can very rapidly transfer to the appropriate routine for handling the condition. The multiway branch capability permits the sequencer to test the conditions of several devices in a single cycle. This means that the DTP module 120 can perform a data transfer on every cycle. This also permits sequencers having only a single condition code (FLAG) input to exercise complex control.

In the presently preferred embodiment, the inputs to select/encode logic 3010 include status bits from four FIFOs, as detailed below. However, of come, a wide variety of other input arrangements could be used.

Note that a shift input is provided to the shift and merge logic. This permits the increment between the destinations of the multiway branch to be varied.

The right side of FIG. 30 shows schematically that the sequencer 310 has relative addressing capability. This capability, in combination with the multiway branch logic, means that address boundary constraints can be ignored. This is particularly advantageous in a data transfer processor. Since such a processor must be able to perform a high fraction of data transfers, it may be desired to include a large fraction of multiway branch instructions. The lack of address boundary constraints means that a high proportion of such instructions can be used.

The presently preferred embodiment uses the program counter as an input to the jump destination. This is different from many previous implementations of multiway branching, where the base destination address was supplied from a different source.

Writable Control Store (WCS) 320

The WCS is made up using the microcode SIL modules. These provide 8K by 32 bits of memory with a serial scan pipeline register for loading microcode and diagnostics. Two versions of the module are used: registered or non-registered outputs. The IPU 340 and sequencer 310 have their own internal pipeline registers and so use the non-registered versions.

WCS interface registers 322 and 323 function analogously to the WCS interface registers 223 and 222 described above with regard to the control processor module.

DMA Controller

An important function of the DTP module 120 is controlling one or more DMA controllers, in the VME interface 160 and possibly in one or more other interfaces as well. This function will be described in greater detail below, where those interfaces are

Miscellaneous Logic

Mode Registers

The mode registers 303 hold the value of little used control signal which can not justify dedicated microcode bits. The mode bits are: Flow through or register control of the read holding registers; Flow through or register control of the write holding registers; External interrupt acknowledge signal that drives the interrupt acknowledge signal in the microcode expansion interface; GIP interrupt request; Loopback mode for the holding registers; Two LED control signal.

TD Bus Decode

This logic (which is one of the most important functions of the decoder 360) decodes the microcode TD source field, and accordingly controls the output enables of devices that can drive the TD bus 122. It also decodes the TD destination field (as qualified by a write gate signal from the clock generator 250) to generate strobe and write enable signals. Most of the ports on the TD bus 122 can be read and written, so mimic registers on the IPU are not required.

Possible TD bus sources and destinations include: IPU 340; VME Interface Memory; Command memory;, Data cache memory holding registers 560B; Mode register (8 bits); Sequencer data port ; Constant/next address field (source only) ; VME data FIFO; Data pipe 1; Data pipe 2; GIP FIFO **; Interrupt vector register (8 bits); DMA control register; DMA controller—address counter *; DMA controller—word counter *. Sources marked * are decoded by the DMA controller instruction and not as part of the normal TD bus control field. Sources marked ** only drive the lower 16 bits. When one of them is selected, the sign-/zero extend PAL 216 is also activated, so that the data is either sign or zero extended up to the bus width of 32 bits.

Note that only one source and one destination can be selected, and they must be different. The transfer of data into the IPU 340 is under control of the IPU 340's instruction field so it can take data from the TD bus 122 at the same time it is being loaded into another destination.

Clock Generator

As noted above, the clock generator 250 produces the basic clock signals used throughout the data transfer processor module 120.

Debug Hardware

Most of the debug hardware included in the data transfer processor module 120 has already been mentioned in various places in the preceding description. These are summarized here for convenience: Host control of microaddress bus 311—both read and write; Host loading and readback of the WCS; VME generated interrupt to get the DTP's attention; Hardware breakpoint support with no restriction on the number of breakpoints that are set at any one time; Claw logic, which permits the user task to be single stepped without single stepping the monitor task; All registers are read/write; Hardware control of clocks for single stepping microcode; All interrupts can be selectively enabled or disabled; Access to the internal state of the critical logic groups to allow the complete state save and restore of the DTP module's hardware states.

Microcode Word Format

Figure 3C:
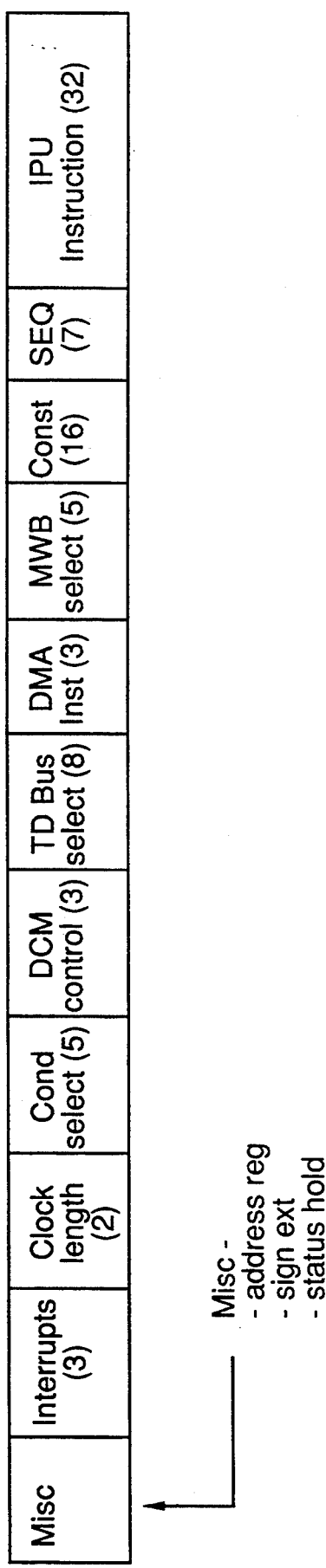
FIG. 3C schematically shows the field allocations in the microinstruction format used in the Data Transfer Processor module 120, in the presently preferred embodiment.

The microcode word format is generally shown in FIG. 3C, and is defined below. Items marked with a * come directly from the WCS, and are pipelined internally in the devices they are controlling.

The total number of microcode bits available are 96. Most of the bits are used, but there are a few spares that have not been included in the following fields.

IPU opcode (32) * This field controls the data routing and arithmetic or logical operation of the IPU 340 integer processor. The allocation of bits within the field is encoded and details will be found in the Weitek data sheets. All instructions are encoded in the bottom 24 bits and the top 8 bits are only used during the transfer of data into the IPU 340's register file.

Sequencer opcode (7) * This field controls the generation of the next address by the ADSP 1401. See data sheet for the instruction set.

Constant/next address field (16) * This field is mainly used for providing address information to the sequencer but can also be used to place a 16 bit constant value onto the data bus. This can then be loaded into any of the registers on this bus.

Multiway branch select (2) * This field selects which set of FIFO status signals are to be used during a multiway branch operation. The choices are: VME input FIFO; GIP input FIFO; Data Pipe 1 input FIFO; and Data Pipe 2 input FIFO.

Multiway shift control (2) This selects that the multiway branch status information is inserted from bit position 0, bit position 1, bit position 2 or not at all. The various shift factors allow for each entry point within a multiway branch to be 1, 2 or 4 instructions long respectively.

Multiway branch transfer enable (1) This bit enables or disables the data cache memory access granted signal from being combined with the FIFO status. When it is not used the multiway branch is 4-way and when it is used it is 8-way.

Cycle length (2) This field selects the cycle length appropriate to the instruction and data routing selected.

Data cache access (1) * This bit is active whenever an access to the data cache memory is required by the data transfer processor module 120.

Data cache write enable (1) This bit generates a write cycle in the data cache memory if access to the data cache memory has been granted.

Data cache write all (1) This bit overrides the normal write enable gating that allows selective updating of words in the data cache memory and forces them all to be written. This only results in a data cache memory write cycle when access has been granted. This is useful when setting blocks of memory to a constant value.

Condition code select (5) This field selects one of the following condition codes to be tested by the sequencer during a conditional instruction: IPU 340 condition code output; microcode loop; write flags (2 entries); Data pipe input FIFO#1 (half full and empty); Data pipe input FIFO#2 (half full and empty); Data pipe output FIFO#1 (full); Data pipe output FIFO#2 (full); VME data input FIFO (half full and empty); VME data output FIFO (half full and empty); GIP interface (input) (half full and empty); GIP interface (output) (full, half full, empty); Data cache memory cycle acknowledge; Microcode expansion interface condition code signal; DMA bus error; Hold status.

Hold Status (1) This bit prevents the updating of the mimic status register that normally follows the state of the FLAG register inside the sequencer 210. Normally this mimic bit follows the internal register's state, but during an interrupt service the mimic bit is prevented from being updated. This permits the FLAG register to be correctly restored when the interrupt routine is exited.

TD bus source (4) This field selects one of the following registers, buffers or devices to drive the TD bus: IPU 340; Command memory; VME interface memory; Data cache memory holding register; Mode register; Sequencer data port; Constant/next address field; Sequencer data port; Constant/next address field; VME data FIFO Data pipe 1; Data pipe 2; GIP FIFO; Interrupt vector register (8 bits); DMA control register DMA controller—address counter; or DMA controller—word counter.

TD bus destination (4) This field selects one of the following registers, buffers or devices as the destination of the data on the TD bus: Command memory; VME interface memory; Data cache memory holding register; Mode register; Sequencer data port; Constant/next address field; Sequencer data port; VME data FIFO Data pipe 1; Data pipe 2; GIP FIFO; Interrupt vector register (8 bits); DMA control register; DMA controller—address counter; DMA controller—word counter.

The IPU 340 is not included in this list, because it can "grab" the data on the TD bus at any time. This function is controlled by the IPU instruction field.

- Address register control (2) One of these control bits enables the loading of the address register and the other bit enables readback of the register for use by the diagnostics and debug monitor.
- Breakpoint (1) ( Debug use only ) Set by the debug monitor to place a breakpoint on an instruction. This causes an interrupt to occur during the instruction so that control is passed to the debug monitor microcode after this instruction has finished.
- Claw (1) ( Debug use only ) Set to prime the claw logic when single stepping a user task. This causes an interrupt to occur during the next instruction so that control is passed back to the debug monitor microcode after one user task instruction has been executed. This allows a user task to be single stepped without physically switching the clocks on and off.
- Interrupt CP (2) This generates an interrupt in the control processor module 110 at one of three levels. The levels are allocated as follows: New command from host received; Data transfer finished; Relinquish access to data cache memory.
- Zero or Sign extend (1) This bit only has any effect when a 16 bit wide register or device is read. In this case it selects whether the data is to be zero extended (bits 16-31 set to zero) or sign extended (bits 16-31 set to the same as bit 15).
- DMA Controller instruction (3) This field controls the instructions to the DMA controller. The instructions available are concerned with reading and writing the internal registers, re-initializing the registers, and also the normal DMA operation of incrementing (or decrementing) the address and decrementing the word counter.

Microcode Expansion Bus

The microexpansion bus extends the basic microcode services off-board. This can be used to control some interface logic on the expansion peripheral board, or to control an entire peripheral board. Typical uses of this might be to interface to a bulk memory card or network interface card.

The expansion bus interface is electrically and mechanically identical to the expansion interface on the GIP so they can share any common expansion cards.

The expansion connector is a 96 way DIN connector, and the signals on it are: Three bit slice clocks [Note 1]; Pipeline register clock [1]; Microaddress bus 311B (15 bits) [2]; TD bus 122 (32 bits) [3]; Reset; WCS output enable; Pipeline register output enable; WCS write enable 324; Pipeline register mode control; Serial clock, Serial data in, and Serial data out (used for microcode loading); External interrupt [4]; Interrupt acknowledge; and Condition code [4]. All signals are TTL levels except where noted: [1] These signals are differential ECL levels. [2] These signals are single ended ECL levels. [3] This bus is 32 bits wide, but can be considered for some purposes as two 16 bit buses—called the primary data bus and the secondary data bus. [4] These signals are driven by open collector buffers.

The use of some ECL signals in this interface is useful in minimizing the effects of clock skew between boards.

Numeric Processor Module 130

The presently preferred embodiment of the numeric processor module 130 is a floating-point processor. Therefore, the module 130 will sometimes be referred to as a floating-point processor module (or "FP module"). However, this module could optionally be configured for other data types, e.g. as a complex arithmetic module or as a module for wide-integer arithmetic. Therefore, this module will also sometimes be referred to more generically, as a numeric processor module 130.

In the presently preferred embodiment, the floating-point processor module 130 is very closely coupled to the control/interface logic which governs data transfers between the floating point processor and the cache memory. This control/interface logic is clocked by the microcode clock of the control processor, and is preferably controlled by an extension of the control processor microinstructions. In the presently preferred embodiment, the Floating-point Processor Module 130 and the control/interface logic (CP Extension logic) are located together on a separate subboard, which plugs into the main base board (where the cache memory 140 and the main part of the control processor module 110 are located). If additional modules 130 are used, each of them would contain a portion of the control/interface logic.

In the present application, this control/interface logic is regarded as an extension of the control processor module 110. However, whether or not this control/interface logic is regarded as part of module 110, the present application contains some significant teachings regarding the timing and control characteristics of this logic.

The presently preferred embodiment uses a 32 bit data structure. Each floating-point number is represented by 32 bits, and therefore 32-bit units are referred to as floating-point words (or "F_words"). In the presently preferred embodiment, the number format is 24 bits mantissa and 8 bits exponent. This can be, selectably, either IEEE format or DEC format.

The internal operation of the floating point processor module 130 will first be discussed. The features of the interface to the control processor module 110 and to the cache memory 140 will then be discussed in greater detail.

Figure 4D:
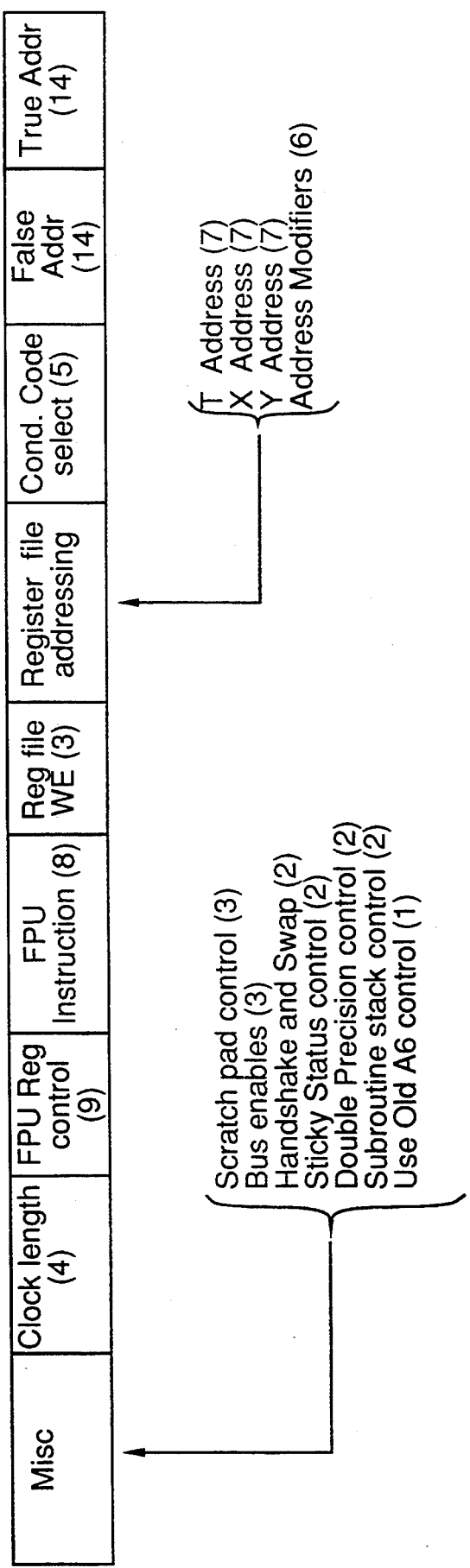

FIGS. 4A through 4D show key portions of the numeric processing module 130, in the presently preferred embodiment. FIG. 4A schematically shows the interface logic 410 which is used to interface to the control processor module 110. FIG. 4B shows some key portions of the data path in the module 130. FIG. 4C shows the logic used in the presently preferred embodiment, for microcode access and decoding. FIG. 4D shows the microinstruction format used in the floating-point module 130 in the presently preferred embodiment.

The floating-point arithmetic unit, where the actual numeric calculations are performed at high speed, will be described first. The double-buffering operations, by which data is transferred across the clock boundary between the FP module 130 and the slower modules, will then be described. Next, the further stages of data transfer (largely controlled by extensions of the CP module 110) will be described. Finally, the program control which governs the arithmetic unit will be described.

Floating-Point Arithmetic Unit (FPU)

The floating-point arithmetic path of the presently preferred embodiment is quite simple, and runs at high speed. This path includes a floating point multiplier, a floating point ALU (arithmetic and logic unit), and fast multiport register files, all controlled by a very fast, but simple, sequencer. In addition, a scratchpad memory is closely coupled to the inner data paths, to hold lookup tables and provide histogram storage or data stack operations.

Figure 16:
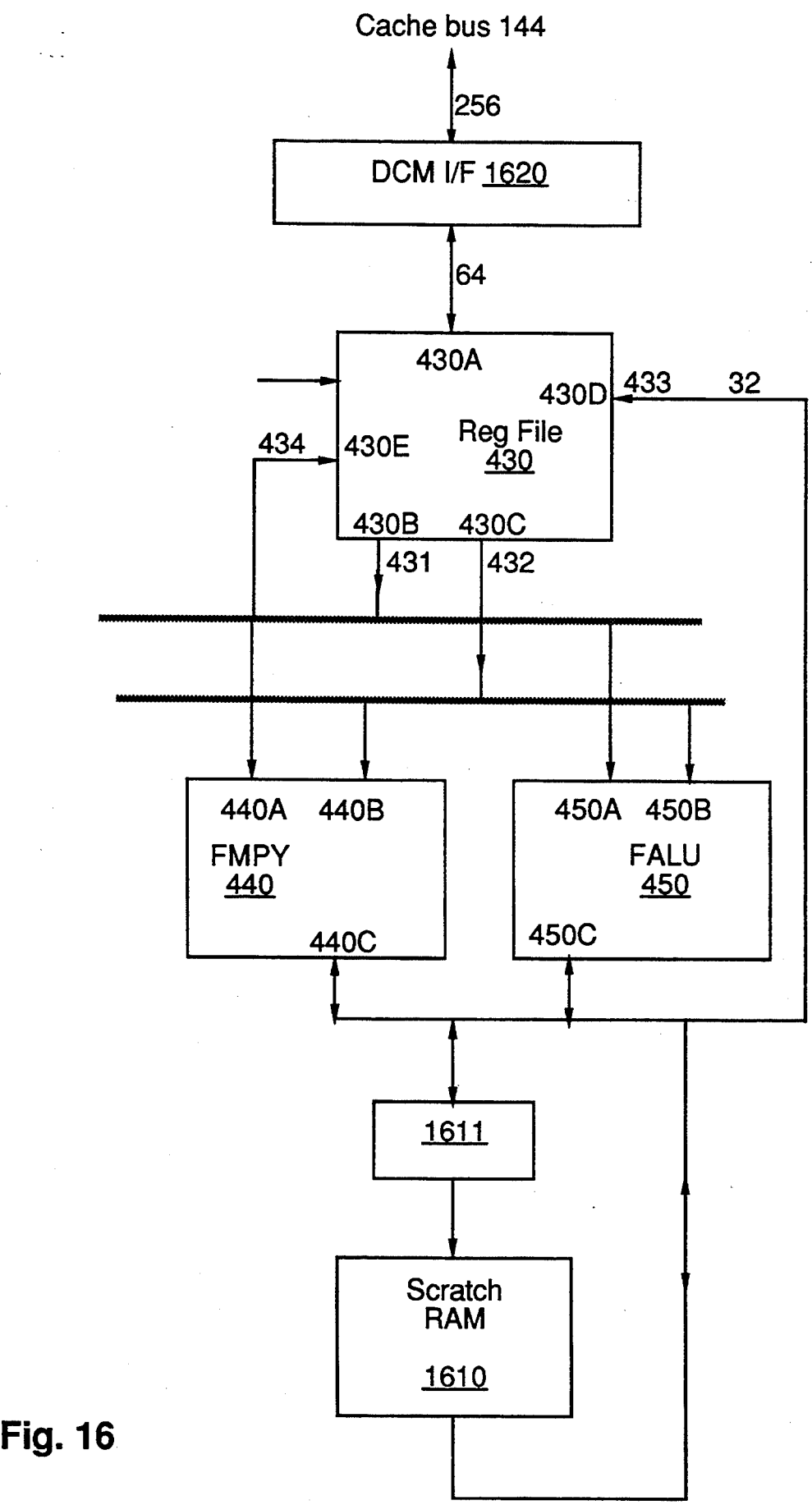
FIG. 16 generally shows the organization of some key parts of the primary data path for numeric operations, within the floating-point processor in the presently preferred embodiment.

The topology of the low-level data path is seen most clearly in FIG. 16. this low-level data path, and its components, will be referred to as the Floating-Point Arithmetic Unit (FPU). The FPU includes fast register file 430, multiplier 440, ALU 450, scratchpad memory 1610, and local busses 431, 432, 433, and 434.

Arithmetic Calculation Units 440 and 450

The floating-point calculation units used in the floating-point processor module 130 are the floating-point multiplier (FMPY) 440 and floating-point arithmetic and logic unit (FALU) 450. Both parts have very similar internal architectures. The only difference in their data handling (apart from the different arithmetic operations) is the extra feedback path in the FALU 450 for accumulate operations.

The presently preferred embodiment uses integrated circuits (floating point chip set and register files) from Bipolar Integrated Technologies (BIT), as follows. The BIT part numbers, and the equivalent Analog Devices numbers, are: Multiplier 440: B2110 or ADSP7110; ALU 450: B2120 or ADSP7120; Register File 430: B2210 or ADSP7210. The multiplier 440 and ALU 450, and the fast register files 430, actually use ECL gates internally. However, their interfaces and power supplies are TTL. These arithmetic chips have a full 64-bit data path internally, with 32-bit external interfaces. Accordingly, these chips have the capability to do rapid 64-bit operations, using multiplexed data transfers as necessary.

The FMPY 440 and FALU 450 each have two 32 bit wide input ports X and Y for operands (connected to local operand busses 431 and 432 respectively), and a 32 bit wide bidirectional port T for results (connected to the local results bus 433). Each of the input ports of the calculation units contains a latch and multiplexer, and the output port contains a multiplexer, so 64 bit wide numbers can be transferred in or out.

The result ports of the two calculation units are connected in parallel (to results bus 433, and thereby to write port 430D of the register file). This permits the calculation units to swap data without using external multiplexers or routing data through the register file. This is useful, for example, when sum of products calculations are done. This capability is also useful in permitting rapid data transfer to and from the scratchpad memory 1610. However, a restriction of this configuration is that both the FMPY 440 and FALU 450 can not be active at the same time (except for a sum of products operation), because the output ports are tied together. Even if the ports were separate, then the problem could exist on the input side, since both devices share the same data path from the register files 430.

The actual arithmetic devices used offer a degree of flexibility in configuring the input and output ports to be registered or transparent. However, in the presently preferred embodiment this capability is not used, and all the ports are registered. The internal data paths and the function unit of both calculation units are all 64 bits wide, and can perform both single precision (SP) and double precision (DP) calculations.

The function unit in the FMPY 440 supports 4 arithmetic instructions. The minimum cycle times (in nanoseconds) for both precisions are:

|  | Single | Double |
|---|---|---|
| Multiply | 40 | 59 |
| Divide | 200 | 300 |
| Square root | 300 | 600 |
| Pass | 40 | 60 |
| Integer multiply | 45 | — |

The function unit in the FALU 450 supports a very wide range of floating point instructions, integer instructions and conversion instructions. For further details, the manufacturer's data sheet can be consulted. All floating point instructions (single and double precision) execute in a minimum cycle time of 25 ns; the integer operations all take 12 ns and all the conversions take 25 ns.

The more common instructions include:
Floating point: add and subtract (signed or absolute), absolute, negate, scale, merge, normalize, and compare.
Conversions: SP→32 bit integer, signed or unsigned; SP→64 bit integer, signed or unsigned; SP←32 bit integer, signed or unsigned; SP←64 bit integer, signed or unsigned; DP→32 bit integer, signed or unsigned; DP→64 bit integer, signed or unsigned; DP←32 bit integer, signed or unsigned; DP←64 bit integer, signed or unsigned; SP→DP; DP→SP;
Integer: add (with 0, 1, carry); subtract (with 0, −1, -carry); max(signed or unsigned); min (signed or unsigned); logical; shift (logical or arithmetic); rotates; and bit reverse.

Scratchpad Memory 1610

As seen in FIG. 16, the scratchpad memory 1610, with its address counter 1611, hangs on the results bus 433. Since the calculation units 440 and 450 have bidirectional ports onto this bus, data can be read directly from this memory by multiplier 440, ALU 450, or Register file 430.

The address counter 1611 permits several modes of access to this memory. Depending on two mode bits, the address counter may (at each read or write access) increment the address, decrement the address, hold the address, or permit the address to be specified. (For example, combinations of address incrementing and decrementing can readily be used for operation as a stack.) The address generation capability of the counter 1611 permits the memory 1610 to function at one write per cycle, under some conditions.

The operation of this memory as a stack is particularly advantageous for scaler programming with compilers, as discussed above.

When running histogram algorithms, the previous subtotal (of the parameter being tracked) can be read out onto results bus 433. In one simple example of such an operation, the memory 1610 is designated as data source for results bus 433, and the ALU 450 is commanded to read an operand value from the results bus, while the multiplier 440 is working. When the multiplier 440 finishes, it drives its result onto the results bus 433, and the ALU reads in that value as a second operand. The ALU then drives the sum onto the results bus 433, while the memory 1610 is commanded to write that result. (Meanwhile, additional operands can be loaded into multiplier 440.)

Fast Register Files 430

The register fries 430 form the main interface with the data cache memory 140. One bank of the register ties runs in partial synchrony with the CP module 110, and interfaces with the FP holding registers 420 through local transfer bus 422 (connected to bidirectional port 430A (FIG. 16)). The other bank runs synchronously with the FP module, and interfaces with operand busses 431, 432 (read ports 430B and 430C), results bus 433 (read port 430D), and loopback connection 434 (write port 430E).

FIG. 4B shows some key portions of the data path in the module 130. The main cache bus 144 (which is 256 bits wide) is interfaced to a series of four FP holding registers 420. (These holding registers are actually paired, so that a read register is paralleled by a write register. Thus, there are eight holding registers 420, each 64 bits wide, to provide a bidirectional 256-bit interface.) The eight holding registers 420 receive separate enable signals 421. Thus, this bank of registers permits the 256 bit wide cache bus 144 to be multiplexed into the 64 bit wide fast register file 430.

This multiplexing is performed primarily for cost reasons. The fast register files 430 are very expensive chips. Using four times as many of them would very significantly increase the cost of the system. Moreover, as may be seen from FIG. 38B, the footprint of these devices is very significant (due to their very high pin count), so that using sixteen of these packages rather than four would add significant demands on board area.

There are actually four registers 430, and not merely two. Each of the physically separate chips is 18 bits wide, so four of them in parallel are used to provide a 64 bit interface to the local transfer bus 422. (Note that this interface is two F_words wide.)

In the presently preferred embodiment, the register files 430 are constructed from 5 port devices which are 18 bits wide by 64 locations deep. Thus, the 64-bit side interface to local transfer bus 422 requires four devices to be used in parallel (For clarity, FIG. 4B shows the register file as if it were two 32-bit wide files. This helps to show the word address odd/even status structure discussed below. FIG. 16 simply shows the register file 430 as a single file.) In the presently preferred best mode, these devices have been actually constructed using part number B2210 from BIT.

Ideally the register files would be 256 bits wide, to permit a more direct interface to the cache bus 144, but this would require significant added hardware expense. The alternative used in the presently preferred embodiment is to use FP holding registers 420 (with associated control logic), to multiplex the 256-bit interface to cache bus 144 down onto a 64 bit wide port 430A. The multiplexing and data routing is controlled by transfer logic, shown generally in FIGS. 4A and 4B, which will be discussed in greater detail below.

The interconnections of these files are preferably as follows. (The ports are individually labelled in FIG. 16.)

Each of the files 430 has a bidirectional interface 430A, which connects to the registers 420, through lines 422.

Each of the register files 430 has two transparent data outputs. These outputs can be separately enabled, so that they can represent different words from within the register file 430. These outputs 430B and 430C drive local operand buses 431 and 432.

Each of the register files 430 has an input port 430D which is connected to a third local data bus 433, which will be referred to as the results bus. This results bus is connected to the outputs of the calculation units 440 and 450.

Each of the register files 430 has another input port 430E, which is tied to read port 430B by loopback connection 434 to first operand bus 431. This write port takes its address from the "results" write port 430D. This allows data to be copied from one register file address to another without having to go through the ALU 450 or multiplier 440, thus saving two cycles of delay. This means that data can be rapidly reordered and shuffled as desired, without using the calculation units 440 and 450 and incurring the delays associated with these parts. This capability can be particularly advantageous in bonding subroutines.

Thus, the five-port register files 430 each have two read ports D and E, two write ports B and C, and one bidirectional port A. The read ports feed operands to the FMPY 440 and FALU 450, and the results are written back using write port 430D (or, if desired, write port 430E). The register files can store 128 F_words.

The data, address and write enables for write ports 430D and 430E (and the write part of the bidirectional port 430A) are registered internally to the register file 430. An internal write pulse is automatically generated.

The two read ports can have their data paths registered or latched (both must be the same), and their addresses registered or latched. The configuration used on the floating-point processor module 130 is to register the addresses as these are driven directly from the microcode and to hold the data latches transparent. The data is registered internally to the FMPY 440 and FALU 450.

The register files can operate in a "write through" mode, when the read and write addresses are the same. In this mode the written data appears on the read port in the same cycle, but about 10 ns later than a normal read operation. This is useful for recursive or scalar calculations where it is advantageous to reduce the number of pipeline stages.

Separate addresses for the read port 430B, read port 430C, and write port 430D, are supplied by fields of the FP microcode. This allows r1=r2 OP r3 type of calculations to be performed within the constraints of the pipelining.

Double Buffering

The highly multi-ported fast register file 430 is a key element in providing a clean interface between the control processor module 110 and floating-point processor module 130. The address space of this register file is partitioned, to act as a double buffer. At any given time, one bank of this register file runs quasi-synchronously to the control processor module 110, and the other bank runs synchronously to the floating point processor module 130. (The operations which are quasi-synchronous to the CP module are discussed in detail below. These quasi-synchronous operations may be regarded as providing a transitional clock domain, which helps in providing a high-bandwidth interface.)

The assignments of the two banks are interchanged, under the control of handshaking logic, at synchronization points. Thus, this clock boundary placement permits changes to be made on one side of the boundary without affecting the other side.

This clean interface provides a migration path to faster, or more, integrated floating point chip sets, and hence provides floating point device independence. (The function and use of the handshaking logic will be described in greater detail below, with reference to FIG. 22, where the interaction between the CP module and the FP module is described.)

Figure 18:
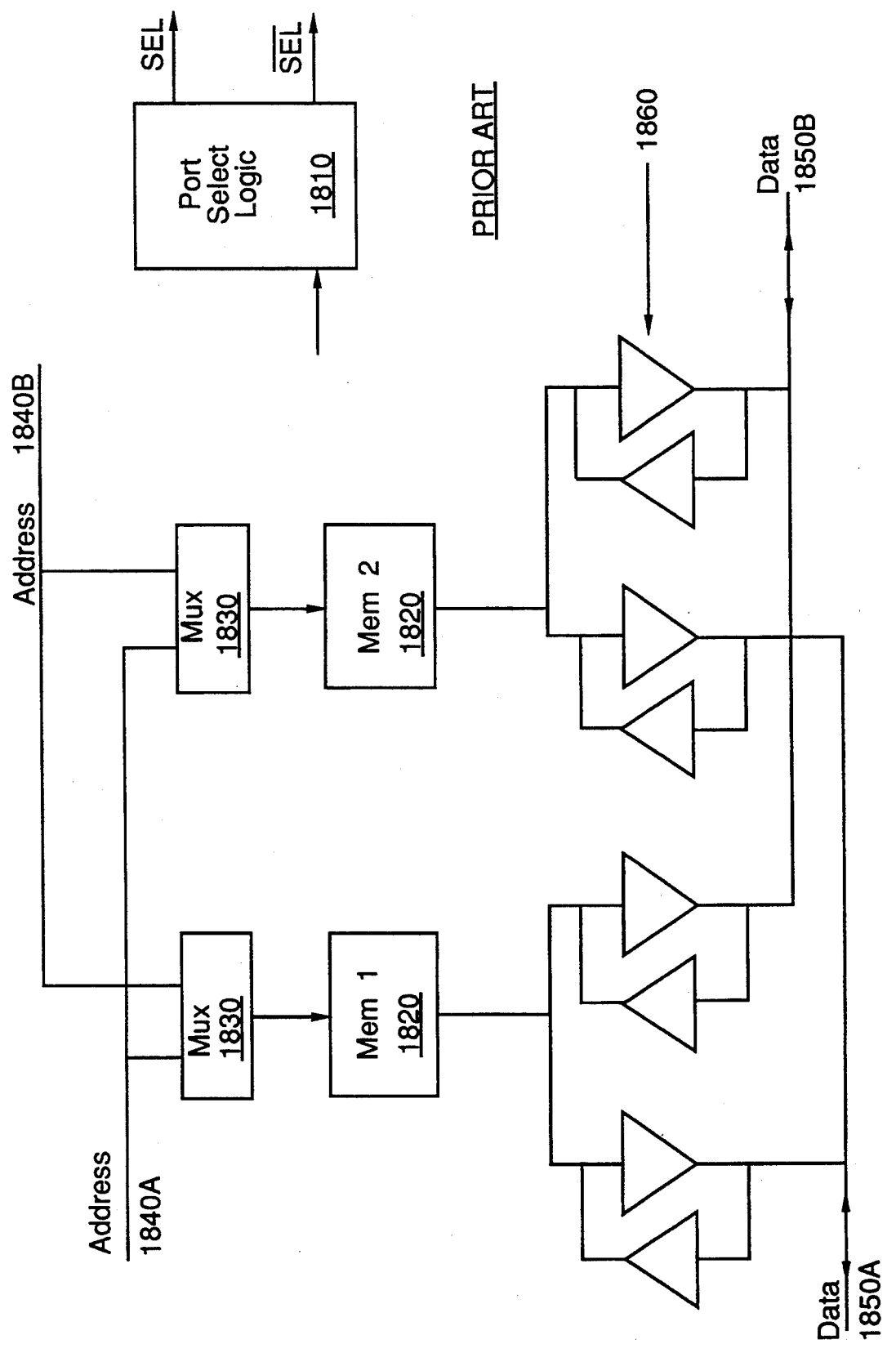
FIG. 18 shows how a conventional double buffer is organized and controlled in hardware.
Figure 19:
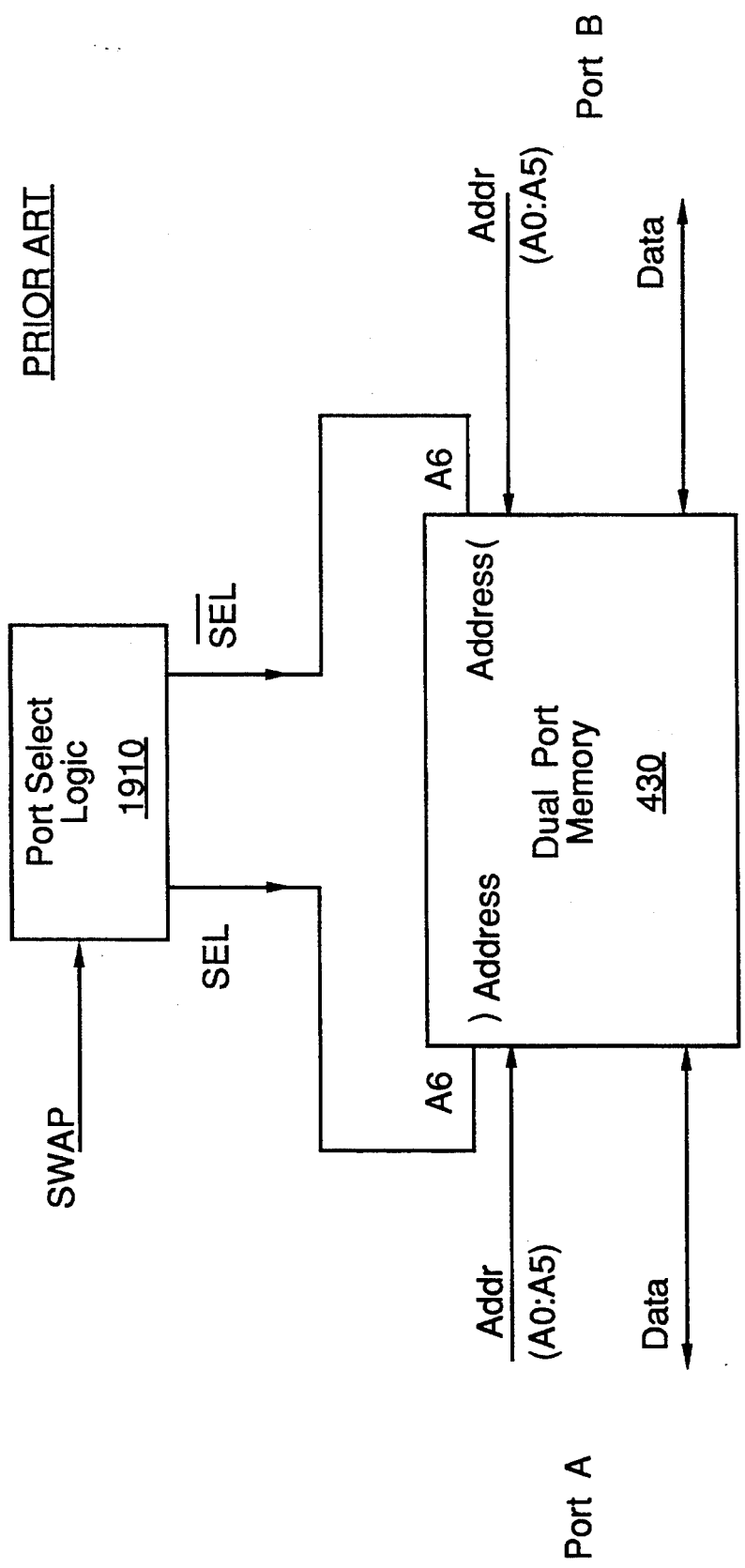
FIG. 19 another conventional method for double buffering, where a dual port register file is used with one of the bits controlled externally.

Thus, the register file 430 is double buffered for the normal exchange of data and results. However, unlike prior systems such as that of FIG. 18 and 19, this double buffering is not inflexible. Thus, both the control processor module 110 and floating-point processor module 130 can access any of the addresses in either bank of the register files 430. The fact that the accesses are not locked out of the opposite bank is used to great advantage, as will be seen below.

Since hardware access is not cut off, each access to the register files must (at some level) specify the full 7 bits of address (A0:A6). Where the double buffering operation is being used, only six bits of address are actually needed (to address a location within the currently available bank). The double buffering operation is actually achieved by modifying the top address bit on the fly. A mode signal indicates how the top address bit is to be modified.

Thus, the register file addresses specified in the microcode are modified automatically by hardware. The double buffering is controlled by a "bank select" signal which determines which half of the register file the floating-point processor module 130 has access to, and which haft the control processor module 110 has access to. This bank select signal is not controlled directly by the microcode fields, but is toggled (by separate logic) only when both the control processor module 110 and floating-point processor module 130 have requested a swap.

The double buffering uses partitioning on the top address bit (A6). (By contrast, FIG. 4B shows two fries side by side, to indicate double-word structure of the file. This corresponds to partitioning on the bottom address bit (A0).)

Each register file address (7 bits) is accompanied by a two bit modifier, which selects one of the following address modes:

Physical address: This uses the address specified without any modification.

Logical address: This is selected when the automatic soft double buffering is used, and it causes the most significant bit of the address to be replaced by the bank select bit. The control processor module 110 register file address would use the inverse of this bit.

Preview: This allows the floating-point processor module 130 to preview the data on the other side of the bank, without having to swap the banks or use physical addressing. To keep the calculation pipeline full when crossing a synchronization point, access to the new data is needed (if it has been imported yet). However, there will normally be a delay due to pipelining: the banks can not be swapped over until all the results for the current bank have been written. This access mode circumvents that delay, since a read access can be taken from the opposite bank of the register files 430, before the bank swap is actually performed This is accomplished by replacing the most significant bit of the address with the inverse of the bank select bit.

Figure 20:
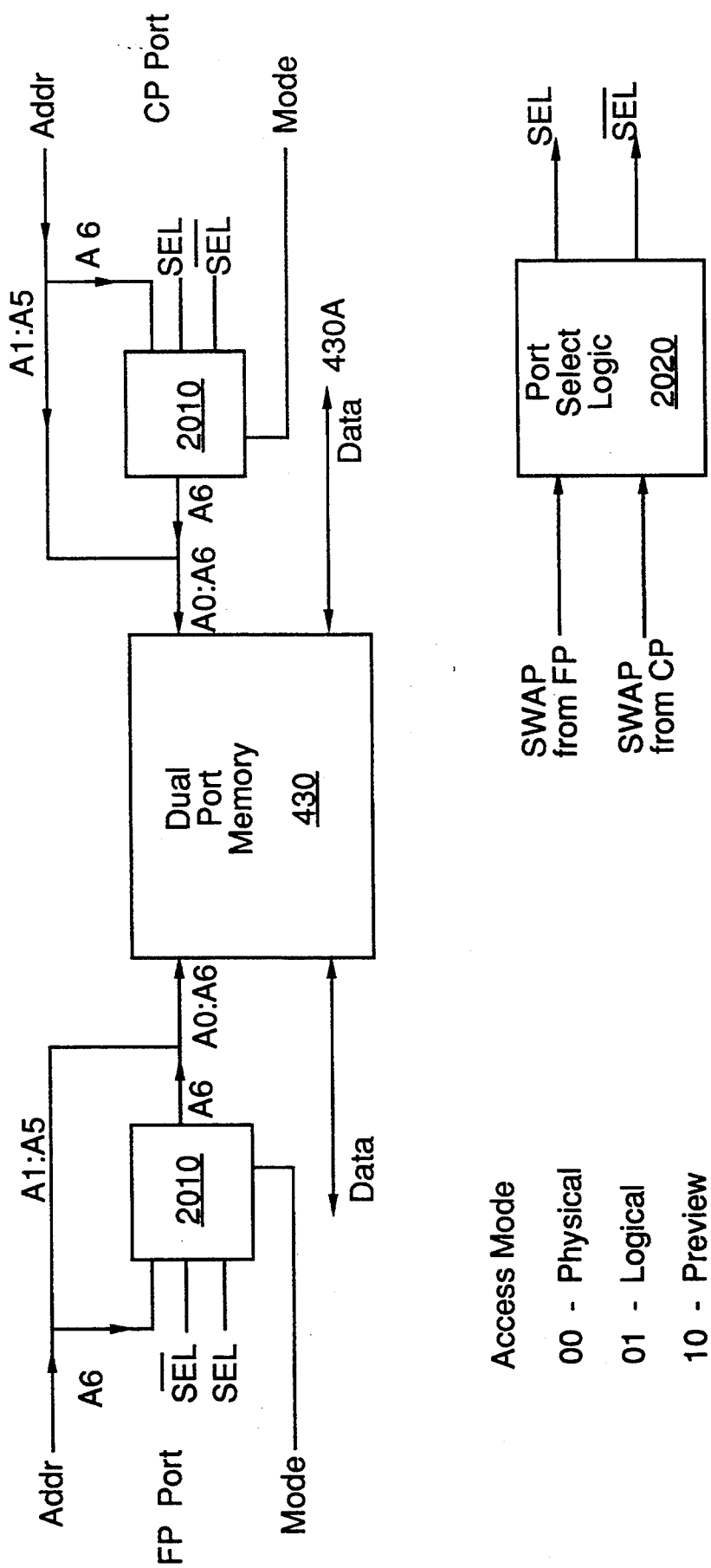
FIG. 20 schematically shows how the innovative double buffer of the presently preferred embodiment is organized and controlled in software, to provide multiple optional access modes.

FIG. 20 shows generally the logic used to accomplish the address modification for double buffering. The right side of this Figure shows the interface of register files 430 to the CP module 110, and the left side shows the interface to the remainder of FP module 130. Thus, the data connections on the right side would correspond to port 430A (shown in FIG. 16), and thence to FP holding registers 420 and cache bus 144. The data connections on the left side would correspond to ports 430B, C, D, and E (as shown in FIG. 16), and thence to multiplier 440, FALU 450, etc. The address inputs on the right side would correspond to data fields extracted from the microinstructions called up from WCS extension 490 by the CP microaddress bus 211A. The address fields on the left would correspond to data fields extracted from the microinstructions called up from FP WCS 470 by the FP microaddress bus 473. (The register file 430 has internal pipeline registers for the address inputs, and therefore receives the microinstruction bits unregistered.)

Two address modification logic units 2010 are shown. They essentially identical, except that their connections to SEL and SEL-bar are reversed. Thus, if both the CP and FP attempt to access the same address in logical mode, the address modification operations of their respective logic units 2010 would result in opposite A6 bit output addresses, which neatly implements the double-buffer function. The address logic unit also receives the top bit (A6) of a seven-bit address taken from one of the CP or FP microcode fields. It also receives a 2-bit mode signal In the actual implementation of the presently preferred embodiment, three address modification logic units 2010 are used on the FP side (one each for ports 430B, 430C, and 430D).

The complementary bank select signals SEL and SEL-bar are provided from port select logic 2020. These two signals are reversed whenever both the FP module and CP module have requested a bank swap. (The logic which accomplishes this is described in much greater detail below.)

Reduced Setup Time for Unregistered Bits

Figure 17:
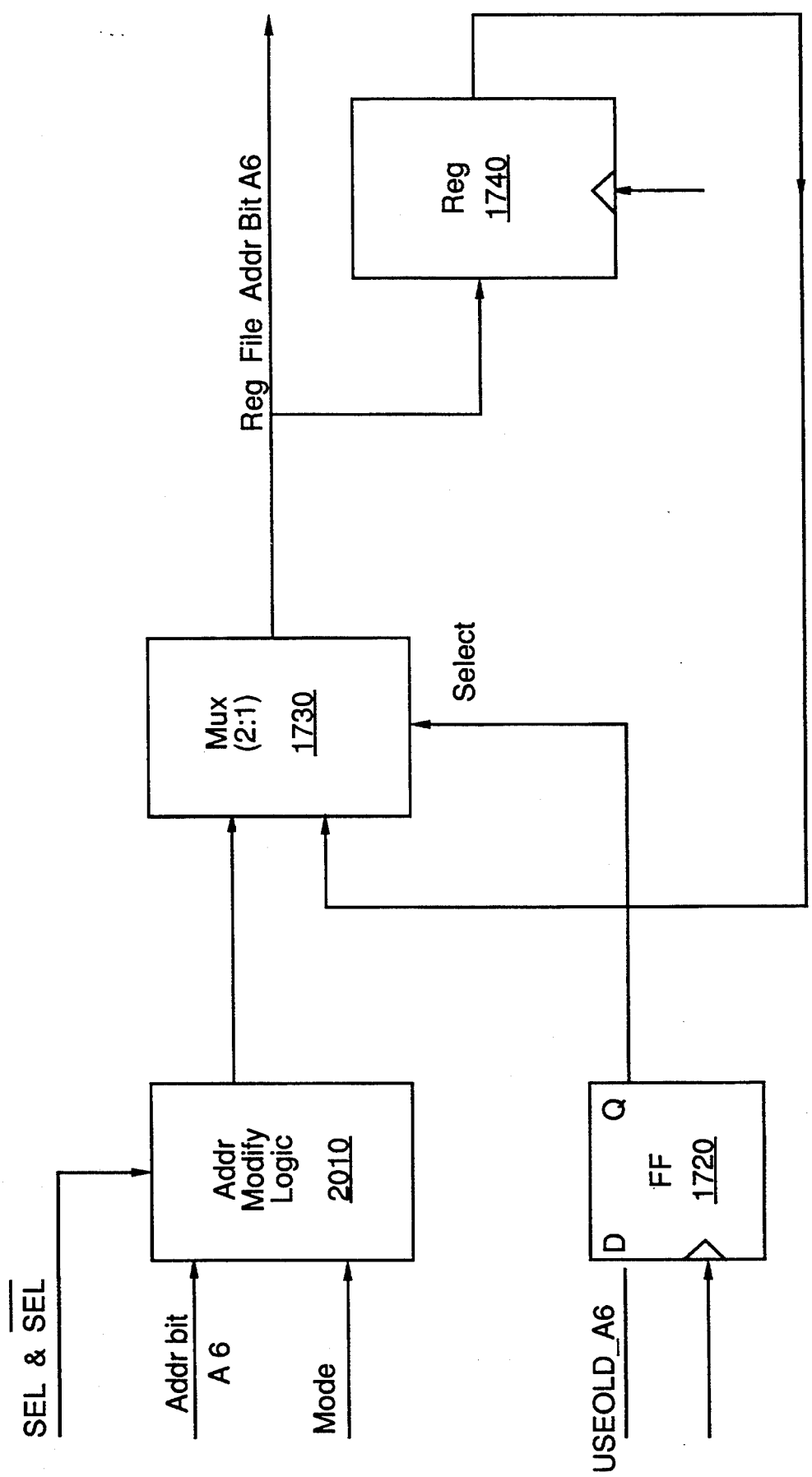
FIG. 17 shows the logic used within the floating-point processor in the presently preferred embodiment, to reduce the setup time for unregistered microcode bits.

In implementing the address modification logic 2010, some additional logic, as shown in FIG. 17, has been added. This additional logic solves a general problem, and may usefully be adapted for use in many contexts.

Many manufactures of "bit slice" components are including pipeline registers in their ICs. However, any processing which is done on the microcode bits before they reach the chip must be added to the chip's setup time. This is the situation which occurred in implementing the soft double-buffering system just described. The problem is that the address modification logic 2010, in processing the most significant bit of the register file address (the "A6" bit) to implement the logical, physical and preview modes of addressing, adds an extra 10 ns onto the cycle time. When (as in the presently preferred embodiment) the cycle time can be less than 30 ns, this is a very significant overhead.

Therefore, some additional logic, as shown in FIG. 17, was introduced to remove the extra 10 ns from the cycle time (on many cycles). The potential for doing this occurs when the addressing mode remains the same from one cycle to the next. In this situation, the setup time has already been paid for in the earlier cycle. However, as the microcode address changes and new data is accessed in the writable control store (WCS), the unregistered microcode bits will not be stable. Therefore, the setup time would have to be incurred again, unnecessarily.

The logic shown in FIG. 17 holds the modified address bits constant in a separate register 1740. A special microcode bit (called "useold_A6") is used to select (using flip-flop 1720 to control multiplexer 1730) that the old A6 value (fed back from register 1740) be used, rather than the microcode derived one. (When using a microcode assembler, the "useold_A6" microcode bit can be automatically set by the microcode assembler, so the programmer doesn't need to worry about this optimization.)

The multiplexer 1730 is contained in the same PAL as the address modification logic, so this multiplexer does not introduce any additional delay.

Cache Bus Interface and Control

As discussed above, many aspects of the operation of the numeric processor module are controlled by an extension of the control processor module 110. Most of this logic is physically on the FP module, but is controlled by the microcode of the control processor module 110, and interfaces to the CD bus. There are several distinguishable parts of the cache bus interface, to manage the transfers of data among the data cache memory 140, the FP holding registers 420, and the register files 430. The principal parts of this interface are: holding registers 420; data cache transfer logic; and local transfer bus logic 2110.

Holding Registers 420

The holding registers 420 include eight 32-bit registers. (These registers are bidirectional; each contains a read side and a write side which, internally, are parallel.) These registers are arranged with 256 bits on the data cache memory side, but only 64 on the register file side. The output enables on the register file side select one of the four groups of registers to drive the 64 bit local transfer bus 422 to the register files 430. (The operation of this interface will be discussed in greater detail below.)

Data Cache Transfer Logic

The data cache transfer logic is located on the main board, and is part of the CP transfer logic 550. It provides a module select address (3 bits), an output enable, and a clock. This logic controls transfers between the cache memory 140 and the holding registers 420. If this module is selected, then the output enable signal, when active, enables the holding registers 420 to transfer data onto the cache bus 144.

Local Transfer Bus Control Logic

Figure 21:
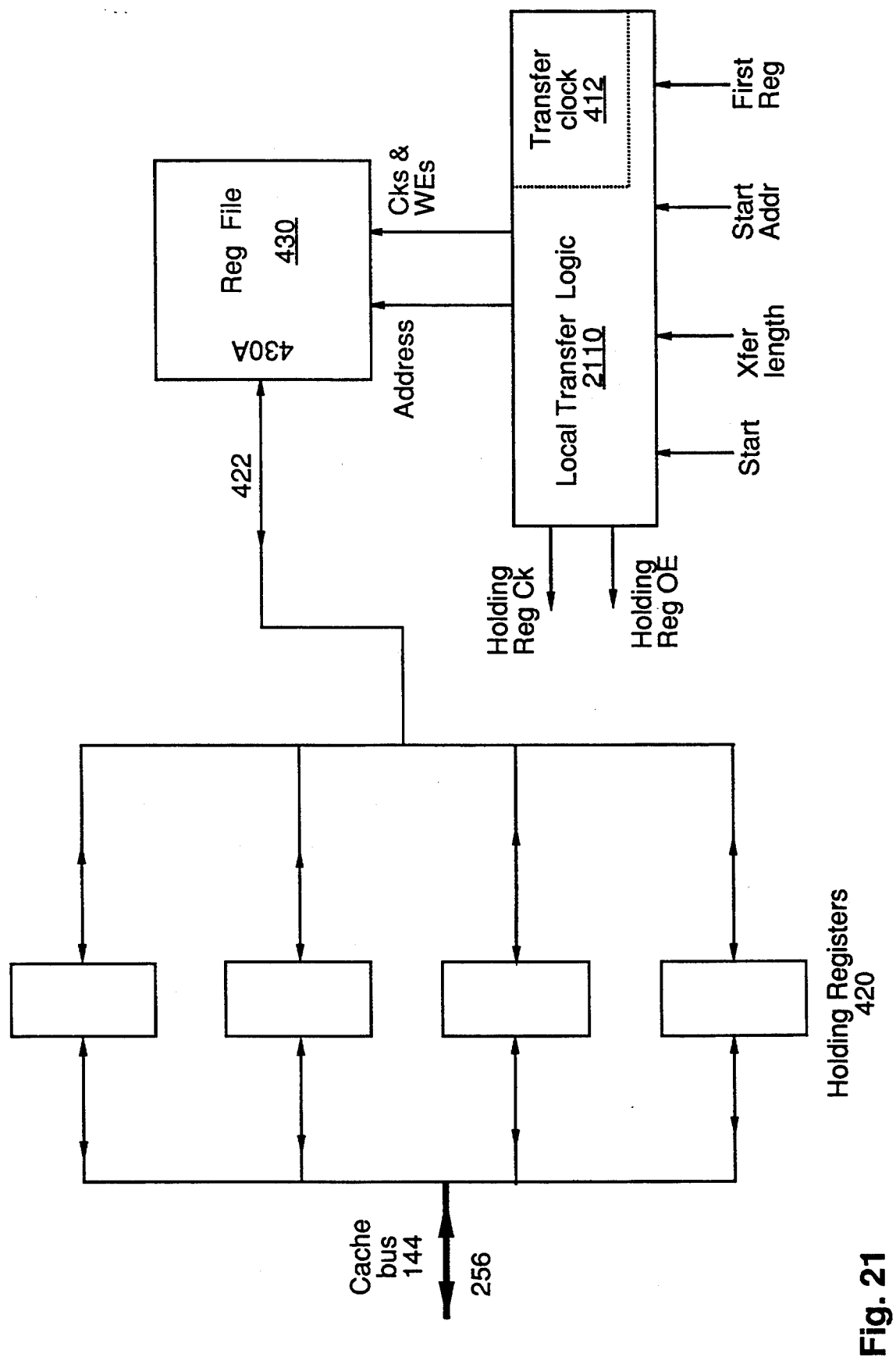
FIG. 21 schematically shows the logic used, in the presently preferred embodiment, for data transfer across a clock boundary between the holding registers, which interface to the 256-bit wide cache bus, and the Register File, which is only 64 bits wide.

The local transfer bus control logic 2110 is shown in FIG. 21. This logic is responsible for the data transfers between the holding registers 420 and the register files 430. Within a single transfer cycle there are 4 minor cycles, corresponding to the 4 pairs of F_words that can be transferred to or from the resister file. These minor cycles are generated by a dedicated clock, which runs at very high speed.

Transfer Clock Generator 412

The transfer clock generator 412 provides the transfer clock outputs only during a major transfer cycle. It is triggered to run when both the CP clock and a transfer enable bit indicate a "go" condition.

The transfer clock generator is partly, but not entirely, asynchronous to the CP clock generator 250. A high-frequency ECL circuit is connected to a 70 MHz oscillator, and, until the CP clock generator indicates a "go" condition, the high-frequency circuit simply keeps looping. Thus, on every edge of the high-frequency clock, the "go" status will be checked. This means that a "go" status will be detected within at most one period of the high-frequency clock.

When the go condition is detected, the transfer clock generator begins dividing down the high-frequency oscillator input, to produce the transfer clock outputs for a major transfer cycle. Depending on the particular major transfer cycle being performed, between two and five clock beats will be produced during a major transfer cycle. The clock beats are connected to all eight holding registers 420. The sequential access to these registers is "phased" by an overlaid walking zero pattern, as described below.

Figure 47:
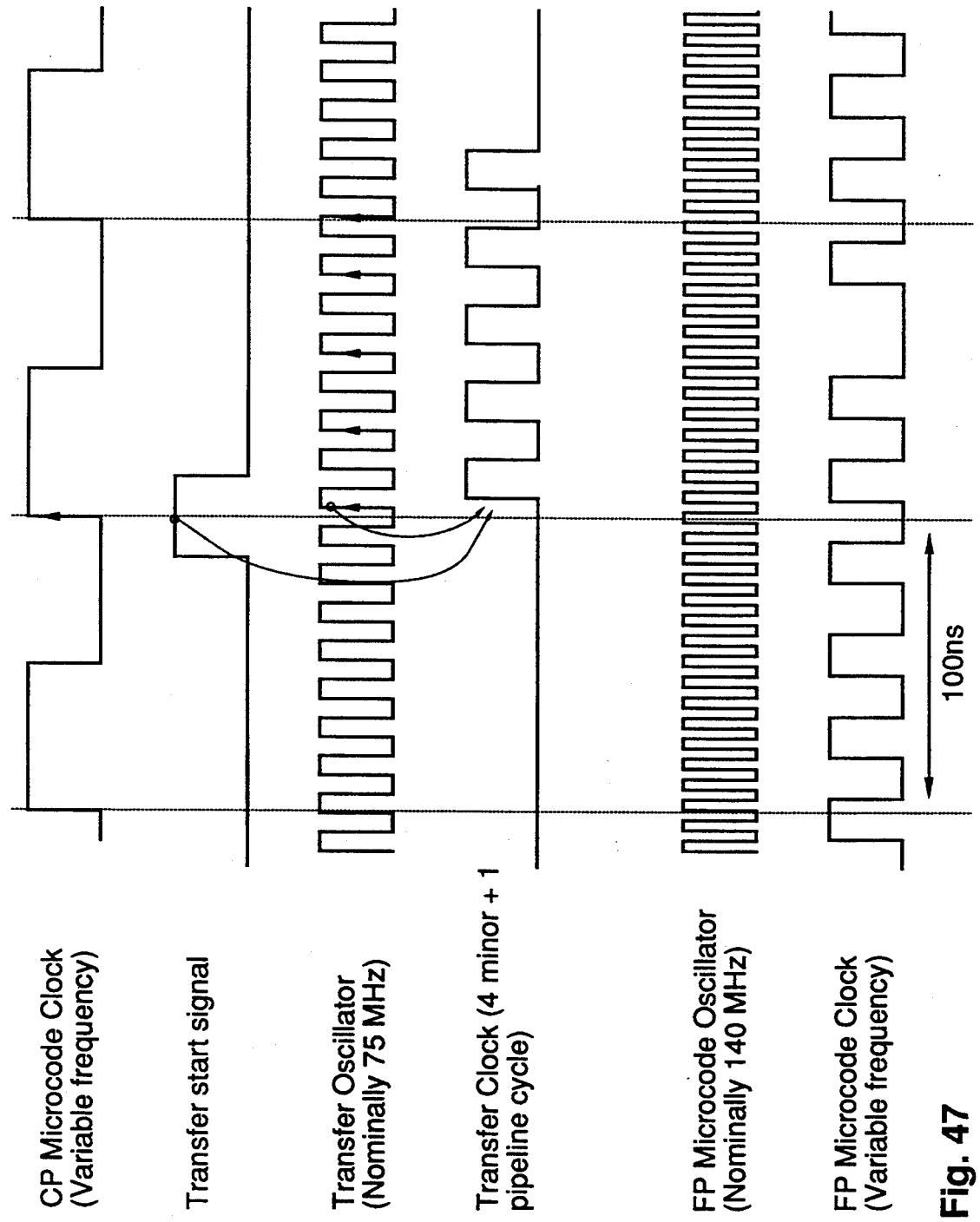
FIG. 47 shows the timing structure used for how word address odd/even structure results from the double-word transfer operations.

FIG. 47 schematically shows the timing relations here. The high-speed variable-length clock 480, which clocks the operation of the calculation; units 440 and 450 (as well as data ports 430A, 430B, 430C, 430D, and 430E of the register file 430) is shown at the bottom, for reference. Above that is shown the high-speed ECL loop of the transfer clock 412. Above that is shown the enable signal which (with the CP microcode clock) starts the transfer clock generator 412 on a major transfer cycle. Above that is shown the transfer clock. Above that is shown the CP microcode clock, generated by CP clock generator 250.

Thus, the transfer clock generator in effect provides an intermediate clock zone, which expedites the transfer between the data cache memory 140 (which is controlled by the CP clock generator 250) and the inner bank of the Register File 430 (which is controlled by the FP clock generator 480).

The clock boundary between the FPU and the data cache memory is a very important boundary. This boundary crosses not merely a clock phase boundary, but also a potentially drastic difference in clock frequency. Moreover, as noted above, net transfer bandwidth across this boundary is critical The presently preferred embodiment bridges this boundary in two steps.

The double buffering of Register File interface provides a transfer from the FP clock domain to the transitional clock domain.

High-speed multiplexed transfer (from the outer bank of Register File 430 into the FP interface of the FP Holding Registers 420) occurs within the transitional clock domain.

Transfers from Holding Registers 420 into Data Cache Memory 140 occur wholly within the CP clock domain.

Some general points regarding this clock frequency difference should be noted:

The relation between the minor transfer cycle duration and the minimum FP cycle time is not accidental As noted above, the worst burden on cache bandwidth comes from diadactic operations. For example, in a vector add, two operands and one result must be transferred between the register file and the cache. On the FPU side of the register file, the two operands will be read out in parallel, and (pipelined with this) the result will simultaneously be written back into the register file. Thus, in the worst case, two words must be written into Register file 430 and one word must be read out, for every calculation cycle of the calculation units. Not all operations will be diadactic, but, in many applications, the average may not be much more favorable.

In embodiments using a transitional clock domain, as discussed above, it is most preferable that: the minor cycle duration, divided by the number of words transferred per minor cycle, should preferably be in the range of one-half to one-third times the minimum duration of a calculation cycle in the FPU. However, the advantages of the two-stage interface, using a transitional clock domain, can be largely obtained even if this numeric relation is not met.

Note that the advantages of the transitional clock domain are generally applicable to systems where high-speed numeric calculation units are used. The clock interface architecture described permits such units to be isolated in their own clock domain, so that their clock can be run at the maximum possible. This teaching is independent of the particular timings, and is independent of the device technologies used. For example, this interface architecture could be used in the future to integrate a limited number of calculation units in expensive high-speed technologies (such as Josephson junction or III–V device technologies) into a large computer system.

Control Signals

To keep the number of control signals down (both on the input and output sides) there are some restrictions on how the 8 F_words are transferred from the holding registers 420 into the register files 430. The need for this is clearly demonstrated by considering the addresses. Eight F_words would require 8 separate addresses, if total flexibility was necessary; and, with each address requiring 9 bits to specify it, there would be 72 bits of address information in total.

The input control signals are:
Direction. Specifies whether data is transferred from the register files to the holding registers or vice versa.
Register Address (6 bits). This specifies the start address where data is transferred to or from in the register file. This address is incremented after every minor transfer cycle and will wrap around when it gets to 64. Note that from the FPU side the register file addresses are 7 bits because they reference 32 bit words rather than 64 bit ones.
Logical/physical address modifier. This selects whether the address is modified to implement soft double buffering.
Transfer length (3 bits). This determines the number of F_words transferred (1 ... 8).
Transfer start (3 bits). This specifies the first F_word to transfer out of the eight. These bits can be defined by a microcode field, or a register field, or they can be the least significant 3 bits of the CA bus 111. If the transfer start + transfer length > 8 then the F_word selection wraps around.
Transfer enable. Enables a transfer cycle to occur in the current control processor module 110 cycle.
Module select. Selects one of the four floating-point processor modules to take part in the transfer.

The control signals to the register files and the holding registers are:
Holding register group output enables (4). Selects the register group to drive the 64 bit data bus. If the transfer direction is from the register file 430 to the holding registers 420, then none of these enables will be active.
Holding register group clocks (8). There are four clock enables, which sequence through the patterns 1110, 1101, 1011, 0111 (a "walking low" pattern). These four clock enables select the 64 bit group register. A static 8 bit clock mask selects which two of the 32 bit registers will actually be enabled to access the local transfer bus 422. (Note that the start position within the pattern depends on the transfer start, and the number of patterns depends on the transfer start and transfer length parameters.)
Register file address (7). Increments on every minor cycle and is modified depending on the state of the logical/physical address modifier.
Register file read/write control (2). There is a separate control for each pair of register files so an odd number of writes can be done. These are decoded from the transfer length and address.
Register file output enable. Derived from the transfer direction control signals.

Constraints On Transfers (Double-Word Structuring)

The interface just described results in some constraints on transfers. These restrictions are best explained by showing how data maps between the data cache memory 140, holding registers 420, local transfer bus 422, and register files 430.

The register file 430 has some double-word structuring. That is, it appears to the FPU to be 32 bits wide, but to the local transfer bus 422 the register file 430 appears to be 64 bits wide.

The use of a two-words-wide interface from register file 430 to local transfer bus 422, with a transfer clock of (effectively) no more than four minor-cycle phases being applied to the eight registers 420, is very advantageous in maximizing transfer speed (and in permitting the use of a static clock mask). However, a side effect is that some odd/even structure gets built into the file address structure.

Figure 46:
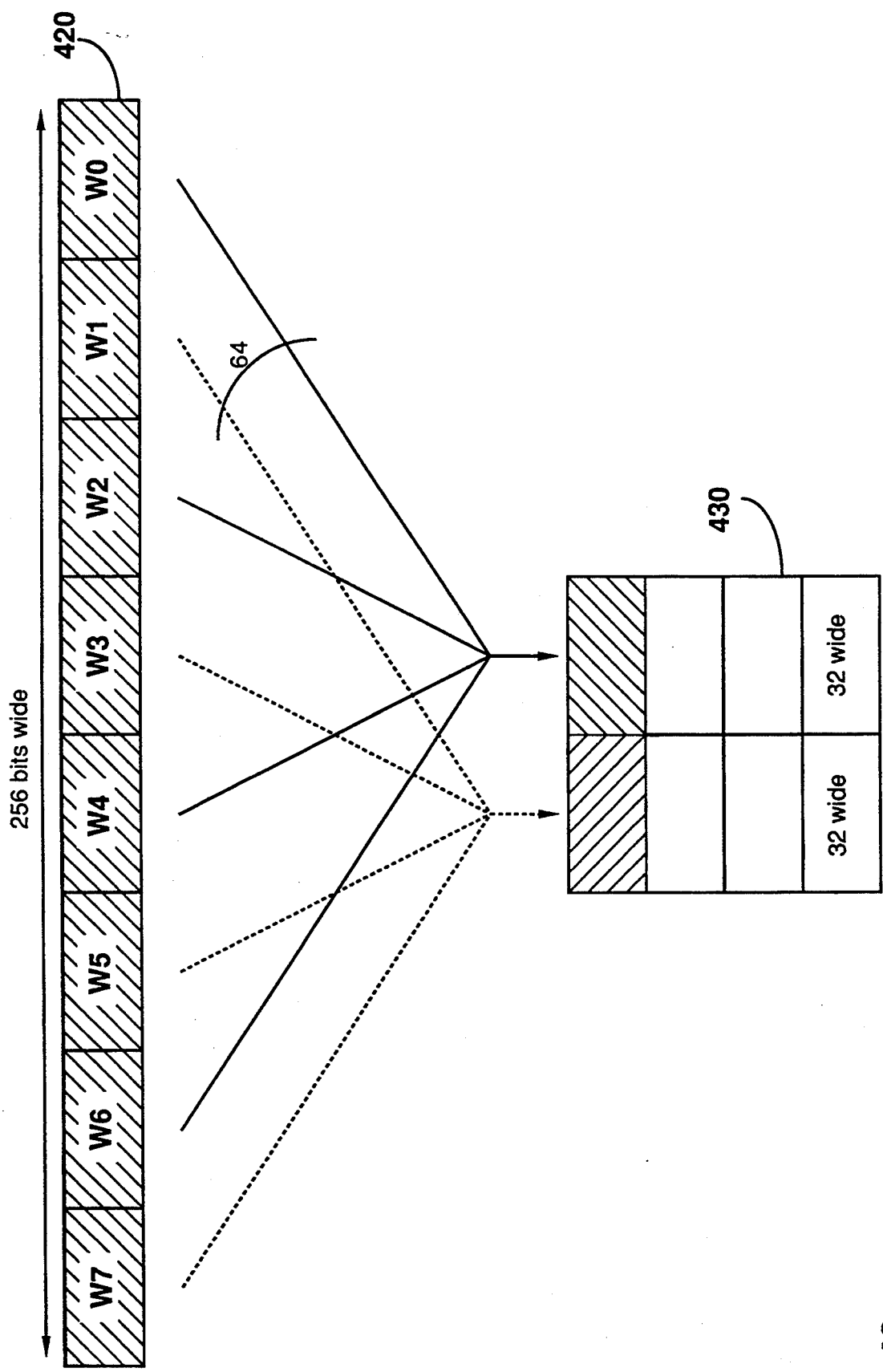
FIG. 46 shows how word address odd/even structure results from the double-word transfer operations.

This is shown schematically in FIG. 46. The eight F_words in the width of the FP holding registers are hatched in opposite directions, to indicate which is even and which is odd. The result of the double-word transfer is that any even F_words which are transferred (W0, W2, W4 and W6) will map to the left side of the register file 430. These will therefore map to even register file addresses as seen by the FPU. Correspondingly, any odd F_words which are transferred will map to the right side of the register file 430, and will therefore map to even register file addresses as seen by the FPU.

The less serious implication of this is that if (in a series of scattered read accesses from cache memory 140) all transfers are from even data cache addresses, then only half of the addresses in the register file 430 can be used.

The more important consideration is that if a single F_word (for example) is being transferred from a calculated address, then the data could end up at either the even or odd address in the register file, and program steps would need to be used to ensure that this data was accessed (by the FPU) from the correct side.

The presently preferred embodiment provides the user with five options which can be used to avoid such problem:

1. The CP module 110 can shuffle data in the DCM, so that any data being transferred starts on an even address in DCM.
2. Transfer logic carries a status bit, showing whether the last transfer was to an even or odd address. The FP logic can test this status bit. However, note that this only supplies information for the very last transfer.
3. Double write cycles could be used, with data valid flags, to permit the odd/even characteristic of the word address to be ignored at some points. That is, the memory actually used in Register Files 430, in the presently preferred embodiment, includes two parity bit locations for every sixteen bits of data. Since the presently preferred embodiment does not use parity checking, these extra bits are available for other uses. In particular, they can be used to carry "data valid" flags along with the data. Thus, all writes from the holding registers 420 would write a pair of F_words, from a pair of the holding registers, into the two words on both sides of the register file 430.
4. A register bit, written by the CP module 110, can be used to indicate the current word location odd-/even status. The FP module can then test this register bit to do conditional branches.
5. The CP module 110 can change the FP programming, as a way to inform the FP of correct word odd/even status, by changing the start address in register 478.

A further alternative is that dedicated hardware could be added, to perform word swapping on the fly. This alternative is not preferred, since such dedicated hardware would add delay to every transfer (whether swapped or not).

The control of the transfer doesn't allow non-contiguous addresses to be transferred within one major transfer cycle. For example, it would take 2 major transfer cycles to transfer W0 and W2 from the holding registers into the register file. However, if W1 could be transferred as well (even if it is never used) then only one major transfer cycle is necessary.

When transferring data from the Register File 430 to the cache memory 140, similar considerations arise when scattered writes are being performed. The preferred approach in this case is to perform writes to both sides of the Register File simultaneously. That is, as shown in FIG. 4B, the two (physically separate) Register File portions 430 and 430' can both be enabled, so that data written in from results bus 433 is written into both the even and odd words. When this duplicated data is written out to Holding Registers 420, it can be written into all eight of them simultaneously. (This function is activated by the HR_Clock_All bit in microcode.)

Holding Register/Transfer Clock Operation

As noted, a clock having at most four beats for transfer enable is used for the transfers between holding registers 420 and register files 430. In the presently preferred embodiment, this clock can actually have as many as five beats per major transfer cycle. Four of these beats activate respective pairs of the holding register banks, and the fifth phase provides some margin for pipeline overheads. As presently operated, the phases of this clock are about 30 ns. Therefore, a major cycle is about 150 ns. (Of course, these times could be changed.)

This clock structure shows a significant advantage of the double-word transfer architecture used at the interface from the cache bus 144 to the holding registers 430. Since the transfer logic sees the holding register 430 as being two words wide, the transfer operation can be treated as if it were only a 4:1 multiplexing, rather than 8:1 multiplexing.

FP Program Control

FIG. 4C shows the logic used, in the presently preferred embodiment, for FP microcode access and decoding.

Microinstruction Sequencing

In the presently preferred embodiment, the numeric processing module 130 does not use a highly integrated "sequencer". Instead, the functions of defining the address for microinstructions to be executed, and of decoding the microinstructions, are implemented using a lower level of integration, to maximize speed. A writable control store 470 contains microinstructions which are accessed by a microinstruction address input 473. The microinstruction address source is selected by the next-address logic 472, which receives condition code inputs, as well as outputs from the decoding of the microcode word.

The microaddress can come from one of four sources during normal operation (i.e. apart from intervention by the control processor module or by the host). These sources are: "True" Address Register 474; "False" Address Register 475; Stack Register 478; and Start Address Register 479.

Every instruction contains a "true" address field and a "false" address field. The combination of the two addresses permits conditional jumps. The true address alone permits unconditional jumps and "continue" instructions.

To accomplish this, certain fields of the microinstructions 471 are fed into two registers 474 and 475. These registers permits the "true" and "false" addresses to be buffered, so that, depending upon the outcome of a logical test, one or the other can be loaded back in as the next microinstruction address 473. That is, these registers provide rapid conditional branch capability.

Note that an additional register 476 is provided, for the microcode bits that do not use on-chip pipeline registers.

Stack Register 478

Stack register 478 provides some significant additional capability for FP program control. This can provide outputs on the microaddress bus 473, and can receive inputs from certain bits of the microinstruction bus 471, as will be discussed below.

Figure 39:
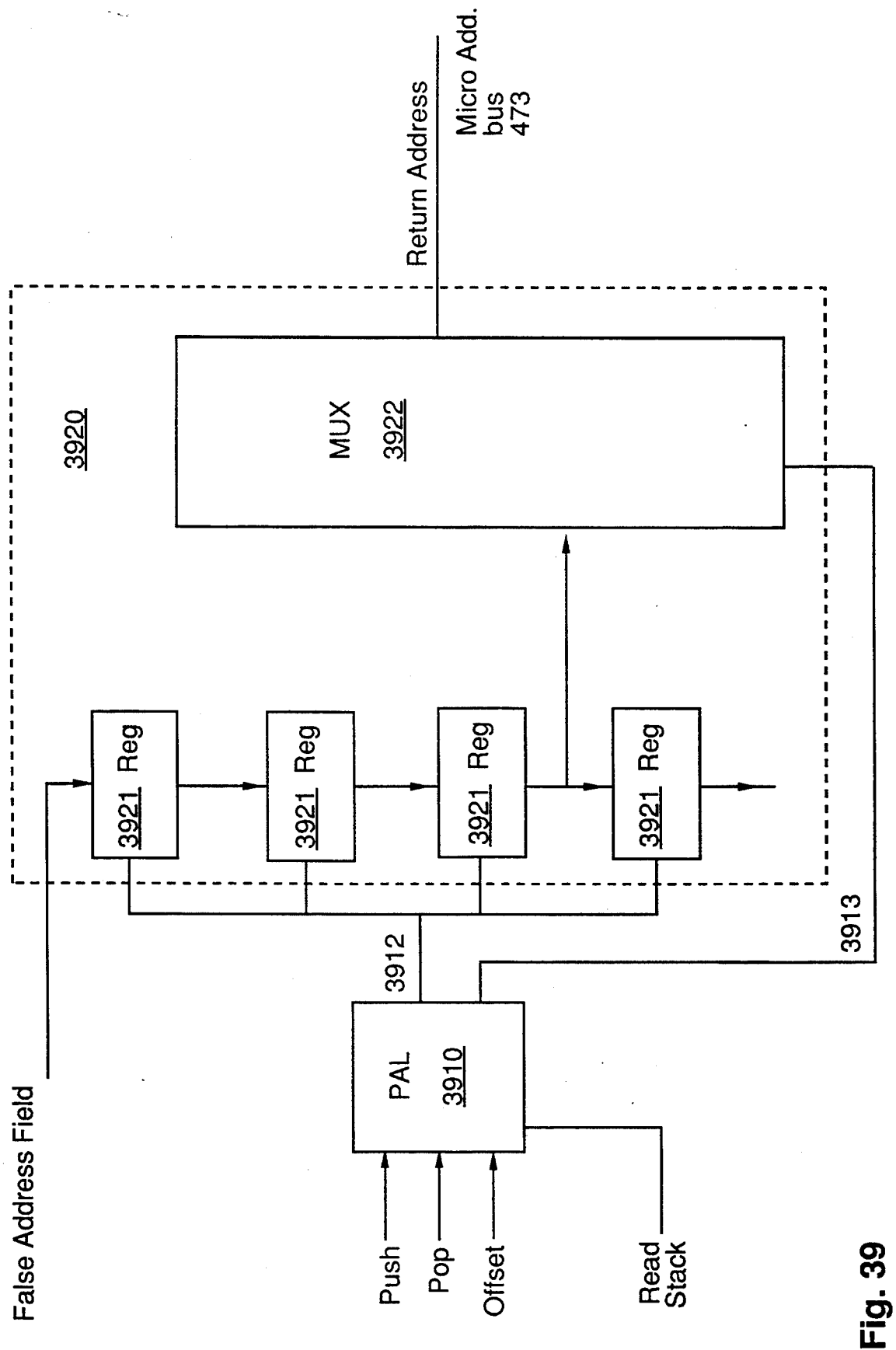
FIG. 39 shows the preferred embodiment of the stack register in the floating-point processor module 130.

However, the requirements of a stack to use with the high-speed microcoded architecture of the FP module are somewhat unusual. The presently preferred embodiment provides a stack which not only provides the necessary last-in-first-out (LIFO) operation at high speed, but also provides additional flexibility which is very useful for debugging. Achieving this functionality required some new structure, as shown in FIG. 39.

The conventional way to implement a stack function has been with a register file whose output enable and write enable signals were tied to an address counter, so that every "pop" (read) operation decremented the counter and every "push" (write) operation incremented it.

The central portion 3920 is a multilevel pipeline register, which is a commercially available part from AMD (AMD 29520). This part contains four pipelined registers 3921, and an output multiplexer 3922 which can be used to select one of the registers 3921 for output. (The normal mode of operation of a device of this type would be either as a FIFO, or to provide a fixed delay.)

In the embodiment shown, the control capabilities of this register are used, under control of a PAL 3910, to implement the LIFO operation. The PAL receives command signals to pop or push the stack. A read_stack input is also provided, so that (primarily for diagnostics) the state of the stack can be read without changing it. For use in this mode, an offset input is provided, which can be used to read out a stack level which is relative to the top level The output of the stack register is connected to the microaddress bus 473. The input to the stack register is provided by the false address, for reasons which will now be discussed.

Subroutine Operation

Stack register 478 provides a powerful capability for subroutine operation. The microcode instruction which calls a subroutine will state the subroutine address in the true field, and the return address in the false field. A short field of this instruction will also contain a push command, so that the stack register saves the "false" address output. At the end of the subroutine a pop command will enable the stack register to output the return address onto the microinstruction bus 473.

Thus, the four levels of the stack register 478 permit up to four levels of subroutines to be nested.

Clock Generator 480

The cycle times for different instructions in the FMPY and FALU are different. It would be useful to tailor the cycle time accordingly, to optimize the calculation rate. The most important difference (15 ns) is between the FALU operations and the single precision multiply.

The FMPY has some very long instruction, such as divide and square root, where their execution times are 200 ns and 300 ns respectively. Two options are provided for these slower instructions:

Extend the cycle length by the appropriate amount.
Disable the clock enables to the FMPY while the long instructions are in progress, but keep the instruction and data streams going to the FALU at the normal data rate. This will allow several FALU operations to be hidden under a divide operation, which might benefit some algorithms.

The clock generator produces two waveforms—the microcode clock and a write gate for the scratchpad memory. The minimum cycle length the clock generator produces is 21 ns, and this can be varied in 7 ns steps, up to a maximum cycle length of 98 ns. In the presently preferred embodiment, the minimum practical cycle length is 28 ns (since the WCS memory access time is the limiting factor). The cycle time for FALU operations is 28 ns, and 41 ns for single precision multiply operations.

The clock generator is implemented as an ECL state machine running with an input frequency of 140 MHz to give the timing resolution. The use of this ECL state machine in combination with TTL sequencing logic and high-speed calculation units, turns out to be quite advantageous. (As noted above, the register files 430 and the calculation units 440 and 450 have ECL internals with TTL peripherals.)

The clock generator can receive the following control inputs: a stop or start command may be received from the VME interface (i.e. from the host), or from the CP module 110; a length input field from the microinstruction bus 471; a stretch input will command a "wait state" (or longer cycle length when the CP forces the start address register to be the microaddress source for the next FP microcycle; and the breakpoint bit is also connected to the clock generator, and commands it to stop instantly.

As noted above, there is also a transfer clock generator 412 in the CP Extension Logic. This clock is not related to the clock generator 280. (However, note that both of these clock generators exploit the advantages of using ECL logic in a clock generator which is driving TTL logic parts.)

Microcode Compaction

One of the notable features of operation of the FP module 130 is the use of compacted microcode. That is, some logic is provided at the interface to WCS 470, which permits a field of the microinstruction to be replaced on the fly by a previously registered value.

In the presently preferred embodiment, the field which can be replaced in this fashion is the operate specifier. However, in other system it would be quite possible to replace other microinstruction fields in this fashion.

Thus, for example, for operations which mapped two arrays onto a third array (e.g. $C_i = A_i + B_i$), the instruction register could be loaded with an operation specifier (e.g. "ADD") before a sequence of such operations was begun. The sequence of operations would then be stated in code which did not specify the operation directly.

Figure 45:
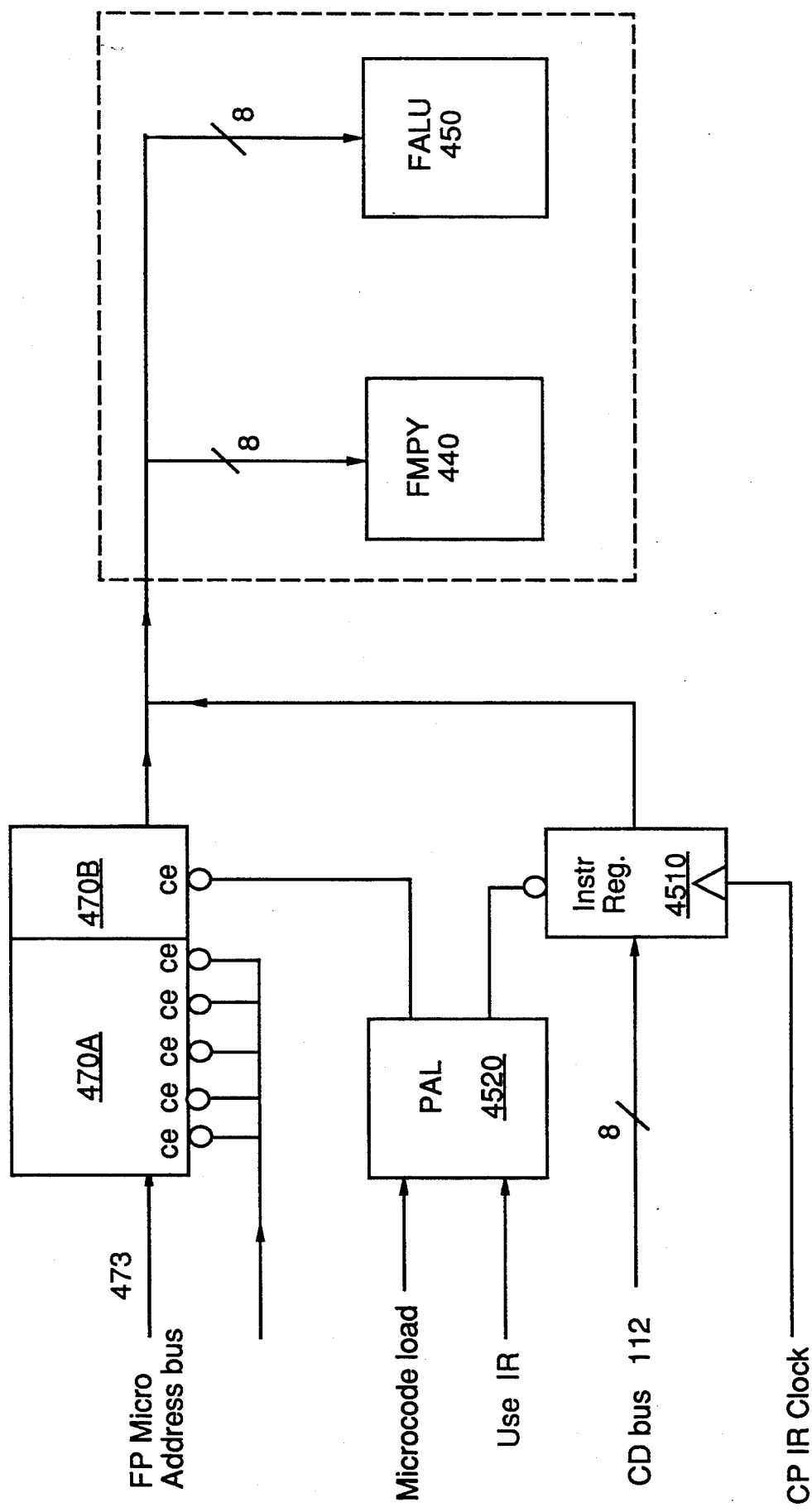
FIG. 45 shows logic for substituting the contents of an instruction register for a field of microcode from control store.

This logic is shown in FIG. 45. An instruction register 4510 is loaded with an operate specifier (8 bits). This operate specifier corresponds to one of the fields of the microinstructions stored in WCS 470.

In response to the "Use_IR" bit (which is written into a register by the CP module 110, and therefore changes relatively infrequently), PAL 4520 selects whether to enable the output memories 470B or Instruction Register 4510.

If the "Use_IR" bit were assigned to a field in the microinstruction, it could change at every cycle. However, in this case the extra delay in decoding which specifier to use (and then enabling it) would increase the cycle length on every cycle where a change was made.

WCS 470 is actually physically configured, in the presently preferred embodiment, as 26 integrated circuit memories, each 4 bits wide. Thus, two of these physical memories store the 8 bits of the operate specifier field. These two memories are shown as portion 470B, and the memories which store the other fields of the WCS 470 are shown as 470A.

The instruction register 4510 can be read or written from the CD bus 122, by specifying it (in CP microcode) as the CD bus source or destination.

Note also that the PAL 4520 also receives another bit of input, so that its bypass operation can be disabled during microcode load operations.

Parallel Leading of Microcode

Figure 29:
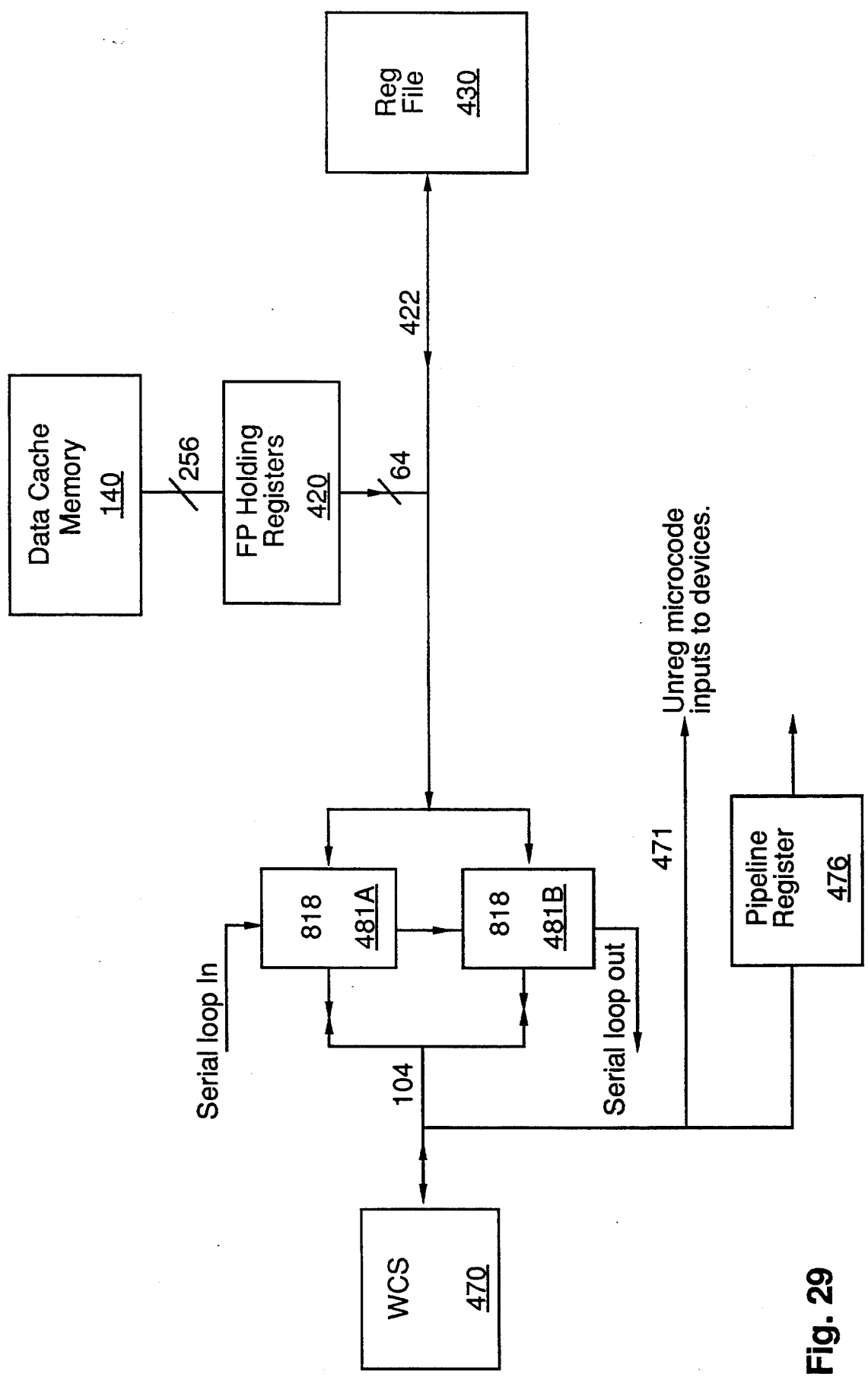
FIG. 29 schematically shows the logic used, in the presently preferred embodiment, to permit either serial or parallel write into the control store of a numeric processor in a multi-processor system.

FIG. 29 schematically shows how the WCS 470 interfaces to the wide cache bus 144. The 64-bit local bus 422, which connects the FP holding registers 420 to port 430A of the register file 430, is also connected to the serial shadow registers 481 which hang on the microinstruction data line 471. (As extensively discussed elsewhere, these serial registers interface the control store 470 to the serial loop used to transmit microinstructions from the host.)

This additional connection is particularly advantageous in the numeric processor module 130, since it permits microcode overlays to be changed very rapidly.

In the presently preferred embodiment, the serial shadow register 481 is actually configured as two physically separate registers 481A and 481B. These registers not only provide a bidirectional interface to the data port of the control store 470, but also can receive data from the local bus 422. As mentioned above, the microinstruction fields in the CP Extension logic contain bits, indicating the data destination of the local bus 422, which can command this read.

As noted above, each FP microinstruction is 104 bits wide. However, to conform to the automatic shifting of data around the serial interface loop, the shift register 481 has been made 112 bits in length. That is, the number of microinstruction bits has been rounded up to the next even multiple of 16, to define the length of the shift register at the interface. In the presently preferred embodiment, register 481A is 64 bits wide, and register 481B is 48 bits wide.

After the registers 481 have been loaded with a microinstruction (in two minor transfer cycles of the local transfer bus 422), they are driven to load the instruction back into the WCS 470. This will require an address to be placed on the FP microaddress bus 473, and will also require a write enable signal to be transmitted to the WCS 470.

In serial loading, the host uses the CP microaddress register to hold the address of the FP WCS to load (or read), and routes this address to the FP WCS. (Note that the input from CP microaddress bus 211A is fed into FP microaddress bus 473 by the buffer shown at the top of FIG. 4C.)

In the parallel leading mode, the CP places the target address in the start register 479.

Additional logic is also provided for interface to the host. This logic permits microinstructions to be read from or written to the control store 470. This function will be discussed in greater detail below.

Starting An FP-microcode Routine Running

When the FP module starts up, it will normally go into a wait state, because of the FPWAIT/CPWAIT handshaking logic described below. To start a routine running in the FP module, one bit of the CP microcode can force the microinstruction address held in start register 479 to be used as the next microaddress on the FP microinstruction address bus 473. This action is qualified by the module selection, as described below.

Selecting an FP Module(s)

At the highest level a floating-point processor module 130 must be selected before it can be controlled. In a single-module configuration, the FP module is selected all the time, and some of the following comments don't apply. However, in a multiple-module configuration, the desired FP module (or algorithm accelerator) must be selected before it can be controlled. Several FP modules can be selected at once, to allow data or control information to be broadcast to a subset of the FP modules. The FP modules can be selected in one of three ways: a 3-bit value previously stored in a control register can be used; a microcode field can be used; or, less preferably, the CP Extension Logic portions 410 on each of the different modules; can run their own streams of microcode in synchrony, so that access arbitration can be performed in microcode. The method that is used can be changed on a per cycle basis.

Once an FP module(s) has been selected, the method of controlling it is split between control registers (loaded with long term control information), and dedicated microcode bits for cycle by cycle control. Most of the cycle by cycle control is concerned with data transfers between the data cache memory interface and the register files on the module, as described below.

Figure 23:
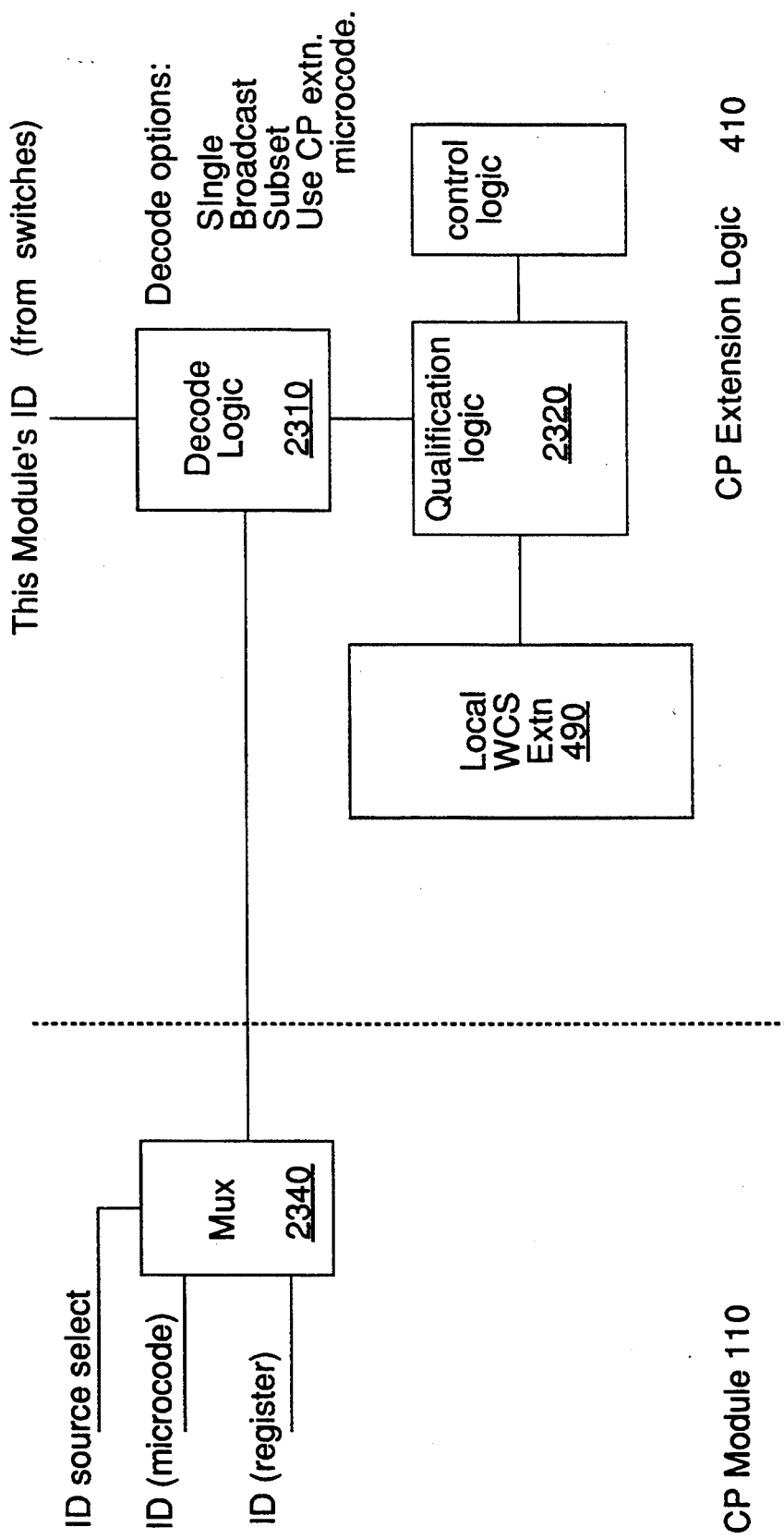
FIG. 23 schematically shows the control definitions used, in the presently preferred embodiment, to select among multiple FPs and/or multiple algorithm accelerators, in a system like that shown in FIGS. 9 or 10.

The module selection is shown schematically in FIG. 23. Multiplexer 2340 selects which input to use for module ID. Decode logic 2310 (which is part of the CP extension logic in one of the modules 130 or 130') tests the broadcast module address against the switch settings in the particular module. Qualification logic 2320 accordingly qualifies a side variety of microinstruction fields from the local WCS extension 490, as described below.

Control Registers

The control processor module 110 can read and write the following registers:

Transfer Control register: The transfer control register collects together the control signals that influence the transfer of data from the holding registers 420 (in the data cache memory interface) into the register files 430. A few miscellaneous signals are also included to economize on hardware.

The control signals used include:

Transfer start (3) This field specifies which of the 8 registers in the holding register group is to be transferred first. This can also be specified as part of the microcode instruction or automatically based on the data cache memory address that the data originated from.

Transfer length (3) This field specifies the number of words to transfer between the holding register and the register file. Between 1 and 8 words inclusive can be transferred.

Transfer type (1) This bit selects the transfer to be between the holding registers and the register file (0), or from the holding registers to the FP module's WCS pipeline register (1). This latter function is used during parallel loading of the FP's WCS memory.

Loopback control (1) This bit allows the data in the write holding registers to be copied directly into the read holding registers without having to be written into the register file first. The main use of this is for diagnostic and state save and restore operations.

Operation select (1) This bit has no hardwired function and can be tested to the FP's sequencer. This allows the control processor module 110 to tell the FP to do one of two operations within the routine it is currently executing. For example this bit could be used to specify that the data at the even address (as opposed to the data at the odd address) is to be used for the calculation.

Select Instruction Register (1) This bit forces the Instruction Register (see later) to be used instead of the microcode instruction field in the WCS to control the operation of the floating point ALU and multiplier.

Mask Error (1) This bit inhibits an FP error condition (as determined by the FP microcode) from generating an interrupt in the control processor module 110's sequencer. The FP error status can still be tested via the normal condition code selection procedures.

Stack position (2) During diagnostics and state save and restore situations the host computer needs access to the FP's subroutine stack. When access to the stack has been enabled this field is used to select which stack entry to read. Note that the stack entry that is accessed is relative to the location pointed to by the stack pointer.

FP control register The FP control register collects together the parallel microcode load controls, interrupt masking, clock control and microaddress selection fields.

Clock control (2) This field allows the control processor module 110 to control the FP's clocks. The FP clocks can either be running or stopped. The extra bit in the clock control field was used to select that the FP microcode clock uses the microcode clock of the control processor module 110, thus allowing the FP to run synchronously to the control processor module 110.

FP microcode address source (2) This field allows the control processor module 110 to select that the microcode address used by the FP is one of:
  FP sequencer output This is the normal micro address source when the FP is running microcode.
  Start Address register This selects the start address register during parallel microcode loading. (A different mechanism is used to select the start address register when the CP module 110 or the host is commanding the FP module 130 to start running microcode from a particular address.)
  Force stack output This is used by the control processor module 110 to gain access to the subroutine stack during diagnostics and microcode debugging.

Interrupt mask (4) These 4 bits allow the control processor module 110 to select on which events in the FP it is to be interrupted. These events are breakpoint, CPWAIT, FPWAIT, register file swap, and FP error. Once an interrupt has occurred the corresponding mask bit is temporary cleared to reset the interrupt request.
  Parallel microcode load control (5) This field includes separate bits to control the WCS write enable, the WCS output enable, and the diagnostic shift register mode, clock and serial data in signals. The parallel microcode load is controlled by the control processor module 110, as is described in greater detail below.
  Floating point serial access loop (3) Running through the floating point ALU and multiplier is a serial loop that can be used to gain access to the internal state of both chips and also to load in some new state information. All the internal registers and flags can be accessed in this way. To control this serial loop the control processor module 110 has three control signals: serial mode, serial data in and a serial clock. The serial clock is driven directly from this register bit and must be toggled by the control processor module 110 to generate the rising and falling edges required.

Start address register The control processor module 110 loads the start address register with the address of the microcode routine it wants the FP to start running when the jump start address microcode bit is used. This register is also used during parallel microcode to hold the address of the WCS location to load.

Instruction register (8 bits) The control processor module 110 can override the floating point ALU and multiplier instruction from the WCS and substitute its own instruction. The Instruction register 4510 (shown in FIG. 45) holds this instruction. The benefit of this is that the control processor module 110 can customize a generic microcode routine for the particular type of calculation it requires which leads to a very large reduction in the mount of WCS used for very similar algorithms.

Status register (source only) This is only used for diagnostics and microcode debugging to gain access to some internal information in the FP module. The status that can be accessed includes the register file address and holding register start address used during transfers and the sticky status.

Microcode Word Format

Key fields of the FP microcode format are generally shown in FIG. 4D. The microcode word is defined more precisely below. The items marked with a * come directly from the WCS 470, and use the internal pipeline registers of the devices they are controlling. The number of bits per field is indicated in parentheses.

True address (14). This field holds the next address to jump to during normal sequential program execution (i.e. continue instruction), the address to jump to when a conditional test is true and the subroutine address for a jump subroutine instruction.

False address (14) This field holds the next address to jump to when a conditional test is false and the return address for a jump subroutine instruction.

Read address X (9) * This field holds the 9 bits that specify the address in the register files where data is to be read from and placed on the "X" port. The physical address is held in 7 of the 9 bits and the other 2 bits select how the address is to be modified. The options are no modification (physical), and soft double buffering (either logical or preview).

Read address Y(9) * This field holds the 9 bits that specify the address in the register files where data is to be read from and placed on the "Y" port. The physical address is held in 7 of the 9 bits and the other 2 bits select how the address is to be modified. The options are no modification (physical), and soft double buffering (logical or preview).

Write address (8) * This field holds the 8 bits that specify the address in the register files where data is to be written to. The physical address is held in 6 of the 8 bits, and the other 2 bits select how the address is to be modified. The options are no modification (physical), soft double buffering (logical), or soft double buffering (preview). The address selects a pair of registers, one at the even address and one at the odd address. The writing of the register(s) is controlled by two separate write enable bits. (This feature allows a result to be duplicated in both the odd and even sides of the register file, as discussed above.) This address is also used for the "loopback" write port which is used to duplicate data in the register file.

Even Write enable (1) * When this bit is active data is written into the even register file address.

Odd Write enable (1) * When this bit is active data is written into the odd register file address.

Floating point operation (8) * This specifies the floating point or integer operation to do and is shared by both the FMPY 440 and the FALU 450. Full details concerning the instruction set and opcodes for the specific parts used can be found in the manufacturer's data sheets.

FMPY enable controls (4) This field controls the internal multiplexing of data and the loading of the input and output registers: X port multiplexer control (the "X port" is the port connected to the first operand bus 431); Enable X port register data load; Enable Y port register data load (the "Y port" is the port connected to the second operand bus 432); Enable Z register load (the "Z port" is the port connected to the results bus 433).

FALU 450 enable controls (5) This field controls the internal multiplexing of data and the loading of the input and output registers: X port multiplexer control; Y port multiplexer control; Enable X port register data load; Enable Y port register data load; Enable Z register load.

Clock length (4) Defines the instructions cycle length. These range from 28 ns to 98 ns in steps of 7 ns.

FMPY or FALU status selects (1) * Selects either the FMPY 440 or FALU 450 to drive the status bus.

Condition code select (5) Selects one of the following conditions to test: force true (default condition); FPWAIT; carry (FALU); divide by zero (FMPY); sticky status (divide-by-zero; sticky status active; CP option bit; X data valid; Y data valid; address last data transferred (i.e., even or odd; microcode loop; zero; negative; interrupt flag, not a number (NAN); rounded up; sticky overflow; sticky underflow; sticky inexact; sticky invalid operation; sticky denormalized. The last ten of these may originate from the FMPY 440 or FALU 450.

Breakpoint (1) Set to indicate that there is a breakpoint set on this instruction.

Set FPDONE (1) Sets the FPDONE status flag in the control processor module 110 interface to tell the control processor module 110 that the calculations have been completed.

Swap (1) Requests that the soft double buffer in the register file be swapped over. The swap doesn't happen until both the control processor module 110 and floating-point processor module 130 have requested the swap.

Scratchpad control (3) This field controls the operation of the scratchpad memory and its address counter. One bit is the write enable for the scratchpad memory, and the other two bits select the address counter operation out of: load; increment; decrement; hold.

Results bus output select (2) This field selects the source that drives the results bus 433. The possible sources are: FALU; FMPY 440; Scratchpad memory data; Scratchpad memory address.

Stack control (2) The stack control field controls the subroutine stack logic so that the return addresses are: pushed, popped or held.

Loopback write enable (1) This bit enables a write cycle in the register file 430, through the loopback part 430E. This copies whatever data is on first operand bus 431 into the address specified for the write port 430D. The odd and even write enables select which bank of the register file 430 the data is written to, or whether it is written to both.

Sticky status control (2) This field selects whether the status generated in this cycle is to be incorporated into the sticky status, the sticky status is to be cleared or is to be held.

Double precision data transfer (2) These two bits control the multiplexing of data into the X and Y input registers in the FALU 450 and FMPY 440, and the multiplexing of the double precision result out from the Z port.

Use old A6: This bit is set by the microcode assembler when the most significant address bit to the register files for all the ports remains the same over adjacent cycles. This is used to reduce the cycle time for these situations.

Sample Program Flow

Following is a short sample program (a multiply routine) in pseudo-code. This example will help to show how the innovative features provide efficient execution.

Figure 42:
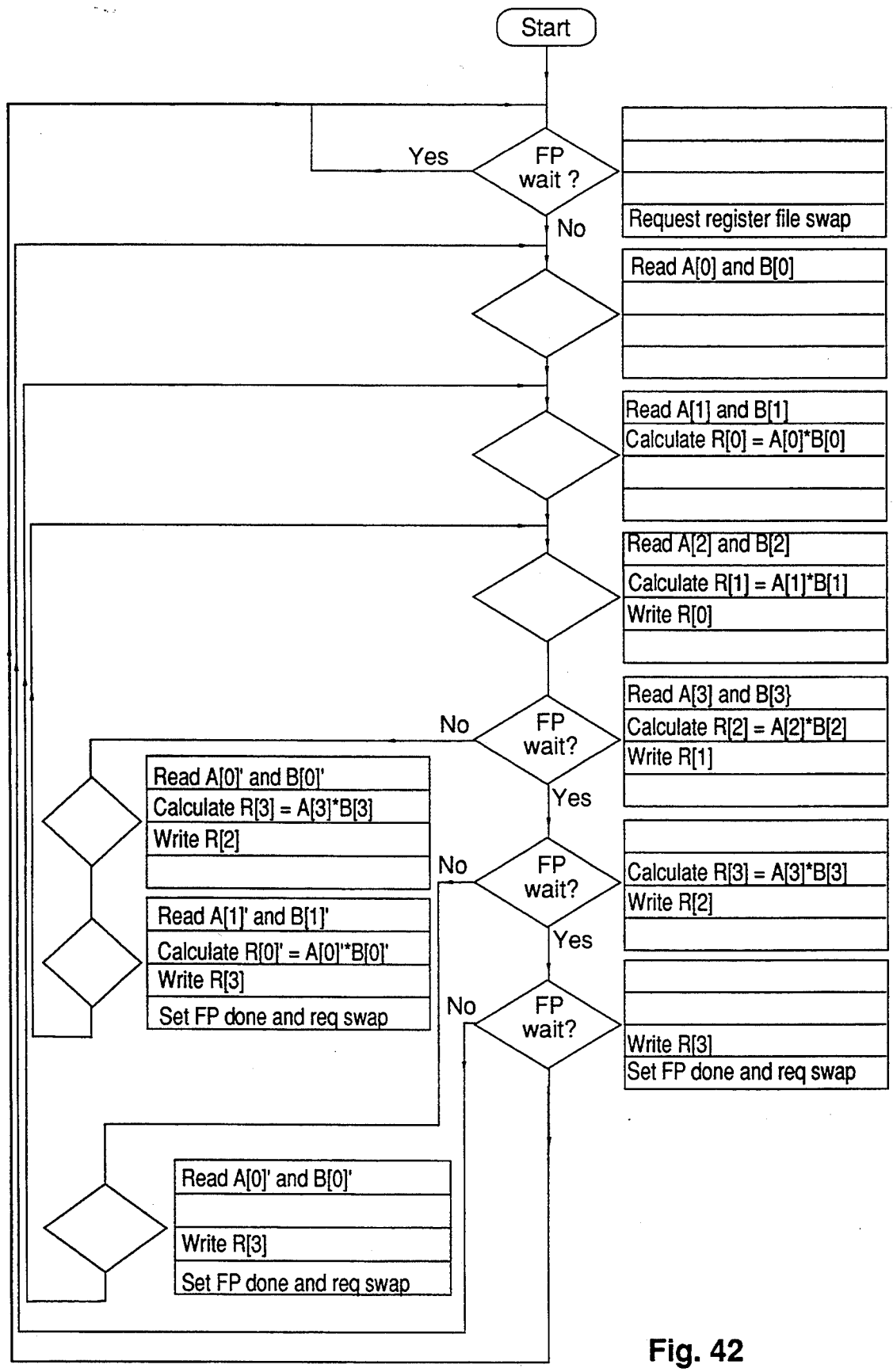
FIG. 42 schematically shows the flow of steps, in a system like that shown in FIG. 1, to multiply two arrays together (on an element by element basis) and deposit the results in a third-array.

The operation of this example is also shown schematically in FIG. 42. In this example, it should be noted that:

Instructions grouped together within curly brackets {} are executed in parallel.

Normally 8 multiplies would be done per pass through the routine. However, this has been cut down to 4 to shorten the routine.

The double buffering is transparent to the microcode.

The calculation performed is C[n]=A[n]*B[n] where n is in the range 0 . . . 3, and the 8 operands and 4 results are at unique addresses in the register file. Note that a ' (prime) on one of these references indicates that the opposite of the corresponding element, i.e. the element which is on the other side of the double buffer before the buffers are swapped.

There is a three stage pipeline: read operands from the register file, do calculation, write result back to register file.

The control processor module 110 clears FPWAIT which starts the floating-point processor module 130 running the routine.

The multiply routine is as follows:

```
MUL1:  {Test FPWAIT, if false jump to MUL1, else continue}
MUL2:  {Read A[0] and B[0] from register file,}
MUL3:  {Read A[1] and B[1] from register file,
        Do calculation, result R[0] = A[0] * B[0],}
MUL4:  {Read A[2] and B[2] from register file
        Do calculation, result R[1] = A[1] * B[1],}
        Write value of result R[0] into register file at C[0]}
    —  {Read A[3] and B[3] from register file
        Do calculation, result R[2] = A[2] * B[2],}
        Write value of result R[1] into register file at C[1]}
        Test FPWAIT, if true jump to MUL5, else continue}*
    —  {Do calculation, result R[3] = A[3] * B[3],}
```

-continued

```
                Write value of result R[2] into register file at C[2]}
                Test FPWAIT, if true jump to MUL6, else continue}*
        —       {Write value of result R[3] into register file at C[3]
                Set FPDONE and swap buffers
                Test FPWAIT flag, if true jump to MUL2 else jump
                    to MUL1}
        MUL5:   {Read A'[0] and B'[0] from register file,
                Do calculation, result R[3] = A[3] * B[3],
                Write value of result R[2] into register file at C[2]}
        —       {Read A'[1] and B'[1] from register file,
                Do calculation, result R[0] = A[0] * B[0],
                Write value of result R[2] into register file at C[3]}
                Set FPDONE and swap buffers,
                Jump to MUL4}
        MUL6:   {Read A'[0] and B'[0] from register file,
                Write value of result R[3] into register file at C[3]
                Set FPDONE and swap buffers,
                Jump to MUL3}
                    FP Vector Multiply Routine (in pseudo-code)
```

There are several points to note about this routine:

The routine is heavily optimized to keep the FPU busy on every cycle (providing there is data for it). A simpler, less efficient, version would not include the instructions MUL5 and onwards.

To extend this to multiply 8 pairs of numbers, the instruction at MUL4 would be repeated 4 times with different register addresses.

In order to keep the FPU operating on every cycle it is necessary to access data from the other side of the double buffer without having to do a swap. This is used in instructions MUL5 and onwards.

No time is wasted in synchronizing with the control processor module 110 providing the next set of data is available (i.e. FPWAIT is false).

Debug Hardware

The debug hardware on the floating-point processor module 130 is much more limited than that included in the control processor module 110 and data transfer processor module 120, because the microcode that runs here is very much simpler. Also, any debug hardware must not degrade the cycle time.

Access to the register file is provided through the local transfer bus 422, so it can be read and written by the monitor microcode. The FMPY 440 and FALU 450 have built in serial scan logic, which permits their internal pipeline registers and status/mode registers to be accessed. The next microcode address can be read by the control processor module 110, by accessing the start address register 479.

The breakpoint logic uses a bit in the microcode word to define a breakpoint. When an instruction is encountered with the breakpoint bit set, the clock generator is halted and the breakpoint status signal in the control processor module 110 interface is set. To continue from a breakpoint, the control processor module 110 clears the breakpoint input into the clock generator. Once sufficient internal state has been saved immediately after the breakpoint, the control processor module 110 starts some floating-point processor module 130 microcode running (via the start address register mechanism) to gain access to the indirect access status and the scratchpad memory.

The microcode can only be single stepped by setting the breakpoint bit on every instruction within the routine to single step.

Another feature supporting the debug capability is that the subroutine stack can be read.

Application-Customized Processor Modules 130'

FIG. 9A shows a general overview of a numeric accelerator subsystem including an application-customized numeric processing module 130' (also referred to as an "algorithm accelerator"). By using the powerful control tools provided, the control processor 110 can control a combination of one or more numeric processing modules 110 with one or more algorithm accelerators 130'.

It can be particularly advantageous to combine a general-purpose floating-point unit 130 with one or more algorithm accelerators 130'. In such a combined system, the design of the algorithm accelerator 130' can be freed from the constraints of the need for general-purpose floating-point operations. Therefore, the algorithm accelerator can be designed to be highly application-specific if desired.

One particularly advantageous combination may be to include a complex arithmetic module as one of the modules 130'.

Preferably the application-customized processor is an application-customized numeric processor. However, the application-customized processor could optionally (and less preferably) be of a more exotic variety, such as a symbolic processor (i.e. a processor which has the extra data paths needed to fun LISP or PROLOG with high efficiency), or a neural network machine.

The control of multiple numeric processor modules 130 (including algorithm accelerators 130') is discussed below.

FFT Accelerator Module

Figure 9B:
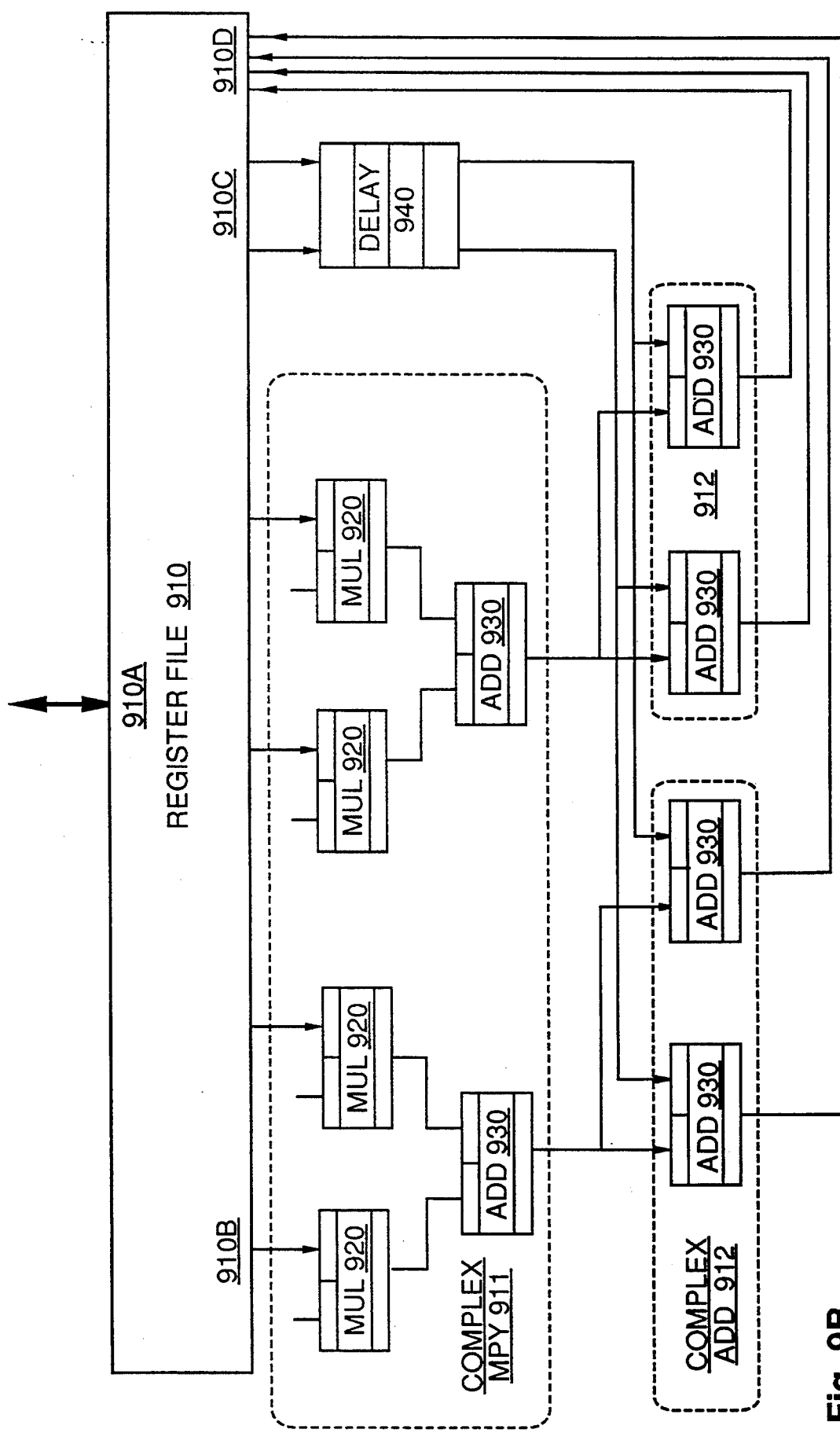
FIG. 9B schematically shows how the architecture of one example of an algorithm accelerator 130' differs from that of a general-purpose floating-point module 130.

FIG. 9B schematically shows how the architecture of one example of an algorithm accelerator 130' differs from that of a general-purpose floating-point module 130.

The module shown is particularly optimized to run discrete integral transform operations. For example, this module is particularly fast at executing the Fast Fourier Transform (FFT) algorithm. An example of the execution of this algorithm will be reviewed below.

In the embodiment of FIG. 9B, the register file 910 is even more highly multiported than register file 430. Register file 910 includes four read ports and four write ports, as well as a wide bidirectional port 910A which interfaces to the cache bus 144.

The four lines shown as read ports 910B are actually replicated. Since the multiplies performed will typically not be random multiplies, but will be multiplication with a coefficient (which changes less frequently than the data words), only one complex word of input is needed per cycle for most of the cycles. (However, this is not true in the final cycle.)

The four multiply units 920 can be integer or floating-point units. They are most preferably similar to the multiplier 440 described above, but of course other calculation units could be substituted. These units will hold the coefficients in registers, until they are commanded to read new coefficients.

Thus, the four multipliers 920 and adders 930 configure a full complex multiplier 911. The complex multiplier 911 is pipelined with two complex adders 912.

The inputs to the two complex adders 912 include not only the outputs of complex multiplier 911, but also data from read ports 910C, fed through delay block 940. (This delay block can optionally be used to share ports 910B and 910C on the register file 910.) The outputs of the complex adders is connected to write ports 910D.

Thus, this structure permits butterfly calculations to be pipelined very efficiently.

Data Cache Memory Module 140

The data cache memory provides a large amount of high bandwidth storage. The storage capacity currently is 2 Mbytes, and the bandwidth is 320 Mbytes per second. This memory is multi-ported, to allow data transfers with the outside world to occur in parallel with the floating point calculations. This helps prevent the calculations from occurring in a "stop-start" fashion, with the floating-point processor module 130 standing idle for long periods.

FIG. 5 shows key features at the data cache memory module 140. Central to this module is a large block of memory 510. In the presently preferred embodiment, this memory block 510 is configured as 8 single-in-line modules, each containing eight $32K \times 8$ SRAMS, for a total of 2 megabytes of memory. However, it will be readily recognized by those skilled in the art that the memory implementation could be changed, in accordance with the changing availability of advanced semiconductor parts and the demands of a particular application.

In particular, it is contemplated that for some applications it may be advantageous to have significantly more memory. Note that the by-256 configuration preferably used for this memory bank 510 means that the address space is used economically, at least for fully parallel accesses. Thus, in the presently preferred embodiment 24 bits of address information are provided to the memory bank 510 at address input 511. Note that the write enable input 512 is actually 8 bits wide, so that individual 32-bit words, within one 256-bit block of memory, can be selected for writing. This is advantageous, as will be discussed below. The data port 513 is 256 bits wide. Note that the functionality of block 510 does not yet provide the multiport capability character of module 140 as a whole. The logic for implementation of this multiport capability, and for accessing the memory bank 510, will now be described.

Figure 24:
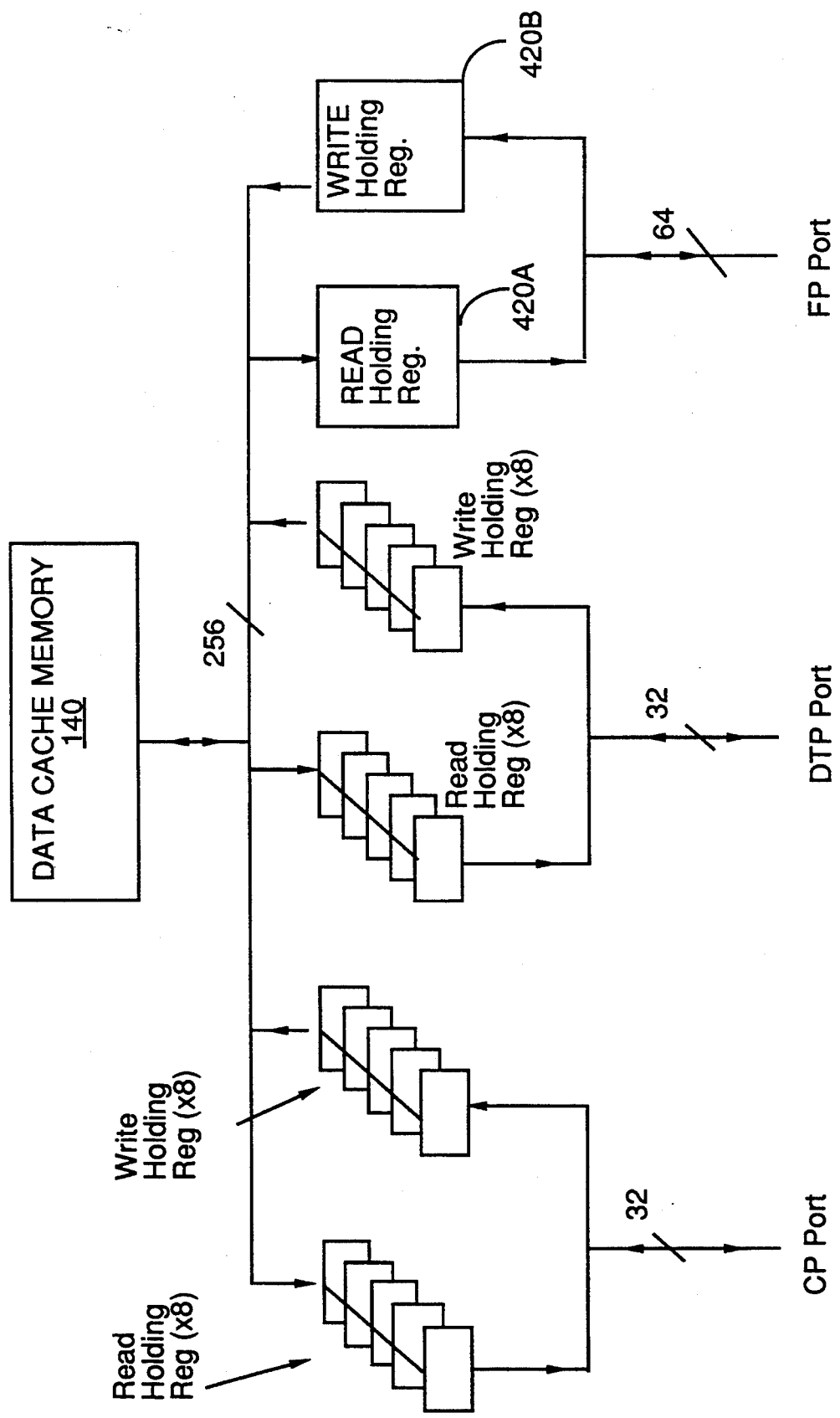
FIGS. 24, 25, and 26 show the architecture of the data interfaces to the cache memory.

At the bottom of FIG. 5 are seen the 32-bit wide data buses which connect to the control processor 110 (CD bus 112) and to the data transfer processor 120 (the TD bus 122). Each of these buses is first fed into a holding register bank 560. Each of the register banks 560 contains eight 32-bit wide registers 561 in parallel (In the presently preferred embodiment, these registers 561 are each actually configured using four 74ALS652 devices, configured to provide a write holding register 561' in parallel with a read holding register 561''. The structure of the register sets 560A, 560B, and 420 is further shown in FIG. 24.)

When the memory bank 510 is accessed, an address must be provided at port 511. This address will be provided through multiplexer 520, from either the CA bus 111 (which carries addresses originated by the control processor) or the TA bus 121 (which carries addresses originated by the data transfer processing module 120). A select input 521 chooses which of these inputs is to be provided to the address port 511.

The select signal 521 to the multiplexer 520 is generated by arbitration logic 530. This simple logic grants access to the DTP module 120 only if the DTP is requesting access and the CP is not requesting access. The select signal 521 is provided not only to address multiplexer 520, but also to write mask multiplexer 530, and to DTP transfer logic 540.

As will be discussed below, the write mask input 512 is very advantageous during writes from the TD bus 122 or the CD bus 112. Since the write enable input 512 has 8 bits of resolution, the eight 32-bit words in each block of memory 510 can be separately enable for writing during a single fully parallel write operation. Thus, for example, when the control processor 110 wants to write less than eight words into one row of memory bank 510, the registers of 561 for the desired word positions will be loaded up with the desired data value. In addition, 8 bits will be provided on write mask line 551, to indicate which of the registers 561 contain information which should be written into the corresponding words of memory bank 510 at the row indicated by address 511 (from the CA bus 111). (As noted above, transfer of an address from the CA bus 111 into the multiplexer 520 is controlled by the output of the IPU 340.)

Figure 25:
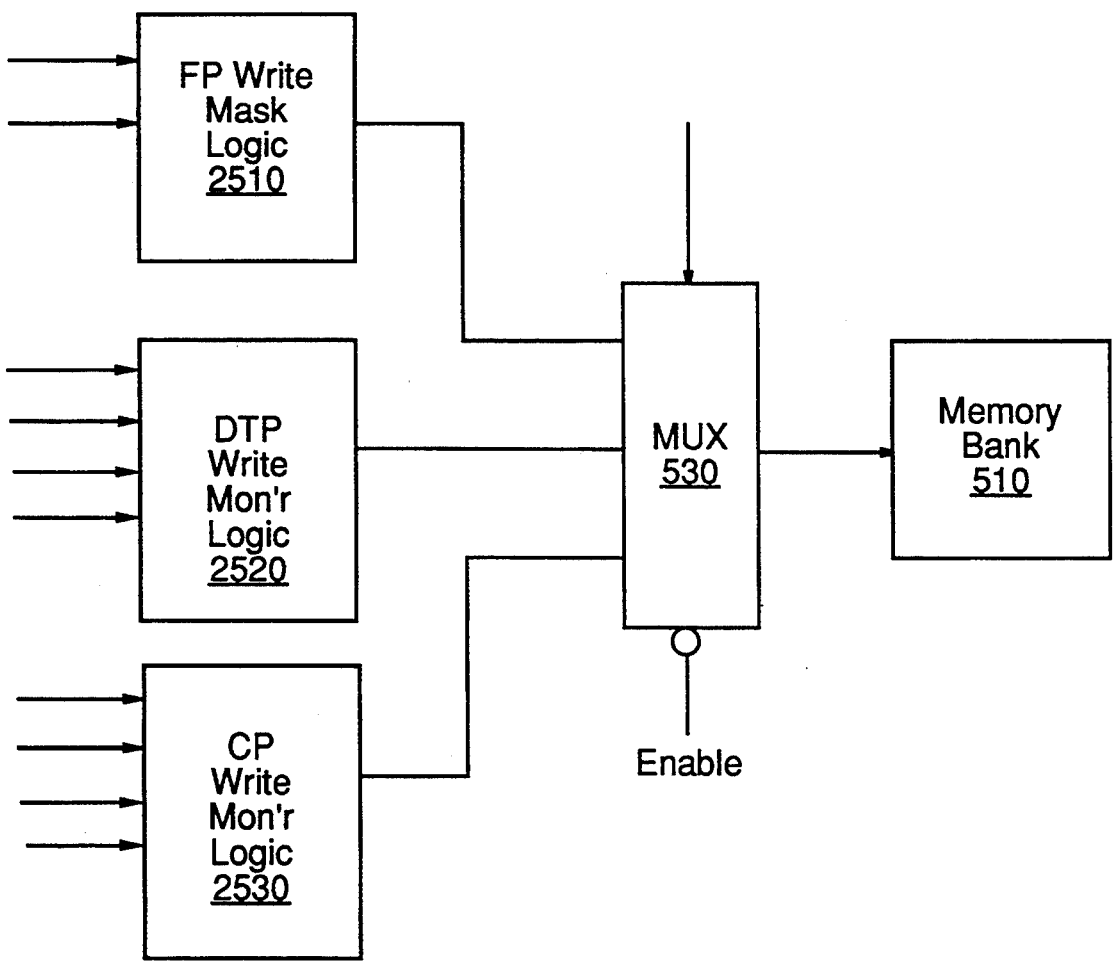
Figure 26:
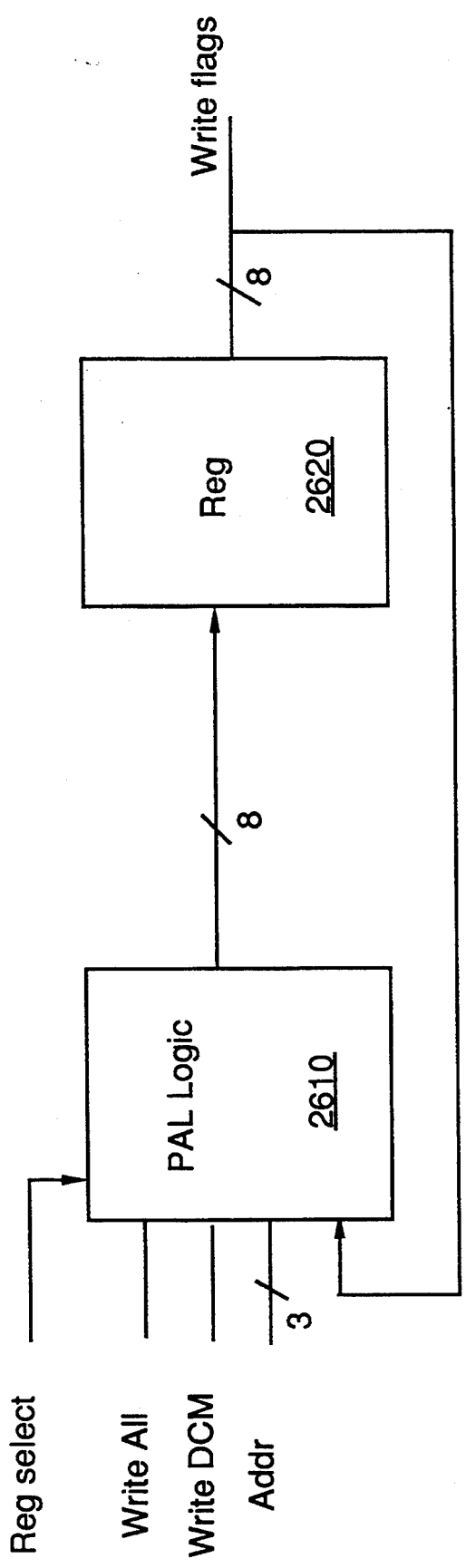

FIG. 25 provides a different view of the write mask logic. In this figure the FP write mask logic 2510, CP write monitor logic 2520, and DTP write monitor logic 2530 are broken out as three separate blocks, which provide inputs to multiplexer 530. FIG. 26 provides a more detailed view of the workings of the write monitor logic blocks. Inputs to the logic 2610 include Register Select, Write All, Write DCM, and Load Holding Register. The output is eight flag bits, registered in register 2620.

The transfer logic 540 is driven by microcode instruction fields 542, which are part of the microcode instruction sequence within the data transfer processor 120. Similarly, the CD transfer logic 550 is driven by microcode instruction bits 552, which are part of the microcode instruction driven by the sequencer 210 of the control processor module 110. (In fact, some of the microcode driven by this sequencer is preferably distributed. That is, some of the fields of the microinstruction are stored separately from the control store 220, but are clocked by the series of microinstruction addresses 211 which are the outputs of the sequencer 210. This provides substantial advantages in the system context, and will be discussed below.)

The other outputs 543 and 553 of the transfer logics 540 and 550 include such control functions as control of the respective register banks 560, including clocking and output enable. (Note that each of the register banks 560 has two output enables, for the two sides of the register bank, and two sets of clocks. Note also that one of the functions controlled by the CP transfer logic 550 is the output enable line 514 of the memory bank 510.)

It will be noted that there is no direct input from the FP module 130 to request access to the cache bank 510. This is because such accesses are controlled by the control processor module 110. This surprising twist turns out to yield significant advantages, as will be described below.

Memory Configuration

The accelerator subsystem uses a wide memory architecture. On each access to the data cache memory 140, 256 bits are read or written. This represents 8 floating-point words per cycle.

The data cache memory 140 is tri-ported to the control processor module 110, floating-point processor module 130, and data transfer processor module 120, but because the control processor module 110 and floating-point processor module 130 accesses are controlled by control processor module 110 microcode the arbitration and address multiplexing only needs to be done two ways.

Data Ports

There are three ports into the data cache memory. The port to the FP module(s) is 256 bits wide, and the control processor module 110 and data transfer processor module 120 each see respective 32 bit wide ports. The data routing and storage for the 32 bit wide ports is included as part of the data cache block 140.

The multiplexing of the 256 bits of data from the memory array onto one of the 32 bit busses is implemented with 32 bidirectional registers, arranged as 8 groups of 4 registers. Each group stores 32 bits (i.e. one floating-point word) in the read direction and 32 bits in the write direction and is called a holding register. The more specific naming of each register is read holding register and the write holding register as seen from the processor sides of the interface.

When data is read from the memory array, all 256 bits are stored in the holding registers, and the output enables of these registers are controlled to select the required floating-point word onto the 32 bit port.

When data written to the memory array only those registers that have been updated from the 32 bit port are stored. This is controlled by the write mask logic and is achieved by using 8 write enables, one per group.

Both 32 bit ports have identical data routing and storage logic.

The 256 bit port to the floating-point processor module 130 module contains similar logic to the 32 bit ports, but is located on the floating-point processor module 130 module. To allow future expansion of the data cache memory, using modules, the address bus (24 bits) and write enables (8) are taken to the module connectors 3810 (shown in FIGS. 38A and 38B.)

CP Transfer Logic

The CP transfer logic is responsible for the transfer of data between the CP holding registers (or the FP holding registers) and the data cache memory.

The data in the holding registers is accessed when the CD source microcode field selects the read holding register. The least significant 3 bits of the CP address bus selects the 32 bit word to drive onto the bus. During this process the data cache memory isn't used but it could be accessing the next set of data if necessary.

To write data into the write holding registers, the CD destination microcode field selects the holding registers as a group, and the least significant 3 bits of the CP address bus CA 111 select the 32 bits to update. When a write holding register is updated, a corresponding write flag is set. Therefore, when a write to the data cache memory is done, only the holding registers that have been updated by the control processor module 110 are actually written into the memory array. Those words in the memory array for which the corresponding holding register had not been updated are not changed. The write flags are all reset when the data cache memory is written to (if the data source is the control processor module 110). If the control processor module 110 had been updating one of the write holding registers during the same cycle that it had been writing into the data cache memory, then that write flag bit would remain set.

Sometime it is advantageous to by-pass this selective write mechanism, for example when clearing memory to a constant value. In this case the control processor module 110 can override the selective writing, and force all words to be updated. Without this selective write capability the write operation of the data cache memory would be very slow, and would involve: reading the block of data (256 bits) into the read holding registers, transfer the words that were not to change to the write holding registers, update the write holding register(s) with the new data, and then do a data cache write cycle. In the current architecture the copying of data from the read holding registers to the write holding registers would take one cycle per word.

The state of the write flags can be extracted non-destructively by the control processor module 110, for the purposes of state save during microcode debugging.

The read holding registers are separate from the write holding registers so multiple read cycles can be done without disturbing the contents of the write holding registers, and vice versa.

To control the transfer of data between the holding register sets and the data cache memory the following microcode bits are used:

Data Cache access (1) This bit is active whenever an access to the data cache memory is required by the control processor module 110 for its own use or to transfer data to or from the floating-point processor module 130. The access flag is not pipelined. Therefore, arbitration with the data transfer processor module 120 data cache requests can be sorted out before the start of the cycle the request happens on.

Data cache write enable (1) This bit generates a write cycle in the data cache memory.

Data cache write all (1) This bit overrides the normal write enable gating that allows selective updating of words in the data cache memory and forces them all to be written. This is useful when setting blocks of memory to a constant value.

Data cache port select (1) This bit selects either the FP module holding registers or the control processor module 110 holding registers to be the source or destination for a data cache transfer.

There are three bits in the mode register that control the holding registers. Two bits select whether the holding registers are to be used or by-passed. The third bit disables the data cache memory from driving the DCM data bus so a loopback data path can be set up between the write holding registers and the read holding registers. These facilities are only present so the state save and restore microcode can gain access to the write holding registers without forcing a data cache memory write operation first and also more precise diagnostics.

The control processor module 110 can use the data cache memory in two ways:

The first way is to ignore the wide memory architecture and treat it as if it were just 32 bits wide. To do this, the CP module 110 simply requests an access cycle prior to every read access and after every write access. Using this method, the data cache memory can be regarded as just a memory with pipelined data accesses. This method simplifies using the data cache memory, but does not make efficient use of the memory's ability to service the data transfer processor module 120 port. This method also introduces inefficiencies when the control processor module 110 is accessing sequential data. However, for non-sequential data accesses the next method cannot be used in any case, so this first method must be used.

When the control processor module 110 is doing sequential memory accesses, it takes it 8 cycles of reading or writing to all the holding registers 561 for each access to the memory bank 510. The data cache memory access can be pipelined up with the holding register accesses, so 7 out of 8 cycles are free for data transfer processor module to use. The data cache memory access does not occur automatically, so the microcode to specify an access cycle every 8 cycles. This type of transfer is more likely to occur in the data transfer processor module 120, because I/O transfers to or from the external interfaces will normally be sequential in nature.

The control processor module 110 is also responsible for transferring data between the data cache memory and the holding registers on the FP module. In this case the basic control is the same except for determining which words within a block to update during a write to the data cache memory. In this instance a different approach is taken to the write flags as described above.

The differences arise because of several factors:

The transfer logic that governs the data flow between the FP's register file and the holding registers have some limitations so the more general write mask generator used in the control processor module 110 is not necessary.

The normal data transfers from the FP's register file are usually blocks of data (i.e. part of a vector) and as this happens in a single transfer cycle a number of the write mask bits must be set in parallel rather than individually as in the case of the control processor module 110.

The one FP write mask generator must cope with multiple FP modules.

The FP write mask is generated by specifying the word to update and the number of consecutive words from the first word. The start position is supplied by the least significant 3 bits of the CP address and the length is held as a field in the microcode instruction.

DTP Transfer Logic 540

The data transfer processor module 120 transfer logic is responsible for the transfer of data between the data transfer processor module 120 data bus (TD bus 122) and the memory array. It is very similar to the CP transfer logic except:

The parts associated with the floating-point processor module 130 are missing.

The output signals are qualified by the results of the arbitration logic.

Arbitration Logic 535

The arbitration logic determines who has access to the data cache memory on a per cycle basis. The two competing ports are the CP/FP and the data transfer processor module 120. The CP/FP has priority over the data transfer processor module 120 so the data transfer processor module 120 is made to wait for a free memory cycle. The data transfer processor module 120 can force the control processor module 110 to inject a free memory cycle by interrupting the control processor module 110.

The arbitration of the data cache memory has been simplified by both port's access requests (or demand in the CP/FP case) being synchronous. This has been achieved by sharing the same clock generator between the control processor module 110 and data transfer processor module 120. Without this degree of synchronization, the control processor module 110 could never assume it had access during a cycle, because the data transfer processor module 120 might have just started an access.

The cycle by cycle arbitration is done in the arbitration logic. The arbitration logic takes two request signals CP request and DTP request. Both these are microcode bits that are asserted whenever that port accesses the data cache memory. These microcode bits are non-registered so that the arbitration can be sorted out on the cycle before the access occur. This allows enough time for the data transfer processor module 120 grant signal to be tested by the data transfer processor module 120 sequencer without incurring an extra cycles delay due to the pipelining of the sequencer's FLAG input.

The two output signals are the dtp_grant signal, which informs the data transfer processor module 120 that it has access to the data cache memory, and a signal that controls the address and write enable multiplexers.

The CP/FP accesses the data cache memory as if it were a single ported device. The data transfer processor module 120 however must go through the following procedure every time it requires access. This procedure is written in pseudo code.

---

WAIT:  { do some writes to the holding registers }
       { request write access to data cache memory
       if access failed jump to WAIT esle continue }
       { do some other work }

---

Some points to note regarding this example are:

This logic helps to maintain a large mount of work going on in parallel

If the access failed, then the write (or the loading of the holding registers on a read access) is automatically inhibited.

The result of the test indicates whether the access was successful or not.

If it was not then the data transfer processor module 120 tries again by looping on the accessing instruction.

This example has shown the data transfer processor module 120 waiting until access is granted. However, it would normally wait only for a certain number of cycles. If access still had not been granted, the DTP module would then interrupt the control processor module 110. During the few cycles the control processor module 110 takes to service the interrupt the data cache memory would be free for the data transfer processor module 120 to access.

Command Memory 190

The command memory 190 provides communication between the control processor module 110 and the data transfer processor module 120. Both have equal access to this memory. Dual port RAMs are used in the presently preferred embodiment. The command memory is 32 bits wide by 2K deep.

Figure 15:
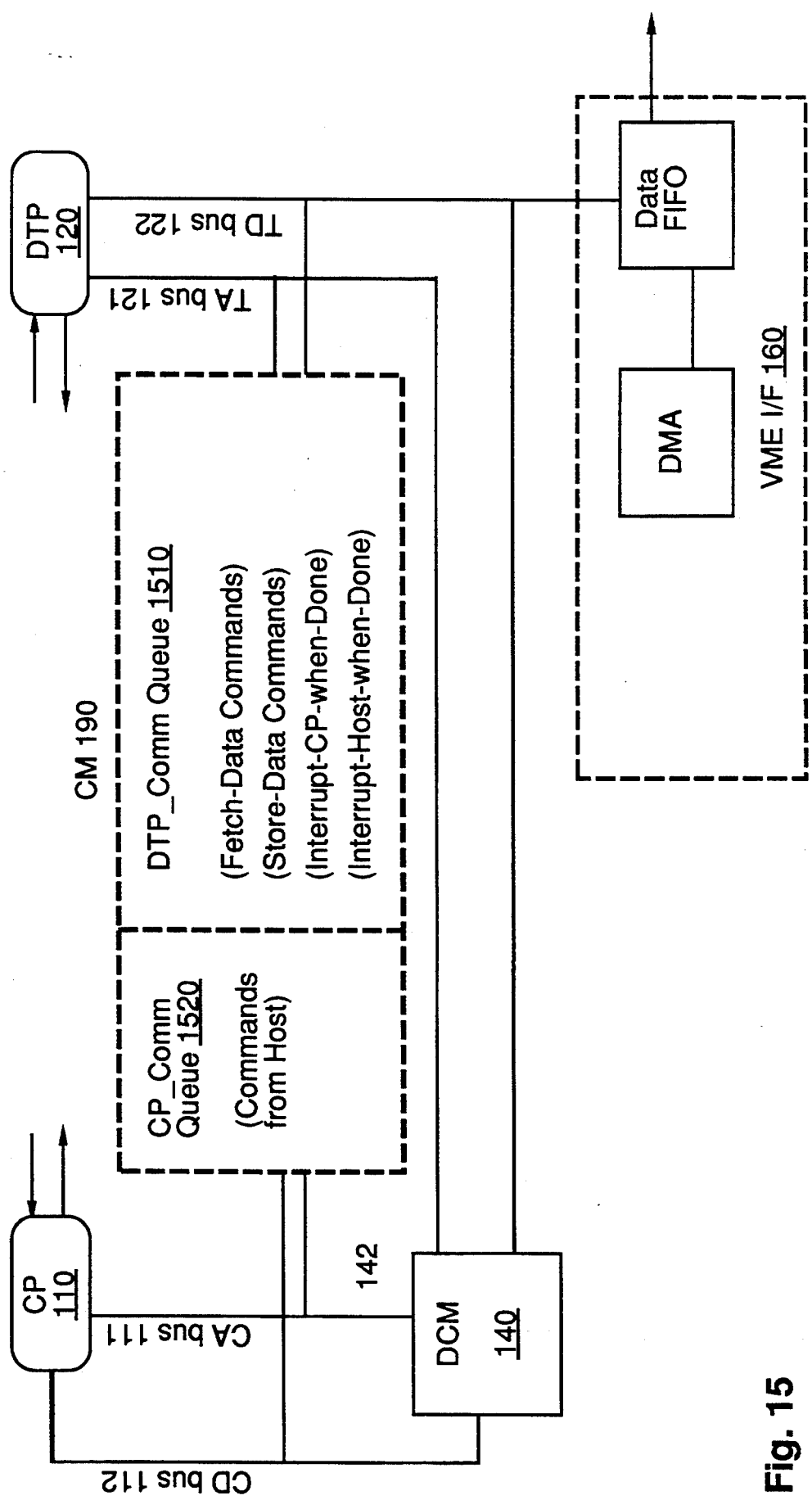
FIG. 15 schematically shows the interface between the control processing module and the data transfer processing module, in the presently preferred embodiment.

FIG. 15 shows some significant features of the organization of this memory. The operation of the command queues is described in detail below, with reference to FIG. 15, where the processor interface between the CP module and the DTP module is discussed. However, some key features of the organization of this memory will be noted at this time.

These dual port RAMs allow unrestricted access by both ports when the two addresses are different. If the two addresses are equal, and if both sides are writing, then the result is undefined. As discussed below, the communication protocol between the two processors is arranged so that both never need to write to the same address. Therefore no arbitration is necessary.

Software controls how the control processor module 110 and data transfer processor module 120 will use the command memory. In the presently contemplated best mode, the allocations will include: command queue to the CP module 110 (e.g. about 12% of memory space); command queue to the DTP module 120 (e.g. about 38% of memory space); state save and restore data structure (e.g. about 50% of memory space).

The state save and restore data structure is reserved for use by the microcode debug monitor, to hold the control processor module 110 and floating-point processor module 130 state information (as well as some command structures).

Host Interface Logic 160

Figure 6:
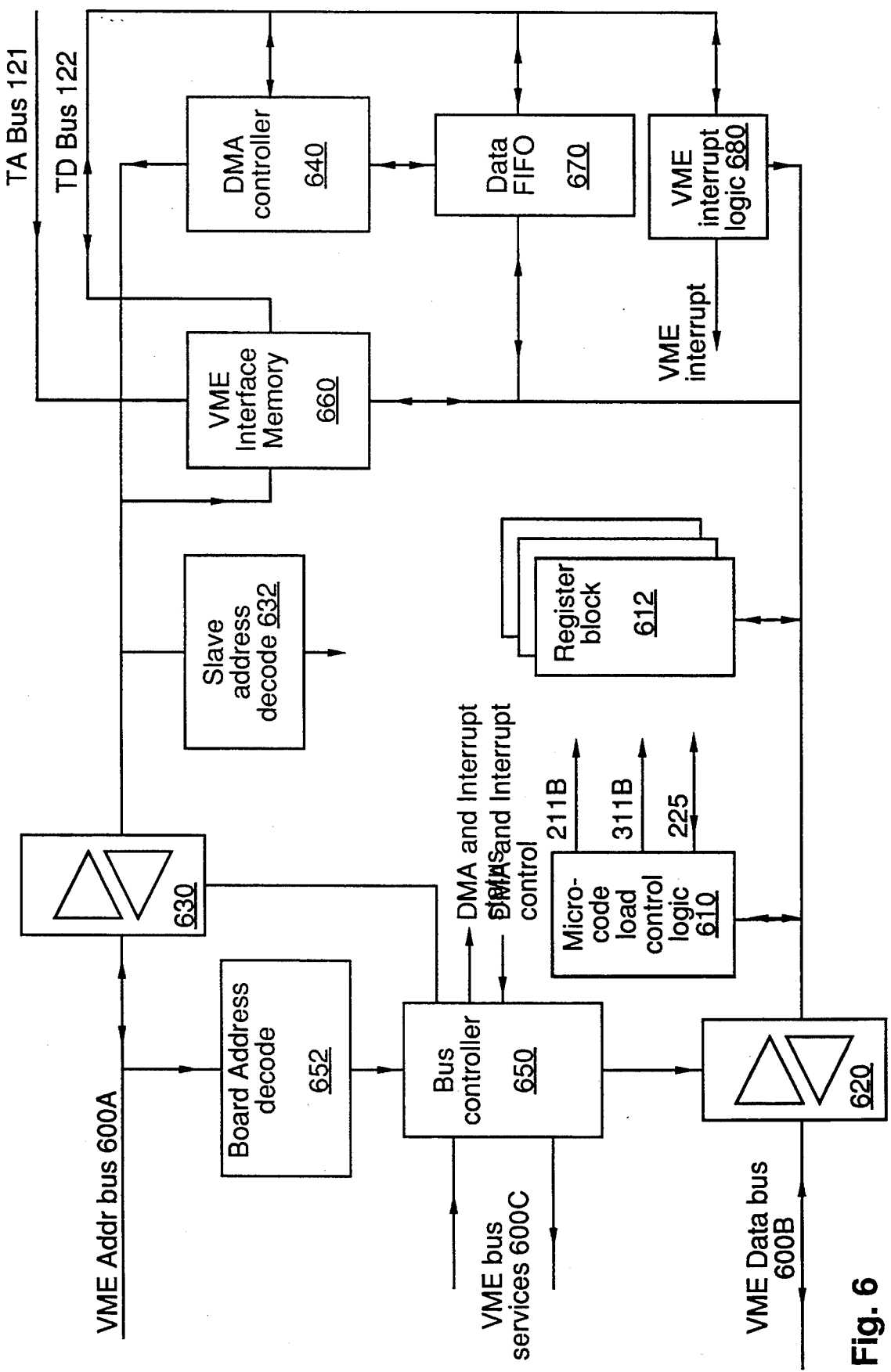
FIG. 6 generally shows the organization of some key parts of the Host Interface Logic, in the presently preferred embodiment.

FIG. 6 shows principal components of the host interface logic, which is generally shown as block 160 in FIG. 1. In the preferred embodiment, the system bus is a VME bus, and therefore this interface logic is often referred to in the present disclosure as the "VME Interface." However, as will be apparent to those skilled in the art, a wide variety of other system busses could be used instead, and the disclosed innovations can readily be adapted to such systems.

A bus controller 650 interfaces to the VME bus services lines, to provide such interface signals as bus grant, bus request, reset, etc.

The interrupt logic 680 is used for interrupt handling, to send interrupts to the host. (These interrupts will go out on the VME bus services lines 600B.) In the presently preferred embodiment, this is implemented using a PAL, as described below.

In addition, a DMA controller 640 is also preferably provided. This provides low level control of data handling between the VME bus and the FIFO 670, without supervision of all intervening steps by the data transfer processor 120. In the presently preferred embodiment, the DMA controller is configured using a PAL, as described below.

The VME interface provides four main services to the host processor:
  Microcode loading via a serial scan loop interface to the three types of processor modules.
  Command instigation and status monitoring.
  Data transfer to/from the VME address space using DMA access to the host memory so the subsystem can transfer its own data
  Debug (hardware and software) facilities.

The internal connections of this interface logic include: the TD bus 122, for data; the TA bus 121, for address information; the CP microaddress bus 211B; the DTP microaddress bus 311B; the serial microinstruction loop 225; and numerous interrupt and status lines.

The external connections, in this embodiment, are to a VME bus. The lines of this bus are depicted separately, in FIG. 6, as address lines 600A, data lines 600B, and bus services lines (including status and control lines) 600C.

The presently preferred embodiment conforms to the electrical definitions in the VME interface specification, which has been promulgated as IEEE standard P1014/D1.2, and as IEC 821. The interface block 160 will accept 32 or 24 bit addresses and 32 or 16 bit data In the presently preferred embodiment, some minor limitations have been imposed on the type of accesses available, to keep the addressing and data routine simpler.

Alternatively, a wide variety of other bus configurations could be used instead. For example, VersaBus, FutureBus, Multibus II, or NuBus could be readily designed into the system if desired. For very high-speed computing systems, it might be advantageous to use optical busses, using modulated solid-state lasers on optical fibers.

Interface To Physical Lines of Bus

The logic blocks which interface most directly to the VME bus will be described first. Other logic and memory blocks will be described thereafter. The register block 612 will be described last; the description of this register block contains a wealth of detailed information which further clarifies the operation of the other blocks.

Bus Controller 650

Bus controller 650 interfaces to the bus services lines 600C, and also receives an output from beard address decoder 652 which indicates whether this particular board is being addressed.

The decoder 652 is constantly watching the board-address lines of the VME bus to provide this decode output. The address of the subsystem, as specified by the host system, is set by the user at installation, using DIL switches. The actual decoding of the address and function codes is done in PALs, so the subsystem can be configured to fit into the target VME system easily.

The bus controller 650 provides enable signals to the bidirectional data buffer 620 or the bidirectional address buffer 630, in accordance with the VME control protocols.

The bus controller 650 is also connected to receive status information from the DMA controller 640 and the VME interrupt logic 680 (and also from other logic blocks, as will be described in detail below). The bus controller 650 is also connected to send control signals to the DMA controller 640, the VME interrupt logic 680, and to many other blocks (as will be described in detail below). Since the status and control connections of the bus controller 650 are extensive, they are not all separately shown, to avoid possible confusion. However, their connections will be readily apparent to those skilled in the art.

In the presently preferred embodiment, this is implemented as a VME bus controller device (Signetics SCB68172). This handles all the bus protocols, including arbitration for the master interface and bus error cycles.

Master And Slave Modes

The VME interface can be considered as two fairly separate interfaces: a slave interface and a master interface. Implementation of the master mode is described below, with reference to the DMA controller 640.

The slave mode is implemented using slave address decoder 632. When the accelerator subsystem is operating in slave mode (as shown by VME commands decoded by bus controller 650), the controller 650 puts the bidirectional buffers 630 in a pass-through mode, and enables the slave address decoder. The slave address decoder then decodes the address brought in from the VME address lines 600A, and enables the appropriate devices. Again, since the outputs of the slave address decoder are widely connected, they are not separately shown.

The slave address decoder also contains the necessary DTACK generation logic, to comply with VME protocols.

Under the VME protocol, the current bus master addresses a board, and that board can only respond in slave mode, because only one active master is allowed at any one time. (There can be many masters waiting to be granted access to the bus and hence become active.) The master then waits until the slave responds with DTACK (data transfer acknowledge) to say it has taken the data (write operation) or has provided the data (read operation).

Data Buffer 620

This is a bidirectional buffer, which provides direct interface to the VME data lines 600B.

Address Buffer 630

This is a bidirectional buffer, which provides direct interface to the VME address lines 600B.

VME Interface Memory 660

This memory provides a significant block of storage in the interface 160. A number of uses of this are described above, in connection with the operations of the DTP module 120.

Memory Map

Each accelerator subsystem uses 8K bytes of VME address space. The base address of this address space is selected by 8 switches. The register addresses are given as an offset from this base address. The memory map for the accelerator subsystem can be broken into 2 areas:

- A memory area which is 2K by 32 bit words in size. The usage of this memory area is controlled by software. Some of the data structures which this area will typically contain will be mentioned.
- A register area which occupies the bottom portion of the memory space. This area is used for many important functions, as will be explained in detail below.

The memory area is shared between the microcode debugger and the normal run time interface:

- The debugger area will contain the state save information of the subsystem, as well as a command queue which permits the monitor microcode to read memory, FIFOs etc.
- The run time interface consists mainly of a command queue that the device driver can add to and the blitz microcode remove commands from.

There are several restrictions on how the hardware can be accessed. These restrictions are imposed primarily to keep the hardware simple, while still allowing 16 or 32 bit data bus interfaces. The restrictions are: Byte accesses are not supported; and 16 bit accesses must occur on long word (32 bit) boundaries.

The memory 660 and the data FIFO 670 are 32 bits wide. If the host system is a 16 bit system, the top 16 bits are not accessible. For a 16 bit system to write to consecutive addresses in the memory, the address must be incremented by 4 to move onto the next location.

The VME memory map used by the preferred subsystem is:

| Register | Offset | Width |
|---|---|---|
| Control register | 0 | 16 read/write |
| Strobe buffer | 4 | 16 write |
| Status register | 4 | 8 read |
| WCS control register 0 | 8 | 16 read/write |
| WCS control register 1 | 12 | 8 read/write |
| WCS data register | 16 | 16 read/write |
| CP microaddress | 20 | 16 read/write |
| DTP microaddress | 24 | 6 read/write |
| Data FIFO | 28 | 32 read & write |
| IF memory 660 | 4096 | 32 read/write |

Data FIFO 670

The data FIFO 670 provides an important capability in the data transfer operations.

In the normal mode of operation the data FIFOs are never accessed by the host, because the DMA controller uses them exclusively. The host can gain access to them by clearing the FIFO access bit in the control register.

The block shown as FIFO 670 is physically implemented as two FIFOs, to gain the functionality of a bidirectional FIFO. One of these FIFOs is read by the host and the other is written by the host. The other ends of the FIFOs are accessed by the DTP. (Thus, in general, if the host reads the FIFO after having written to it, the read data would be different from the written data.)

When the host is accessing the FIFOs it must monitor the FIFO status, to ensure that FIFO is never read when empty or written to when full. (The host might need to access these FIFOs for diagnostics, or if polled I/O rather than DMA was required.)

VME Interrupt Logic 680

The VME protocol provides for a number of interrupts. These interrupts can be triggered by the DTP module 120.

The DTP module 120 also defines the interrupt vector. The vector can be changed depending on the reason for the interrupt, or a single vector can be used, with the cause(s) of the interrupt held in the VME interface memory 660.

DMA Controller 640

Sequential or block mode transfers, between data FIFO 670 and the VME bus, are supported by the DMA controller 640. (This controller also supports the more usual single word transfers.) The DMA address is the full 32 bits, and the VME address modifiers and LONG* signals used during a transfer are all set up by the DTP module 120 in registers before the transfer starts.

The opposite side of the FIFO 670 is filled or emptied by the DTP module 120 (normally into the data cache memory 140). When 16 bit transfers are used, the DTP microcode packs/unpacks the data to/from the 32 bit internal format.

This part is referred to as a DMA controller by analogy, in that it can perform block data transfers to and from the FIFO 670 in response to a single high-level command from the DTP module 120. However, the functioning of this logic is not quite the same as that of commercially available DMA controller chips. Normal DMA controllers will get their data and address information from the same bus as the one they use for DMA access when active. However, the DMA controller 640 receives its address information from the DTP module 120, and uses this information to control the address and data interface to the VME bus.

In the presently preferred embodiment, the DMA controller 640 is actually implemented using four Am2940 DMA bit slice chips, with some associated logic in PALs as discussed below.

The setup of the DMA controller is done by the DTP module 120, and the data is transferred between the VME bus lines 600B and the data FIFO 670.

Three addressing modes are available. Which of these is used will depend on the type of transfer or system configuration.

- Hold address constant. This addressing mode keeps the same VME address for every DMA access to the VME memory and this is used when accessing I/O ports.
- Increment address by 2 (or decrement). This addressing mode is used when the VME memory being accessed is only 16 bits wide. In this case the DTP splits or merges the data between 32 bit words used internally and 16 bits words used externally.
- Increment Address by 4 (or decrement). This addressing mode is used when the VME memory being accessed is 32 bits wide.

Of course, multiple status signals are preferably used to control data handling to the FIFOs, as is well known to those skilled in the art. For example, such status signals would include FIFO empty, FIFO halt-full, etc.

Microcode Load Control Logic 610

This logic provides the interface to the microaddress busses 211B and 311B, and to the serial loop 225. (More precisely, as shown in FIG. 28, this logic provides one serial output line 225A, and receives four return lines 225B, 225C, 225D, and 225D.) The components of this block, and the functions it performs, are discussed in detail below (in connection with the operation of the serial loop interface), with reference to FIGS. 27, 28, and 29.

Note that this logic must access the CP and DTP microaddress registers in the Register block 612. It also accesses the WCS specifier control register. These registers are shown in register block 612, but could alternatively be regarded as part of the control logic 610.

This block includes a flip-flop 2720, a state machine 2740, a multiplexer 2710, and the WCS data register 2730 (which is a shift register).

Register Block 612

A large number of useful registers are shown collectively as register block 612. The functions and signals included in this block will now be discussed.

Control Register Bits

The host uses the control register to control the basic operations of the subsystem hardware. These mainly include hardware reset functions and clock control. The control bits are:

- CP sequencer reset: This bit when set forces the CP sequencer 210 to jump to address 0, and resets the internal sequencer state.
- DTP sequencer reset: This bit when set forces the DTP sequencer 310 to jump to address 0 and resets the internal sequencer state.
- DTP reset: This bit when cleared places the DTP in a safe state, so that all the buses are tristated. The main use of this is when loading microcode to prevent bus contention on illegal microcode instructions.
- CP reset: This bit when cleared places the CP in a safe state, so that all the buses are tristated. The main use of this is when loading microcode to prevent bus contention on illegal microcode instructions.
- FP reset: This bit when cleared places the FP in a safe state, so that all the buses are tristated. The main use of this is when loading microcode to prevent bus contention on illegal microcode instructions.
- VME FIFO reset: This bit when cleared sets the VME data FIFOs to the empty state.
- Data Pipe FIFO reset: This bit when cleared sets the Data Pipe FIFOs to the empty state.
- GIP FIFO reset: This bit when cleared sets the GIP interface FIFOs to the empty state, and initializes the GIP interface.
- Free run clocks: This bit controls the CP and DTP microcode clocks, and either allows them to free run or stops them. When the clocks are stopped they can be single stepped by the host.
- Disable Clocks: This bit disables all the microcode clocks for the CP and DTP except the clock to the pipeline registers. This is necessary to allow the microcode to be read or written without disturbing the state of the CP or DTP, for example when setting breakpoints.
- Free run FP clocks: This bit controls the FP microcode clocks and either allows them to free run or stop.
- Fifo access: This bit controls the access to the VME data FIFO. The normal option is to let the internal DMA controller have exclusive access and control rights but for diagnostics or in a VME slave only environment the host can take control of these FIFOs by setting this bit.
- Microcode loop: This bit is only used by the diagnostics to cause a test to repeat itself at the microcode level.

Strobe Buffer

The host uses the strobe buffer to control aspects of the subsystem that are edge or pulse related. If the strobe buffer is written to, then for every bit that is set a corresponding strobe line will be pulsed. This automatic strobing relieves the host from having to toggle a strobe line by first setting it and then clearing it. This action is used in the write mode only; if the host reads this buffer, it will receive some alternative status information back.

The strobe lines are:

- Single Step: This will single step the CP and DTP microcode clocks through one cycle. This is used when hardware single stepping and loading reading or modifying the WCS.
- FP pipeline clock: The FP pipeline clock signal is only used as part of the serial microcode loop control when reading back the contents of the FP's WCS. The run time pipeline clock in the FP is the same as the normal FP microcode clock.
- CP WCS write enable: This signal causes the CP's WCS 220 to be written with the data previously loaded into the serial loop at the address specified in the CP microaddress register. This is qualified by the load WCS mask for the parts of the CP WCS that lie on the FP modules. A similar signal is used for write enable of the DTP WCS 320.

FP WCS write enable: This signal causes the FP's WCS 470 to be written with the data previously loaded into the serial loop at the address specified in the CP microaddress resister. Note that the CP microaddress register is used. The writing into the WCS 470 is qualified by a load-WCS mask, so that only the selected FPs have their WCS updated.

CP debug interrupt: This strobe generates an interrupt in the CP. This is used by the microcode debug monitor to force the CP to return to the debug monitor.

DTP debug interrupt: This strobe generates an interrupt in the DTP. This is used by the microcode debug monitor to force the DTP to return to the debug monitor.

DTP interrupt: This strobe generates an interrupt in the DTP. This is used by the device driver to notify the DTP that a command has been loaded into its command queue.

Status Register

The status register is read only and it is mainly used to allow the host to determine the VME data FIFO's status when the host has access to them.

The status bits are:

VME Output FIFO status: The three status bits that this FIFO produce are full, half full and empty. These status bits are for the FIFO that the host reads from (if its access is enabled).

VME input FIFO status: The three status bits that this FIFO produce are full half full and empty. These status bits are for the FIFO that the host writes to (if its access is enabled).

Here: This status bit allows the host to determine if any FP modules are present. To do this it writes each module's address into the WCS control register 1 and tests this status bit. If there is a module at this address then this status bit will be cleared otherwise it will set.

WCS Control Register

Two registers are used to control the WCS interfaces. The first one controls the reading and writing of the various microcode memories in the CP, DTP and on the FP module. More detail on the function and use of these signals is included in the section on microcode loading.

The control signals in this register are:

Serial loop output enable: This is the most significant bit of a 8 bit field that selects which branch of the parallel paths of the serial loop is to act as the return path. The other 2 bits of the field are in WCS control register 1.

FP WCS output enable: This bit output enables the data out of the FP microcode memory which needs to be enables for normal microcode execution and microcode readback, but disabled when loading microcode.

FP pipeline output enable: In the presently preferred embodiment, the FP WCS 470 is split into two banks for optimal microcode loading (as discussed below). The present signal controls the pipeline registers 476 which interface to the output of these two banks.

FP WCS mode: This controls the serial loop mode and selects between shifting data around the loop and the transfer of data to/from the WCS.

CP and DTP pipeline register output enable: This is only used to disable the microcode instruction and "force" all the bits to go high.

CP WCS output enable: This bit output enables the data out of the CP microcode memory 220 which needs to be enables for normal microcode execution and microcode readback, but disabled when loading microcode. A similar signal controls the DTP WCS320's output enable.

CP WCS mode: This controls the serial loop mode and selects between shifting data around the loop and the transfer of data to/from the WCS.

DTP WCS mode: This controls the serial loop mode and selects between shifting data around the loop and the transfer of data to/from the WCS.

CP microaddress select: This forces the CP's sequencer to tristate its address bus and enables the CP microaddress register to drive the bus instead.

DTP microaddress select: This forces the DTP's sequencer to tristate its address bus and enables the CP microaddress register to drive the bus instead.

FP microaddress select: This forces the CP microaddress bus to be used as the address source for the FP's WCS. Normally the CP microaddress select has been set up so that the host is supplying the microcode address to the CP and hence the FP.

FP WCS select: The FP WCS must be treated as two halves when reading because of the data routing imposed by the parallel load feature. This bit selects the lower 64 bits or the upper 40 bits.

Serial Loop Return Source (2): The serial loop return path can be selected from one of 4 sources. (It must be set up to select that source when the WCS contents are read via the serial loop.) The possible sources include: CP internal (on the base board only); CP external (on the base board and the FP module); DTP; and FP.

Serial loop Mode (2): These bits control how the serial loop behave when data is written or read from the WCS data register. The options are: Hold data; Shift data; Pulse data The effect of these are discussed in the serial microcode load section.

The other register holds the fields to control the loading and reading of microcode on the FP modules. The two fields to control this are:

WCS load mask: Each bit of the mask enables the loading of microcode into the corresponding module. Any number of bits can be set so any like modules can be loaded with the same microcode in parallel.

Serial Loop Output Enable: These are the remaining two bits that together with the third bit in WCS control register 0 select which one of the modules drives the CP external return path and the FP return path of the serial loop.

WCS Data Register

The WCS data register is the register the host roads and writes to access the serial loop and hence the microcode memories. In order to make the microcode loading more efficient this register behaves in different ways depending on how the serial loop mode field in the WCS control register 0 is set up.

If the serial loop mode is set to "hold" then this register is read and written like any other register.

If the serial loop mode is set to "shift" then after every read or write operation to the WCS data register the register is shifted 16 places which inserts the written data into the serial loop and loads the "last" word in the loop into the data register.

If the serial loop mode is set to "pulse" then the register is read and written like any other register, but after the write operation some control signals are automatically generated to control the serial loop.

CP Microaddress Register

This register holds the data which is to be driven onto the CP microcode address bus 211B by the microcode load control logic 610 during microcode loading of the CP or FP modules. If the CP microaddress select bit is set in the WCS control register 0, then reading this register will return the last data written to it; otherwise an asynchronous snap shot of the address the CP's sequencer is outputting is returned.

DTP Microaddress Register

This register holds the data which is to be driven onto the DTP microcode address bus 311B by the microcode load control logic 610 during microcode loading of the DTP modules. If the DTP microaddress select bit is set in the WCS control register 0, then reading this register will return the last data written to it; otherwise an asynchronous snap shot of the address the DTP's sequencer is outputting is returned.

Data Pipe Interface Logic 150

The data pipe concept provides a means for a number of separate accelerator subsystems to be connected in a wide variety of topologies. This connection is done using multiple local busses which are referred to as "data pipes." This connection is independent of the backplane, and can be done over a reasonable distance.

In the presently preferred embodiment, each data pipe local bus supports 32 bit wide transfers at 40 Mbytes per second, and is FIFO buffered at the receiving end. Each subsystem contains two input pipes and one output pipe. The output pipe has separate clocks, so when it is daisy chained to 2 input pipes the data can be routed to each input pipe individually or together.

Figure 7:
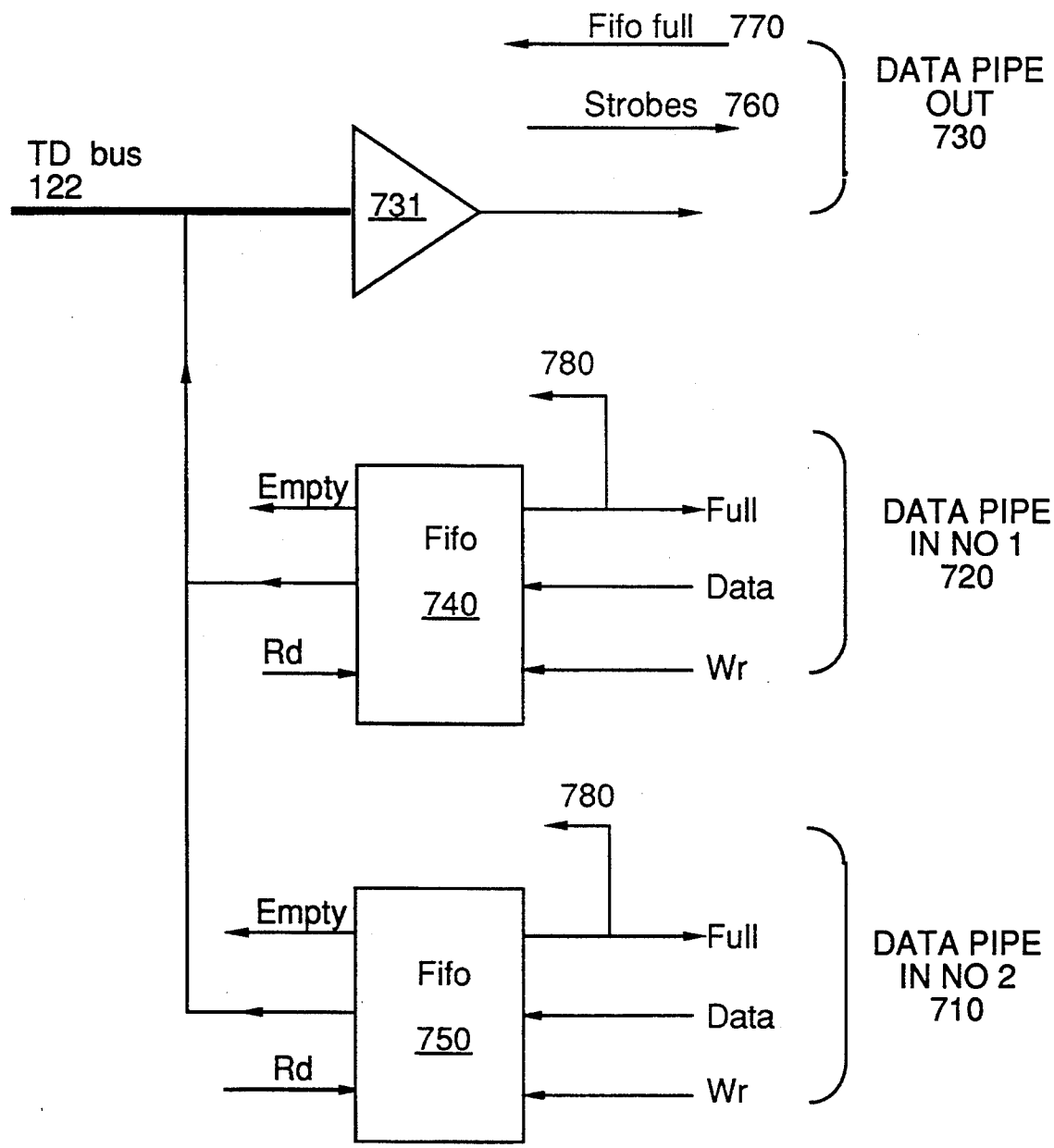
FIG. 7 generally shows the organization of some key parts of the Data Pipe Interface Logic, in the presently preferred embodiment.

The data pipe interface 150 is shown in FIG. 7. The data pipe output port 730 is 32 bits wide. This port can be connected to the input port (710 or 720) of the data pipe interface on another accelerator board 4140 (or to a data pipe interface on another device of some other type). The receiving end of a data pipe is FIFO buffered (using FIFOs 740 and 750), so the output 731 just electrically buffers, the data Two strobes 760 are provided, so that one data pipe interface can write to two other subsystem. To prevent data overrun in the receiving subsystem, the FIFO full flags 770 from the receiving system are available to the sending subsystem for monitoring. Two input FIFOs 740 and 750 are provided for the two input ports 710 and 720, so two subsystems can send data to the one receiving subsystem.

The FIFO output enables are controlled by the TD source field in the DTP microcode, and the output strobes are controlled by the TD destination field. The input FIFO's status signals 780 can be tested by the condition code logic, or can generate an interrupt.

Using this interface structure, multiple subsystems can be linked by local busses in a wide variety of topologies. This ability to do flexible subsystem reconfiguration is particularly advantageous in combination with subsystems as shown in FIG. 1, since an application-customized macroscopic data transfer architecture can be very advantageous for many applications. Some examples of the topologies are shown in FIGS. 34, 35, 36, and 37.

Figure 36:
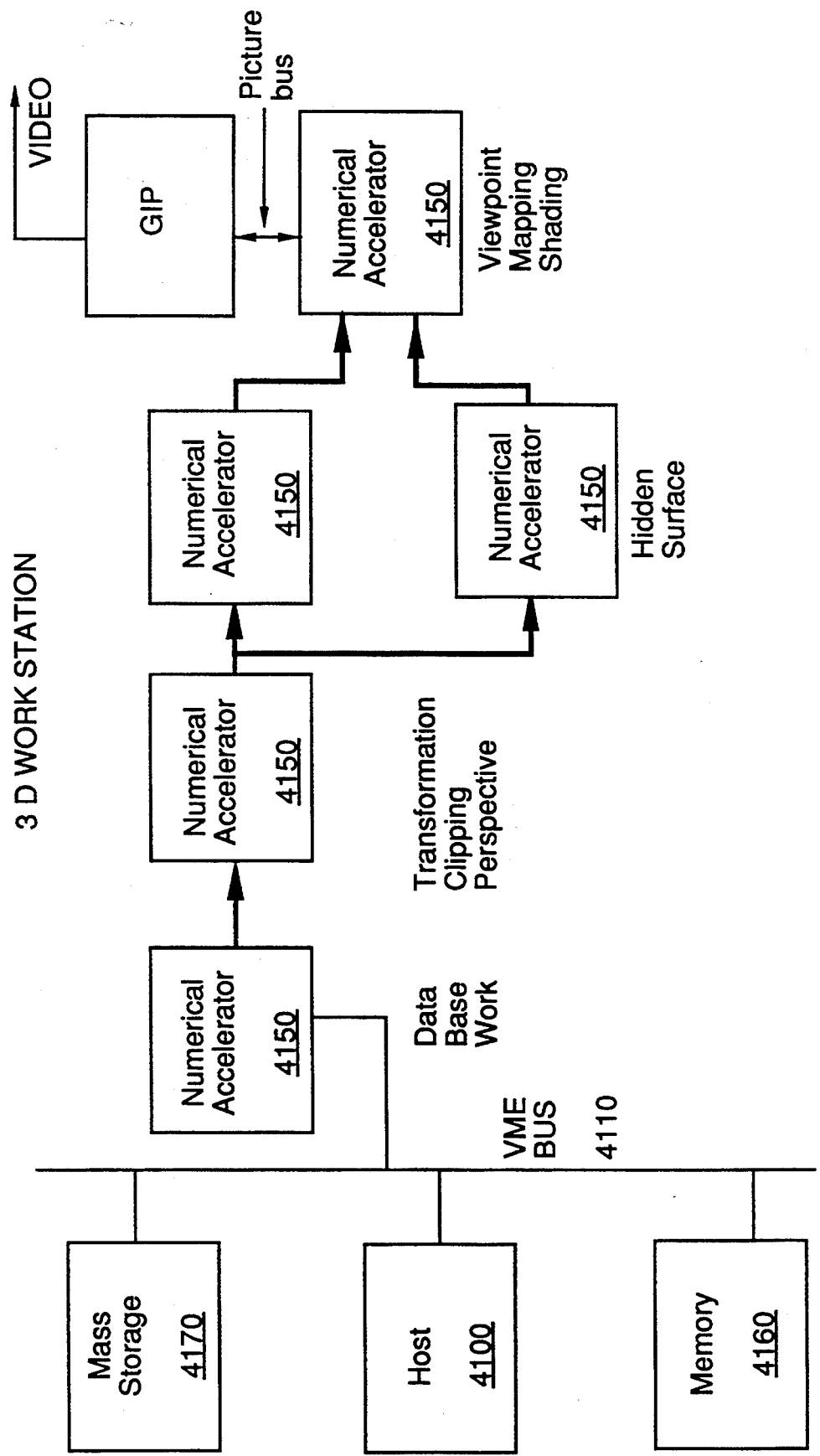

Some algorithms or applications can benefit from a parallel or pipelined arrangement of multiple subsystems, to distribute the calculation workload. For example, one example of a high performance 3D graphics workstation configuration is shown in FIG. 36.

Figure 37:
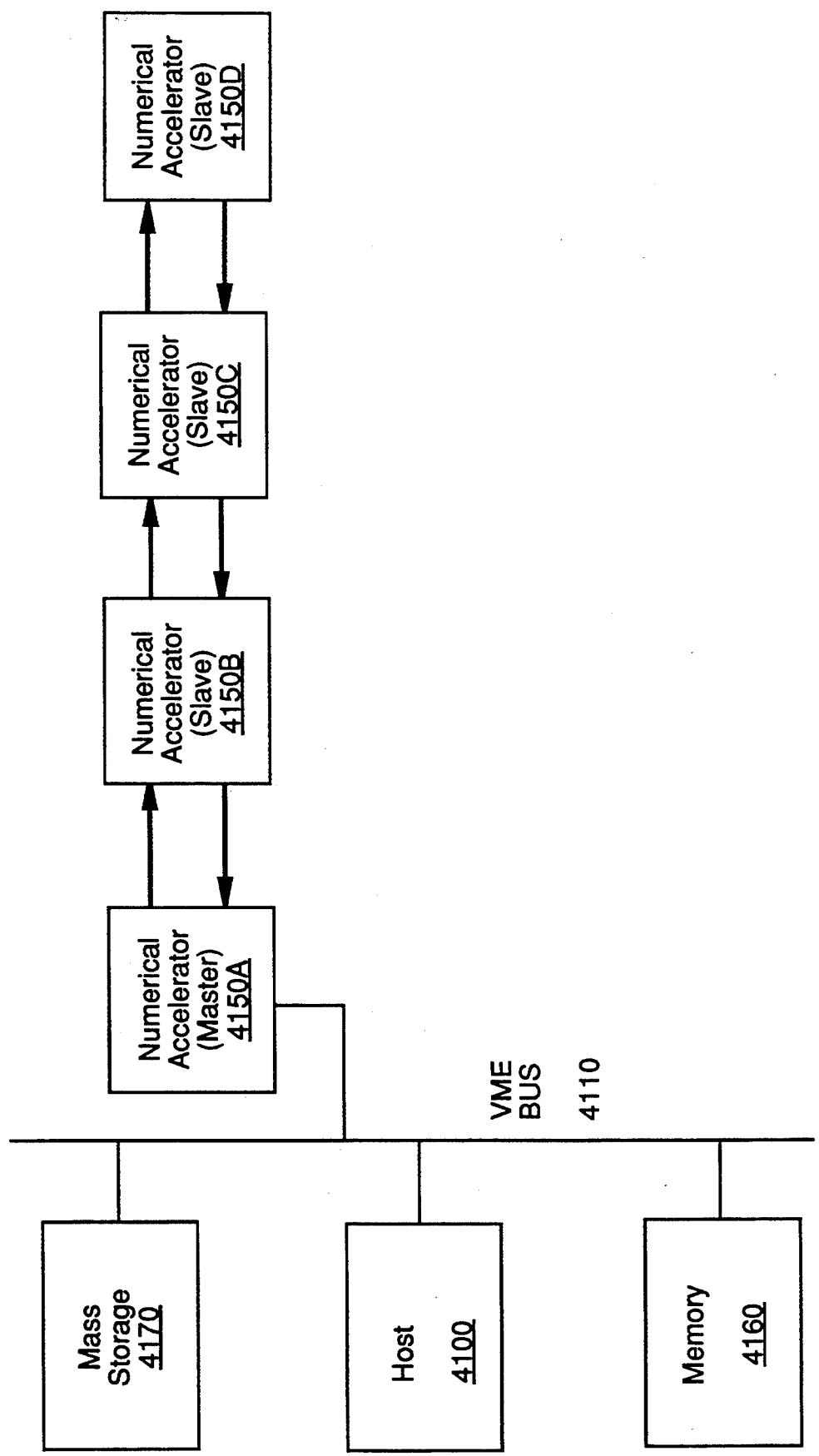

A straight daisy chain of several subsystems (as shown in FIG. 37) can be used to share data, where the "master" subsystem 4150A acquires the data from the host memory, for example, and shares it with all the other subsystems 4150B, 4150C, 4150D via the data pipe connections. This will save on the host bus 4110 bandwidth, because only one subsystem will be fetching the data rather that each one getting its own copy.

The data pipes could be connected into a ring (FIG. 35) to effectively form a token passing network similar in concept to the Cambridge Ring.

The contents and meaning of the data sent on the data pipes is under software control, but would normally be message packets.

The data pipes were designed for inter-subsystem communication, but they can connect to other peripherals. While the sustained I/O rate is 40 Mbytes per second, the burst input rate is much higher. The burst input rate is limited by the electrical aspects of the cabling, but can be as high as 160 Mbytes per second for one data pipe input (or, when both inputs are paralleled, up to 320 Mbytes per second with suitable buffer cards.)

It should be recognized that a key advantage of this interface capability is the wide variety of subsystem interconnect topologies which can be used. Therefore, it is particularly important to recognize that the sample configurations shown are merely illustrative of the great flexibility which is provided.

Picture Processor Interface 170

This interface allows connection to an application-customized bus. In the presently preferred embodiment, this bus connects to a picture processor, which is particularly optimized for graphics and image data In the presently preferred embodiment, this picture bus is a "GIP bus," which has 160 data lines and runs at a data clock period of 120-200 ns. (This interface logic is therefore referred to, in numerous places in the present application, as the "GIP interface".) However, other picture data bus standards could (less preferably) be used instead. Alternatively, other application-customized busses could be used, for applications having special data-transfer requirements (such as seismic work, or real-time systems).

Figure 8:
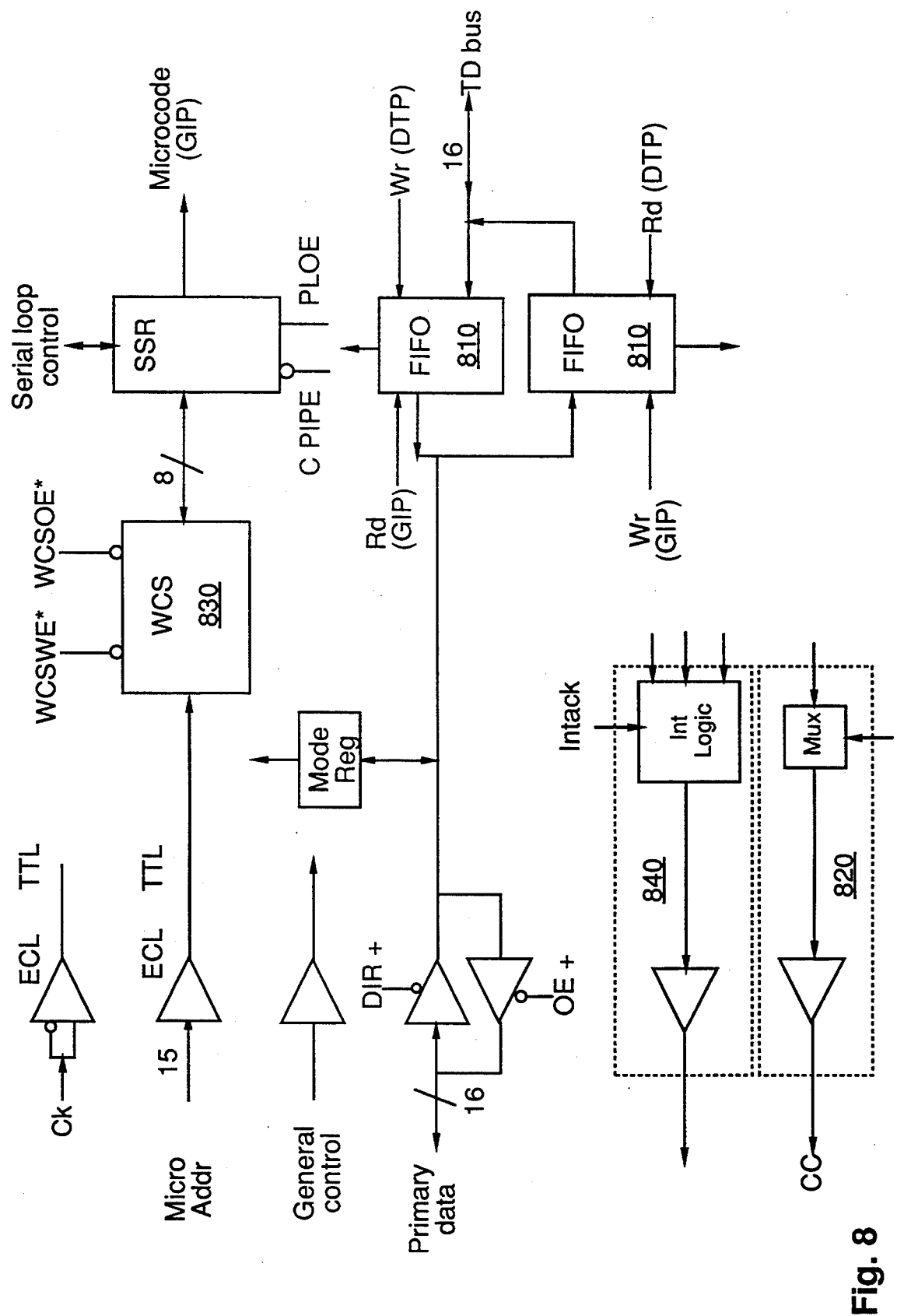
FIG. 8 generally shows the organization of some key parts of the GIP Interface Logic, in the presently preferred embodiment.

The GIP interface allows the GIP and subsystem to pass data and commands to each other. The interface is shown in the block-diagram in FIG. 8.

All communication between the GIP and the subsystem pass through a 16 bit wide bidirectional FIFO 810. One side of the FIFO is controlled by the DTP microcode, and the other by the GIP microcode. The GIP interface includes a microcode expansion port interface, so the GIP actually runs microcode (8 bits) that is resident on the subsystem. The GIP microcode expansion bus is identical to the DTP microcode expansion interface described earlier.

The GIP interface provides the services necessary for the GIP graphics processors to run some distributed microcode in the sub-system These services include the GIP microcode clocks, the GIP microcode address and data bus, interrupt and status signals and a means for serially loading the extension GIP microcode.

The principal components in the GIP interface are the WCS 830, the bidirectional FIFO 810 (constructed out of unidirectional FIFOs), the status logic 820 and interrupt logic 840.

The resident GIP microcode allow the GIP to perform the following functions:
  Read or write data from the FIFO 810.
  Test the FIFO status signals via the status logic 820 and drive the result out on the open collector condition code interface signal.
  Set up the conditions that will cause the GIP to be interrupted (for example, the FIFO becoming full or empty) by the interrupt logic 840.
  Generate an interrupt in the DTP From the DTP side, the FIFO looks like any of the other FIFOs except it is 16 bits wide rather than 32 bits wide.

All the details on the format the communication take, and on whether the accelerator subsystem or the GIP is the master device, are totally decided by the microcode running in the two processors. In the 3D workstation environment, as shown in FIG. 36, the preferred hierarchy would be the host as master, the graphics subsystem the slave, and the numeric accelerator subsystem in the middle.

Serial Loop Interface

One advantageous part of the concurrent multiprocessor system shown in FIG. 1 (and elsewhere) is a serial loop interface to the writable control stores (WCSs) of the three or more processors present. The topology of this loop, in the presently preferred embodiment, is shown in FIG. 28. (The line shown as 225 in FIGS. 2A, 3A, 4C, and 6 is broken out, in FIG. 28, to show one output line 225A and four return lines 225B, 225C, 225D, and 225E.)

The implementation of the interface to the serial loop has been described above with respect to the various processors individually, and in connection with the VME interface 160. However, some of these features will now be reviewed again, so that the higher-level architecture of the serial loop can be explained more clearly.

Loop Interface to Control Stores

The serial loop interface provides data access from the host to all of the control stores. To maximize the net bandwidth of this loop, each separate WCS (including the WCS extensions 490) interfaces to the serial loop through a bank of serial/parallel shadow registers.

The shadow registers which interface to FP WCS 470 are shown as registers 481A and 481B in FIG. 29 and in FIG. 4C. The shadow registers which interface to CP WCS 220 are shown as registers 222 and 223 in FIG. 2A. The shadow registers which interface to DTP WCS 320 are shown as registers 322 and 323 in FIG. 3A. The registers which interface to the CP WCS Extension 490 are shown generally as part of the CP extension logic in FIG. 4A, but are not shown separately.

Each of these registers can load the instructions into its respective control store, or clock the instruction stream incrementally, or simply clock the instruction stream along as fast as possible. Thus, the bandwidth of this line is used efficiently, and only a minimal number of instructions is required to access control storage for a given processor.

Loop Control

In the presently preferred embodiment, some additional capability is provided for control and routing of the serial loop, to provide adaptation to the wide range of configuration and expansion options.

In the presently preferred embodiment, each subsystem can have up to 6 microcoded processors (one control processor, one data-transfer processor, and as many as four floating-point processors or algorithm accelerators). Each of these processors has its own WCS. Each WCS must be written to, to load up microcode, and be read from, for diagnostics, setting breakpoints, etc.

The main features which help provide this capability include:
  A return multiplexer: This collects the serial loop from two internal sources (the control processor and data-transfer processor), and from the two external "return buses" (for the microcode of the control processor extensions, and of the multiple floating-point processors).
  The return serial buses which collects the serial loops from the floating-point processor modules where the control processor and floating-point processor microcode reside. A return loop address selects which module drives the serial return buses.
  Each floating-point processor module has a microcode load enable bit so that any combination of modules can be loaded simultaneously.
  The data-transfer processor serial loop expansion is controlled by jumpers and wire links.

With this organization, the protocols to transfer data around the serial loop and backload into the WCS are quite complicated. Such protocols would normally be done in software. In the presently preferred embodiment, the time consuming parts of these protocols have been implemented in hardware, which significantly speeds up the downloading of microcode. As an added benefit, the software overhead has also been reduced.

In the presently preferred embodiment, the host writes (or reads) the microcode, a word at a time, to the data register. (The data register, in this embodiment, is constructed from two universal shift registers. The remainder of the serial loop uses serial shadow registers, such as the Am29818 made by AMD.) Depending on the serial mode previously selected, one of three things happens:
  If the "hold" mode has been selected, then the data transfer behaves just like any transfer to memory.
  If the "hold" mode has been selected, then immediately after the read or write cycle ends the data is data is shifted into (or out of) the serial loop. While this is happening a busy signal delays further access by the host to the data register.
  If the "pulse" mode is selected, then about 500 ns after the write access the serial data clock is pulsed, to set the shadow register into the required mode.

Loop Topology

FIG. 28 shows the large-scale connections of the serial loop.

A single output line 225A is driven by the microcode load logic 610 in the VME interface 160. (Alternatively, this does not have to be only a single physical line, but could be a bus instead, e.g. a four-bit-wide bus.) This line is applied to each of the shadow registers at the periphery of each of the three writable control stores 220, 320, and 470. (Note that the CP WCS extension 490 is not directly connected to the output line 225A, but instead is connected to line 225C, downstream of the primary WCS 220.)

Four return lines are provided, which can be selected by multiplexer 2710. These return lines are primarily useful for debugging.

Note that there is very little "snaking". That is, there are only two cases where the serial output of the serial shadow registers on one WCS is used as input into the interface of another WCS. In each of these cases the WCS which is downstream in the serial loop is effectively an extension of the upstream WCS. That is, series connections of independent processors in the serial loop are generally avoided. The benefit of this is that the independent microcode programs for different processor modules do not have to be merged together. This helps programmers to take full advantage of the advantageous partition of algorithms discussed above. This also helps to provide faster loading. This also helps to avoid any problem with merging programs which are targeted for WCSs with different widths and/or depths.

An advantage of the parallelism in the loop topology is that parallel loads can easily be accomplished. For example, if a common sequence of microcode is sought to be loaded into each of the FP modules 130, all of the shadow registers on all of the FP modules can be enabled simultaneously, and each will be loaded in accordance with the serial data on line 225A and the microaddresses on bus 211B.

As may be seen from FIG. 28, the loop topology includes multiple parallel branches:

CP branch: Output line 225 is provided as input to the shadow register interface at CP primary WCS 220. The return from the shadow register interface to CP WCS 220 (line 225C) is fed back into multiplexer 2710.
 CP Extension subbranch: Downstream of the interface to CP WCS 220, return line 225C is also provided as input to the shadow register interfaces at all of the CP WCS Extensions 490. The returns from the shadow register interfaces to the WCS extensions 490 are all connected to return line 225D, and thereby fed back into multiplexer 2710. (Since the returns are connected in parallel, the serial output commands are preferably qualified by an individual module address, to prevent contention on the return line 225D.)

DTP Branch: Output line 225 is also connected to provide a serial input to the shadow register interface at DTP WCS 320. The return from the shadow register interface to WCS 320 (line 225B) is fed back into multiplexer 2710.
 DTP Extension subbranch: Downstream of the interface to DTP WCS 320, return line 225B is also made available as an off-board output. This connection can be exploited by users, if desired, to provide DTP extension logic. The operation of such logic is discussed in greater detail below.

FP Branch: Output line 225 is also available as a serial input to the shadow register interface at the WCS 470 on each of the numeric processor modules 130 or 130'. The returns from the shadow register interfaces are all connected to line 225E, and thereby are fed back into multiplexer 2710. (Since the returns are connected in parallel, the serial output commands are preferably qualified by an individual module address, to prevent contention on the return line 225E.)

Figure 27:
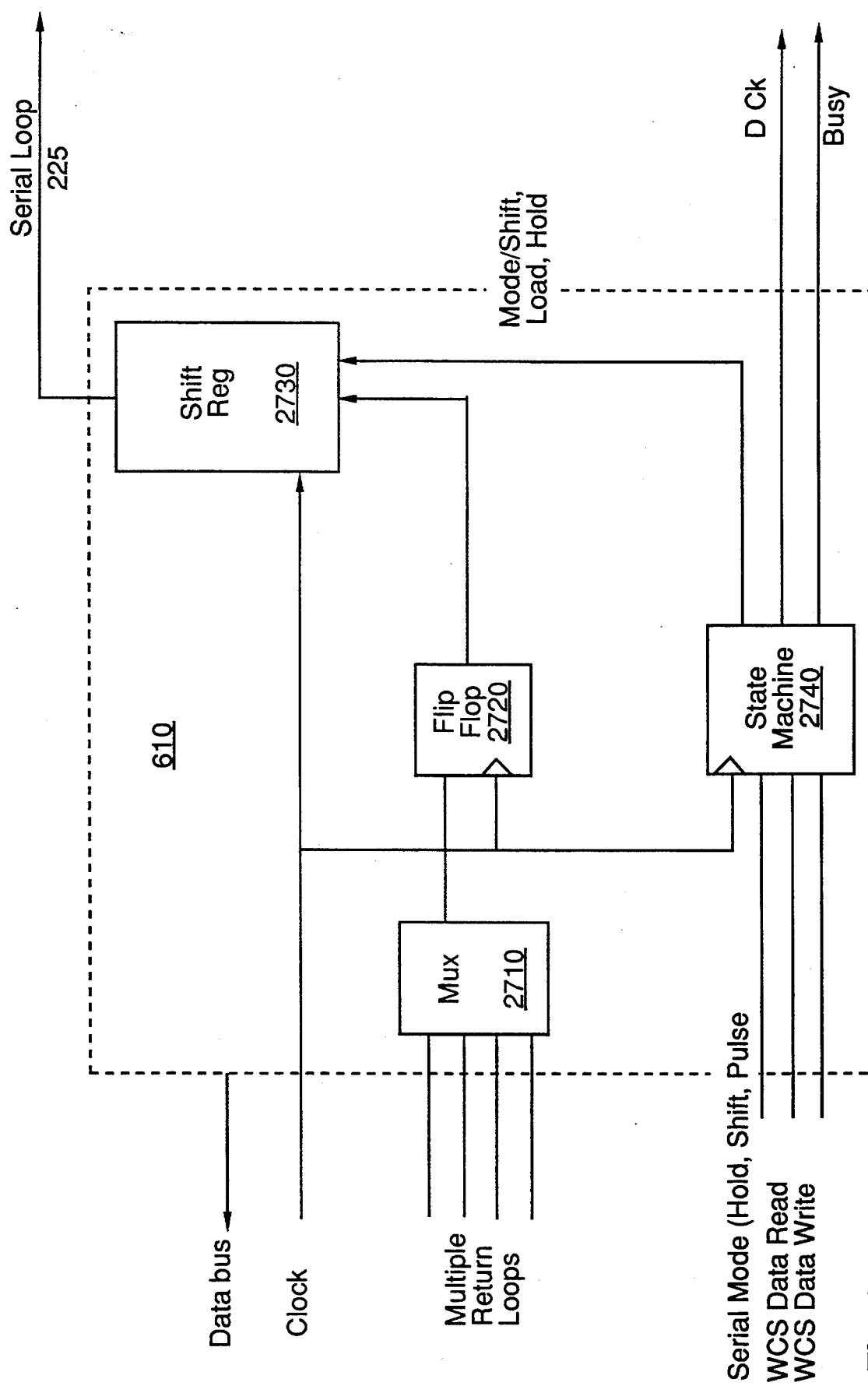
FIG. 27 schematically shows the hardware configuration used, in the presently preferred embodiment, to permit efficient control of microcode transfer and loading in a serial loop which interfaces to the writable control storage of several devices.
Figure 28:
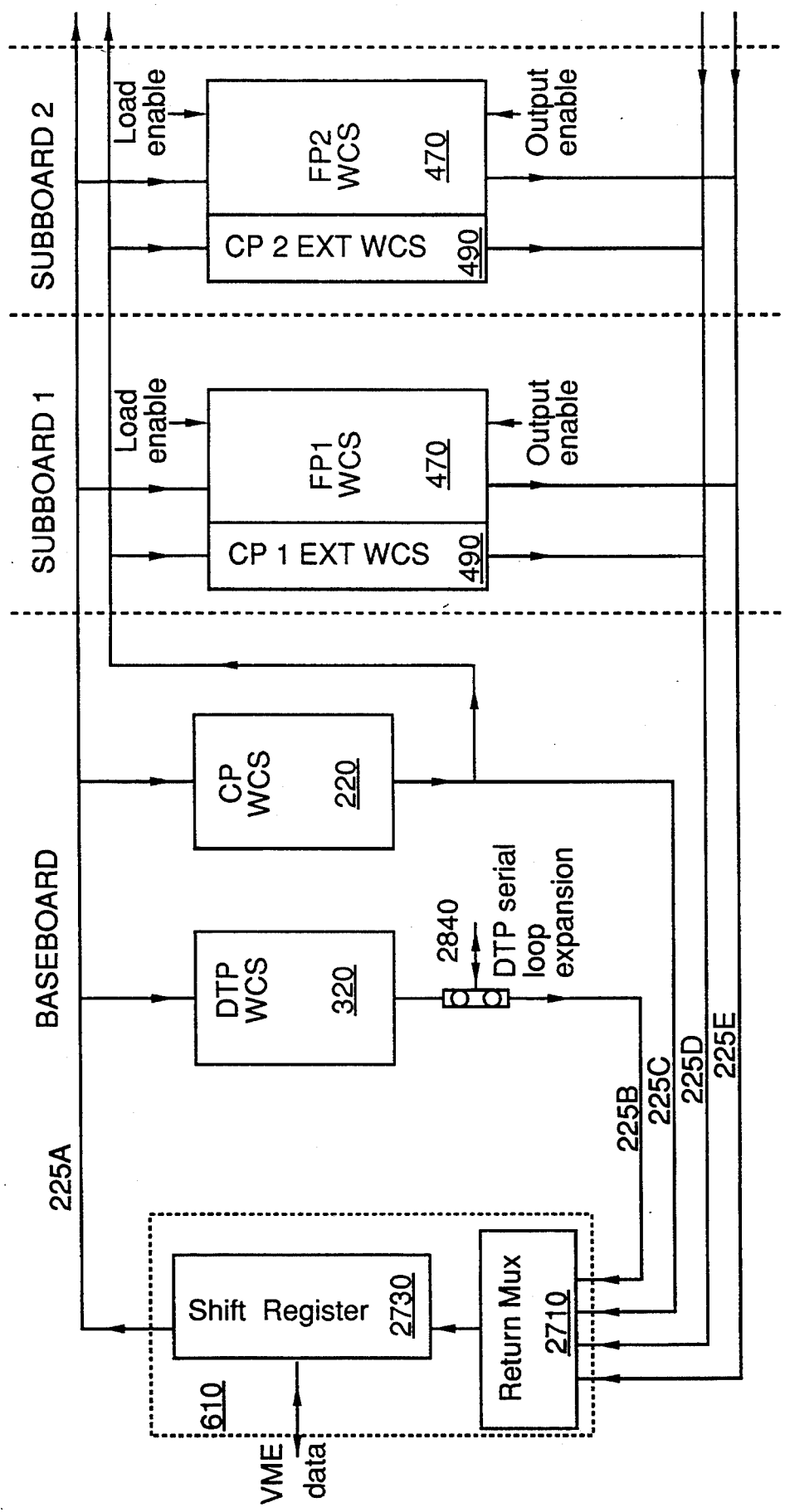
FIG. 28 schematically shows the serial loop configuration used, in the presently preferred embodiment, to permit microcode loading to any one of several processors, or to some groups of processors.

FIG. 27 shows greater detail of the components of microcode loading control logic 610. One important component is the flip flop 2720, which resynchronizes the return serial data. When the WCS is distributed, controlling the clock skew between the shift register clock and the shadow registers' D clocks can be very difficult, because of the many different serial loop configurations. The inclusion of this flip flop takes care of any clock skew (as long as the skew doesn't exceed the basic clock period that drives the controlling logic). State machine 2740 provides D clock outputs, in response to decoded signals from the host.

Loop Interface to Host

As discussed above with regard to FIGS. 6 and 27, the microcode loading control logic 610 can read and write data onto the serial loop 225. It can also write and read to the CP and DTP microaddress busses 211B and 311B.

DTP Microcode Expansion Loop

The presently preferred embodiment also provides the capability to configure a second serial interface loop, extending off-board. The connection to this loop is shown as 2840 in FIG. 28.

Optionally, the DTP module 120 can be extended off-board, by building DTP WCS extensions, somewhat analogous to the CP WCS extension 490, into additional components. These WCS extensions provide microinstruction outputs as selected by the DTP microaddress bus 311B. The control of these DTP extensions is preferably somewhat looser than that of the CP Extension Logic, since the DTP extensions may be used in a somewhat wider range of environments. It is contemplated that the DTP extension logic may be useful for interface to closely-coupled high-speed I/O devices.

If this expansion option is used, the DTP extensions (if any are used) are all in series with the DTP itself. This prevents contention.

Parallel Microcode Loading

As noted above, the presently preferred embodiment provides two methods of loading microcode into the floating-point processor: either via a serial loop under control of the host, or in parallel under control of the control processor. The parallel loading of microcode is useful because the amount of writable control storage ("WCS") available on the floating-point processor is limited (4K or 16K instructions). When there are too many floating-point processor routines to fit in WCS at once, some form of overlaying is necessary. Using the serial loop to load overlays is not practical, since the host can load instructions only slowly (e.g. 100 microsecond to 3 ms per instruction, depending on disk accesses).

The parallel load capability provided by the presently preferred embodiment makes use of the very wide data cache memory to hold the entire microcode instruction (currently 104 bits), and transfer it to the floating-point processor write holding registers in one cycle. This is then transferred into the diagnostic shift registers (e.g. AMD 29818), used for the serial loading, by way of the normal output port. These devices come with an output port (which can also be used as an input port if desired) for pipelining of microcode bits. However, in the presently preferred embodiment, this capability is not used, because it is too slow. (Many of the chips register the microcode bits internally anyway.) This means that the parallel load route just described can make use of this capability of the serial parallel registers, and does not impose any penalty in speed or functionality. The parallel load time is about 500 ns per instruction, which is a significant improvement over the serial load time.

Another significant point is that the overlaying of microcode in the floating-point processor can be controlled entirely by the control processor, without requiring any supervision by the host. Alternatively, if the microcode overlay is not already present in the data cache memory, the control processor can instruct the data-transfer processor to go out to the host memory and fetch it from there.

In the presently preferred embodiment, each subsystem can have up to 6 microcoded processors (one control processor, one data-transfer processor, and as many as four floating-point processors or algorithm accelerators). Each of these processors has its own WCS. Each WCS must be written to, to load up microcode, and be read from, for diagnostics, setting breakpoints, etc.

Modular Expansion Options

As discussed in several places above, there are a number of options for modular expansion of the system shown in FIG. 1. Some of these options will now be summarized, for convenience.

Two types of modules can be connected to the cache bus 144:
- The arithmetic processing type, as typified by the floating-point processor module 130, or an algorithm or application accelerator unit 130'.
- A High Speed Data (HSD) module, typically used to expand the data cache memory or to add a high speed I/O channel. This method of expanding the memory is very different from the use of a bulk memory subsystem which interfaces to the accelerator subsystem via the DTP microcode expansion bus 2824. The HSD method will support the same bandwidth as the data cache memory 140, but may not have as much capacity as the bulk memory subsystem.

The multi-module configuration allows for up to 4 floating-point processor module 130 type modules and 2 HSD modules. These figures have been chosen for mechanical and electrical reasons rather than any limiting architectural reason.

The FP 130 modules are selected by the module select bits. These are normally under control of the control processor module 110, but the VME interface can override them. This would only be used for downloading microcode or during debugging. The module select bits control every aspect of a module's operation except for resetting (which is controlled by the reset signal).

The HSD module is selected decoding the data cache address bus.

Module Connections

The connections to the modules are summarized below. The list groups the connections into logical area and identifies which of the two types of module would use them.

The connections are made via six 96 way DIN connectors. FIGS. 40A and 40B show the physical connection configuration of the presently preferred embodiment.

In the presently preferred embodiment, the module connections include:
- for Data cache transfers: 256 bits of data, 23 bits of DCM address, 8 Write enables, a Holding Register OE bit, a delayed access signal (to extend clock cycles, e.g. accommodate slow memories), and a Holding Register CK bit;
- for CP interface: 3 bits of CP address, 16 bits of data, 16 bits of CP sequencer address, the CP microcode clock, the CP pipeline clock, and the CP write gate clock, one interrupt line, and one Condition Code;
- for microcode loading: separate lines for CP WCS output enable, CP Pipeline output enable, CP WCS write enable, CP Mode, CP serial data out, CP serial data in, FP WCS output enable, FP Pipeline output enable, FP Pipeline clock, FP WCS write enable, FP Mode, FP microaddress select, FP upper/lower WCS select, FP serial data out, FP Serial in, as well as a six bit Serial clock/WCS Load Mask signal; and a 3 bit Serial Loop return select;
- generally useful: 3 bits of Module select, and control signals for Reset, Single step, Free run, FP Breakpoint, Microcode Loop, FP Reset, CP Reset, Here;
- DC lines: 21 lines for +5 Volts, 6 lines for −5 Volts, and 161 Ground lines.

Every module type has access to all the signals.

Multiple Numeric Processing Modules

As shown in FIG. 10, one very useful class of embodiments uses multiple numeric processing modules 130. In this embodiment, all of the modules 130 are under high-level supervision by a control processor module 110. The CP module 110 not only performs high-level supervisory tasks, but also directly controls all data transfers to and from the numeric processor modules 130. All of the numeric processor modules are connected in parallel to a cache bus 144. Each of the numeric processor modules 130 includes a CP Extension Logic 410, as described above. Data-transfer processor module 120 manages data transfers between the cache 140 and the outside world, as discussed above.

The very high memory bandwidth between the data cache memory 140 and the numeric processor modules 130 or 130' will, in many cases, allow a number of modules to be working in parallel without suffering data starvation.

The number of numeric processor modules that can operate usefully depends very much on the application or algorithm mix. In the presently preferred embodiment, this has been limited to four. This limitation has been imposed primarily for electrical and mechanical reasons. However, once all the memory bandwidth has been used, there is no advantage in increasing the number of floating-point processor modules.

Since the numeric processors run autonomously, the module interface doesn't have to include any protocols for floating-point processor to floating-point processor synchronization or data exchange. This keeps the interfaces very simple, as it removes the need for arbitration.

Preferably an instruction write bus is shared by the numeric and/or application-customized processors. Preferably the most significant address bits are decided according to logic such that any one of the numeric and/or application-customized processors can be addressed individually, all of these processors can be addressed together, or some (but not all) groups of these processors can be addressed together.

That is, the control of multiple floating-point processors needs to take into account the fact that an algorithm might run on any one of the floating-point processors present, or parts of it might run on some or all of the floating-point processors present. This may require defining a long term or short term control relationship between the control processor and the floating-point processor. The control processor can select on a cycle by cycle basis which floating-point processor to control or transfer data between, or for a longer term relationship this can be defined more globally.

In the presently preferred embodiment, this is achieved by using a microcode bit that selects on a per cycle basis the control mechanism which defines which floating-point processor to use. The control mechanism can be either the use of other microcode bits, or the use of the contents of a register (which would have been preloaded by the microcode). The bits in the microcode instruction field can be used for definition in the short term, i.e. on a per cycle basis, while the register defines the long term usage.

Examples of the use of the two modes might be:

Short term—When doing an FFT with 4 floating-point processors the control processor will spend a few cycles with one floating-point processor, loading the next butterfly's data and collecting the previous butterfly's results, before moving on to the next floating-point processor to deal with another butterfly.

Long term—When doing a vector add the floating-point processor to use is selected before the vector add routine (in the control processor) is called. This means that the control processor doesn't need to know which floating-point processor (or type of floating-point processor) is being used to do the calculations.

FIG. 23 schematically shows how the module addresses are decoded. The actual implementation of this decoding is discussed in connection with the FP module 130, above.

Cache Memory Expansion

As mentioned above, a large mount of expansion memory can be directly attached to the cache bus 144. This is a further advantage of the physical structure and data transfer protocols used. An example of such a structure is shown in FIG. 43.

Physical and Electrical Implementation

Figure 38A:
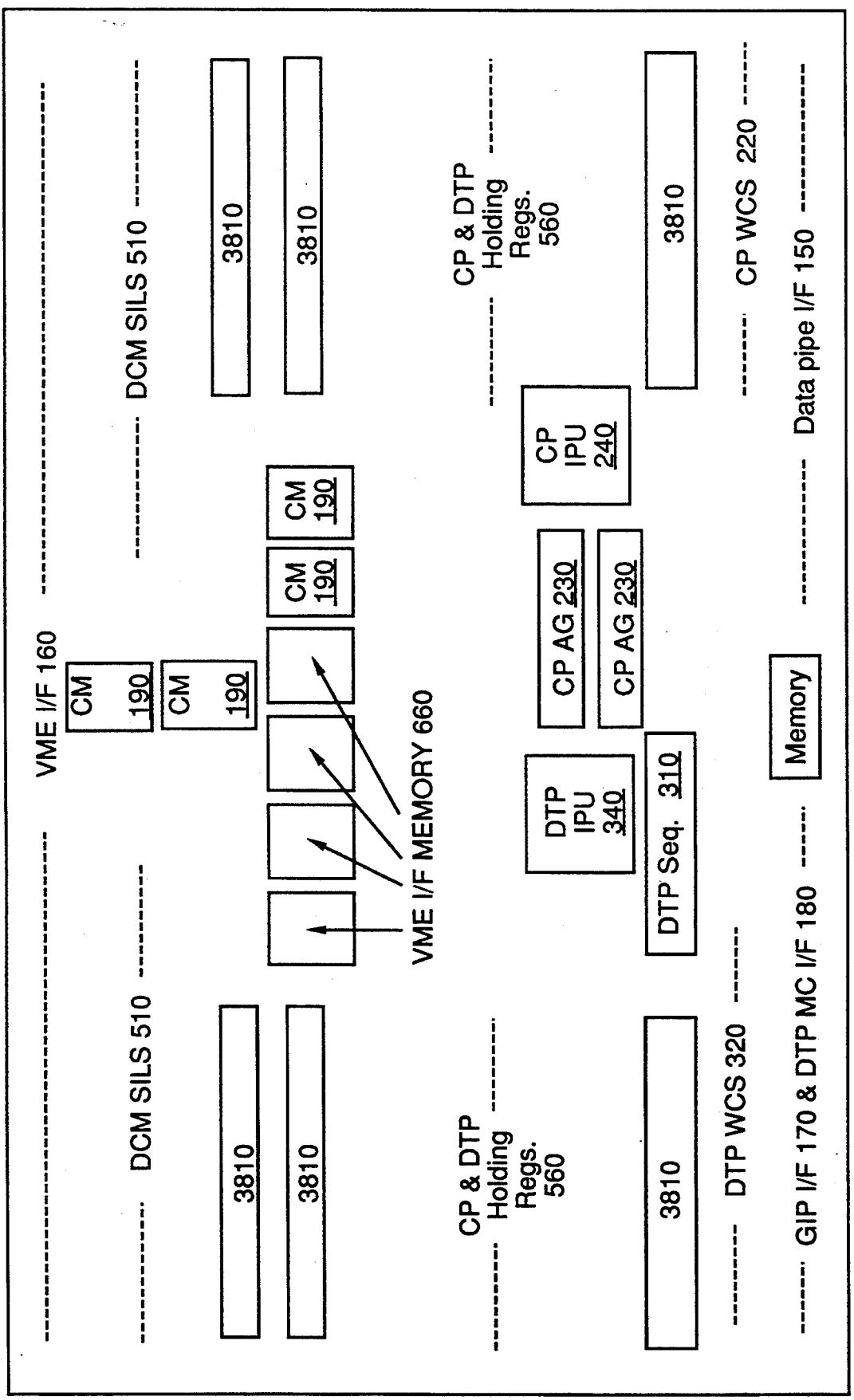
FIG. 38A generally shows the preferred physical layout of the main board, and FIG. 38B generally shows the preferred physical layout of a daughter board which nests onto the board of FIG. 38A. The board of FIG. 38B contains key components of FP module 130. The two boards together provide a complete system like that shown in FIG. 1.
Figure 38B:
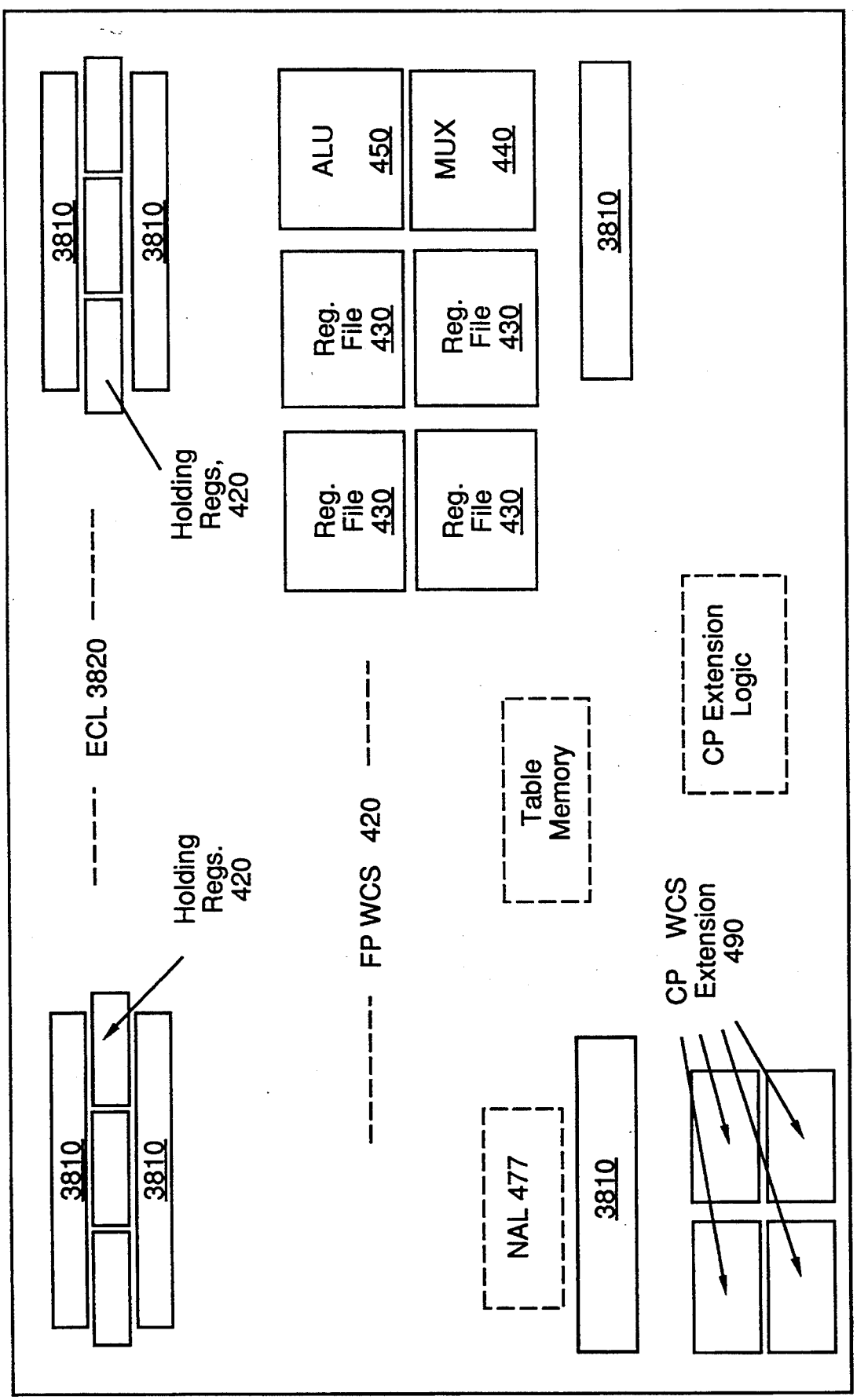

FIGS. 38A and 38B show key features of the physical layout of the presently preferred embodiment. FIG. 38B is a daughter board, which is smaller than the main board of FIG. 38A. FIG. 38B provides the hardware for a floating-point processor module 130 (including the accompanying control processor extension logic). FIG. 38A contains the data transfer processor 120, the primary portion of control processor 110, the data cache memory 140, the command memory 190, and the interfaces 150, 160, 170, and 180. The two boards together provide a complete system like that shown in FIG. 1.

The two boards have an identical pattern of six connectors 3810. Since these connectors are male/female, more boards may be stacked together. For example, the configurations shown in FIG. 9 and FIG. 10 may be achieved by stacking multiple floating-point modules 130 and/or algorithm accelerators 130' together. (However, for future versions, it is contemplated that it my be more advantageous to use a backplane for these connections. This would give a more convenient mechanical configuration.)

The connectors 3810 are preferably each 96 pins wide. Thus, although the full width of the cache bus 144 is routed through these connectors, there are ample pins to spare.

Expansion memory to enlarge the data cache memory 140 my also be stacked up, using this pattern of connectors. As noted above, attaching additional expansion memory on the cache bus 144 provides a relatively large memory space within a very short access delay over a very high bandwidth channel. In the presently preferred embodiment, up to 12 Mbytes can be accessed, within 100 ns, at 240 Mbyte/sec.

FIG. 38A shows the locations of the largest individual components, and shows the general allocation some functions in other areas. The board used in this embodiment is a triple-height Eurocard. The VME interface logic 160 is generally located at the edge of the board, to minimize backplane stub length. (The VME interface specification requires a short stub length.)

The memory banks 510 are generally located near the connectors 3810, at the left and right corners shown at the top of the drawing. The command memory 190 and VME interface memory 660 are also located in this area.

A large portion of the center of the board is taken up with the CP holding registers 560A and the DTP holding registers 560B.

The DTP and CP IPUs 340 and 240, the DTP and CP sequencers 310 and 210, and the CP address generator 230 are all separately shown.

The DTP module's writable control store 320 is generally shown below the connectors 3810 near the bottom left of the drawing, and the CP module's writable control store 220 is generally shown below the connectors 3810 near the bottom right. The GIP interface 170, and the DTP microcode expansion interface 180, are generally shown at the bottom left corner. (This area also contains some DIN connectors, not shown, which provide the physical connection which this logic is available to support.) Similarly, the bottom right corner contains not only the data pipe interface 150, but also its associated connectors.

The daughter board, shown in FIG. 38B, is smaller. (FIGS. 38A and 38B are not drawn to the same scale.)

The holding registers 420 are nested between the connectors 3810, in the areas shown top right and top left. In between these registers is an ECL neighborhood 3820, where ECL parts (which tend to have high power dissipation) are located. (In the presently preferred embodiment, the ECL parts include the transfer clock generator 412, and the FP microcode clock generator 480.) The isolation of these parts also helps to minimize the injection of TTL noise into the quieter ECL parts.

It may be seen that the chips used to construct the Register File 430 are large, as are the ALU 450 and multiplier 440. (In this embodiment, each of these chips is in a pin-grid package.)

The FP module's WCS 470 is generally located in the left middle portion of the Figure. Just below this is the FP module's next-address logic 477. Note that the scratchpad memory 1610, which the FP module's control logic can also use for a stack, is physically close to the next address logic 477.

The CP extension logic, which is used to extend the CP microcode for control of each of the daughter boards 130 or 130'', is largely located at the bottom edge of the board as shown. In particular, the WCS expansion memory 490 is shown at the bottom left.

It is particularly advantageous to separate the floating-point processor module on a separate subboard. (Note also that, if multiple numeric processor modules are used, each processor module 130 is preferably isolated on its own respective subboard.) The numeric processor modules 130 are particularly likely to generate noise, since they include much high-speed logic, and they are also significantly susceptible to noise, since some of their liens and components use ECL levels.

Moreover, note that the holding registers 420, the local transfer bus 422, the register files 430, and the transfer clock 412 are all located on the subboard. This is advantageous, since the highest-frequency lines are all isolated on a common subboard. This is particularly advantageous in embodiments using multiple numeric processor modules, since some degree of isolation among the various patches of very high-speed logic is thereby provided.

PAL Implementation

In the presently preferred embodiment, the following PALs (programmed logic arrays) are used. All of the PALs presently used are TTL. Most are from the 16 and 20 series, but a few others are also used.

However, it will be readily be recognized by those skilled in the art that a wide variety of other implementations could be used instead. The division of functions into hardware blocks be changed, and the hardware implementation for a given group of functions can also be changed. Many of the functions presently embodied in PALs could be implemented using MSI logic parts, or as blocks in an ASIC or semi-custom integrated circuit, or by programming VLSI logic chips. However, this implementation is given in great detail here to provide full disclosure of the presently preferred embodiment, to ensure full compliance with the patent laws of the United States.

CP PALs

Following are brief descriptions of some of the most important PALs used in the control processor module 110.

Clock Waveform Generator PAL 250

This PAL generates the timing waveforms used by the CP and the DTP. As discussed above, four clocks are produced. These each follow one of 4 predefined waveform sequences. The 4 sequences are characterized by different periods, namely 4, 5, 6 and 7 times the input clock period. This translates to 100, 125, 150 and 175 ns, when a 40 MHz oscillator is used, as presently preferred. The microcode clock and the pipeline clock have identical waveforms, but the microcode clock can be disabled, leaving the pipeline clock running, for microcode loading. The microcode clock is always high for 2 cycles (of the oscillator), and then is low for 2, 3, 4 or 5 cycles, as selected by the cycle length inputs. The cycle length is chosen from the maximum requested by the CP (2 bits) and DTP (2 bits). Since the cycle length is driven from a pipeline register (although it might better have been designed to be unregistered), the cycle length is sampled at the last possible moment, to give the maximum time for it to propagate around the loop. This timing is more critical than first appears, because the output clocks are active in the cycle immediately following that in which they are generated.

The write-enable gate signal goes low one cycle after the microcode clock goes high, but returns high 1 cycle before the microcode clock does.

The times-two clock runs at twice the frequency the microcode clock does, and its rising edge occurs at the same time there is a the microcode clock edge.

When the write-enable gate signal is low, an input from the VME interface memory 660 is sampled. If this input shows that the memory is busy, the cycle length will be extended until this input changes. This allows a safety margin of access time for memories whose access time may be slowed by access clash, offboard communication, etc. (The busy signal from the PAL's viewpoint, simply inserts extra cycles when the write gate is low.)

Another input selects whether the clocks free run or are singe stepped.

CD Bus Source PAL

This PAL decodes the CP microcode bits that select which source drives the CD bus 112, and drives the output enable lines of the appropriate device. Whenever any 16 bit source is selected (such as address generator 230), this PAL also outputs a signal to activate the sign-/zero extend PAL 216. When a reset signal is active, no source is selected.

Similar PALs are used to decode the data source field for the TD bus 122. The PAL which selects the TD data bus source also contains logic to gate the FIFO read with their corresponding FIFO empty status signals, to prevent the reading of an empty FIFO (which could cause errors within the FIFO).

CD Bus Destination PAL

This PAL decodes the CP microcode bits that select the destination for the data on the CD bus 112, and drives the read enable line(s) of the appropriate device.

Similar PALs are used to decode the data destination bits for the TD bus 122.

Whenever the source or destination device has chip enable lines which must be driven, (e.g. the memory in VME interface 160, or in command memory 190), the respective chip enable lines are driven.

Sign/Zero Extend PAL 216

This PAL performs a sign or zero extend function, depending on an enable signal and on the high bit of the source data Since the PALs preferably used are only 8 bits wide, a pair of them is used for every sign/zero extend operation. This PAL is used in two places: one pair hangs on the CD bus 112 (shown as block 216 in FIG. 2A), and one pair (shown as block 316 in FIG. 3A) hangs on the TD bus 122.

The bus source logic provides an enable bit to the sign/zero extend logic 216, when a 16-bit source is being accessed.

Figure 14A:
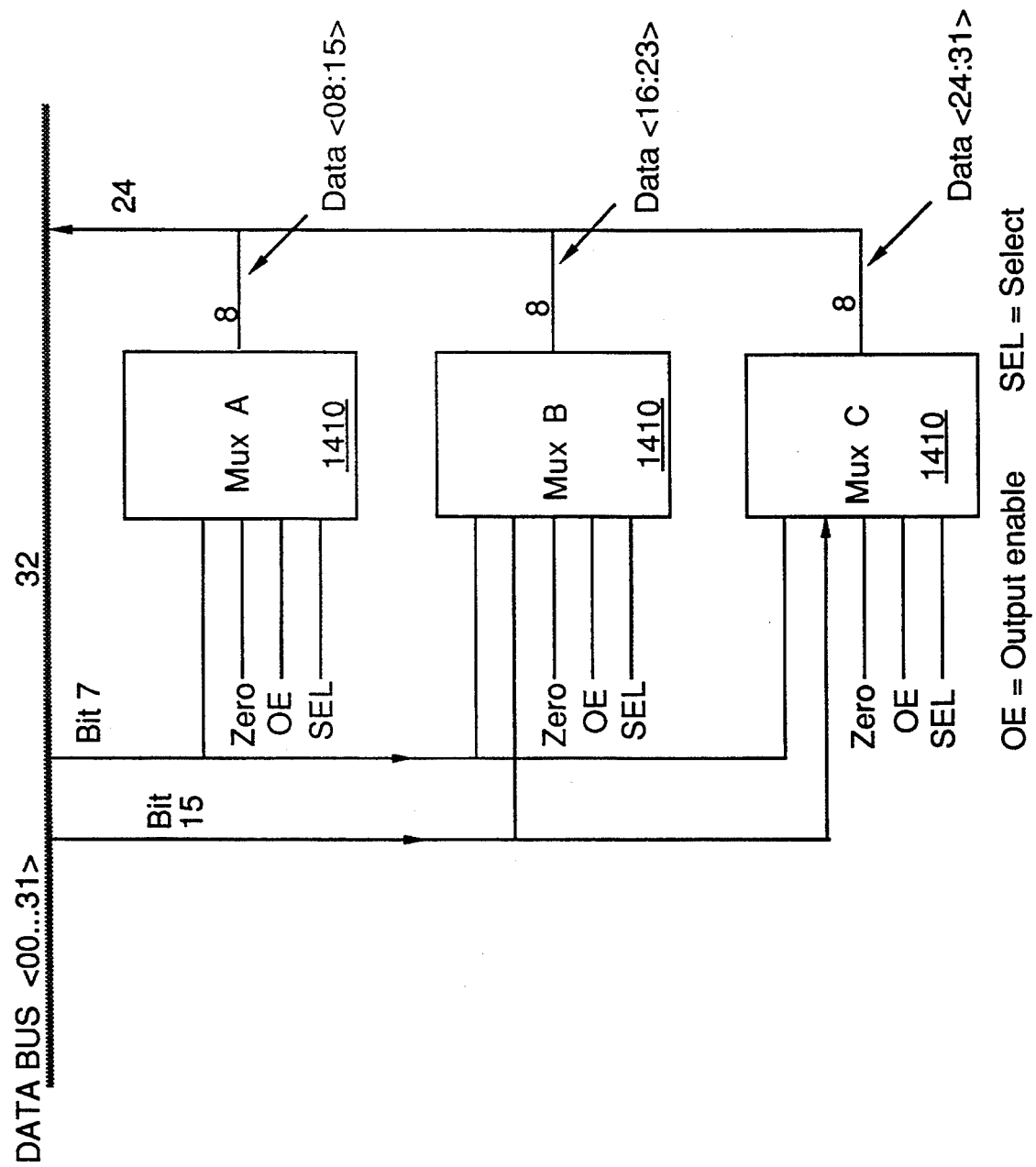
FIG. 14A schematically shows the hardware used, in the presently preferred embodiment, to permit a 16-bit address generator (or other low-resolution subprocessor) to be used in a 32-bit system.

FIGS. 14A and 14B show the structure and operation of this PAL. More precisely, FIG. 14A shows a slightly different embodiment, where three eight-bit multiplexers are used for each sign/zero extend operation. This permits single-byte sources to be used, which is not possible with the presently preferred embodiment. FIG. 14B shows the command structure used with the hardware of FIG. 14A.

Multiway Branch Addressing PAL 217

This PAL is used to implement the multiway branching capability of the sequencer 310. This PAL takes a three-bit condition code and inserts it into the least significant three bits of the microcode constant field. The modified constant field is fed back onto the sequencer bus 315. A shift field input controls whether the result is shifted 0, 1 or 2 places left (i.e. multiplied by 1, 2 or 4), or whether the input constant field is routed through unchanged. Another input enables the tristate output drivers of this PAL.

As shown in FIG. 3A, this PAL is preferably connected in parallel with a tristate buffer 318. Only the least significant 8 bits of the constant field are routed through the PAL 317. The most significant 8 bits are routed through the buffer 318.

(Preferably the modified constant field is used with a relative sequencer instruction, but it may alternatively be used, with care, with absolute or indirect instructions.) The multiway branching operation is discussed in greater detail below, in connection with FIG. 30.

Data Input Condition Code Select PAL

This PAL (located in the DTP module 120, and shown as multiplexer 812 in FIG. 3) selects a set of FIFO status codes which can be tested by the DTP microcode sequencer 310. The selected set is encoded, and provided to the sequencer 310, to permit multiway branching on these conditions. The source for these status signals can be selected to be within one of four bus input interfaces: the GIP interface 170, the two input ports of the data pipe interface 150, and the VME interface 160.

DTP and I/F PALs

Following are brief descriptions of some of the most important PALs used in the data transfer processor module 120 and in the interface units 160, 170, 180.

VME Address decode PALs

One PAL decodes the least significant bits of the VME address, and the 5 address modifier bits. The output goes active when the VME address and address modifiers match the previously selected ones. (Up to 15 address and address modifier combinations can be programmed, and one of these can be selected by a 4 bit switch signal.) There is also an input from a VME interrupt PAL, which indicates when an interrupt acknowledge cycle is in progress. This is ORed with the address decode to drive the output.

A similar PAL decodes the most significant address bits (18–31) of the VME address bus. On this PAL, an additional input selects whether the top 8 bits of the address are used or ignored.

DMA FIFO Status and Clock Control PAL

This PAL controls the routing of the clock and status signals from the DMA FIFO 670. This PAL also controls whether the clocks of these FIFOs are under the control of the DMA controller 640 or decoded from the VME interface.

VME Read and write decode PALs 611

The read decode PAL decodes the 8 possible read sources from the VME bus. The internal VME addresses are decoded and qualified by the data strobe, write enable, and board select signals.

The write decode PAL decodes the 9 possible write sources from the VME bus. The internal VME addresses are decoded and qualified by the data strobe, write enable, board select, and a VME write enable signal. The VME write enable signal can be used to control the setup and hold requirements of the various write enables or clocks, independent of the VME bus timings.

VME Slave access timing PAL

This PAL generates the timing for data transfer acknowledgements in the bus controller 650. The timing can be tailored to the register or memory that is being read or written, because essentially the same addresses and qualifiers which the decoder 611 receives are also inputs to this PAL. Another input delays the timing if the dual ported VME memory 660 is busy. (If this occurs, an extra cycle is also inserted after the busy signal ends.)

Another input delays the timing if the serial loop is busy shifting data. When data is written to the serial loop register 680, a delay of three cycles is inserted after the VME write enable signal goes high, so that the serial loop state machine (in a different PAL) has time to latch in the data.

This PAL also generates an enable signal whenever the VME interface memory 660 is being accessed.

Serial Loop Control PAL

The PAL implements multiplexer 2710 and state machine 2740. The state machine function is connected to control the 818 serial/parallel registers at the interface to each of the writable control stores in the serial loop. (These include the CP WCS 220 and the DTP WCS 320, and also a FP WCS 470 and CP WCS extension 490 on each of the processor modules 130.)

The state machine controls a shift register and a serial data clock. When a data transfer to or from the shift register is occurring, the shift register and serial data clock are controlled as a function of the access type (i.e. read or write), and in accordance with a mode signal The serial loop mode signal specifies one of three access modes:

DATA HOLD (00): read/write like a normal register.

DATA SHIFT (10): read/write like a normal register but then shift the data by 16 bits around the serial loop while toggling the serial data clock.

DATA PULSE (11): read/write like a normal register and pulse the serial data clock once.

In the DATA_SHIFT mode, the state machine controls the shift register, so that on one cycle it shifts and on the next it holds. This two cycle pattern repeats 16 times, so the contents of the shift register are inserted into the serial loop. On the hold cycles the serial data clock is asserted. While the data is being shifted, a busy signal is active to hold off any further VME accesses to the shift register until the shifting is finished.

In the DATA_PULSE mode, 300–400 ns after a write operation, the serial data clock is pulsed high, once. This pulse loads up the internal flip-flop inside the "818" shadow register. (Each of these shadow registers contains an internal flip-flop, which controls its operation mode when backloading data into the respective corresponding WCS.) No data is shifted around the serial loop when this D clock is pulsed. (The delay allows data to stabilize, i.e. to percolate around the loop.) During this operation a busy signal is activated to inhibit any VME accesses to the serial loop.

This PAL also contains multiplexer 2710, which collects the four serial loop return paths 225B, 225C, 225D, and 225E, and resynchronizing flip-flop 2720.

DCM and DCM I/F PALs

Following are brief descriptions of some of the most important PALs used in the data cache memory 140, and in the CP Extension Logic, located on the FP module 130 but controlled by the CP module 110, which handles the data interface to the cache memory 140.

DCM Address Decode PAL

This PAL, together with a multiplexer, is shown as block 560 in FIG. 5. This PAL decodes the data cache memory address. Two address inputs are provided: input 516 corresponds to bits 19-25 of the CA bus 111, and input 517 corresponds to bits 19-25 of the TA bus 121. A control line 521, generated by arbitration logic 535, selects which address to decode.

DCM Holding Register Control PAL

This PAL (controlled by the CP and DTP microcode streams) generates various control signals used to control the three banks of data holding registers 560A, 560B, and 420. Microcode bits are decoded to drive the clock and output enable signals. The signals to control bank 560A are controlled by the CP access signal 536. The signals to control bank 560B are controlled by both CP access signal 536 and DTP access signal 537, because the DTP port has a lower priority.

The signals to control register trunk 420 (the FP holding registers on the floating point modules 130) are ANDed with the appropriate module select signals. All the clock signals are qualified by the write enable gate clock signal, to control the timing of the positive clock edge.

Another set of signals can disable the memory output on access cycles. This allows the holding registers to be read back without writing into the data cache memory. (These signals are similarly in another PAL to get access to the write mask information.)

DCM Write Flag Register PALs

Several PALs are used to implement the write mask logic 530 (which provides an 8 bit write mask signal 512 to the memory bank 510.) The PAL corresponding to the DTP interface registers 580B will be described first. A similar PAL is used to track the status of the other register set 560A, which is accessed by the CP module 110.

The purpose of this PAL is to remember which of the 8 F_words in the holding register 560B have been written to by the DTP. When a data cache memory write is required, the outputs of this PAL mask the parallel write from the DTP holding registers. Only those F_words that have been updated are actually written into the data cache memory bank 510. Whenever a write to a holding register occurs, the corresponding flag bit is set within the PAL. The flag bit to set is decoded from the DTP address under these conditions. The flag bits are cleared on a data cache write. However, due to the pipelined operation, the DTP can write to the holding register 560B on the same cycle. In this case the flag bit would remain set.)

In addition, all 8 flag bits can be set simultaneously (in response to a microcode command). This allows block writes. A reset signal clears the flags. The logic is completely synchronous and is clocked by the microcode clock generated by clock generator 250.

Another input signal enables the read back mode. In this mode the state of the flag register can be serially output, via the two least significant bits. The microcode can read the flag bits in the two least significant bits, and, by swapping with the other flag bits, the microcode can read all the flag bits. The DTP address selects which of the 3 flag bits are to be swapped with even flags bits, and which with odd flag bits.

FP Write mask PAL

This PAL generates the write mask for transfers between the FP holding register and the data cache memory. The parameters that control the mask generation are the number of F_words to write, and the F_word to start from.

FP PALs

Following are brief descriptions of the programmed array logic units (PALs) used in the FP module 130, in the presently preferred embodiment.

WCS Load enable PAL

This PAL qualifies some of the signals used to load microcode into the FP module's own WCS 470, and/or into the CP module's extended WCS 490 (i.e. the WCS portion located on the FP module), with a module select signal.

Host-source Module select PAL

This PAL compares the module address inputs from the host with local switch settings, to see if this module has been selected. One set of inputs enables WCS loads to occur.

A one-bit-per-module address is provided. This permits WCS writes to be independently controlled for all the modules 130. (By contrast, as discussed above, data accesses use module addresses having fewer bits than the maximum number of modules, so that not all combinations of modules can be selected.)

As shown in FIG. 28, the preferred topology of the serial command loop is such that two loop portions 2840 enter each numeric processing module 130: one portion 225A to provide input to that module's own WCS 470, and one portion 225C to provide input to the WCS extension 490 on that module. Thus, two separate output commands are provided (and further qualified by the module address), so that the WCS 470 and the WCS extension 490 can feed their outputs onto the common return busses 225E and 225D (respectively, which any of the modules can drive when selected.

CP Module select PAL

This PAL compares the module address selected by the CP against the locally stored values. IF a match is found, then four outputs are asserted. Two of these outputs enable the control signals to clock or output enable the holding registers 420. Another output signal drives an LED, to give a visual indication of which FP module(s) have been selected. The final output enables a condition code bit ("selected") which is returned to the main board. The final output is the qualification signal to most of the logic controlled by the CP extension microcode, to enable the action defined by microcode fields (or registered values) to take place.

FP-WCS Control PALs

Two PALs are used to control the WCS 470. These two PALs are located in separate areas, but they are interlocked together because both affect the WCS. In general, the first PAL is used to control the Instruction Register (which is used for microcode compaction as described above). The other controls parallel microcode loading.

The first PAL controls the output enables of the two RAM chips in the WCS 470. In the presently preferred embodiment, the WCS 470 is configured using two RAM chips, to provide a better match to the interface register set 420 for parallel loading. Since (in the presently preferred embodiment) the cache bus 144 is multiplexed down to a 64-bit data path into the FP module 130, the division of the WCS 470 into two portions provides a better match for parallel loading of the microinstructions (which in the presently preferred embodiment are 104 bits long).

When the host is loading microcode, the instruction register is disabled. In this case the output of the instruction register is always disabled, and the RAM outputs are controlled by a signal which is generated by the host.

The second PAL performs two separate functions. These are combined only to achieve hardware compaction.

The first function is to control which bank of pipeline registers 476 to enable during the reading of the WCS by the host.

The second function is to adjust the transfer length, i.e. the number of words to transfer between the holding registers and the register file.

There are two pipeline register output enable signals, and they are never active at the same time. (These signals are used to enable the two banks of register 476. As discussed elsewhere, this structure corresponds to the two banks of WCS 470.) For either of the pipeline registers to be output enabled, the busy signals must be inactive, and the module select and FP pipeline register output control (from the host) must be active.

The transfer length field is coded so that 1 represents one word to transfer, 2 for two words etc. To specify eight words to transfer, 0 is used. The transfer clock generator (part of the cache bus interface logic 460) needs to know the number of transfer cycles, and this is the number of minor cycles +1 (for pipeline startup). The number of minor cycles is a function of the transfer length and its start position.

Handshake Logic PAL

Figure 22:
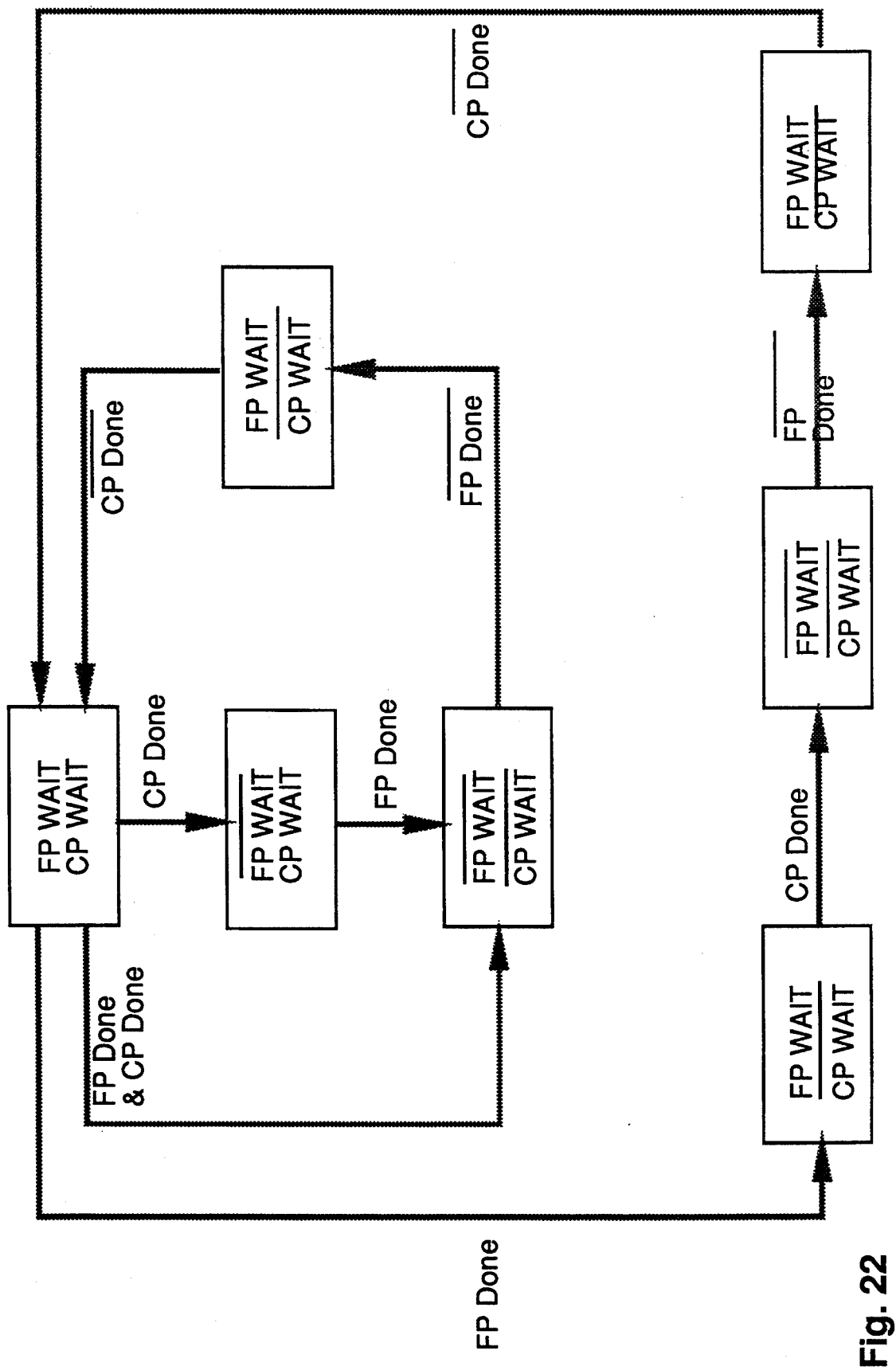
FIG. 22 shows a state diagram of the handshaking logic used, in the presently preferred embodiment, to provide interfacing between the CP module 110 and the FP module 130.

Two PALs are used to control the handshaking logic. The first PAL performs two independent functions: First, it controls the handshaking between the CP and FP module 130. (In this function, it implements a state machine having a state diagram as shown in FIG. 22.) Secondly (and independently), it also controls bank selection when the register file 420 is used in a double buffered mode. (The principles of operation of this mode are generally shown in FIG. 20, and are discussed above.)

The handshaking state machine indicates the CP is to wait for the FP by driving the CPWAIT output HI. If the FP is to wait, the handshaking state machine indicates this by driving FPWAIT HI.

If both CPWAIT and FPWAIT are HI, and the CP is the first processor to assert its done signal, then the sequence is as follows:

1. When CPDONE is found to be HI, then FPWAIT is driven LO.
2. CPWAIT stays HI and control remains in this state until FPDONE goes HI.
3. When FPDONE has gone HI, CPWAIT is driven LO.
4. Both CPWAIT and FPWAIT signals remain LO until the corresponding DONE signals are disasserted.

The above sequence is duplicated, with the roles reversed, if the FP asserts FPDONE first.

If CPDONE and FPDONE both arrive at the same time (Legate both first sampled HI on the same clock edge), then both CPWAIT and FPWAIT go LO together.

The bank swap side of this PAL is separate from the CP/FP handshaking just described. The two input signals that control this state machine are SCPBANKSEL and FPSWAP. SCPBANKSEL specifies how the CP wants the banks to be allocated when a swap point is reached by the FP. When the FP reaches a swap point it drives FPSWAP active until the swap point has been passes. Note that the swap points are synchronized by the CP/FP handshake logic. At the FPSWAP point the state of SCPBANKSEL is the new state of the BANKSEL output, and outside the swap point the BANKSEL state remains unchanged.

The first PAL runs synchronously to the FP, so another PAL is used to capture the CP-synchronized signals which indicate that the CP module 110 has finished, or that it wants to swap banks.

This second PAL is governed by three handshake mode bits (subject to the module select signal). The three handshake mode bits are allocated as follows: bits 0 and 1 are encoded to implement the following actions: 00 No operation; 01 Set CPDONE; 10 Clear CPDONE; 11 Test mode. Independently of this, bit 2 requests that the register banks be swapped.

The CPDONE state remains unchanged across microcode cycles, unless the instruction is a set or clear operation.

This PAL can detect a positive edge on bit 2 of the mode field, by comparing the new input with the previously registered version. When the edge is detected this toggles the state of the bank select output.

Interrupt Capture PAL

Another PAL is used to capture clock edges on CPWAIT, FPWAIT, and several interrupt signals. The error interrupt shares the same interrupt output as the breakpoint interrupt, but has its own mask bit. The outputs are reset when the corresponding mask bit is driven LO, but this mask bit must be returned to the HI state for further interrupt edges to detected.

Microaddress And clock control PAL

This PAL performs two independent functions: control of the FP microaddress some, and control of the FP clock.

The microaddress source is selected by two bits of input, and can be as follows: (00) FP Next Address Logic 477; (01) CP microaddress 211A; 10 Start address register 479 (continuous); (11) the output of stack 478, Alternatively, another input permits the two-bit select command to be overridden. In this case the CP microaddress will be enabled whenever the module is enabled. This input permits the host to get access to the WCS 470 for startup or debug.

The outputs to control the FP clock generator 480 (which is ECL in the presently preferred embodiment) can be selected as follows: (00) FP microcode clock is free running, (01) FP microcode clock stopped, Another logical condition permits the FP clock to be controlled by a different input, so that the clock free runs whenever this is asserted.

Serial/parallel load select

This PAL controls the loading of microcode from the host or the CP into the FP module's WCS 470. Microcode loaded by the host must use the serial loop, but the CP can load microcode in parallel To achieve this, this PAL essentially implements a 2:1 multiplexer. There are several points to note:
1. The pipeline registers used in WCS 470 do not have separate output enables, so they are separately enabled to prevent contention on the data buses.
2. The dependence of the two serial data clock signals is switched, depending on whether the host or the CP is selected.
3. When the host is controlling the serial loop, then a mode signal selects whether both serial data clocks are driven together (for normal data shift), or only one of them is driven (as selected by another signal). The serial data clocks are controlled like this during the read back of data from the WCS 470.

CP Write decode PAL

This PAL decodes microcode fields in the WCS extension 490, to select which of the registers 420 is to be accessed. The selected register is only written to when RCREGDIR is LO. As well as selecting one out of the XFREG, FPREG, UAREG or MREG to be written to, two other functions are performed:
1. The direction and output enable controls to the CD bus transceivers 444 are generated.
2. The microcode bit to dear a breakpoint is write-enable-gated with the write-gate clock. The use of a short pulse here prevents missing breakpoints which occur immediately after a restart. (It could pose problem if the CP were still holding a signal low to dear the previous breakpoint when anew breakpoint appeared.) We are therefore ORing this signal (active-low AND) with the clock to keep it short.

All the clocks/strobes are qualified by CPMCCK and CPMCCKWG to set their timings within a microcode cycle, but are disabled if the module hasn't been selected.

CP Read decode PAL

This PAL decodes the CP microcode fields to select which of the registers 420 is to be accessed. The selected register is only read when RCREGDIR is HI.

Holding Register Control PALs 461

Two PALs are used to control outputs from the holding registers 420.

The first one generates the transfer sequence waveforms used to enable clocks to each pair of the registers 420. Each transfer cycle lasts from 1 to 4 minor cycles, as specified by the transfer length. (The "minor cycle" period is generated by the transfer clock 412, as discussed above.) On each minor cycle a pair of F_words is transferred, although one of them may be inhibited by another PAL. The transfer sequence waveforms appear on four lines as a "walking LO."

The first line in the cyclic sequence to be asserted is controlled by XFHRST <1:2> and only occurs when XFINIT is HI. XFINIT is only active during the first cycle and on subsequent cycles the current sequence waveform is used to generate the next. UCXFDIR disables HRCKENP* <0:3> when the transfer direction is from holding registers 420 to register file 430, unless the LOOPBACK mode is in operation. The HRCKALL overrides the normal start and length controls, and forces all clock enables to be active at the same time thus quadruplicating the data into all register pairs in the one cycle.

The XFTYPE input selects whether the waveform sequence is for normal transfer cycles or a parallel microcode load cycle. In the latter case there are always 2 minor transfer cycles and the timing can be slightly different. This input can inhibit all the clocks to the holding registers.

The second PAL generates the transfer sequence waveforms used to output enable each register pair. These two PALs are used for opposite transfer directions.

A "clock mask" PAL generates the 8 clock enables used to control the writing into the eight 32 bit registers (F_registers) which make up the holding register 420. In a single major transfer cycle up to 8 F_words can be transferred into the 8 separate registers of the register bank 420. The inputs show the first register which must be updated (0 . . . 7), and the number of F_registers (1 . . . 8) to update. The PAL accordingly generates a mask with a bit set for every register to be updated (within the major transfer cycle). If the transfer direction is from the holding registers 420 to the register file 430, then all the mask bits are set HI, thus preventing any writing to the holding register. Similarly, if a microcode load cycle is occurring, then the clocks are disabled. If all holding registers are to be cleared (as indicated by yet another signal), then the enables are set low so all the holding registers are updated.

Holding Register Start Address PAL

This PAL implements a 4:1 multiplexer followed by a register. The 4 possible inputs to the multiplexer are: holding register (HR) start address from a register; HR start address from the microcode instruction; HR start address from the CP address bus; The previous HR start address. If the module is not selected, then the previous HR start address is maintained.

Register File WE control

This PAL controls the write enables to the register files 430. In a minor cycle 1 or 2 F_words can be written into the register file. Six bits of start position and length are used to generate the write enable mask, in the same way the clock enable mask is generated. The relevant 2 bits from the mask are sequenced out of a lower-half-write signal or an upper-half-write signal, depending on which minor cycle is in progress. When the loopback mode is active, the write enable mask is disabled. Another signal can be used to force both words to be written on every minor cycle.

The lower-half-write signal and upper-half-write signal are disabled if the transfer direction is wrong, or if the transfer type is a microcode load function. The input signals are also decoded to select the read/write mode of the register file. A busy signal line is also provided, to indicate the holding register data bus 422 is in use.

Register File address modification PAL

This PAL registers the register file address when the module is selected; otherwise the previous address is held. The most significant bit of the address is modified to implement the soft double buffering. A two-bit signal selects what type of modification will be made to the most significant address bit. The options are:
1. Use the input bit. This is the physical addressing mode.
2. Use BANKSEL. This is the double buffered mode.
3. Use the inverse value of BANKSEL. This is the preview mode, whereby the CP or FP can access data on the other side of the double buffer without having to swap banks.

Register File Address Incrementer

This PAL (when enabled) increments the Register File pointer. Thus, the address can be incremented at each minor cycle (of the transfer clock), to fetch out the next pair of numbers from the register file 430, or write the next pair in. A control input permits keeping the address constant during the first minor cycle of a transfer from holding registers 420 to register file 430. This is necessary because of the pipelining in the data path.

Data Valid control PAL

This PAL controls the data valid signals to the even and odd sides of the register files 430. In a minor cycle, either 1 or 2 F_words can be written into the register file. Depending of the start address and length, one or two words of data will be valid in this minor cycle. Two outputs (EVENVALID* and ODDVALID*) indicate which words are valid. This function is disabled for transfers from the register file.

Microinstruction Address select PAL

This PAL selects the next microinstruction address to be from the true address field (i.e. the output of register 474) or the false address field (the output of register 475). An internal "always true" status can be selected for unconditional jumps. Both can be disabled to allow the start address register 479 to drive the microaddress bus 473, or when STACKPOP or READSTACK* signals indicate that a stack operation is underway. (STACKPOP is derived from FP microcode, while READSTACK is controlled by the CP.)

As noted above, the FP module 130 does not have a separate sequencer, in the same sense that the CP module 110 and DTP module 120 do. In fact, the module does not even have a separate program counter as such; instead, the true and false outputs of registers 474 and 475 fill this function.

ALU Sticky Status PAL

This PAL remembers when one of the floating point status bits has indicated a "sticky status" condition. (A "sticky" status is used, in the presently preferred embodiment, to monitor some fault conditions separately from the primary error-handling mechanism. For example, a test for overflow can be performed at the end of a vector operation rather than on every element calculation. The multiplier 440 and the ALU 450 each have several outputs for sticky status bits (to show overflow, underflow, invalid operation, and similar errors). Two microcode bits control the updating and the clearing of the sticky status register on a per cycle basis.

A similar PAL performs this function for the FMPY status. The logic in these PALs also provide encoded outputs to indicate various sticky status conditions. The clock timing used permits the presence of a stuck status bit can be check in one cycle.

Stack Control PAL 3910

This PAL performs two separate functions: control of the subroutine stack addressing and control of the table address counters.

FIG. 39 shows the preferred embodiment of the stack register 478 in the floating-point processor module 130. The PAL 3910 controls a multilevel pipeline register 3920. (In the presently preferred embodiment, this is an AMD 29520.) The multilevel register 3920 includes four pipelined registers 3921. However, the output multiplexer 3922 can also select any one of these registers for direct output. The output of this multiplexer is connected to the microinstruction address bus 473 of the FP module 130.

The PAL 3910 provides control inputs to multilevel register 3920 which make it function as a LIFO (last-in-first-out) memory. This permits the memory to operate as a stack. The PAL 3910 provides transfer signals 3912 (which are ANDed with the microcode clock) to the pipelined registers 3921. It also provides a select signal 3913 to the multiplexer 3922.

The PAL implements the usual push and pop functions. In addition, it can also be commanded to enter a read-stack mode, where any stack level can be read without disturbing the stack status.

Register File Address Modifier PAL

This PAL modifies the most significant bit of the FP register file address fields as a function of address modifier code and the currently selected bank of the double buffer. There are three address fields (X, Y and T) to be modified (corresponding to the first operand bus 431, second operand bus 432, and results local bus 433), and the logic is identical for each of them. The logic for one of these address will now be described.

A modified most-significant address bit is derived from the most significant bit of the input address, a two-bit modifier code, and the bank select signal. The modifications to the address bit are:
1. No modification—this is the physical addressing mode.
2. Inverse of the bank select signal—This is the "logical" mode, used for normal accesses in the double buffered configuration. Note that the bank selection is opposite to that used when data is transferred between the register file and the holding registers.
3. Equal to the bank select signal—This is the preview mode. As discussed above, in this mode the FP can access data on the other side of the double buffer, without having to swap banks. This capability helps to keep the floating point pipeline full.

The 3 modified address bits are registered externally and fed back in as "old A6" bits (one for each address). These are used to replace the "calculated" values for these bits when a "use old A6" command is asserted. This feature reduces the address setup time when the address mode remains unchanged over several cycles.

Results Bus control PAL

This PAL decodes the results-bus source microcode field, and output enables the required device (e.g., FMPY 440, FALU 450, or scratchpad memory 1610, in the configuration of FIG. 16). This PAL also provides a chip enable signal to the scratchpad memory 1610 when needed.

VME Interrupts PAL

This PAL implements the VME interrupt protocols in a state machine. When GENVMEINT goes active (high) IRQEN is driven high on the next positive VCK edge. IRQEN remains active until the interrupt is acknowledged, so the cause of the interrupt (GENVMEINT) is removed by driving CLRIRQFF* low. The VIACK* and VIACKIN* signals are monitored and when an interrupt acknowledge cycle is detected for the interrupt being generated an internal interrupt acknowledge cycle is started. The correct VME interrupt acknowledge cycle is identified by these signals going active (VIACKIN* is part of a daisy chain) and VMEIA <01:03> being set to the same level the interrupt was generated on. The internal interrupt acknowledge cycle waits for VMEIDS to be asserted and then over a number of cycles enables the interrupt vector onto the data bus (IVOE*), sets IVDTACK and removes IRQEN. Sometime later VMEIDS goes inactive and the interrupt vector and IVDTACK are removed. When an interrupt acknowledge cycle occurs VINTACK is asserted which then starts the BUSCON (via the address decode pals) on a slave cycle which will allow the interrupt vector onto the bus. The interrupt acknowledge daisy chain passes through this PAL unhindered when no interrupt requests are outstanding.

DMA/VME State machine

This PAL is only concerned with data transfers between the VME bus and the data FIFO. The direction of the transfer is hidden from the state machine so the clocks and status are switched externally. When a DMARSTART goes active the state machine starts the DMA transfer. It first waits for synchronized FIFO status (SDMAFSTAT*) to indicate there is data or room in the FIFO for one transfer and SDMADONE to indicate the DMA counters are ready. DMACK is driven low to output enable the FIFO in case it is providing data The state machine issues a request for the bus (LBUSREQ*) and waits for it to be granted (SLBGRANT*). When the bus is granted, DMAAS* and DMADS* are asserted in compliance with the VME bus setup times. These two signals are held until the VME slave device returns the data transfer acknowledge (SLDTACK*) and then DMACK is driven high. One cycle later DMAAS* and DMADS* are removed and a positive edge driven on DMACOUNT. If the transfer mode (DMARBLOCK) is single transfers then LBUSREL is asserted to release the bus and the above sequence repeats. If the transfer mode is block (sequential) transfers then the bus is not released unless the end of the block has been reached (as indicated by BLOCKEND), FIFO is full/empty (SDMAFSTAT*), DMA count is exhausted (SDMADONE) or DMA has been aborted by the negation of DMARSTART. Note that during a block transfer the DMAAS*is held active until released by BLOCKEND.

The SLBUSERR* input goes active when there has been a bus error as a result of a DMA access. If this occurs the current transfer is aborted and DMABERR is driven. The state machine remains in this state until DMATSTART is negated which will clear DMABERR. The final input, DMATEST, allows the DMA to occur without any VME bus cycles occurring. This is useful in testing the basic operation of the state machine and also provides a means whereby the FIFOs can be flushed in the event of a bus error.

A reset condition can be forced by using an unused combination of DMARSTART, DMARBLOCK and DMARTEST.

DMA Address control

The address bits (VMEIA<01:07>) are monitored to detect when a 256 byte boundary is about to be reached so that a block DMA transfer can be interrupted briefly to allow VME arbitration. (This allows compliance with the maximum block transfer length constraint in the VME specification.) This is indicated on BLOCKEND. The remainder of the PAL is concerned with handling the DMA address incrementing. Depending of the transfer size (16 or 32 bits) the DMA address is incremented by 1 or 2 respectively whenever DMAINC goes high. The incrementing of the DMA address is controlled by DMARLONGINC which selects whether DMACNTEN*is active for one or two cycles of the microcode clock CLRFF* resets the flip flop that caught the edge of DMACOUNT. VMEIRST* is available to reset the PAL, if necessary.

Interrupt Edge Catcher

This PAL catches the positive edges on GIPIEMPTY*, VMEIFEMPTY*, DP1IEMPTY*, DP2IEMPTY*, VTPINTD and VTPINT, and negative edges on GIPOEMPTY* and VMEOFEMPTY*. This allows the interrupt signals to be edge triggered and later synchronized to the microcode clock. When an edge is detected the corresponding output is driven low. The edge catching flip flops are reset in pairs: TPINTGIP* resets the two GIP edges, TTIVMEF* resets the two VME edges, TPINTVME* resets the two VTP edges and TPINTDPIPE* resets the two DP edges.

GIP Microcode Decode

This pal decodes the three microcode signals UGIPRD*, UGIPWR* and UGIPFR to generate the output enables, FIFO read and write clocks and the register clock. The FIFO read clock is gated by the FIFO empty status (GIPOE*) to prevent the reading of an empty FIFO causing errors within the FIFO. The clock type signals are qualified with GIPC1 or GIPFRDCK.

GIP Interrupt Mask

This PAL performs two functions. First of all it selects 4 out of the 7 possible interrupt sources and selectively inverts where necessary so the interrupting action results in a positive edge. Two sets of 4 interrupt sources are allowed for and GIPSELI selects between them. The second function is to mask the selected set by the 4 mask bits (GIPIM <0:3>) before driving the results out as GIPINT<0:3>. The GIPIACK* signal is simply inverted to give GIPIACK.

GIP Interrupt State Machine

This PAL looks for positive edges on the interrupt inputs (GIPINT <0:3>) and when one or more occurs GIPINT is driven. A specific interrupt is cleared by selecting it with the microcode field UGIPCCS <0:1> and asserting UGIPCLAI. All flip flops are cleared on reset by GIPRST*. The edges are detected by delaying the interrupts by one cycle and comparing the delayed and non-delayed versions. The non-delayed versions have already been synchronized to the GIPC1 clock that this state machine runs off.

Host Computer

A system like that shown in FIG. 1 can be used in a wide variety of computer architectures. The presently preferred embodiment uses the system of FIG. 1 as a numeric accelerator subsystem. The host computer is a VAX 8800, running a VME operating system, and communicating with the system of FIG. 1 over a VME interface and VME bus 4110. However, an immense variety of other configurations could be used instead. For example, there are a wide variety of UNIX machines which could be used, including e.g. units from Sun Microsystems.

Moreover, other system bus structures could be used instead. For example, the subsystem of FIG. 1 could be used with a VAX running VMS, and linked through an interface box. This subsystem can even be used with a personal computer running MS-DOS, which communicates via Ethernet (for example), with a simple VME-bus interface box.

It should also be noted that, although the internal architecture of the subsystem of FIG. 1 is primarily a 32-bit architecture, this subsystem can be used very advantageously with 64-bit words or 48-bit words. One factor in achieving this capability is the use of an internal data path in the floating-point processor module 130 which permits 64-bit operations to be performed in only two cycles. Another factor in achieving this, again, is the very wide cache bus 144, which permits multiple 64-bit words to be transmitted in parallel to the numeric processor module 130. Thus, performing 64-bit calculations can usually be performed at nearly half of the word rate (i.e. almost the same bit rate) as 32-bit operation.

Moreover, of course, the numerous inventive teachings set forth herein can be adapted to a tremendous variety of systems. These teachings can be adapted to systems whose bus standards do not at all correspond to those of the presently preferred embodiment. In fact, the VME bus interface is not even especially advantageous (aside from having reasonable total bandwidth), and is disclosed simply to provide full compliance with patentee's duty of disclosure.

Bus Interface to Host

As noted above, the presently preferred embodiment uses a VME bus as the primary interface to the host. This bus is well known, as discussed above.

A wide variety of other bus configurations could be used instead. For example, VersaBus, FutureBus, or NuBus could be readily designed into the system if desired. For very high-speed computing systems, it might be advantageous to use optical busses, using modulated solid-state lasers on optical fibers.

Picture Processor Subsystem

One advantageous system embodiment uses not only a host communicating with one or more subsystems like that shown in FIG. 1 (or 9A or 10), but also uses an additional subsystem which is a specialized graphics processor. The most preferred picture processor here is known as a "GIP" processor, and is available from benchMark Technologies Ltd., Kingston-upon-Thames, England.

Figure 41:
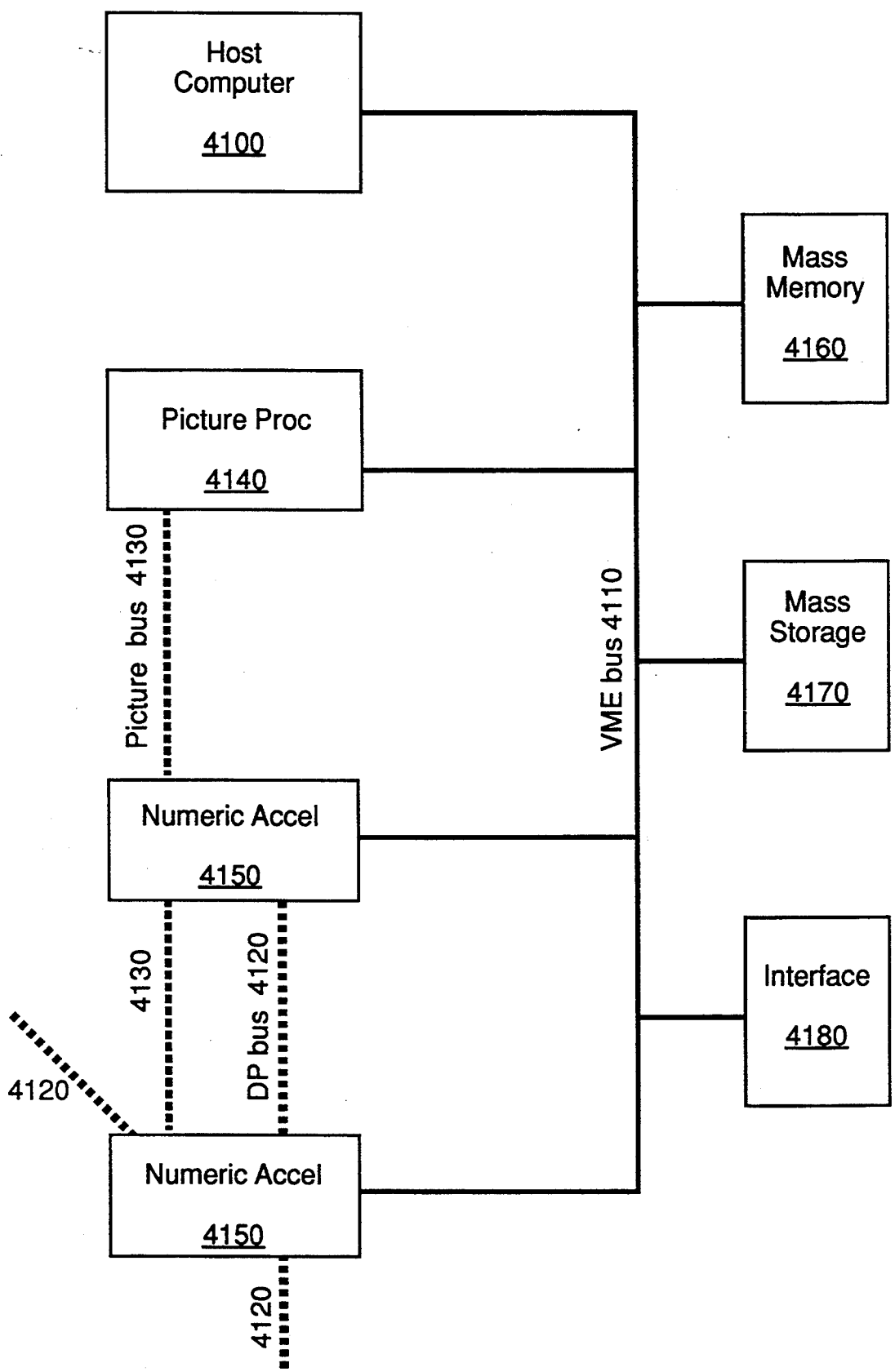
FIG. 41 schematically shows a computer system including a host computer, a picture processor subsystem, and at least two numeric accelerator subsystems, linked by a main bus and two high bandwidth backplane busses.

FIG. 41 provides one sample configuration but of course a wide variety of other topologies and system architectures could be used instead. A host computer 4100 communicates with a picture processor subsystem 4140, and with at least two numeric accelerator subsystems 4150 (which may be, for example, like those of FIGS. 1, 9, 10), over a VME bus 4110. The VME bus 4110 also permits access to main memory 4160, mass storage 4170 (e.g. a hard disk), and optionally also one or more device interfaces 4180 (which may be output devices, gateways, other storage devices, etc.).

Two additional busses are used in this embodiment. The picture data bus 4130 provides an application-customized interface to a graphics processor. (This is a wide bus, which is particularly useful for image or graphics transmission.) In this sample embodiment, this is the "GIP bus" (marketed by benchMark Technologies Ltd.). This application-optimized bus is well-matched to the high-bandwidth I/O demands of the picture processing subsystem 4140. It is a very wide bus, with 160 data lines.

The other backplane bus is the data pipe bus 4120. This bus permits multiple numeric accelerator subsystems to be combined in topologies such as those shown in FIGS. 34, 35, 36, or 37. In this sample embodiment, this bus has 32 data lines.

Operation of the System

Some important ways to use the various points of invention, and some ways to use the disclosed system architecture, will now be described. A number of the methods described are believed to be separately innovative.

Realization of a Sample Operation

A small example of the use of the architecture will now be described. In this example, the host processor 4100 issues a command to the numeric accelerator subsystem 4150 (like that of FIG. 1, 9, or 10) to multiply two arrays together (on an element by element basis), and deposit the results in a third array. All three arrays reside in the VME memory space (e.g. in main memory 4160). Before the command is issued, the subsystem 4150 is in the idle state, and after the command has been executed it returns to the idle state. This is also shown diagrammatically in FIG. 42.

Two versions of the command scenario are given. The first one details a system where the only memory space used is physical memory. (Such an architecture might be used where it is desired that the host offload as much of the work as possible onto the accelerator subsystem.) The second scenario is for a system that has virtual memory, such as is found on a VAX running VMS, or on a UNIX computer. In the second scenario it will be seen how the dynamic memory allocation and the paging of data to/from the disks are accommodated in the processing operation.

FIG. 15 shows how the command memory 190 is organized. It also shows some of the types of commands and interrupts exchanged, and how some of those commands and interrupts are handled. A key point to note is that the command memory 190 is preferably partitioned in software, so that it includes two command FIFOs. A cp_command FIFO 1520 buffers commands addressed to the CP module 110, and a dtp_command FIFO 1510 buffers command addressed to the DTP module 120.

The command interface, interaction, and scheduling of the work are controlled by software, and can be tailored as required. Thus, the following example does not define ways in which the system must be used. It is provided simply to illustrate ways in which the system may be used.

Physical Memory Model (CP/DTP Interaction)

In this example, the host processor issues a command to the accelerator subsystem to multiply two arrays together (on an element by element basis) and deposit the results in a third array. All three arrays reside in the VME memory space. Before the command is issued the accelerator subsystem is in the idle state, and after the command has been executed it returns to the idle state. This is also shown diagrammatically in FIG. 42.

The following steps occur during the execution of a command:

(1) The host writes a vector multiply command into the accelerator subsystem's command queue (maintained in the VME interface memory), specifying the number of elements in the array, the address of the two source arrays, and the address of the results array. After the command and its parameters are added to the queue, the host generates an interrupt in the data transfer processor module 120. The host is now free to do other work.

(2) On receiving the interrupt from the host, the data transfer processor module 120 copies the command and its parameters into a software maintained cp_command FIFO in the command memory. An interrupt is generated in the control processor module 110 to notify it of the existence of this command. The data transfer processor module 120 returns to its idle state.

(3) In response to the interrupt, the control processor module 110 leaves its idle state, and reads the command and its parameters from the cp_command FIFO 1520 in the command memory 190. The addresses given in the command are checked and found to lie off-board (i.e. not in the data cache memory 140). Thus, in this example, two data fetch commands and an "interrupt CP when done" command are written to the dtp_command FIFO 1510 in the command memory 190. Each data fetch command contains the source address of the array, its length, and its destination address in the data cache memory. The data transfer processor module 120 is then interrupted, and the control processor module 110 returns to its idle state.

(4) In response to the interrupt, the data transfer processor module 120 leaves its idle state, and reads the first command (and its parameters) from the dtp_command FIFO 1510. The data transfer processor module 120 checks the address where data is to be fetched from, and identifies that it lies within the VME address space. The data transfer processor module 120 then sets up the DMA controller 640 in the VME interface 160 to fetch the array and write it in to the data FIFO 670 in the VME interface 160. (Note that this is actually a hardware FIFO, unlike the command queue FIFOs 1510 and 1520, which implement the first-in-first-out functionality in software.) As this data arrives, the data transfer processor module 120 reads the data from the data FIFO 670, and writes it into the data cache memory 140. When the transfer is completed the dtp_command FIFO is checked to see what the next command is (if any). In this case another fetch-data command is found, and is executed in an identical fashion to the first fetch command. When this is finished the next command is read and executed. This command generates an interrupt in the control processor module 110. The dtp_command FIFO 1510 is now empty, and the data transfer processor module 120 returns to its idle state.

(5) The interrupt informs the control processor module 110 that the two arrays it requested are now stored in the data cache memory. Since the destination address of the result array is off-board, the control processor module 110 allocates a temporary array in the data cache memory 140 to hold the results. The CP module 110 now begins the calculation process. During the calculation process, intermediate data sets will be fetched from cache memory 140 into the register files of the FP module 130 (under control of the CP module 110); the FP module 130 will perform numeric operations, running its own microcode and interfacing with the CP module 110 at synchronization points; and the intermediate data sets will be transferred from the register files of the FP module into the cache memory 140 (under control of the CP module 110). Thus, when the vector multiply has been completed, the results will be left in the array in cache 140 which was previously allocated by the CP module 110.

(6) The control processor module 110 then writes a store-data command and an "interrupt host when done" command to the to the dtp_command FIFO 1510. The store-data command specifies the source address of the result array in the data cache memory, the destination address (as specified in the original command), and the array length. The data transfer processor module 120 is interrupted. If the cp_command FIFO is empty, the control processor module 110 returns to its idle state.

(7) In response to the interrupt, the data transfer processor module 120 leaves its idle state, and reads the first command (and its parameters) from the dtp_command FIFO. The data transfer processor module 120 checks the address where data is to be stored, and identifies that it lies within the VME address space. The data transfer processor module 120 then sets up the DMA controller 640 in the VME interface 160 to transfer the correct number of F_words from the data FIFO 670 to the VME main memory. The data transfer processor module 120 reads the data from the data cache memory and writes it into the data FIFO 670. When the result array has been transferred into the data FIFO, the data transfer processor module 120 notifies the DMA controller, and then waits until the DMA controller has finished the transfer to the VME memory.

(8) The dtp_command FIFO is not empty, so the next command is read and executed. This is the "interrupt-host-when-finished command. In response to this command, the status of the command just completed is written to the command queue in the VME interface memory, and a host interrupt is generated. The interrupt notifies the host that its vector multiply command has ended, and it can read its status from the status register in the VME interface 160. The data transfer processor module 120 then returns to the idle state. This completes the operation.

There are several points to note regarding the above description:

At any time during the above process, the host could write a new command and its parameters into the command queue, and interrupt the data transfer processor module 120. The DTP module would then generate an interrupt request to the control processor module 110 to notify it of the new command(s). If possible, their execution will preferably be started as outlined above. This attempts to keep the control processor module 110 and data transfer processor module 120 fully occupied in processing commands or transferring data, but care needs to be taken so that unwanted interactions between commands do not occur.

The data address assignments provide considerable flexibility. Each of the interfaces 150, 160, and 170 (and the local data cache memory 140) is assigned a range of addresses that can be accessed through it. This allows the data transfer processor module 120 to control the correct interface to satisfy the data requirements for the command, without requiring separate command definitions for different data source or destination locations.

In the example above, the commands originated from a host on the VME bus, but they could as easily have come from any of the interfaces (or have been stored as part of a command list) with very little change to the foregoing description. The VME host was chosen as an example.

When the total array sizes required for a command exceed the free storage in the data cache memory, the control processor module 110 will attempt to process the command within the available storage space by dividing the command into a number of smaller operations. However, for some types of command this will not be possible, and the host will be notified of the command's failure.

If the host sends commands too quickly, the internal software FIFOs may become full To prevent this affecting the overall operation, the following precautions are taken. First, the dtp_command FIFO 1510 is at least 3 times the depth of the cp_command FIFO 1520. Since one host command will rarely result in more than three data transfer commands, the dtp_command FIFO can never completely fill as a result of host commands.

When the cp_command FIFO reaches the nearly full mark, a status bit in the VME interface is set.

Virtual Memory Model

The virtual memory situation introduces a number of complications which necessitates more work being done in the host. These complications arise because the application has access to a virtual address space that is very much larger than the physical memory. The total virtual address space exists only on disk, and the portions of the address space which the active software currently needs are paged into memory at run-time as required. This can cause several types of problems:

An array, or parts of an array, may be only on disk, and not present in physical memory. Furthermore, parts of an array needed by the accelerator subsystem may be swapped out by to make room for other tasks running in the system.

The physical address the array is assigned to is not predictable, since it is a function of all the processing history since the computer was started.

Each virtual memory access goes through a translation procedure to determine a physical address in order to access a particular data item. This results in arrays being non-contiguous in memory or scattered.

To avoid these problems, the arrays need to be locked in physical memory while the data transfer processor module 120 is transferring them to/from the data cache memory. Ideally, the arrays should be made contiguous. If the arrays cannot be made contiguous, then the data transfer processor module 120 must perform a scatter/gather operation as part of the transfer. However, it will need a scatter/gather table to know where the data is distributed in physical memory.

Preferably the application software (running on the host) is given the job of organizing the transfer of data to/from the accelerator subsystem, and handling the memory management functions that go with this. (In practice the application software would not have to concern itself with most of these issues, as the math library routines and a device driver would handle them. The industry standard array processor library routines leave it up to the user to move data to and from the array processor (using library routines). The different layers of software are described below, but at this point no distinctions are among them.)

In the array multiply example described above, the application software undertakes seven steps.
1) Transfer array A to accelerator subsystem and store at address AA (performed by accelerator).
2) Transfer array B to accelerator subsystem and store at address BB (performed by accelerator).
3) Wait for accelerator subsystem to finish the transfers (performed by host).
4) Multiply the arrays at addresses AA and BB together and store the result at CC (performed by accelerator).
5) Wait for accelerator subsystem to finish the multiply command (performed by host).
6) Transfer array at address CC into host address space (performed by accelerator).
7) Wait for accelerator subsystem to finish the transfer (performed by host).

Some important points to note about this sequence are:
Multiple commands can be sent to the accelerator subsystem. These are queued up and processed.
The host injects synchronization points between the transfers and the multiplication, to ensure that multiplication does not start until all the data is present in the data cache memory.
The host is free to do other work instead of waiting for the accelerator subsystem. However, the host's operating system will normally require an explicit wait operation in order to synchronize with the accelerator subsystem.
Note that steps c and e could optionally be omitted, since the synchronization of transfer and calculation operations can easily be done within the accelerator subsystem as an option. However, this is incompatible with industry de facto standards.
Memory allocation of the data cache memory is handled at a higher level than the CP microcode executive.
The arrays are locked in memory, and the data fragmentation issues are handled by the interface software between the application and the accelerator subsystem. The frequent synchronization (or wait) points result in blocks of memory being locked for shorter periods of time, which places less strain on a multi-user or multi-tasking environment.

To execute a command the following steps occur:

(1) Host writes the command (transfer or calculation) into the accelerator subsystem's command d queue (maintained in the VME interface memory), specifying the command type and the corresponding number of parameters. After the command and its parameters are added to the queue, the host generates an interrupt in the data transfer processor module 120. The host is now free to do other work.

(2) On receiving the interrupt from the host the data transfer processor module 120 supends its current activity (either idling or some transfer) and examines the command type. The command can be one of three types:

If the command is for the control processor module 110 (i.e is a calculation), the command and its parameters are copied into cp_command FIFO 1520 in the command memory 190. An interrupt is generated in the control processor module 110 to notify it of the command. The data transfer processor module 120 returns to its previous activity.

If the command is for the data transfer processor module 120 (i.e. is a transfer request), then the command and its parameters are copied into a software maintained dtp_command FIFO in the command memory. The data transfer processor module 120 returns to its previous activity.

If the command is a synchronization command, no further commands are taken from the queue until all outstanding commands have been completed. To implement this, a "wait for all and notify host" command is inserted in the dtp_command queue.

(3) While the idle state the data transfer processor module 120 is continually checking the dtp_command FIFO. When this queue it becomes "not empty," the command is fetched from it and the operation carried out. In the case of a transfer from host memory into the data cache memory, for example, the data transfer processor module 120 sets up the DMA controller in the VME interface to fetch the array and write it in to the data FIFO. The data transfer processor module 120 reads the data from the data FIFO and writes it into the data cache memory. When the transfer has finished, the DTP module 120 removes the command from the dtp_command queue. If another command is in the FIFO, it is executed; if the dtp_command queue is empty the data transfer processor module 120 returns to the idle state.

(4) In response to the interrupt, the control processor module 110 leaves its idle state and reads the command and its parameters from the software cp_command FIFO in the command memory. The vector multiply of the arrays at addresses AA and BB is completed and the resulting array is left at address CC in the data cache memory. When the command has been executed it is removed from the cp_command FIFO 1520. If no other command exists the control processor module 110 returns to its idle state.

There are several points to note from the above description:

There is much less internal control and synchronization between the control processor module 110 and data transfer processor module 120 than in the physical memory model. The data transfer processor module 120 performs more of a control (or command routing) function than the control processor module 110.

There are three queues active, one for the host communication, one for the DTP's work, and one for the CP's work.

If any calculation requires more storage than is available on the accelerator subsystem in the data cache memory, then it is the host's responsibility to split the calculation up into smaller parts.

Cp and FP Interaction

The control processor module 110 and floating-point processor module 130 interact very closely in order to implement an algorithm. The control processor module 110 calculates addresses and handles the data transfer between the data cache memory and the floating-point processor module 130, while the floating-point processor module 130 does the data calculations. This interaction is independent of the type of interface between the control processor module 110, data transfer processor module 120 and host computer.

In the vector multiply command the floating-point processor module 130 calculates the vector multiplies, eight elements at a time. Thus, for a large array, there could be several thousand interactions (called synchronization points) between the control processor module 110 and floating-point processor module 130. The synchronization points, in this example, occur about every 400 ns and it is therefore very important to make them efficient.

In most cases the control processor module 110 is able to do the address calculations and data transfers more quickly than the floating-point processor module 130 can do the data calculations. If the reverse is true, then the waiting role is also reversed.

As discussed above, two flags (CPWAIT and FPWAIT) control the synchronization between both processors. The FPWAIT flag is cleared by the control processor module 110 when it has transferred the next set of data to or from the floating-point processor module 130. By testing this flag the floating-point processor module 130 can tell whether it can proceed through the synchronization point or needs to wait for the control processor module 110. The CPWAIT flag is cleared by the floating-point processor module 130 when it has finished the data calculations and is monitored by the control processor module 110. The hardware is arranged so that when a flag has been cleared to allow a processor through the synchronization point, it is automatically set once the synchronization point has been passed.

FIG. 22 is a state diagram which shows how the FPWAIT, CPWAIT, FPDONE, and CPDONE flags are used to regulate the data interface the data interface between the CP module 110 and the FP module 130.

There have been many different implementations of handshaking logic and semaphoring between processors. However, the state diagrams shown in FIG. 22 is very advantageous, and is believed to be novel.

The data transfers between the control processor module 110 and floating-point processor module 130 are double buffered, so that while the floating-point processor module 130 is working on one set of data the control processor module 110 can be working on the other. The double buffering is accomplished in software, as described above. Both processors have signals to control the swapping of the buffer, and these are "ANDed" together so the swap only occurs when both are active.

The vector multiply will take place in the following steps: (steps with the same number occur in parallel). These steps are also schematically represented in the flow chart of FIG. 33.

(1) The control processor module 110 sets the FPWAIT flag, and starts the floating-point processor module 130 running the vector multiply microcode. The floating-point processor module 130 waits for the FPWAIT flag to be cleared.

(2) The control processor module 110 transfers the first 8 elements from both arrays into the double buffer (which, physically, is provided by the two banks of the register files 430, as described above). The CP module then swaps the double buffer over to give the floating-point processor module 130 access to the data, and clears the FPWAIT flag.

(3) The control processor module 110 transfers the next 8 elements from both arrays into the double buffer and clears the FPWAIT flag. It then waits for the CPWAIT flag to be cleared (by the floating-point processor module 130).

(3b) The floating-point processor module 130, on detecting the FPWAIT flag being cleared, starts calculating the vector multiply for the 8 pairs of elements stored on floating-point processor module 130 side of the double buffer. The 8 results are written back into the double buffer and the CPWAIT flag is cleared. In this example, the control processor module 110 has already finished and cleared the FPWAIT flag, so the floating-point processor module 130 can change the buffers over and start the next set of calculations immediately.

(4a) The control processor module 110 transfers the 8 results from the double buffer into the data cache memory and then transfers the next 8 elements from both arrays into the double buffer and clears the FPWAIT flag. It then waits for the CPWAIT flag to be cleared (by the floating-point processor module 130).

(4b) The floating-point processor module 130, on detecting the FPWAIT flag being cleared, starts calculating the vector multiply for the 8 pairs of elements stored on its side of the double buffer. The 8 results are written back into the double buffer, and the CPWAIT flag is cleared. In this example, the control processor module 110 has already finished and cleared the FPWAIT flag, so the floating-point processor module 130 can swap the buffers over and start the next set of calculations.

(5) Steps (4a) and (4b) are repeated until the complete vector multiply has been completed.

(6) At the end of step (5) the final set of results are still stored on the FP's side of the double buffer, so the control processor module 110 swaps the buffers over and transfers the last results into the data cache memory.

Software Hierarchy

In the operation of system like that of FIG. 1, preferably the overall run time software environment is separated into several very distinct levels. Some of the levels exist because they are distinct modules of code that run on separate processors, and other levels exist to divide the different levels of interfacing required. All these levels and the inter-level interfacing are under software control and can be changed if they do not fit into the application's requirements.

This software organization is generally quite conventional. However, it is explicitly set out here to provide a clear picture of the preferred use of the described innovations.

Figure 44A:
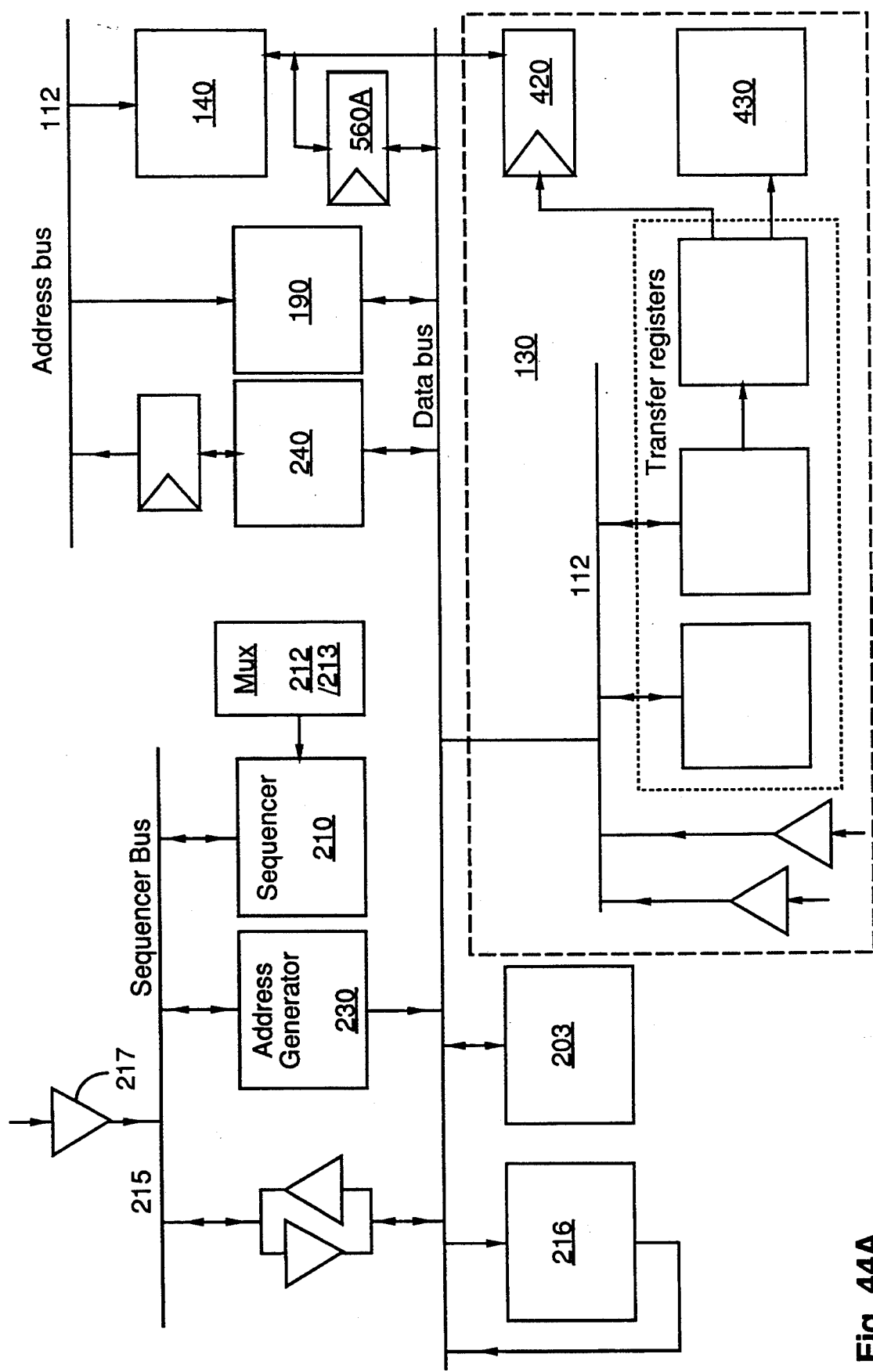
FIGS. 44A, 44B, and 44C schematically indicate the programming environment of the CP, DTP, and FP modules respectively.
Figure 44B:
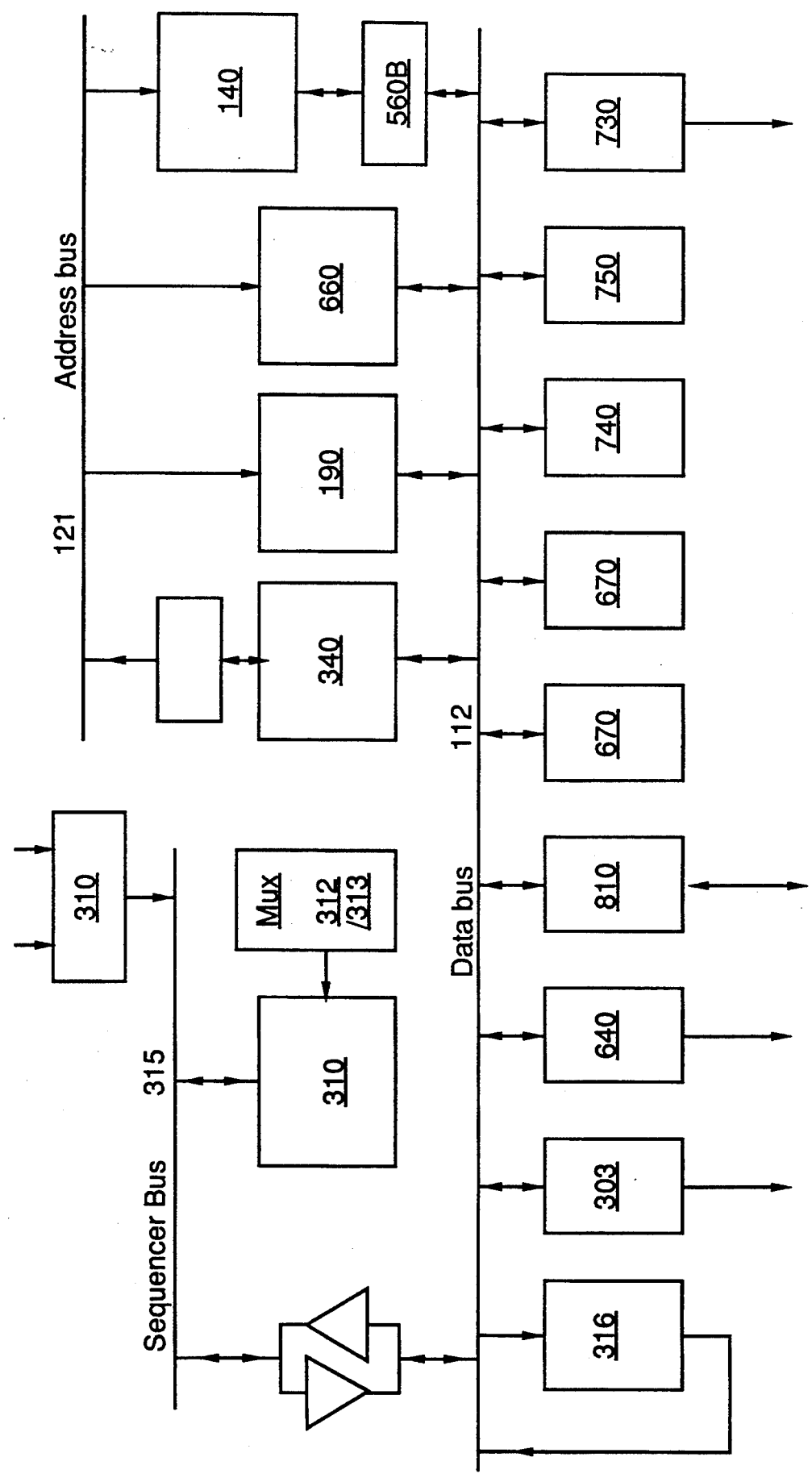
Figure 44C:
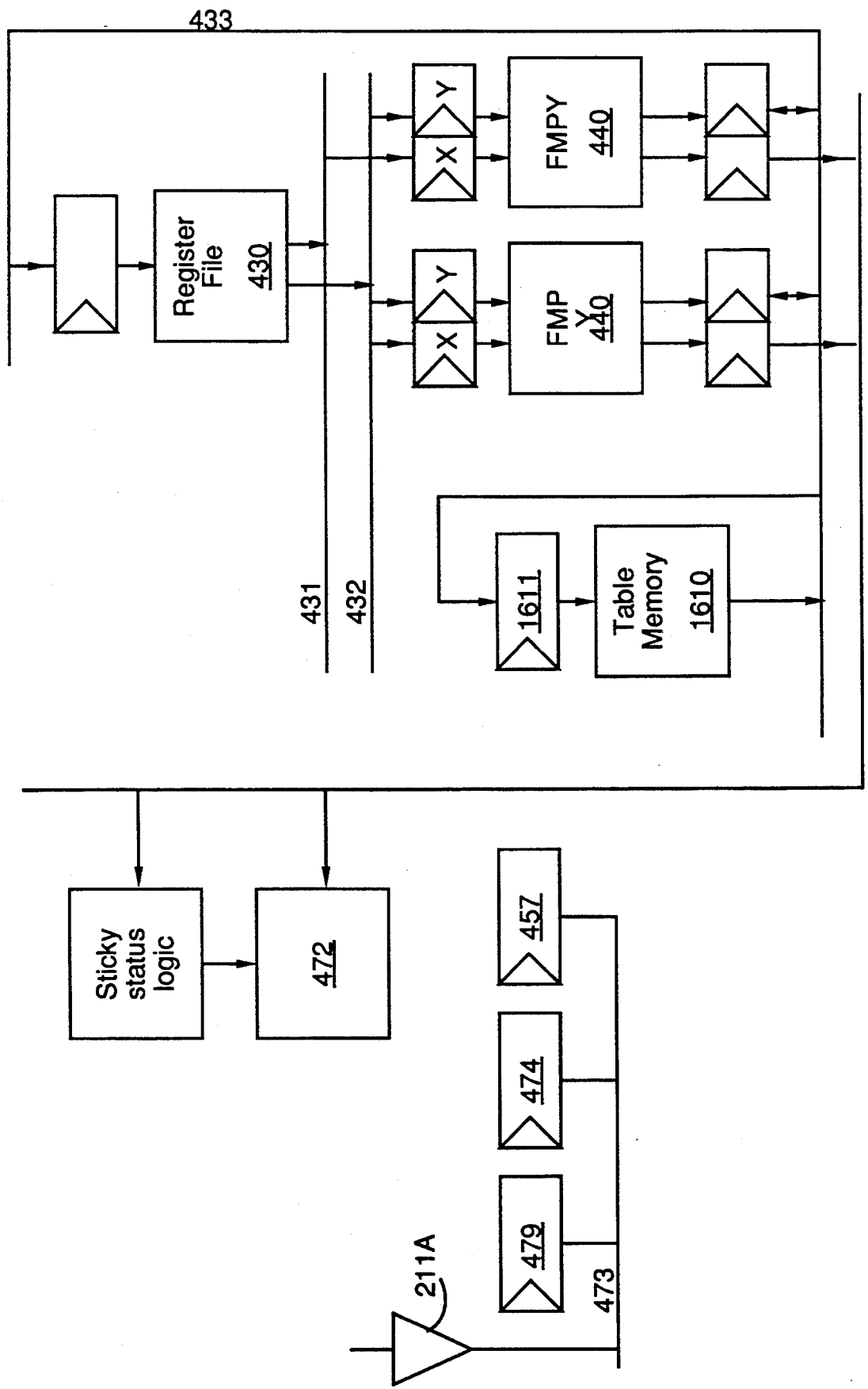

FIG. 44A, 44B, and 44C show the programming environment of a system like that shown in FIG. 1. Note that many of the functional blocks shown have reference numerals corresponding to those of hardware elements in other figures, but FIGS. 44A, 44B, and 44C are intended to show these blocks in the relation they might appear to a programmer. Therefore, it should be noted that these figures do not necessarily correspond exactly to the actual electrical and logical connections.

Application and Library Software

The following description assumes that the application software will be written in a high level language, typically FORTRAN or 'C', and will call standard library routines to use the accelerator subsystem. The calls conform to the de facto industry standard (i.e. are generally compatible with the instruction set of products from Floating Point Systems). They include routines to transfer data between the applications data area and the accelerator subsystem's data cache memory, a wide variety of calculations, and some synchronization routines.

The software at this level runs on the host computer system and implements the desired application. It is linked to the libraries to gain access to accelerator subsystem.

The libraries are the interface to the accelerator subsystem system that the application software sees. The libraries consist of several hundred common arithmetic/algorithmic functions, as well as routines to initialize the accelerator subsystem system and initiate data transfers of the application's arrays or data sets. Most library routines will do little more that pass the input parameters and a function number onto a device driver, but some form of parameter validation could be implemented if desired. In the presently preferred embodiment the interface to the device driver is via system calls. However, in some operating systems system calls carry heavy overheads because the calling task is submitted for rescheduling.

Device Driver

The device driver can be considered as part of the operating system, and runs at a more privileged level than the application software. Its main responsibilities are:

1) Transferring the commands and parameters from the library routines into the command queue maintained in the accelerator subsystem's VME interface memory. This entails some queue management and handling of the situation when the queue is full.

2) Making sure that any data to be transferred (in virtual memory systems) is locked in memory. This requires that the transfers have been split into contiguous blocks and multiple small transfers have actually taken place, or scatter/gather tables have been built and given to the accelerator subsystem.

3) Loading microcode into the multiple processors, and generally bringing the hardware and microcode up to a known state (either after power-on, or in preparation for a new application to use it).

One of the most difficult aspects of porting the libraries and device driver onto a new host is the device driver. These tend to be very operating-system specific, and require an intimate knowledge of the host system. Optionally, to avoid such problems, the libraries can interface to the hardware directly if physical memory accesses are allowed. This bypasses the need for a driver. This method of accessing the accelerator subsystem will be much faster than using the device driver. However, it will also be less secure, especially in a multi-user environment.

Microcode Executive

The microcode executive handles the residue of tasks, other than transfer and calculation, in the accelerator subsystem. Its main tasks are communication with the host, distribution of work between the control processor module 110 and data transfer processor module 120, and internal and external synchronization.

The executive is positioned on the other end of the queue from the device driver, and takes work off the queue. (This entails some queue management to ensure that work is not taken from an empty queue.)

The level of complexity will decide on which processor(s) are used, and will depend largely on how much of the work the host wants to, or can, offload onto the accelerator subsystem. The description of the vector multiply command with the physical and virtual memory models demonstrated the different approaches the executive could take.

In a physical memory architecture, the executive is split between the data transfer processor module 120 and the control processor module 110. The data transfer processor module 120 part does little more than command routing, because the host and control processor module 110 cannot exchange information directly. The control processor module 110 organizes the distribution of work and the handshaking.

Note that this split is somewhat arbitrary. In an alternative (and less preferred) architecture, the control processor module 110 could act as a slave processor to the data transfer processor module 120, rather than the other way around.

In the virtual memory model the data transfer processor module 120 was the master and the control processor module 110 acted as the slave. Most of the control aspects are handled in the host so the DTP's part of the executive only concerns itself with command routing. The control processor module 110 contributes a small amount of queue management.

Microcode Transfer Routines (DTP)

These routines concern themselves with the transfer of data between one of the external interfaces and the data cache memory. The interface will primarily be to the VME bus (and hence to the host memory).

Most of the transfers between the host memory and the data cache memory will fit into a very narrow range of different types, such as: contiguous block transfer; transfer with scatter/gather collection; every nth word; row/column 2-D array accesses.

Any types of transfers that do not fall into one of these categories can easily be added as required. An important point to note here is that a vector add will use the name transfer routines as a vector multiply. This is useful, as discussed above, since the data transfer routines (as opposed to the calculation routines) do not have to distinguish between a vector add and a vector multiply.

Microcode Transfer Routines (CP)

These routines concern themselves with the transfer of data between one of the data cache memory and the fast register files of the floating-point processor module 130.

Again, most of the transfers between the data cache memory and the register files will fit into a small range of different types, such as: one vector in, one vector out; two vectors in, one vector out; one vectoring a scalar(s) out. These transfer types can be further classified according to their data type. The vectors could be simple or complex data types, and there are a number of more specialized transfer types (such as FFT, convolution, etc.) that are more efficient if the general routines are not used.

The important thing to note here is that the same transfer routines can be used for different operations: a vector add will use the same transfer routines as a vector multiply, for example.

Microcode Calculation Routines (FP)

For each calculation type, there is a routine to perform the eight (for example) adds, subtracts or whatever is necessary. The data transfers governed by such routines would be only those within the closely coupled data path which includes the fast register files 430, the multiplier 450, the adder 440, and the scratchpad memory 1610. (This data path also includes several local busses, including the first operand local bus 431, the second operand local bus 432, the results local bus 433, and the loopback connection 434.)

Again, many of the required routines fall into a small number of standard data-format categories. One example of such a category is diadactic vector operations (two vectors in, one vector out; e.g. vector add or vector multiply). Thus, standard templates can be set up for each calculation type within a category. This allows the rapid production of FP microcode to implement many of the basic vector operations.

As discussed above, a registered operation specifier may be used to supplement the microcode operation commands. This permits all the separate routines in a category of calculation types to be formally written as a single routine. In this case the control processor module 110 must load the operation register to specify the calculation type.

Compacted Microcode

Note that the system described above has the capability to use compacted microcode, wherein an operation specifier held in a register can be combined with the remainder of the microcode instruction. This is actually used in the FP module 130, in the presently preferred embodiment, as described above.

Such a compacted microcode is particularly advantageous in a numeric processing portion of a multiprocessor subsystem. In this case, the use of operation-specifier-compacted microcode helps to reduce the need for overlaying operations.

Thus, for example, for operations which mapped two arrays onto a third array (e.g. $C_i = A_i + B_i$), the instruction register could be loaded with an operation specifier (e.g. "ADD") before a sequence of such operations was begun. The sequence of operations would then be stated in code which did not specify the operation directly.

Thus, this capability for real-time expansion of microcode makes the interface between two microcoded processors, in a multiprocessor system, much more flexible.

This also greatly simplifies the bandwidth requirements of loading instructions into the numeric processing portion. Thus, algorithm switching and re-partitioning of tasks generally become more efficient.

Multiway Branching

As discussed above regarding FIGS. 3A and 3B, the present invention provides significant new capabilities for multiway branching in microcoded systems. FIG. 30 schematically shows the microcode operation used in the presently preferred embodiment to provide multiway branching without address boundary constraints.

As described above, the present invention provides an architecture for microcoded computer systems with no address constraints on multiway branching. Moreover, the increment between alternative destinations is variable. A sequencer with relative addressing capability is used.

The presently preferred embodiment uses the program counter as an input to the jump destination. This is different from many previous implementations of multiway branching, where the base destination address is supplied from a different source.

Discrete Fourier Transform Implementation

Figure 31:
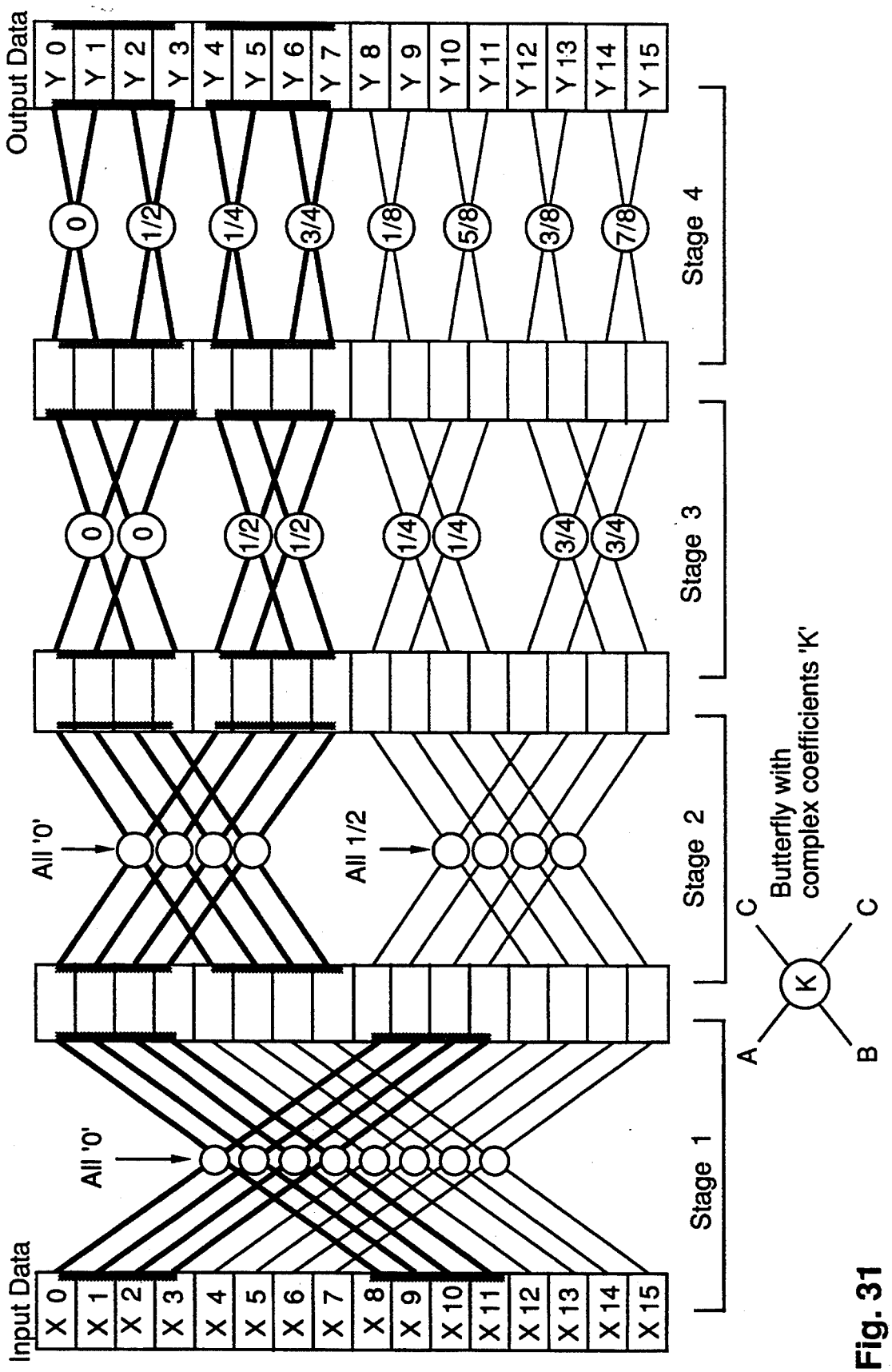
FIG. 31 schematically shows a method of running a discrete Fourier transform algorithm.

FIG. 31 diagrammatically shows some key features of an innovative implementation of a discrete integral transform. In this example, the transform being implemented is a fast Fourier transform (FFT).

The example shown is a 16 point radix-2 complex FFT. Of course, real-world FFT implementations will use many more data points, but this example clearly shows some important points. An n-point FFT normally requires $\log_2 n$ stages, so that a 1024-point FFT would require 10 stages. Each stage requires n/2 butterfly calculations to be performed.

The butterfly calculation is given by:

$$r0 = r4 + [(r6*r8) + (r7*r9)]$$

$$r1 = r5 + \{(r7*r8) - (r6*r9)\}$$

$$r2 = r4 - [(r6*r8) + (r7*r9)]$$

$$r3 = r5 - \{(r7*r8) - (r6*r9)\},$$

where:
r0 and r1 are the real and imaginary parts of result C
r2 and r3 are the real and imaginary parts of result D
r4 and r5 are the real and imaginary parts of input A
r6 and r7 are the real and imaginary parts of input B
r8 and r9 are the real and imaginary parts of coefficient k.

(Note that the subexpressions enclosed in square brackets [] are formally identical, and the subexpressions enclosed in curly brackets {} are also formally identical.)

FIG. 31 represents a four-stage FFT operation diagrammatically, with each circle representing one butterfly calculation. The lines connecting to the left of each circle show where the complex input samples (A and B) to the butterfly calculation come from, and the lines connecting to the right indicate where the complex results (C and D) are written to. The numbers within the circles are the complex phase coefficients "k".

In the presently preferred embodiment of this method, the FFT algorithm is implemented by being partitioned, in an architecture like that shown in FIG. 1, between the control processor module 110 and floating-point processor module 130. As FIG. 31 shows, the address calculations are not insignificant, especially where a large number of data points is needed. The control processor module 110 performs the address calculations, to provide the correct stream of data samples and phase coefficients for the butterfly calculations. The butterfly calculations are actually performed by the floating-point processor module 130.

The shaded bars marked on some of the data points, at each stage, show the innovative data handling provided by this embodiment. The shaded bars shown at each stage show one intermediate set of data transfers. Thus, for example, at the very beginning of the process, 8 complex words (C_words) of input data are loaded in. This amount of data provides sufficient input to perform four butterfly calculations. (Coefficients must also be provided.) The shaded bars indicate that (for example) for the first set of four butterflies, C_words X0, X1, X2, X3, X4, X8, X9, X10, and X11 would be loaded in. Four butterfly calculations are performed, and eight C_words of result are then transferred out. In addition, loading the correct set of phase coefficients may require some additional transfers. (Only one phase coefficient is used at the first stage, but note that the number of different phase coefficients k doubles at each stage.) Thus, at least four full cycles of bus 144 will be required for each set of four butterflies: two full cycles to bring in eight C_words of input, and two full cycles to remove eight C_words of results. (In addition, a fifth major cycle may be necessary to transfer in the coefficients.)

Eight C_words is equal to 512 bits, or sixteen F_words, so it may be seen that this is a quite significant block of data. However, this method has proven to be an advantageous way to make use of the high-bandwidth interface provided by the presently preferred embodiment.

Moreover, transferring data in blocks of this size turns out to work very well with the CP/FP handshaking logic used at synchronization points.

Thus, the FFT software is partitioned into two parts:
The control processor module 110 runs software running which calculates the address of the complex data, and the phase coefficient position in a table sequence, as a function of the stage and butterfly numbers. Once the addresses have been calculated, the process running in the control processor module also controls the transfer of the data and coefficients into the floating-point processor module 130. When the floating-point processor module 130 has completed the butterfly calculations (and sets flags to indicate that it is at a synchronization point), the control processor module 110 reads the results and saves them. Note that the control processor module 110 has no knowledge of the butterfly calculation; it merely interchanges data with the floating-point processor module 130 at synchronization points.

The FP module 130 runs software which calculates the butterfly by a simple linear sequence of instructions that implements the equations as defined above. This routine does not need to take account of the complicated address calculations needed to provide the correct input data and coefficients. This routine can therefore be written in total isolation from the software running on the CP module 110.

An advantageous feature of this partition W that the FP procedure at each stage can be exactly the same, until the last two stages. (The butterfly calculations performed during the last two stages use C_word inputs which fall more closely together, so that some intermediate results can be carried forward inside the FP, as data held in register 430.)

This example also demonstrates the capability for processor independence. The procedures executed by the FP module 130 are so simply defined that, if the floating-point processor module 130 were redesigned around a different calculation unit chip set, then only this simple butterfly routine would require changing. This my well be confined to a re-assembly operation.

The execution of the CP and FP software occurs in parallel, and is pipelined so that the speed at which an algorithm runs is determined by the slowest part.

Note that the FP instruction sequence, in implementing this butterfly calculation, remains the same for all except the last two butterflies in the FFT. Thus, for example, in a 1024-point complex FFT, the FP module would execute the same instruction sequence 512, to do the calculations for the first eight stages. Only then would the FFT begin running a different instruction sequence, for the last two stages.

FFT with Multiple FP Modules

Alternatively, a particularly attractive configuration is a system, like that shown in FIG. 10, which contains four FP modules 130.

There are two key factors which affect performance: the butterfly calculation time, and the data transfer bandwidth to the "butterfly calculator" (e.g. the FP module 130). The achieved performance is determined by whichever of these parameters is not met. The following sample calculation relates to a 1K complex FFT, radix 2.

Butterfly Calculation Throughput

The basic radix 2 FFT butterfly equations consist of ten operations (4 multiplies and 6 add/subtracts) when partial results can be reused, With a system like that of FIG. 1 (or FIG. 10) this calculation takes 10 cycles, because the equations don't lend themselves to using the ALU and Multiplier in parallel. Using a 42 ns cycle time, the butterfly calculation will take 420 ns. The true cycle times of 28 ns for the 6 ALU operations and 42 ns for the four multiplies (330 ns in total) have been derated to 400 ns for this estimate, to cover overheads such as synchronization, pipeline startup, etc. Thus, one FP module 130 can calculate a butterfly in 400 ns.

Transfer Bandwidth

Each radix 2 butterfly calculation requires 2 complex samples, and a complex coefficient (or twiddle factor). It produces 2 complex results. In total 5 complex numbers or ten floating point words need to be transferred per butterfly between the data cache memory 140 and the FPU. The cache memory bandwidth is 320 Mbytes per second, or 80M floating point words per second. This data rate is only achieved when 8 consecutive words can be transferred in one memory cycle (100 ns), However, when executing an FFT this can always be done. The most efficient way to use the memory bandwidth is to transfer data for 4 butterflies per memory cycle. Thus four butterfly calculations require 5 memory transfer cycles.

A 1K complex FFT (radix 2) contains 5120 butterflies. The minimum time permitted by the data transfer rate for this FFT is therefore given by. (5120/4)*5*100 ns=640 microseconds.

However, this throughput estimate must be modified, by considering the effect of the last two stages. Each data set (8 C_words) of results from a set of four butterfly calculations at stage n-2 is sufficient to calculate 4 butterflies for stage n and 4 butterflies for stage n+1, without returning the intermediate results back to memory. An additional set of coefficients will, however, be needed for the second stage. The net result of this is that 8 butterflies can be calculated with only 6 memory cycles. (This technique is further described at pages 577 and 599 of L. Rabiner and B. Gold, *Theory and application of digital signal processing*.)

A 1K complex FFT (radix 2) contains 5120 butterflies so the minimum time as governed by the data transfer rate with this two stage FFT algorithm is: (5120/8)*6*100 ns=384 microseconds. This time is less than the estimated transfer time of 400 microseconds. Therefore, the available memory bandwidth is well matched to a set of four FP modules working together to achieve an FFT in 400 microseconds.

There are several techniques that can be used to reduce the bandwidth requirements further:

1. The number of different coefficients used within a stage varies. For example stage 1 uses 1 coefficient value for all butterflies, stage 2 uses 2 coefficients, stage 3 uses four coefficients, etc, and stage 10 uses 512 coefficients.

For the earlier stages, there are big savings to be made in the memory bandwidth by initializing the coefficients at the beginning of the stage and not on every butterfly.

2. If four FFTs are performed in parallel (so that each of four FP modules 130, in a single accelerator subsystem, is used to calculate a separate FFT, rather than one quarter of one FFT, then the coefficients can be broadcast to all four FPs. This reduces the memory bandwidth used by the coefficient part of the transfers.

3. The two stage butterfly calculation can be extended to three or four stages, the limiting factor being the size of the FP's register files to hold the new data, the current data, and any intermediate storage. For example, a four stage algorithm requires 16 samples and 8 coefficients, and produces 16 results after 32 butterfly calculations. This gives a ratio of 10 memory cycles per 32 butterflies, which will allow the cache memory bandwidth to support an FFT calculation every 160 microseconds.

All these ideas can be used with a radix 4 or radix 8 FFT if desired. In fact, the very wide cache bus architecture provided may be particularly advantageous with higher-radix algorithms.

It should also be noted that other integral transforms can be similarly partitioned into stages of multiple butterfly calculations, although the butterfly definitions and the relations of the stages may be different. Thus, the foregoing teachings regarding data manipulation can be applied to other discrete integral transforms as well.

Histogram Algorithm Implementation

Figure 32:
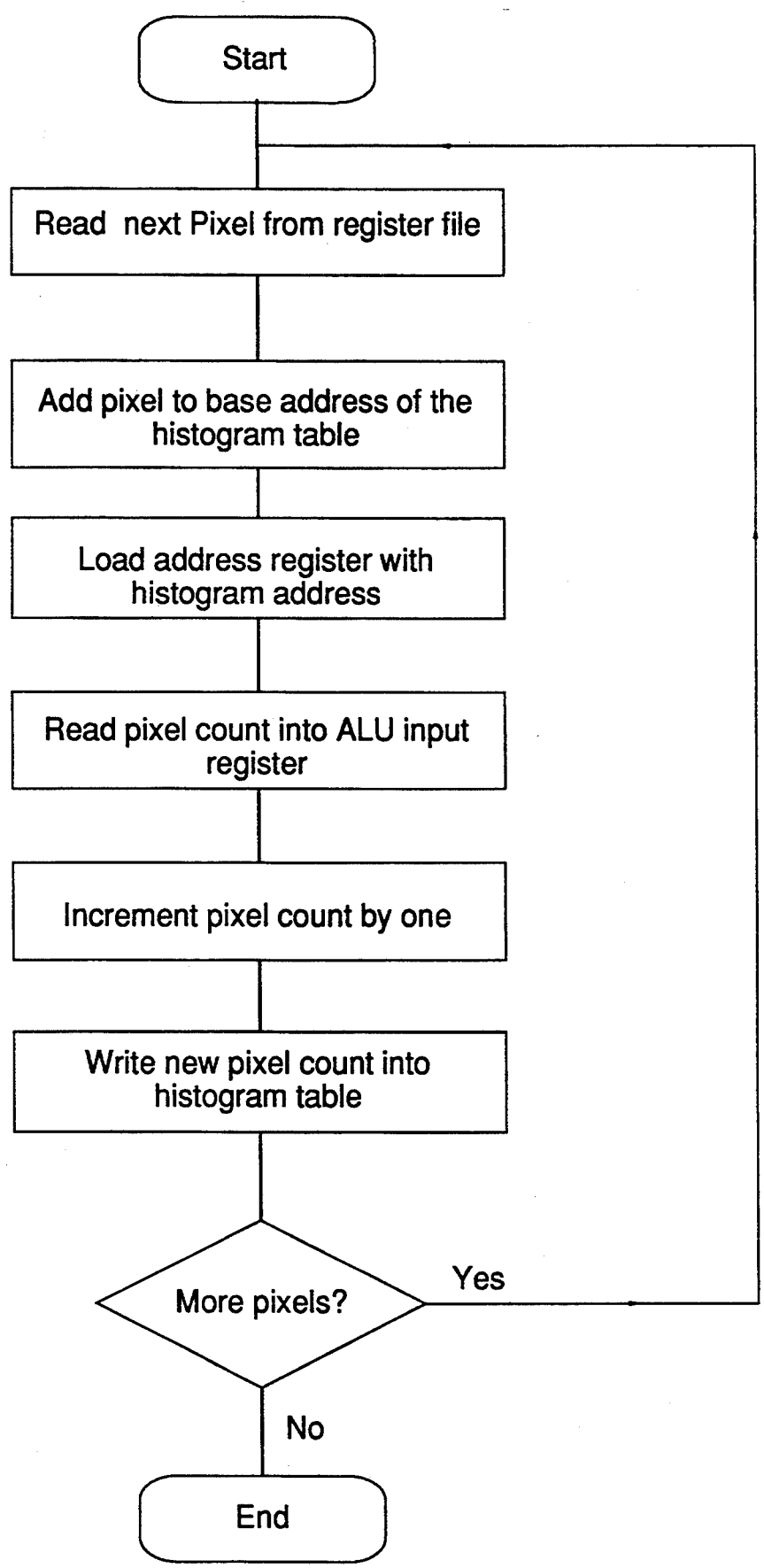
FIG. 32 shows a method of running a histogram algorithm, in hardware like that shown in FIG. 16.

FIG. 32 shows a method of running a histogram algorithm, in hardware like that shown in FIG. 16.

As FIG. 16 shows, the data path, in the calculation portion of the numeric processor subsystem 130, preferably includes not only a multiplier 440 and an adder 450, but also a scratchpad memory 1610 which is very closely coupled to this portion of the data path. (This memory includes address logic 1611.)

This scratchpad memory 1611 gives the module 130 the ability to calculate an address and fetch the data locally. Without the memory 1610, the FP module 130 would have to give the address to the CP module 110, which in turn would do the lookup function and return the result back to the FP module 130. Note that this would require significant additional handshaking, which would be very inefficient. Thus, the architecture of this small-scale data-path portion also cooperates advantageously with the large-scale data-handling architecture used for interface to the numeric processing module, as described above.

In the presently preferred embodiment, the scratchpad memory 1610 can be used in three ways: it can be used as a table memory, for algorithms such as calculation of transcendental functions; it can be used as a local stack; or it can be used in histogram algorithms to collect results.

The ability to use this scratchpad memory as a stack is particularly advantageous, since this permits the data interface, at the edge of the calculation portion of the subsystem, to be defined in a way which is very advantageous for the overall architecture, without requiring that the register files at that interface be capable of utilization as a stack.

Compilation of routines from common high-level languages (such as FORTRAN) into microcode is important way of generating microcode programs. Compilation of vector operations into efficient microcode is relatively easy. However, there will nearly always be a significant fraction of scalar operations as well, and compilation of these is a significantly trickier.

It has been discovered that compilation of scalar routines into microcode proceeds particularly well if a stack-based architecture can be used as the virtual machine. (The conventional procedure for doing this uses translation into reverse Polish logic.)

The use of this scratchpad memory to accumulate results is particularly advantageous with histogram algorithms. When histogram algorithms are run, the histogram data can be accumulated in the table memory. This avoids adding access load to the data cache bus.

The use of a closely coupled local memory to collect histogram data is particularly advantageous in image processing algorithms. Many known image processing algorithms use histogram computations, but the massive volumes of data which must be handled means that cache bandwidth is at a premium. This innovative teaching helps make the use of histogram algorithms more useful.

FIG. 32 shows a simple example of a fairly typical histogram procedure which is applicable to many image processing problems. Note that the histogram table is accessed at every iteration of the inner loop of this procedure. Therefore, providing a very closely coupled storage for the histogram table will tremendously reduce the bandwidth requirements for a procedure of this kind.

Pipelined Algorithm with Preview

A significant teaching contained herein is a method of running a pipelined algorithm, using a software-controlled double buffer with a preview mode to maintain average throughput through synchronization points.

Figure 33:
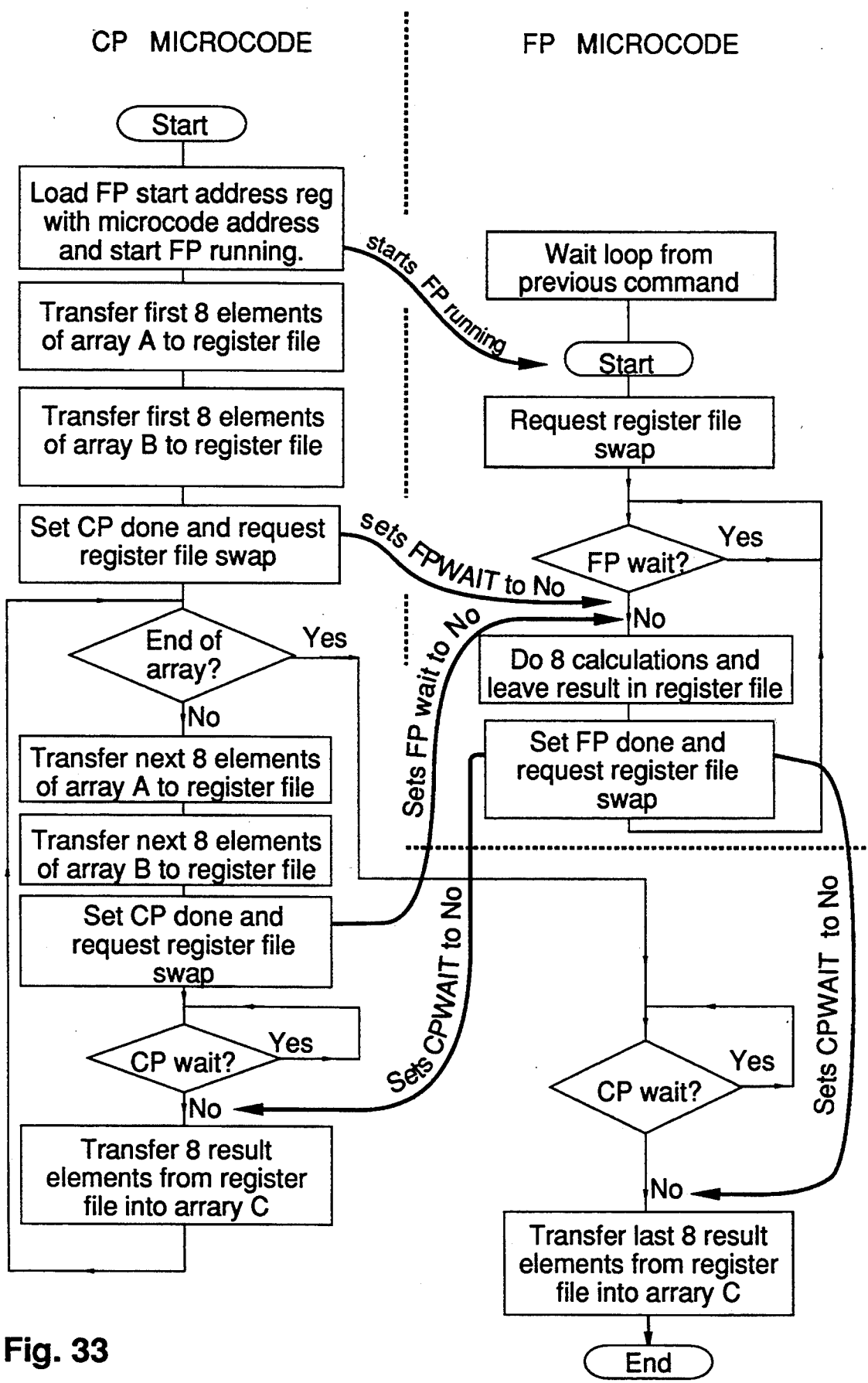
FIG. 33 shows a method of running a pipelined algorithm, in hardware which includes a software controlled double buffer like that shown in FIG. 20.
Figure 34:
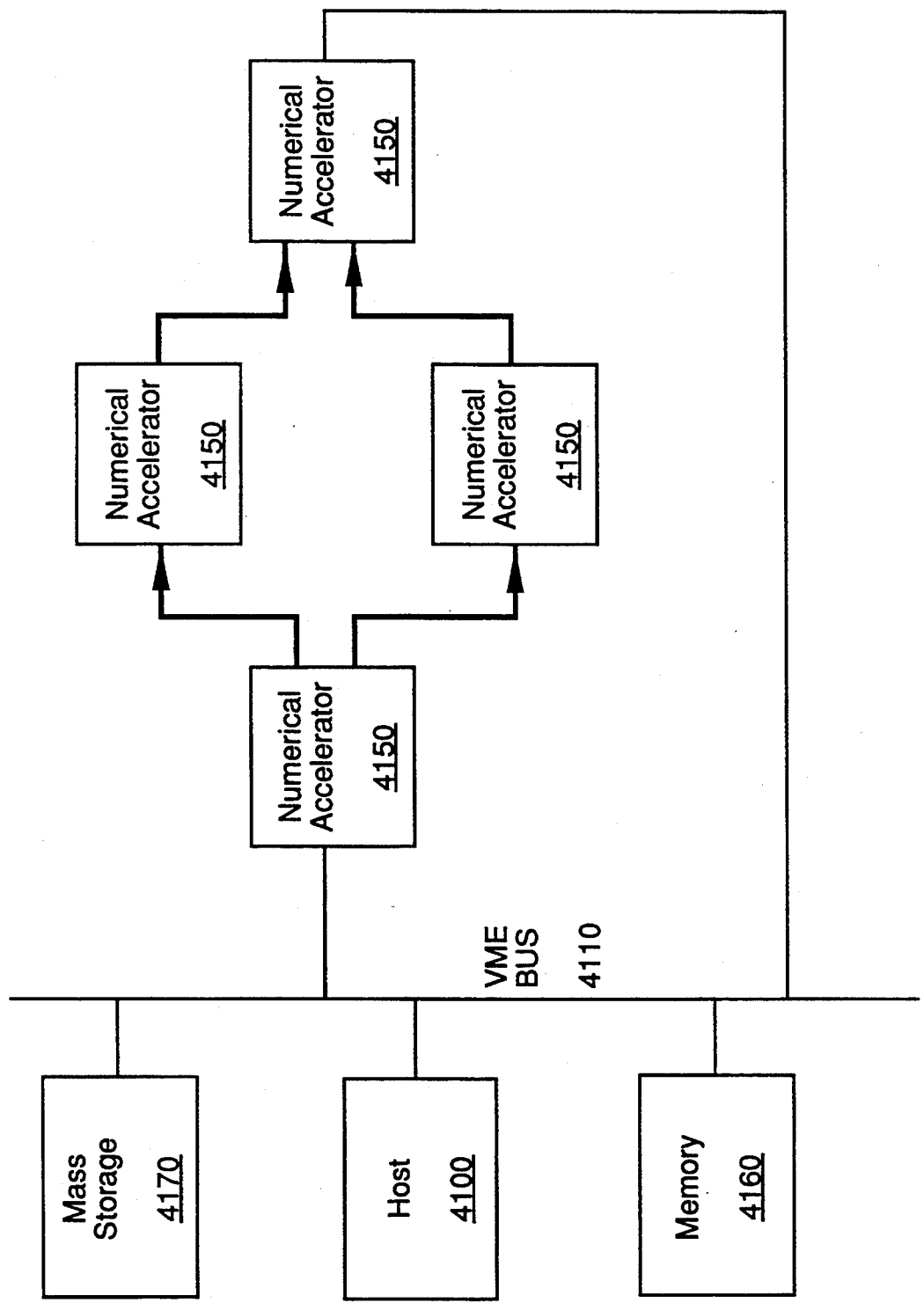
FIGS. 34, 35, 36, and 37 schematically show configurations of multiple subsystems like that of FIG. 1, each of which includes a data pipe interface like that shown in FIG. 7.
Figure 35:
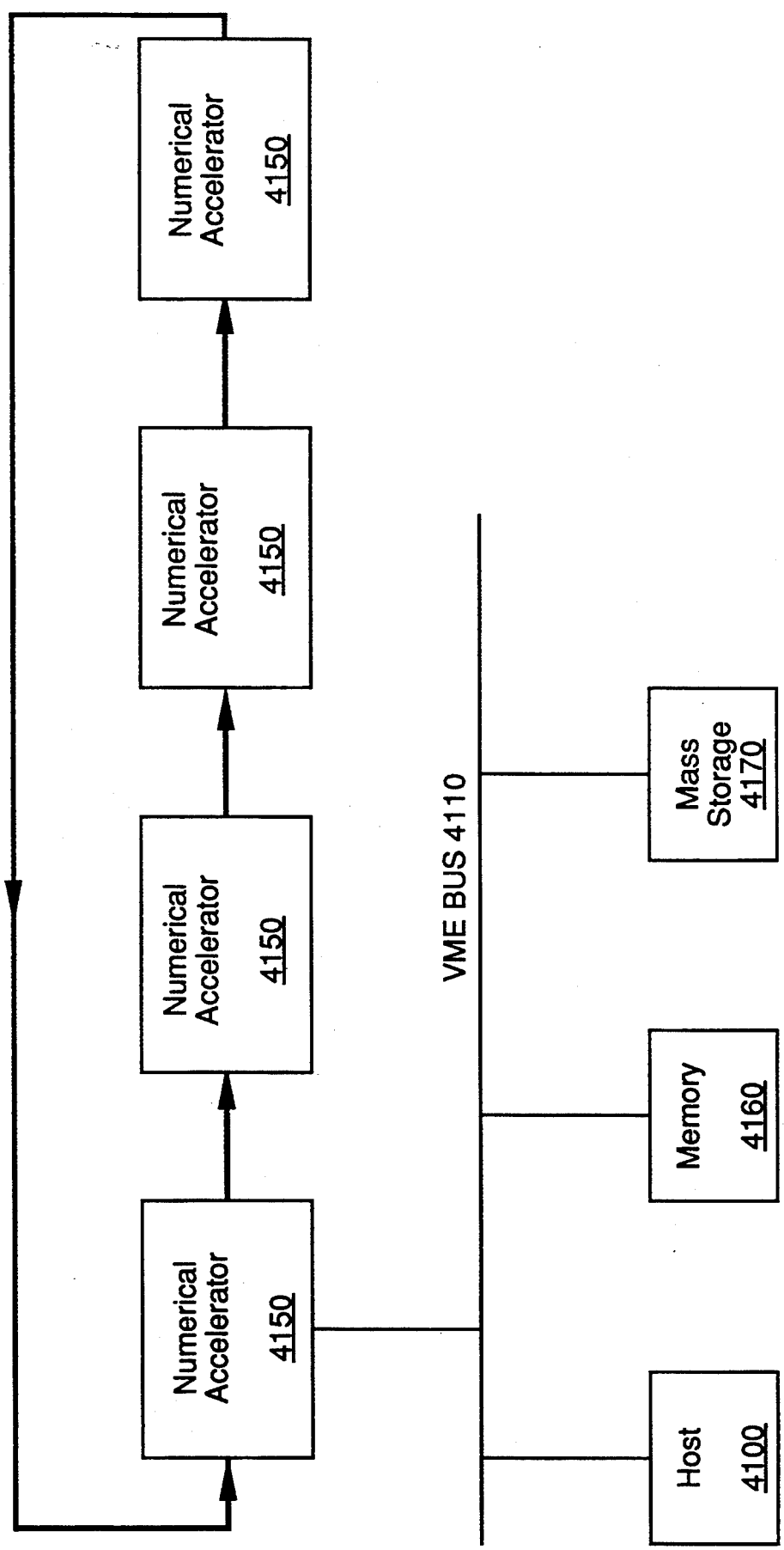

FIG. 33 shows a method of funning a pipelined algorithm; in hardware which includes a software-controlled double buffer like that shown in FIG. 20.

As noted above, the use of a software-controlled double buffer is very useful in crossing a clock boundary between high-speed calculation units and a higher level of control However, it should be noted that the advantages of a software-controlled double buffer extend to a very wide variety of pipelined algorithms.

The preferred subsystem for double buffering uses a dual port memory, partitioned in software so that the top half of the memory is allocated to one processor, and the bottom half to the other. (This allocation is switched when both processors set respective flag bits indicating that they are ready to switch.)

On accesses to this memory, additional bits tag the access as "physical," "logical," or "preview." A physical access is interpreted as a literal address within the full memory, and the double buffering is ignored. A logical access is supplemented by an additional address bit, determined by the double buffering switch state.

A preview access is used for read access only, and goes to the opposite bank of memory from that which would be accessed in a logical access. The use of preview access can be particularly advantageous in avoiding data flow inefficiencies at synchronization points in pipelined algorithms.

For example, if the standard double buffering techniques were used in a system like that shown in FIG. 1, it would be necessary to refill the data pipeline after every swap and empty it before. In this sample embodiment, a simple vector operation require the floating-point processor to do 8 calculations for each buffer's worth of data. This means that three cycles of overhead are used, to fill and empty the pipeline, for every eight words of data. Obviously, this adds a high percentage on to the overall average processing time.

One of the innovative teachings set forth herein is that "soft" double buffering can be used to overcome this problem. The preview mode (described above) allows one port to preview the data in the other half before it is swapped. This later mode provides a means for the floating-point processor pipeline to be kept full when the control processor has finished its work and is waiting to swap buffers before continuing.

Preferably double buffering is used in a register file at the interface between a numeric processor and a large data cache memory in a multiprocessor system. The partitioning of the register file avoids data collisions in the cache memory 140.

In this sample embodiment, a 5-ported register file 430 is used to implement the memory for the double buffer. However, a wide variety of other implementations could be used instead.

This innovation provides much greater flexibility than conventional systems which perform double buffering in hardware, at no loss in speed.

In particular, the "preview" mode permits this double-buffering implementation to be used as a versatile interface architecture in many pipelined environments.

Factors Limiting Performance

There are six fundamental factors that can limit maximum performance. They are:

- The I/O bandwidth (which in the presently preferred embodiment is 40 Mbytes per second);
- The data cache memory bandwidth (which in the presently preferred embodiments 320 Mbytes per second);
- The data transfer rate between the floating-point processor module 130 holding registers and the register file. This is currently less than the data cache memory bandwidth.
- Address calculation rate (which in the presently preferred embodiments typically 10 million per second, but this is very dependent on the algorithm being run).
- The sustained floating point calculation rate. In the presently preferred embodiment, for a single precision 'add' this is less than 28 ns cycle time (and likely to improve as faster components become available), and for a single precision multiply it is less than 42 ns cycle time.
- The number of numeric processing modules used in parallel.

Performance Assessment

The factor which determines the performance for a particular algorithm depends very much on which of the following conditions apply:

- Where the source data and results are stored: The best performance is achieved when the data is stored in the data cache memory. If the data is stored off-board, then it is very likely that the data I/O transfer rate will be the limiting factor. The achievable I/O rate will usually be determined by the peripherals involved and the type of transfers supported (single or block). An I/O rate of 40 Mbytes per second will limit the calculation rate to 3.3 Mflops, for a calculation where three numbers are involved in every calculation.
- The ratio of data to arithmetic operations. This determines whether the floating point calculation rate or the data transfer rate is the bottle-neck. Algorithms which require relatively little data for the amount of calculations (e.g. FFTs) will be limited by the floating-point processor module 130 speed. An example of an algorithm that is data transfer limited is vector add which requires 3 data values per arithmetic operation.
- The layout of data in data cache memory: The maximum transfer rate between the data cache memory and the floating-point processor module 130 is only achievable when 8 contiguous F_words (i.e. floating-point words, of 32 bits each) are transferred together. If the data for an algorithm cannot make use of this block transfer ability, then the net data transfer rate will drop.

This is tabulated below:

| Number Of F words | Transfer rate |
|---|---|
| 8 | 80 MF_words per second |
| 4 | 40 |
| 2 | 20 |
| 1 | 10 |

Most algorithms can make use of the higher transfer rates. (In fact, even the FFT can make use of higher transfer rates, as discussed above.)

- Overlapped operations: This allows off-board I/O transfers to occur in parallel to the floating point calculations. If the algorithms (or sequence of algorithms) can use this facility then the relatively slow I/O transfer rate might not effect the overall calculation rate.
- Multiple FPs: When an algorithm is calculation bound and not limited by the memory or I/O bandwidth then multiple FPs can give a multiple of the single floating-point processor module 130 performance, providing the memory bandwidth is not exceeded. For example, with 4 FPs there is no increase in the vector add performance but an FFT is calculated 4 times faster.

As will be appreciated by those skilled in the art, the innovations disclosed herein can be applied in a wide variety of contexts, and are subject to a wide range of modification and variation. Therefore, the full scope of claimed patent protection is not defined by any of the sample embodiments set forth herein, nor by any statements made herein concerning those embodiments, but is defined solely by the claims appended hereto.

What is claimed is:

1. A computer system, comprising:
    an external interface controller, operatively connected to an external interface bus;
    a control processor, connected to execute a first separate respective stream of instructions;
    a data transfer processor, which is operable concurrently with said control processor to execute a separate respective stream of instructions, and is connected to control said external interface controller;
    a numeric processor, which is operable concurrently and asynchronously with said control processor and data transfer processor, and which executes a respective instruction sequence under the overall control of said control processor; and
    a shared clock, connected to clock said control processor and said data transfer processor, said clock having a variable duration which is dependent on the instructions being executed by said control processor and also on the instructions being executed by said data transfer processor.

2. The system of claim 1, wherein said shared clock is provided by a clock generator which monitors both said respective stream of instructions being executed by said data transfer processor and also the respective stream of instructions being executed by said control processor.

3. The system of claim 1, wherein said control processor and said data transfer processor each execute instructions, in a predetermined format with multiple assigned fields, from a respective control store, and wherein one of said assigned fields of said predetermined format of said control and data transfer processors specifies instruction duration.

4. The system of claim 1, wherein said shared clock has one of four possible durations, in dependence on the instructions being executed by said control processor and also on the instructions being executed by said data transfer processor.

5. The system of claim 1, wherein said shared clock includes multiple clock signals provided to both said control processor and also to said data transfer processor.

6. The system of claim 1, wherein said shared clock includes multiple clock signals provided to both said control processor and also to said data transfer processor, including at least first and second clock signals which have equal frequency and are separated by a constant phase difference.

7. The system of claim 1, wherein said shared clock includes multiple clock signals provided to both said control processor and also to said data transfer processor, said multiple clock signals including at least a first clock signal, a second clock signal which has the same frequency as said first clock signal, and a third clock signal which does not have same frequency as said first clock signal.

8. The system of claim 1, wherein said shared clock includes multiple clock signals provided to both said control processor and also to said data transfer processor, including at least one clock signal which has a constant-length first phase and a variable-length second phase.

9. The system of claim 1, wherein said shared clock is generated by a clock generator circuit which is programmable, through said bus interface, to selectably be free-running, single-step, or stop.

10. A computer system, comprising:
external interface logic, operatively connected to an external interface bus;
a first microprogrammed processor, connected to execute a first respective stream of instructions;
a second microprogrammed processor, connected to execute a second respective stream of instructions concurrently with said first processor's execution of said first stream of instructions;
at least one numeric processor, connected to execute a third respective stream of instructions concurrently with said first processor's execution of said first stream of instructions and said second processor's execution of said second stream of instructions;
a clock generator, connected to receive clock-duration signals from said first processor and also from said second processor, and configured to generate a shared clock signal which has a variable duration which is dependent on both said clock-duration signals;
said shared clock signal being connected to clock said first and second processors, but not said numeric processor.

11. The system of claim 10, wherein said shared clock includes multiple clock signals provided to both said first processor and also to said second processor, including at least one clock which has a constant-length first phase and a variable-length second phase.

* * * * *